US012100042B2

(12) United States Patent
Quillian

(10) Patent No.: US 12,100,042 B2
(45) **Date of Patent: *Sep. 24, 2024**

(54) SUPPLY CHAIN FINANCE SYSTEM

(71) Applicant: PrimeRevenue, Inc., Atlanta, GA (US)

(72) Inventor: David W. Quillian, Atlanta, GA (US)

(73) Assignee: PrimeRevenue, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,718

(22) Filed: May 15, 2022

(65) Prior Publication Data

US 2022/0277389 A1 Sep. 1, 2022

Related U.S. Application Data

(63) Continuation of application No. 17/134,071, filed on Dec. 24, 2020, now Pat. No. 11,334,942, which is a continuation of application No. 16/036,877, filed on Jul. 16, 2018, now Pat. No. 10,878,498, which is a continuation of application No. 13/734,856, filed on Jan. 4, 2013, now Pat. No. 10,026,120.

(60) Provisional application No. 61/584,117, filed on Jan. 6, 2012.

(51) Int. Cl.

*G06Q 40/06* (2012.01)
*G06F 21/62* (2013.01)
*G06Q 40/03* (2023.01)

(52) U.S. Cl.

CPC ......... *G06Q 40/03* (2023.01); *G06F 21/6245* (2013.01); *G06Q 40/06* (2013.01)

(58) Field of Classification Search

USPC .......................................................... 705/35

See application file for complete search history.

(56) References Cited

U.S. PATENT DOCUMENTS

| | | | |
|---|---|---|---|
| 4,713,761 | A | 12/1987 | Sharpe et al. |
| 4,799,156 | A | 1/1989 | Shavit et al. |
| 5,025,372 | A | 6/1991 | Burton et al. |
| 5,433,483 | A | 7/1995 | Yu |
| 5,465,206 | A | 11/1995 | Hilt et al. |

(Continued)

FOREIGN PATENT DOCUMENTS

| | | |
|---|---|---|
| CN | 1184546 | 6/1998 |
| EP | 0858057 | 8/1998 |

(Continued)

OTHER PUBLICATIONS

M. A. Sirbu, "Credits and debits on the Internet," in IEEE Spectrum, vol. 34, No. 2, pp. 23-29, Feb. 1997, doi: 10.1109/6.570823. (Credit). (Year: 1997).*

(Continued)

*Primary Examiner* — Chikaodinaka Ojiaku

(74) *Attorney, Agent, or Firm* — Nelson Mullins Riley & Scarborough LLP; Anthony A. Laurentano

(57) ABSTRACT

In an electronic supply chain finance system, a method of enabling a supplier to obtain funds includes receiving information from a buyer defining a payment obligation, receiving an offer to sell the payment obligation, and providing electronic instructions to print a negotiable instrument issued by the buyer, to the supplier as payee, having a payable date based on a maturity date of the payment obligation and a payment value based on a payment amount of the payment obligation.

24 Claims, 92 Drawing Sheets

(56) References Cited

U.S. PATENT DOCUMENTS 5,550,734 A 8/1996 Tarter et al.
5,677,955 A 10/1997 Doggett et al.
5,694,552 A 12/1997 Aharoni
5,717,989 A 2/1998 Tozzoli et al.
5,757,917 A 5/1998 Rose et al.
5,794,207 A 8/1998 Walker et al.
5,802,497 A 9/1998 Manasse
5,818,343 A 10/1998 Sobel et al.
5,825,881 A 10/1998 Colvin, Sr.
5,890,137 A 3/1999 Koreeda
5,910,896 A 6/1999 Hahn-Carlson
5,933,817 A 8/1999 Hucal
5,950,174 A 9/1999 Brendzel
5,970,475 A 10/1999 Barnes et al.
5,978,780 A 11/1999 Watson
6,029,150 A 2/2000 Kravitz
6,052,674 A 4/2000 Zervides et al.
6,081,790 A 6/2000 Rosen
6,167,378 A 12/2000 Webber, Jr.
6,167,385 A 12/2000 Hartley-Urquhart
6,212,504 B1 4/2001 Hayosh
6,772,342 B1 8/2004 Hawthorne
6,934,692 B1 8/2005 Duncan
7,047,219 B1 5/2006 Martin et al.
7,069,234 B1 6/2006 Cornelius et al.
7,082,412 B1 7/2006 Treider et al.
7,149,720 B2 12/2006 Shepherd
7,155,409 B1 12/2006 Stroh
7,165,174 B1 1/2007 Ginter et al.
7,266,525 B1 9/2007 Duncan
7,340,433 B1 3/2008 Kay
7,363,270 B2 4/2008 Iversen
7,430,537 B2 * 9/2008 Templeton ............. G06Q 40/12 705/40
7,505,945 B2 3/2009 Landrock
7,716,130 B2 5/2010 Duncan
7,720,755 B1 5/2010 Coyle
7,725,372 B2 5/2010 Hahn-Carlson
7,765,161 B2 7/2010 McKenney et al.
7,996,314 B1 8/2011 Smith et al.
8,296,204 B2 * 10/2012 Templeton ......... G06Q 20/4016 705/40
8,370,259 B2 * 2/2013 Templeton ........... G06Q 20/401 705/40
8,417,637 B2 * 4/2013 Templeton ............. G06Q 20/10 705/40
9,224,143 B2 12/2015 Potts et al.
2001/0016838 A1 8/2001 Landrock
2001/0029482 A1 * 10/2001 Tealdi .................... G06Q 40/02 705/38
2001/0051919 A1 12/2001 Mason
2002/0004772 A1 * 1/2002 Templeton ............. G06Q 20/02 705/35
2002/0062258 A1 5/2002 Bailey et al.
2002/0116332 A1 8/2002 Sanchez
2002/0169708 A1 11/2002 Chittenden
2003/0014318 A1 1/2003 De La Motte et al.
2003/0018563 A1 1/2003 Kilgour et al.
2003/0046229 A1 3/2003 Cresswell
2003/0061082 A1 3/2003 Stoutenburg
2003/0183685 A1 10/2003 Steele Moore et al.
2003/0220863 A1 11/2003 Holm et al.
2003/0225694 A1 12/2003 Algiene
2003/0225708 A1 12/2003 Park et al.
2004/0044620 A1 3/2004 Iversen
2004/0049445 A1 3/2004 Kishore
2004/0083181 A1 4/2004 Briley
2004/0093493 A1 5/2004 Bisbee et al.
2004/0111619 A1 6/2004 Laurie et al.
2005/0131780 A1 6/2005 Princen
2005/0131785 A1 6/2005 Yap
2005/0187835 A1 8/2005 Stoutenburg et al.
2005/0283437 A1 12/2005 McRae et al.
2006/0080111 A1 * 4/2006 Homeier-Beals ............................ G06Q 20/3227 705/1.1
2006/0089890 A1 4/2006 Campbell
2006/0095358 A1 5/2006 Viarengo et al.
2006/0095367 A1 5/2006 Iverson
2006/0095374 A1 5/2006 Lo et al.
2006/0122933 A1 * 6/2006 Browning .......... G06Q 20/4016 705/45
2006/0149668 A1 7/2006 Zafrir
2007/0061260 A1 3/2007 deGroeve
2007/0100711 A1 5/2007 Stroh
2007/0130063 A1 6/2007 Jindia
2007/0143230 A1 6/2007 Narainsamy et al.
2007/0156584 A1 * 7/2007 Barnes ................. G06Q 20/102 705/40
2007/0174191 A1 7/2007 Keaton et al.
2007/0271182 A1 11/2007 Prakash
2007/0282744 A1 12/2007 Barnes et al.
2008/0133940 A1 6/2008 Laurie et al.
2008/0162304 A1 7/2008 Ourega
2008/0172314 A1 7/2008 Hahn-Carlson
2008/0219543 A1 9/2008 Csulits et al.
2008/0247629 A1 10/2008 Gilder et al.
2008/0249931 A1 10/2008 Gilder et al.
2008/0262953 A1 10/2008 Anderson et al.
2008/0262954 A1 10/2008 Nally
2008/0312998 A1 * 12/2008 Templeton ......... G06Q 30/0609 705/7.29
2009/0010427 A1 * 1/2009 Meadow ................ G06Q 20/04 235/379
2009/0132404 A1 * 5/2009 King ...................... G06Q 40/02 705/35
2010/0004953 A1 * 1/2010 Pelenur .................. G06Q 40/08 705/4
2010/0049650 A1 2/2010 Keaton et al.
2010/0070324 A1 3/2010 Bock et al.
2010/0161466 A1 6/2010 Gilder
2010/0260408 A1 10/2010 Prakash et al.
2011/0066529 A1 3/2011 Larsen et al.
2011/0066564 A1 3/2011 Larsen et al.
2012/0011071 A1 1/2012 Pennock et al.
2012/0054103 A1 * 3/2012 Templeton ............. G06Q 40/04 705/44
2012/0054104 A1 * 3/2012 Templeton ............. G06Q 20/10 705/44
2012/0109823 A1 * 5/2012 Templeton ............. G06Q 20/04 705/44
2012/0116972 A1 5/2012 Walker
2012/0185375 A1 * 7/2012 Tealdi .................... G06Q 40/03 705/37
2013/0246261 A1 * 9/2013 Purves ................... G06Q 20/36 705/41
2013/0311399 A1 * 11/2013 Tilton .................... G06Q 40/03 705/36 R
2014/0074701 A1 3/2014 Kingston et al.
2014/0289113 A1 9/2014 Decristoforo
2015/0019944 A1 * 1/2015 Kalgi ................. G06Q 20/3552 715/205
2015/0154588 A1 * 6/2015 Purves ................... G06Q 20/12 705/14.27
2015/0178693 A1 6/2015 Solis
2015/0220914 A1 * 8/2015 Purves ................. G06Q 20/405 705/41
2017/0011464 A1 * 1/2017 Puma ..................... G06Q 40/04
2020/0279242 A1 * 9/2020 Dahn .................. G06Q 20/405

FOREIGN PATENT DOCUMENTS

EP 0910028 4/1999
GB 1199308 7/1970
JP 11-149503 6/1999
WO 90/11572 10/1990
WO 91/09370 6/1991
WO 97/16798 5/1997
WO 98/14921 4/1998
WO 98/28699 7/1998

(56) References Cited

FOREIGN PATENT DOCUMENTS

| | | |
|---|---|---|
| WO | 99/03243 | 1/1999 |
| WO | 99/10850 | 3/1999 |
| WO | 99/15999 | 4/1999 |
| WO | 99/66460 | 12/1999 |
| WO | 00/22561 | 4/2000 |
| WO | 00/67167 | 11/2000 |

OTHER PUBLICATIONS

J. . -H. Chen and W. H. Chen, "Factoring Account Receivables Towards Mitigating Cash Flow Fluctuation for Construction Projects," 2008 IEEE International Conference on Communications, Beijing, China, 2008, pp. 5538-5542 (Factoring). (Year: 2008).*
J Christopher Westland; Theordore H. Clark, "Electronic Financial Markets," in Global Electronic Commerce: Theory and Case Studies , MIT Press, 1999, pp. 385-444 (E Market) (Year: 1999).*
Zaretsky, B., Contract Liability of Parties to Negotiable Instruments, Alabama Law Review, pp. 626-677.
Time draft; Internet Archive (https://web.archive.org/web/20080216022843/http://www.businessdictionary.com/definition/time-draft.html) Feb. 16, 2008.
Information Disclosure Statement for U.S. Appl. No. 11/756,484 dated Aug. 18, 2010.
Information Disclosure Statement for U.S. Appl. No. 11/561,837 dated Nov. 15, 2010.
Information Disclosure Statement for U.S. Appl. No. 09/947,062 dated Jun. 4, 2008.
FactorWorks 2.0 Checkpoint Document, FactorWorks Inc., pp. 1-64.
Kosiur, David R. "Chapter 3 Handling Money on the Net." Understanding Electronic Commerce. Redmond, WA: Microsoft, 1997. 35-63.
Sirbu, M., NetBill: An Internet Commerce System Optimized for Network-Delivered Services, IEEE Personal Communications, Aug. 1995, pp. 34-39.
Bregman, Robert L., "A Note on Optimal Order Quantities for Credit Purchases," International Journal of Production Economics, 28, May 8, 1992, pp. 203-210.
Haight, Timothy, "The Enemy is Us," Network Computing, May 1, 1993, Issue: 405.
The Inside Story- In-House Banking, Mar. 11, 1994 Banking Technology BNKTC, 2010 Factivia Inc., pp. 5-7.
Hill, Ned C. and Michael J. Swenson, "The Impact of EDI on Credit and Sales," Business Credit, Jan. 1, 1995, vol. 97, No. 1.
Herzberg, Amir and Yochai, Hilik, "MiniPay: Charging Per Click on the Web," Computer Networks and ISDN Systems 29, 1997, pp. 939-951.
Petersen, Mitchell A. and Rajan Raghuram G., "Trade Credit: Theories and Evidence," The Review of Financial Studies, Fall 1997, pp. 661-691, vol. 10, No. 3.
Uniform Commercial Code, Article 3—Negotiable Instruments (2002), Part 1. General Provisions and Definitions, http://www.law.cornell.edu/ucc/3/3-104 , Nov. 17, 2016, pp. 1-3.
Non-Final Office Action for U.S. Appl. No. 11/561,837 dated Oct. 15, 2008.
Response to Office Action for U.S. Appl. No. 11/561,837 dated Oct. 15, 2008.
Non-Final Office Action for U.S. Appl. No. 11/756,484 dated Dec. 11, 2008.
Response to Office Action for U.S. Appl. No. 11/756,484 dated Dec. 11, 2008.
Final Office Action for U.S. Appl. No. 11/561,837 dated Mar. 12, 2009.
Response to Final Office Action for U.S. Appl. No. 11/561,837 dated Mar. 12, 2009.
Final Office Action for U.S. Appl. No. 11/756,484 dated Jul. 22, 2009.
Response to Final Office Action for U.S. Appl. No. 11/756,484 dated Jul. 22, 2009.
Final Office Action for U.S. Appl. No. 11/561,837 dated Sep. 10, 2009.
Response to Final Office Action for U.S. Appl. No. 11/561,837 dated Sep. 10, 2009.
Interview Summary for U.S. Appl. No. 11/756,484 dated Dec. 15, 2009.
Non-Final Office Action for U.S. Appl. No. 11/756,484 dated Mar. 18, 2010.
Response to Office Action for U.S. Appl. No. 11/756,484 dated Mar. 18, 2010.
Final Office Action for U.S. Appl. No. 11/756,484 dated Oct. 25, 2010.
Response to Final Office Action for U.S. Appl. No. 11/756,484 dated Oct. 25, 2010.
Non-Final Office Action for U.S. Appl. No. 11/756,484 dated May 8, 2012.
Response to Office Action for U.S. Appl. No. 11/756,484 dated May 8, 2012.
Non- Final Office Action for U.S. Appl. No. 11/561,837 dated May 29, 2012.
Response to Office Action for U.S. Appl. No. 11/561,837 dated May 29, 2012.
Non- Final Office Action for U.S. Appl. No. 13/283,401 dated Nov. 20, 2012.
Response to Office Action for U.S. Appl. No. 13/283,401 dated Nov. 20, 2012.
Final Office Action for U.S. Appl. No. 11/756,484 dated Mar. 7, 2013.
Response to Final Office Action for U.S. Appl. No. 11/756,484 dated Mar. 7, 2013.
Final Office Action for U.S. Appl. No. 11/561,837 dated Mar. 15, 2013.
Response to Final Office Action for U.S. Appl. No. 11/561,837 dated Mar. 15, 2013.
International Search Report and Written Opinion for PCT application No. PCT/US13/20480, dated Mar. 18, 2013.
Final Office Action for U.S. Appl. No. 13/283,401 dated Jul. 29, 2013.
Response to Final Office Action for U.S. Appl. No. 13/283,401 dated Jul. 29, 2013.
Non- Final Office Action for U.S. Appl. No. 11/756,484 dated Oct. 9, 2013.
Response to Office Action for U.S. Appl. No. 11/756,484 dated Oct. 9, 2013.
Non- Final Office Action for U.S. Appl. No. 11/561,837 dated Apr. 3, 2014.
Response to Office Action for U.S. Appl. No. 11/561,837 dated Apr. 3, 2014.
Non- Final Office Action for U.S. Appl. No. 11/756,484 dated Jul. 23, 2014.
Response to Office Action for U.S. Appl. No. 11/756,484 dated Jul. 23, 2014.
Non-Final Office Action for U.S. Appl. No. 13/283,401 dated Oct. 6, 2014.
Response to Office Action for U.S. Appl. No. 13/283,401 dated Oct. 6, 2014.
Non- Final Office Action for U.S. Appl. No. 11/561,837 dated Oct. 29, 2014.
Response to Office Action for U.S. Appl. No. 11/561,837 dated Oct. 29, 2014.
Final Office Action for U.S. Appl. No. 11/756,484 dated Jun. 24, 2015.
Final Office Action for U.S. Appl. No. 11/561,837 dated Jul. 14, 2015.
Final Office Action for U.S. Appl. No. 13/283,401 dated Jul. 29, 2015.
Response to Final Office Action for U.S. Appl. No. 13/283,401 dated Jul. 29, 2015.
Non-Final Office Action for U.S. Appl. No. 13/283,401 dated Nov. 23, 2016.

(56) References Cited

OTHER PUBLICATIONS

Response to Office Action for U.S. Appl. No. 13/283,401 dated Nov. 23, 2016.
Final Office Action for U.S. Appl. No. 13/283,401 dated Jun. 23, 2017.
Response to Final Office Action for U.S. Appl. No. 13/283,401 dated Jun. 23, 2017.
Examination Report for corresponding Australian application No. 2013207351, dated Jun. 16, 2017.
Examination Report 2 for corresponding Australian application No. 2013207351, dated Feb. 8, 2018.
Examination Report 3 for corresponding Australian application No. 2013207351, dated Jun. 4, 2018.
Office Action for U.S. Appl. No. 13/283,401 dated Feb. 14, 2019.
Response to Office Action for U.S. Appl. No. 13/283,401 dated Feb. 14, 2019.
Supplemental Notice of Allowability for U.S. Appl. No. 13/283,401 dated Feb. 5, 2020.
Laryea, Emmanual T., "Payment for Paperless Trade: Are There Viable Alternatives to the Documentary Credit," 33 Law & Pol'd Int'l Bus. 3 (2001).
Non-Final Office Action for U.S. Appl. No. 18/238,963 dated Mar. 21, 2024.
Jane Kaufman Winn, What Is a Transferable Record and Who Cares?, 7 B. U. J. Sci. & Tech. L. 203 (2001).

* cited by examiner

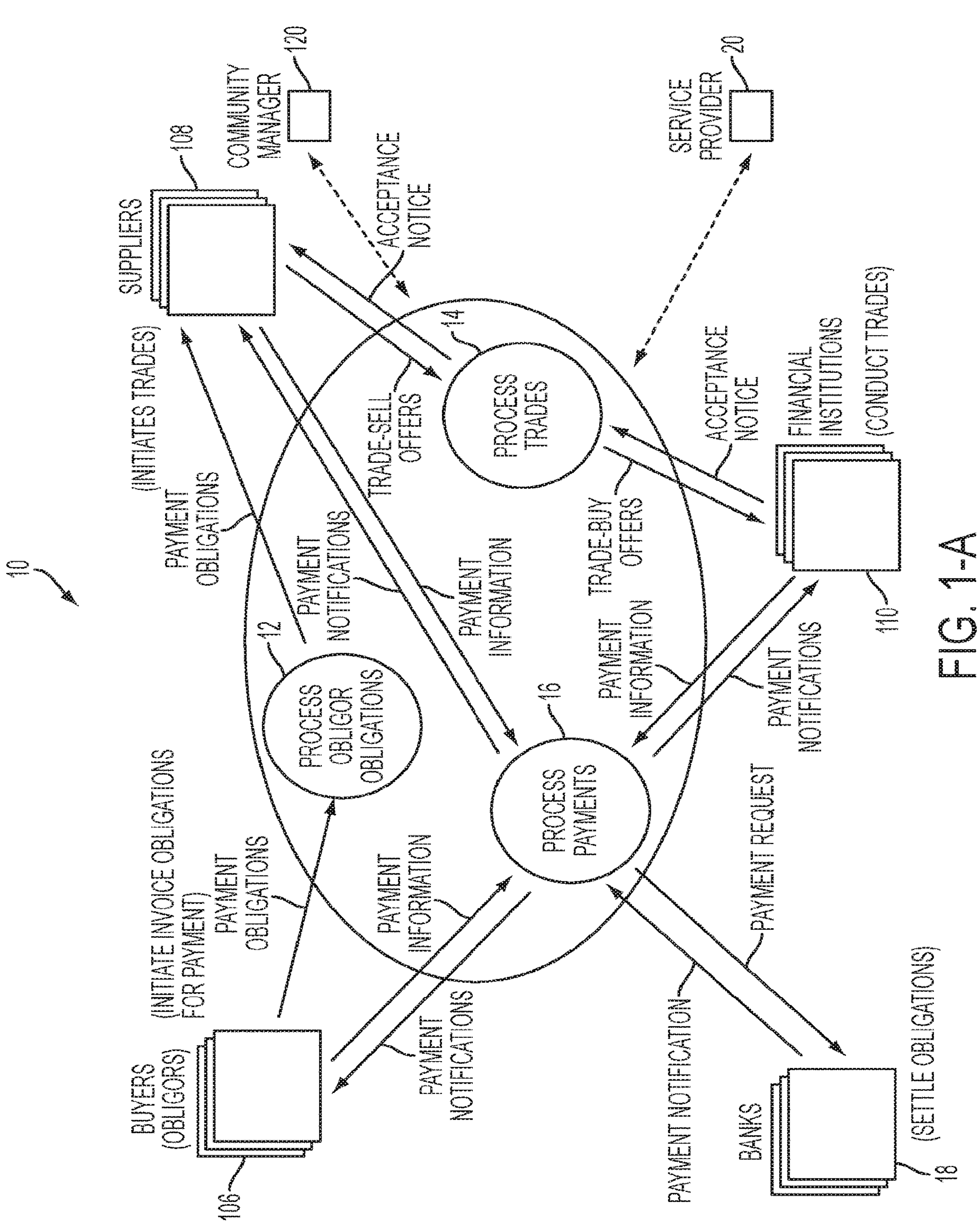
FIG. 1-A

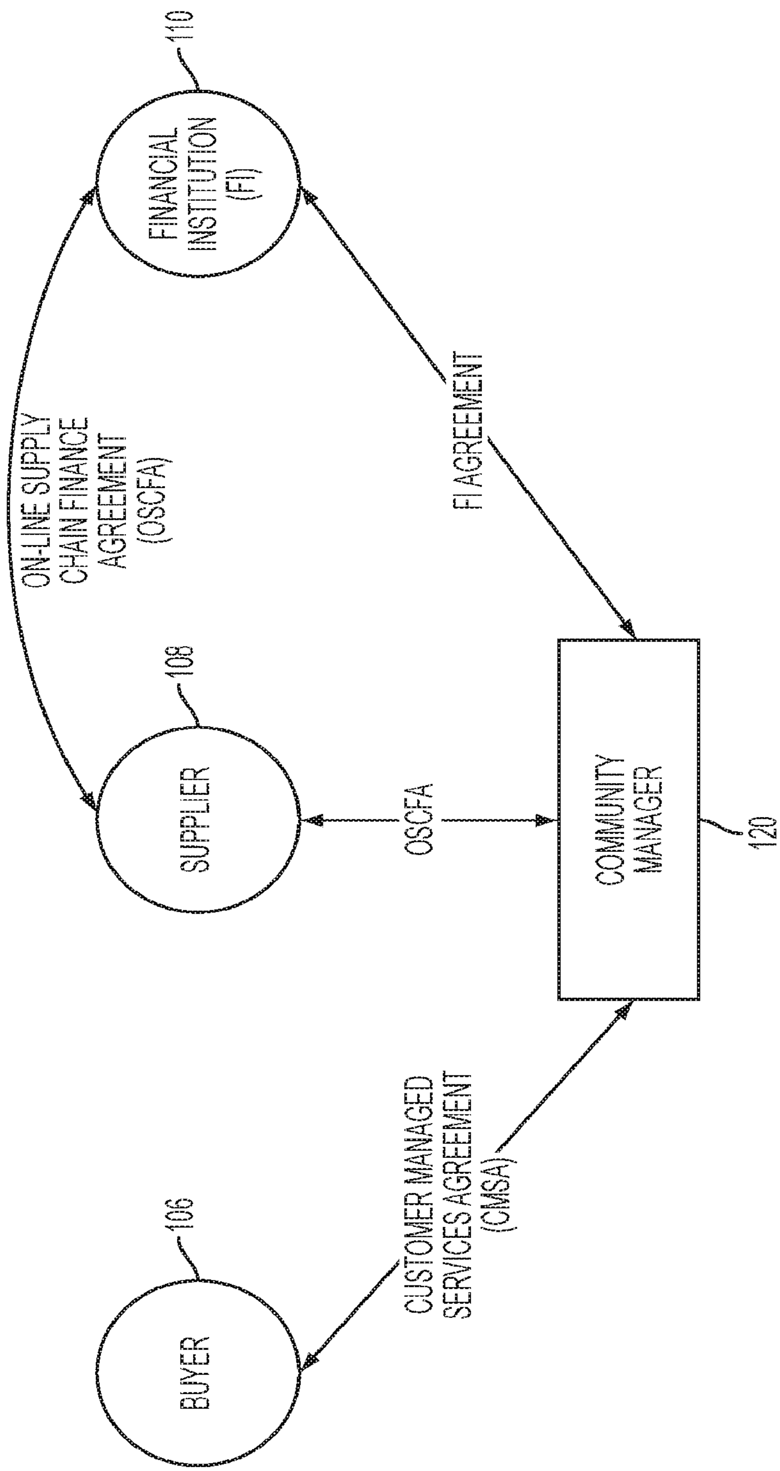
FIG. 1-B

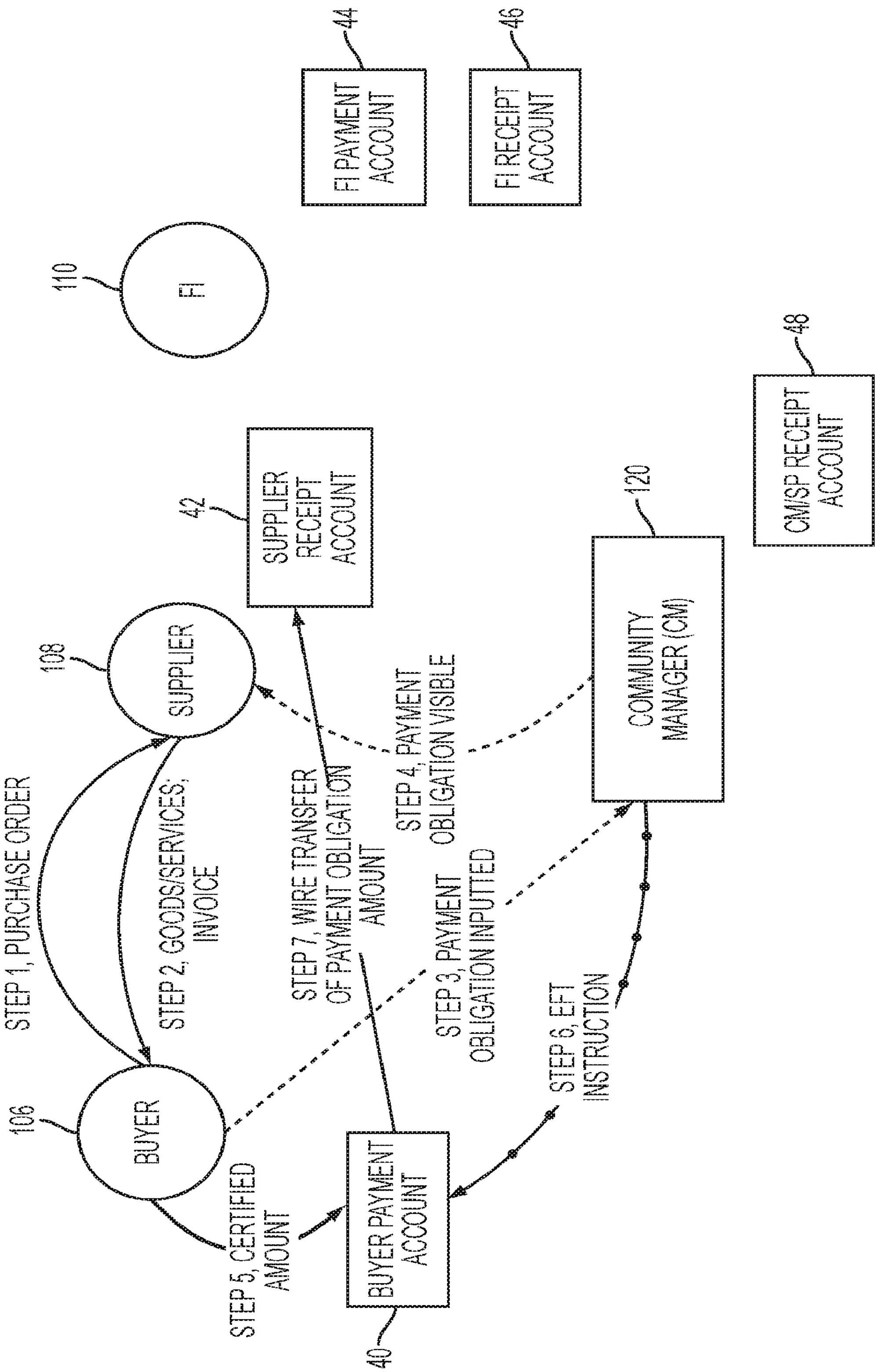
FIG. 1-C

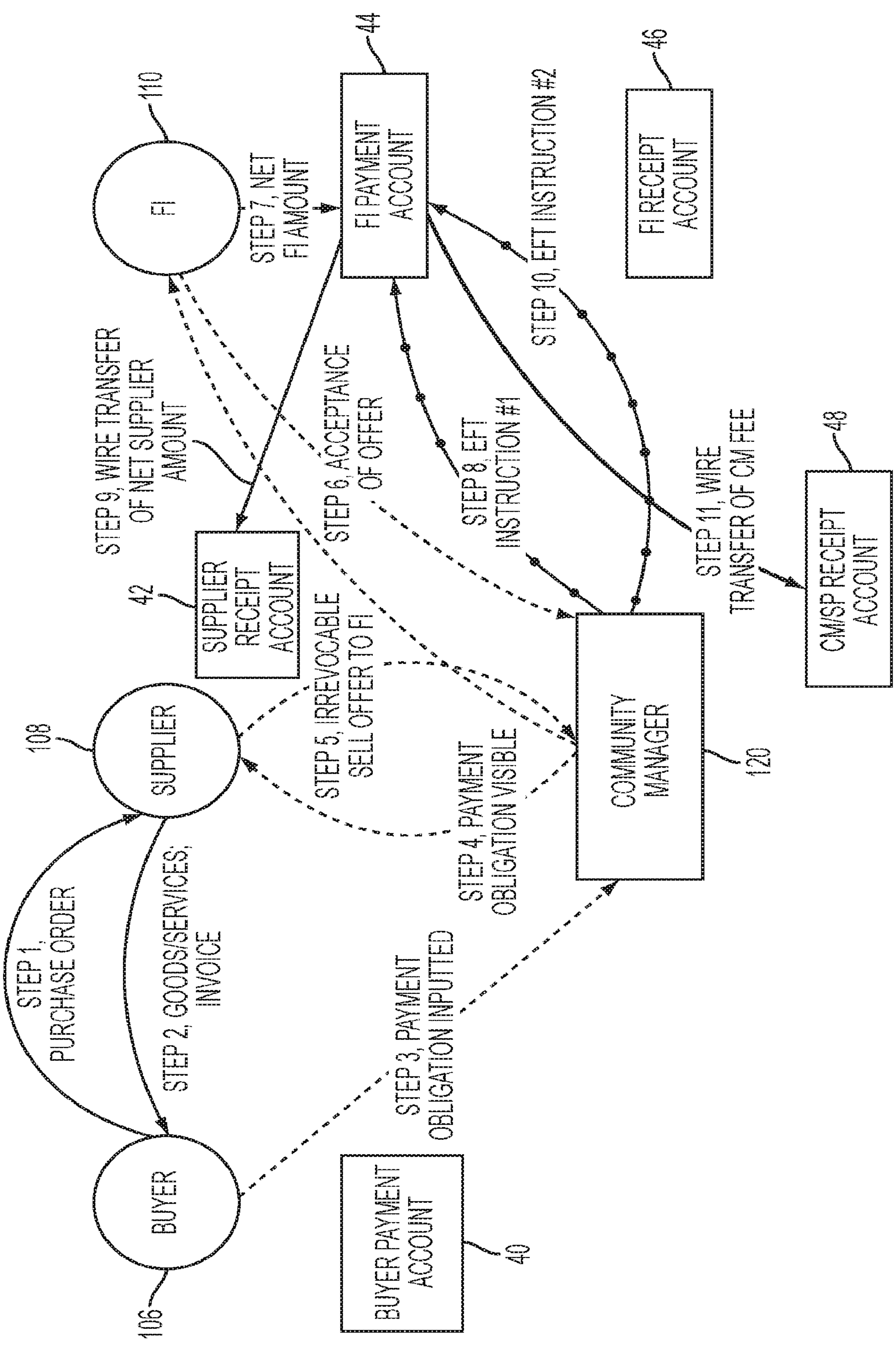
FIG. 1-D

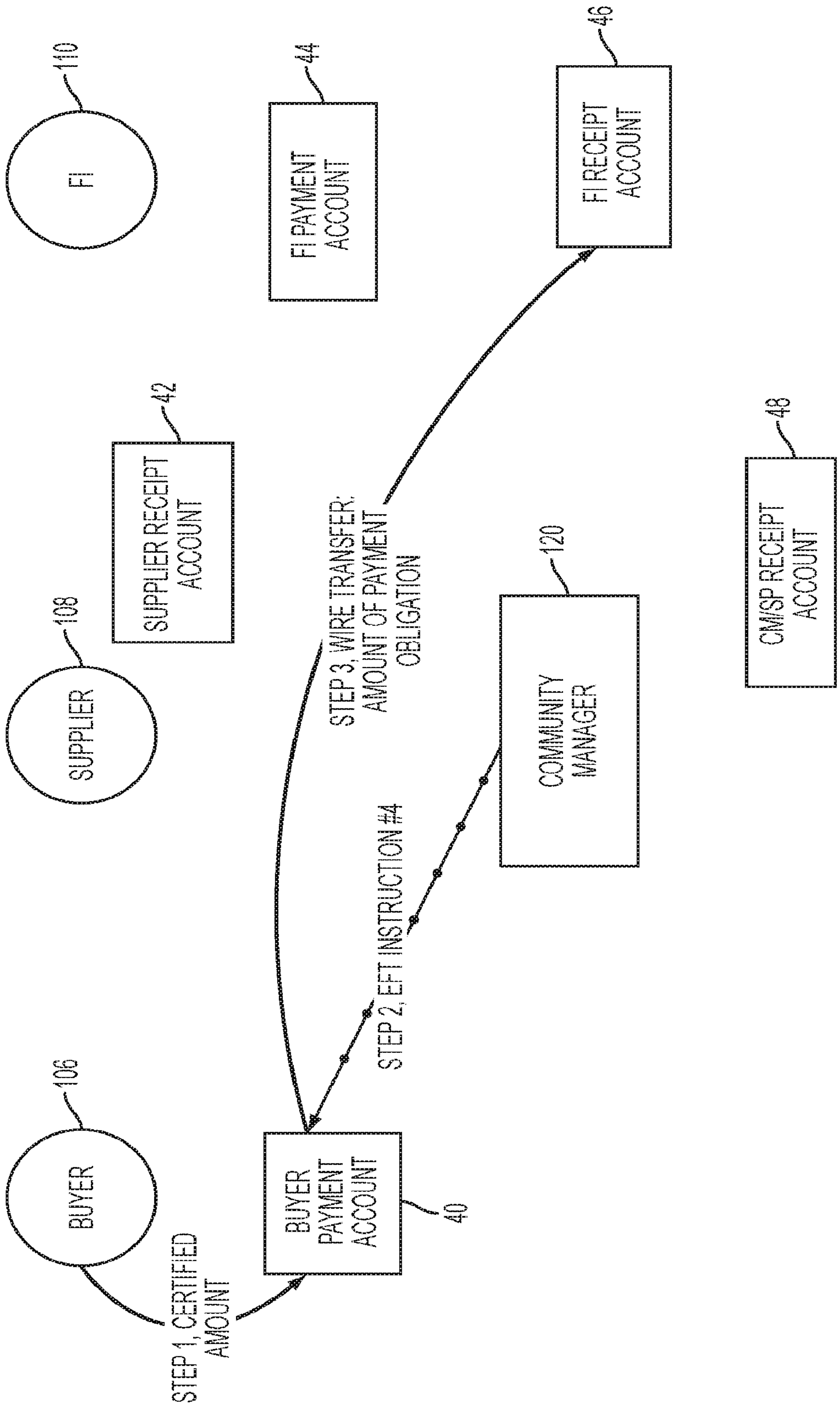
FIG. 1-E

List FI Pricing Profile go back > Home

42 Pricing Profiles found, displaying 1 to 25. [First/Prev] 1, 2 [Next/Last]

| Profile Name | FI Name | Pricing Profile ID | Margin | Rate Allocation | Discount Basis | Currency | Rate History | Buyer Programs | Status |
|---|---|---|---|---|---|---|---|---|---|
| BP6 US USD Fix Fix Ed FI 1 | First Bank | 333 | 110.1 Bpts | Flat | Fixed Rate @ 7.701% | USD | View History | View Programs | Active |
| BP6 US USD Fix Fix Ed FI 2 | 2nd Bank and Trust | 333 | 110.0 Bpts | Flat | Fixed Rate @ 8.500% | USD | View History | View Programs | Active |
| D FI PP AUD Ann Fix2 | 2nd Bank and Trust | 192 | 150.0 Bpts | Flat | Display Tenor Rate - 30 Day | AUD | View History | View Programs | Active |
| Ed FI 1 Prime EUR | First Bank | 490 | 130.0 Bpts | Annual | Prime / Libor Rate @ 2.010% | EUR | View History | View Programs | Active |
| FI GBP For Locked Rate | 2nd Bank and Trust | 218 | 190.0 Bpts | Annual | Fixed Rate @ 5.000% | GBP | View History | View Programs | Active |
| FI PP BP2 DB DKK Ann Prime | First Bank | 45 | 134.1 Bpts | Annual | Prime / Libor Rate @ 5.803% | DKK | View History | View Programs | Active |
| FI PP BP4 DE EUR Ann FI - 47 | First Bank | 331 | 161.0 Bpts | Annual | Display Tenor Rate - 120 Day | EUR | View History | View Programs | Active |
| FI PP BP4 DE EUR Ann Float 6 | Bank of USA | 47 | 180.0 Bpts | Annual | Display Tenor Rate - 120 Day | EUR | View History | View Programs | Active |
| FI PP BP6 US USD Fix Fix | 3rd Financial Institution | 49 | 116.0 Bpts | Flat | Fixed Rate @ 5.600% | USD | View History | View Programs | Active |
| FI PP BP7 AU AUD Fix Ed FI 4 | Bank of USA | 93 | 102.0 Bpts | Annual | Fixed Rate @ 6.220% | AUD | View History | View Programs | Active |
| FI PP BP7 AU AUD Prime Ed FI 1 | First Bank | 334 | 180.0 Bpts | Annual | Prime / Libor Rate @ 8.210% | AUD | View History | View Programs | Active |
| FI PP BP7 AU AUD Tenor Ed FI 2 | 2nd Bank and Trust | 335 | 190.0 Bpts | Annual | Display Tenor Rate - 30 Day | AUD | View History | View Programs | Active |
| FI PP EUR Ann Float (ed. - 57 | First Bank | 341 | 167.0 Bpts | Annual | Display Tenor Rate - 120 Day | EUR | View History | View Programs | Active |
| FI PP EUR Ann Float (ed. 103) | 3rd Financial Institution | 57 | 167.4 Bpts | Annual | Display Tenor Rate - 120 Day | EUR | View History | View Programs | Active |
| FI PP EUR Floating | 3rd Financial Institution | 130 | 190.0 Bpts | Annual | Display Tenor Rate - 90 Day | EUR | View History | View Programs | Active |
| FI PP EUR Floating - 130 | 2nd Bank and Trust | 406 | 190.0 Bpts | Annual | Display Tenor Rate - 90 Day | EUR | View History | View Programs | Active |
| FI PP GBP Ann Fix (ed. 1 - 44 | First Bank | 329 | 171.5 Bpts | Annual | Fixed Rate @ 6.763% | GBP | View History | View Programs | Active |
| FI PP GBP Ann Fix (ed. 51) | 2nd Bank and Trust | 44 | 171.0 Bpts | Annual | Fixed Rate @ 6.786% | GBP | View History | View Programs | Active |
| FI PP GBP Fixed | 2nd Bank and Trust | 181 | 189.0 Bpts | Annual | Fixed Rate @ 5.259% | GBP | View History | View Programs | Active |
| FI PP GBP Fixed (ed. 84) | Bank of USA | 138 | 169.1 Bpts | Annual | Fixed Rate @ 5.260% | GBP | View History | View Programs | Active |
| FI PP GBP Fixed (ed. 84) FI 2 | 2nd Bank and Trust | 398 | 169.0 Bpts | Annual | Fixed Rate @ 5.259% | GBP | View History | View Programs | Active |
| FI PP GBP Fixed (ed. 84) FI 3 | 3rd Financial Institution | 399 | 189.0 Bpts | Annual | Fixed Rate @ 5.260% | GBP | View History | View Programs | Active |
| FI PP GBP for FI 3 | 3rd Financial Institution | 457 | 100.0 Bpts | Annual | Prime / Libor Rate @ 10.001% | GBP | View History | View Programs | Active |
| FI PP MXN Floating | First Bank | 177 | 150.0 Bpts | Annual | Display Tenor Rate - 30 Day | MXN | View History | View Programs | Active |
| FI PP NOK Ann Float 3 (multi) | Bank of USA | 46 | 190.1 Bpts | Annual | Display Tenor Rate - 30 Day | NOK | View History | View Programs | Active |

Export To: CSV, Excel, XML

© Copyright, PrimeRevenue, Inc.

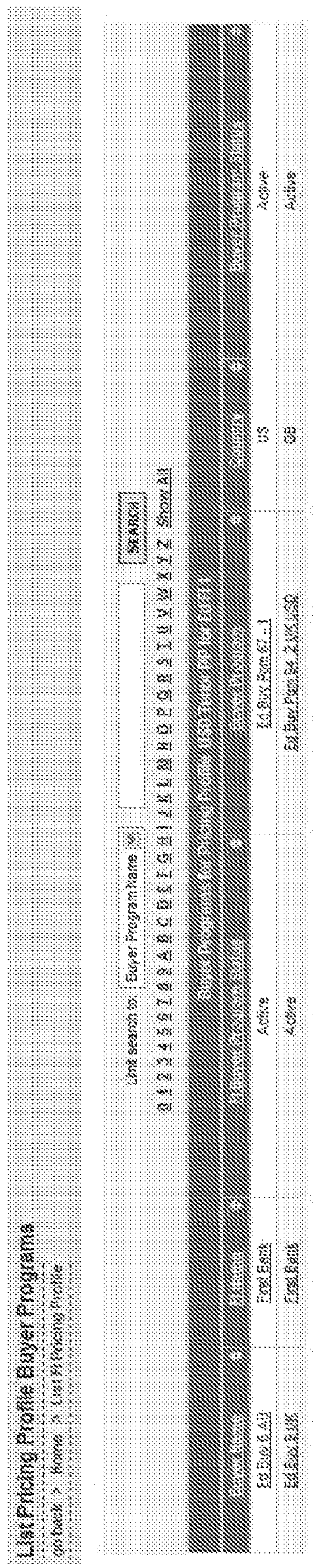
© Copyright, PrimeRevenue, Inc.
FIG. 7-B

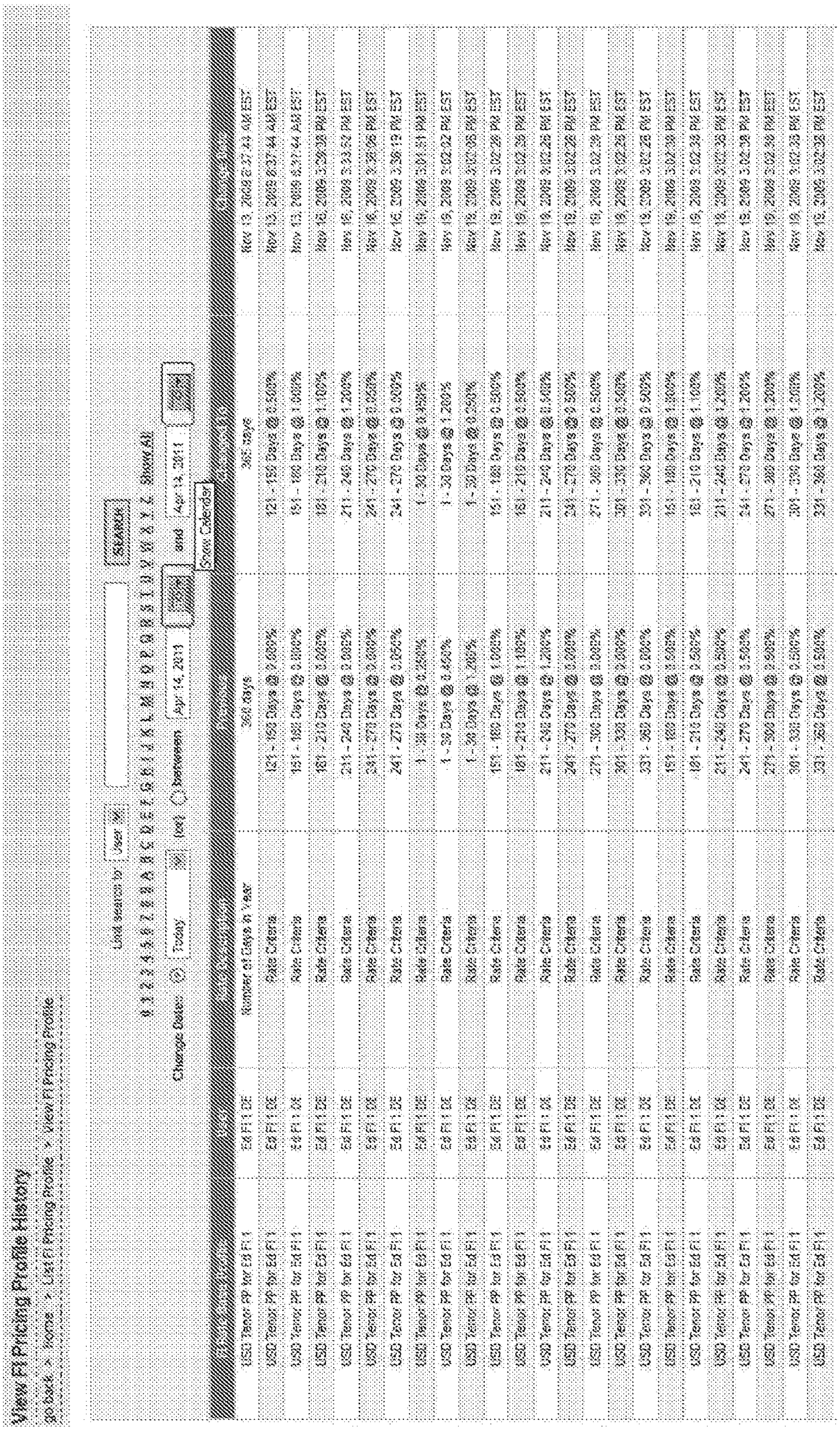
224
FIG. 7-C
© Copyright, PrimeRevenue, Inc.

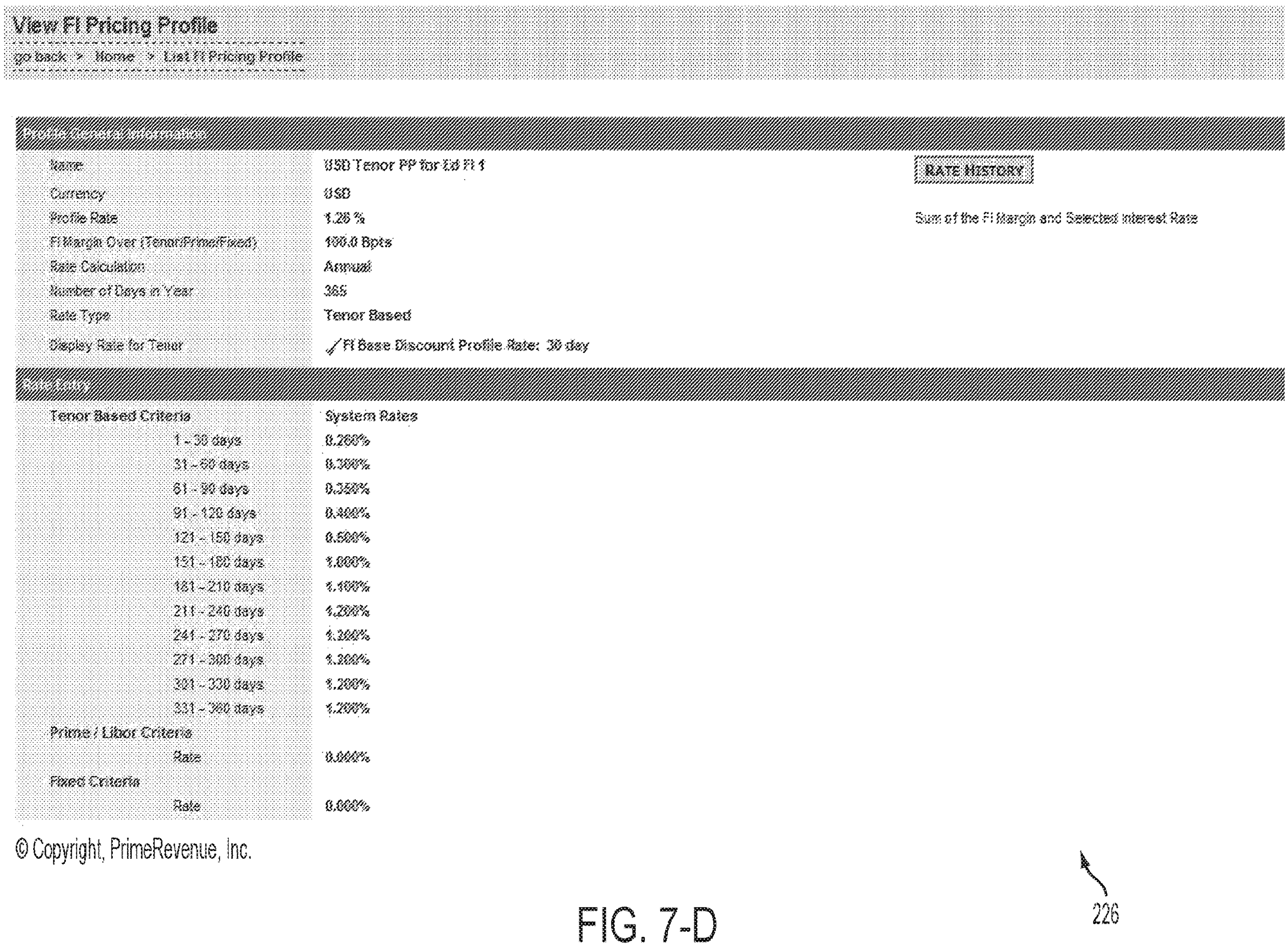
FIG. 7-D

Community Buyers go back > Home

Figure 8:
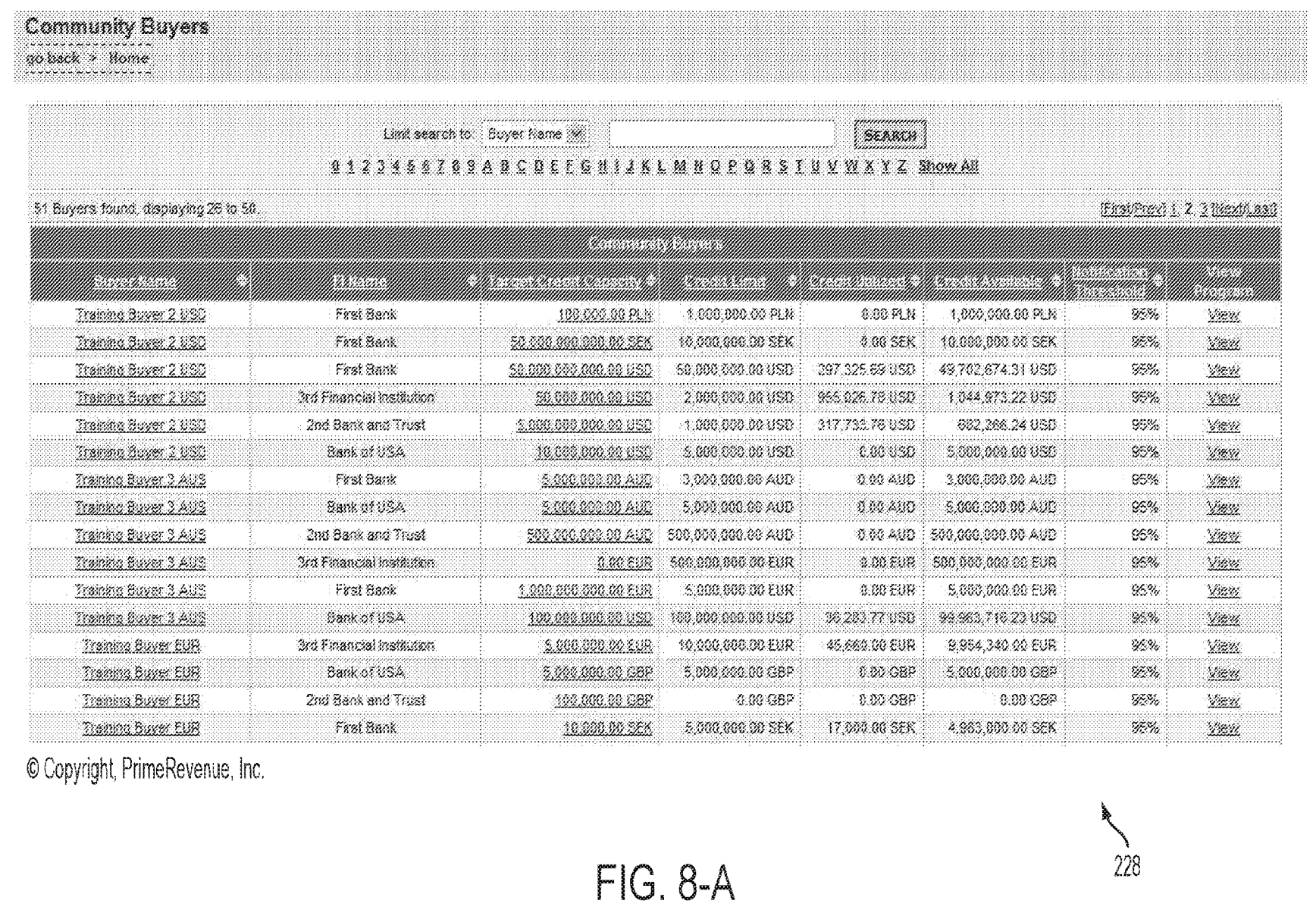

Limit search to: Buyer Name [SEARCH]

0 1 2 3 4 5 6 7 8 9 A B C D E F G H I J K L M N O P Q R S T U V W X Y Z Show All 51 Buyers found, displaying 26 to 50. First/Prev 1, 2, 3 Next/Last Community Buyers

| Buyer Name | FI Name | Target Credit Capacity | Credit Limit | Credit Utilized | Credit Available | Notification Threshold | View Program |
|---|---|---|---|---|---|---|---|
| Training Buyer 2 USD | First Bank | 100,000.00 PLN | 1,000,000.00 PLN | 0.00 PLN | 1,000,000.00 PLN | 95% | View |
| Training Buyer 2 USD | First Bank | 50,000,000,000.00 SEK | 10,000,000.00 SEK | 0.00 SEK | 10,000,000.00 SEK | 95% | View |
| Training Buyer 2 USD | First Bank | 50,000,000,000.00 USD | 50,000,000.00 USD | 297,325.69 USD | 49,702,674.31 USD | 95% | View |
| Training Buyer 2 USD | 3rd Financial Institution | 50,000,000.00 USD | 2,000,000.00 USD | 955,026.78 USD | 1,044,973.22 USD | 95% | View |
| Training Buyer 2 USD | 2nd Bank and Trust | 5,000,000,000.00 USD | 1,000,000.00 USD | 317,733.76 USD | 682,266.24 USD | 95% | View |
| Training Buyer 2 USD | Bank of USA | 10,000,000.00 USD | 5,000,000.00 USD | 0.00 USD | 5,000,000.00 USD | 95% | View |
| Training Buyer 3 AUS | First Bank | 5,000,000.00 AUD | 3,000,000.00 AUD | 0.00 AUD | 3,000,000.00 AUD | 95% | View |
| Training Buyer 3 AUS | Bank of USA | 5,000,000.00 AUD | 5,000,000.00 AUD | 0.00 AUD | 5,000,000.00 AUD | 95% | View |
| Training Buyer 3 AUS | 2nd Bank and Trust | 500,000,000.00 AUD | 500,000,000.00 AUD | 0.00 AUD | 500,000,000.00 AUD | 95% | View |
| Training Buyer 3 AUS | 3rd Financial Institution | 0.00 EUR | 500,000,000.00 EUR | 0.00 EUR | 500,000,000.00 EUR | 95% | View |
| Training Buyer 3 AUS | First Bank | 1,000,000,000.00 EUR | 5,000,000.00 EUR | 0.00 EUR | 5,000,000.00 EUR | 95% | View |
| Training Buyer 3 AUS | Bank of USA | 100,000,000.00 USD | 100,000,000.00 USD | 36,283.77 USD | 99,963,716.23 USD | 95% | View |
| Training Buyer EUR | 3rd Financial Institution | 5,000,000.00 EUR | 10,000,000.00 EUR | 45,660.00 EUR | 9,954,340.00 EUR | 95% | View |
| Training Buyer EUR | Bank of USA | 5,000,000.00 GBP | 5,000,000.00 GBP | 0.00 GBP | 5,000,000.00 GBP | 95% | View |
| Training Buyer EUR | 2nd Bank and Trust | 100,000.00 GBP | 0.00 GBP | 0.00 GBP | 0.00 GBP | 95% | View |
| Training Buyer EUR | First Bank | 10,000.00 SEK | 5,000,000.00 SEK | 17,000.00 SEK | 4,983,000.00 SEK | 95% | View |

© Copyright, PrimeRevenue, Inc.

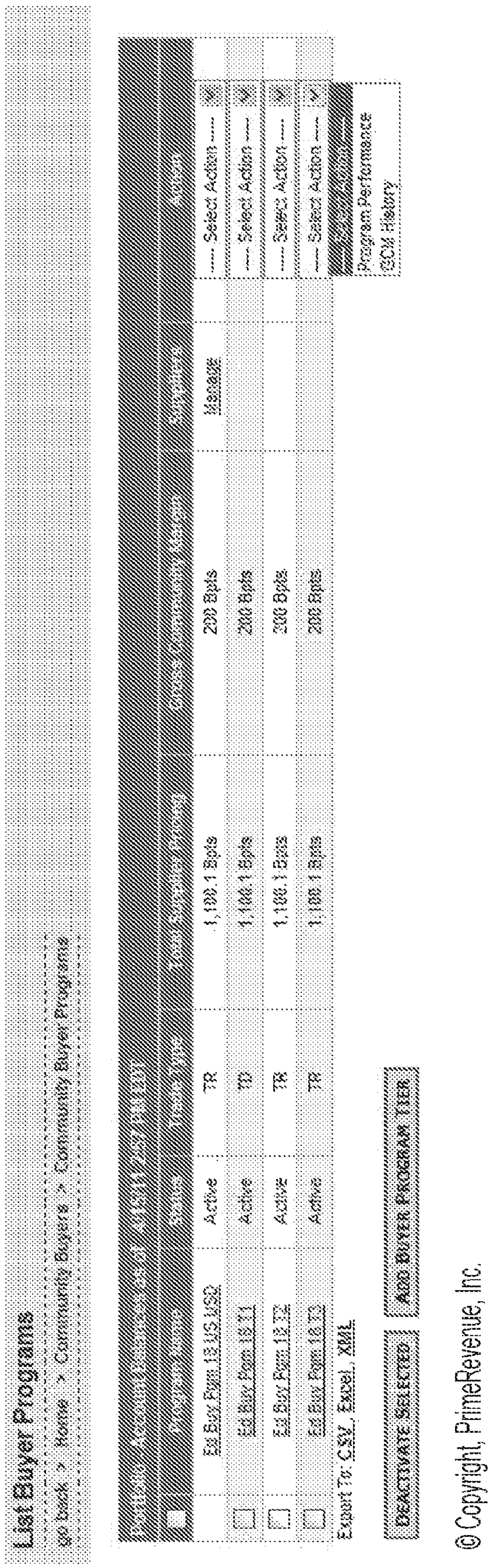
230
FIG. 8-B
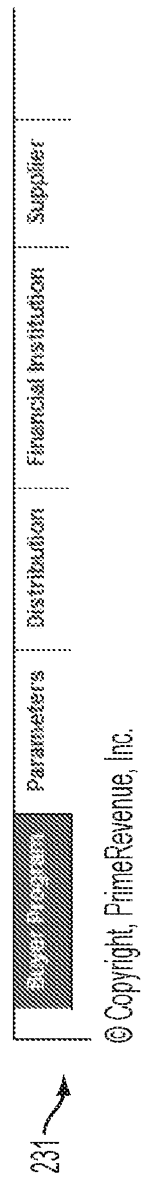
FIG. 8-C

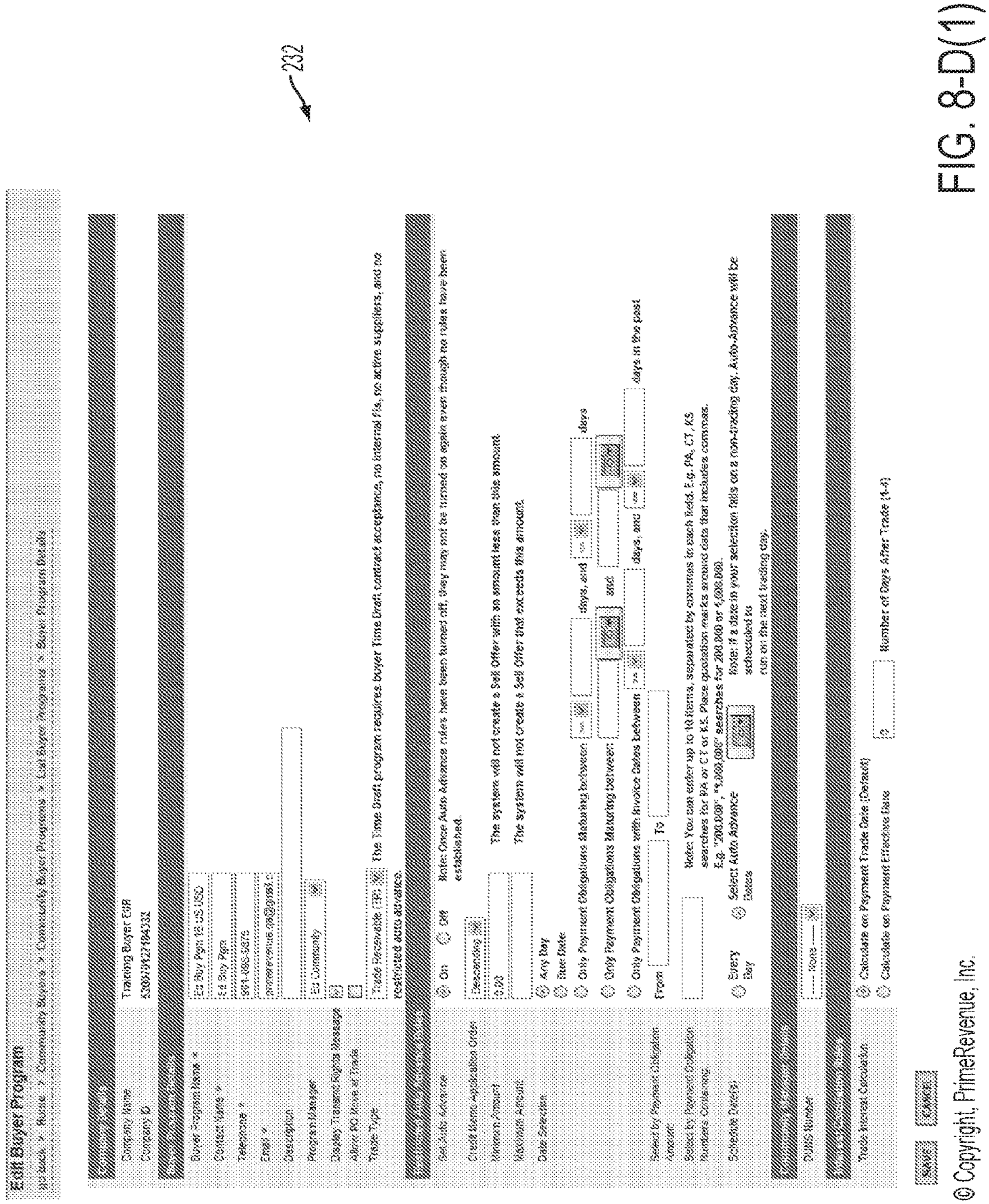
FIG. 8-D(1)

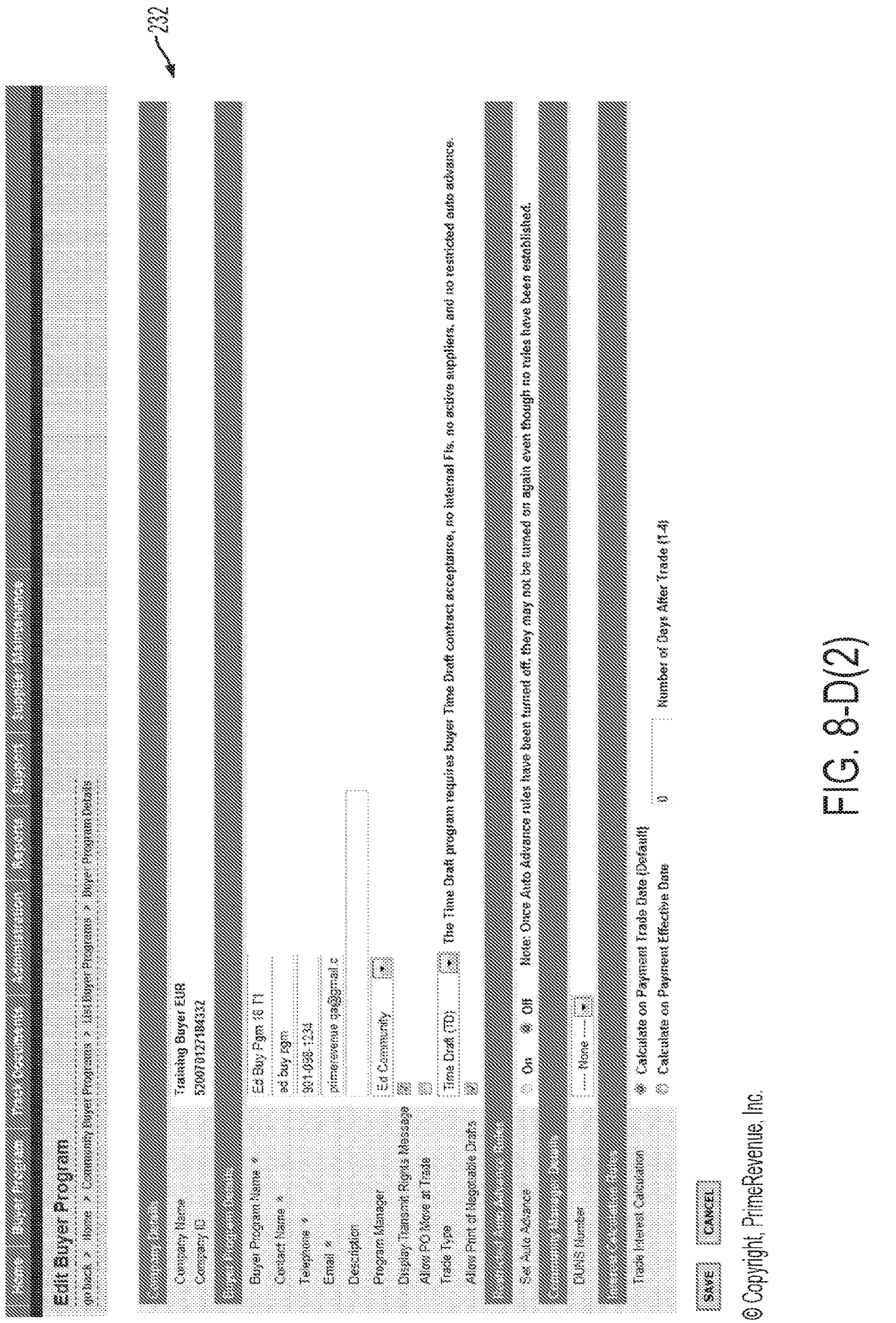
FIG. 8-D(2)

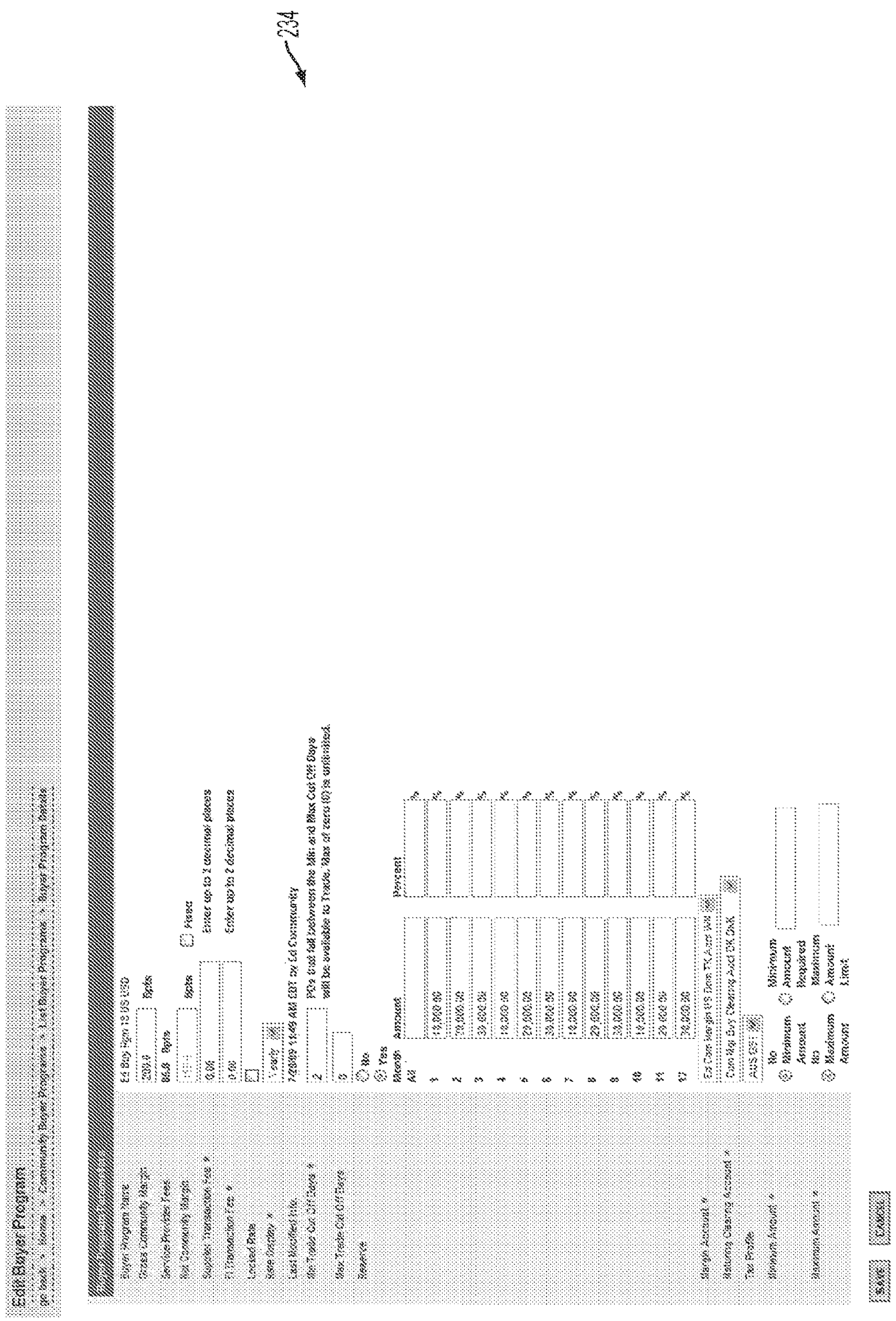
FIG. 8-E
© Copyright, PrimeRevenue, Inc.

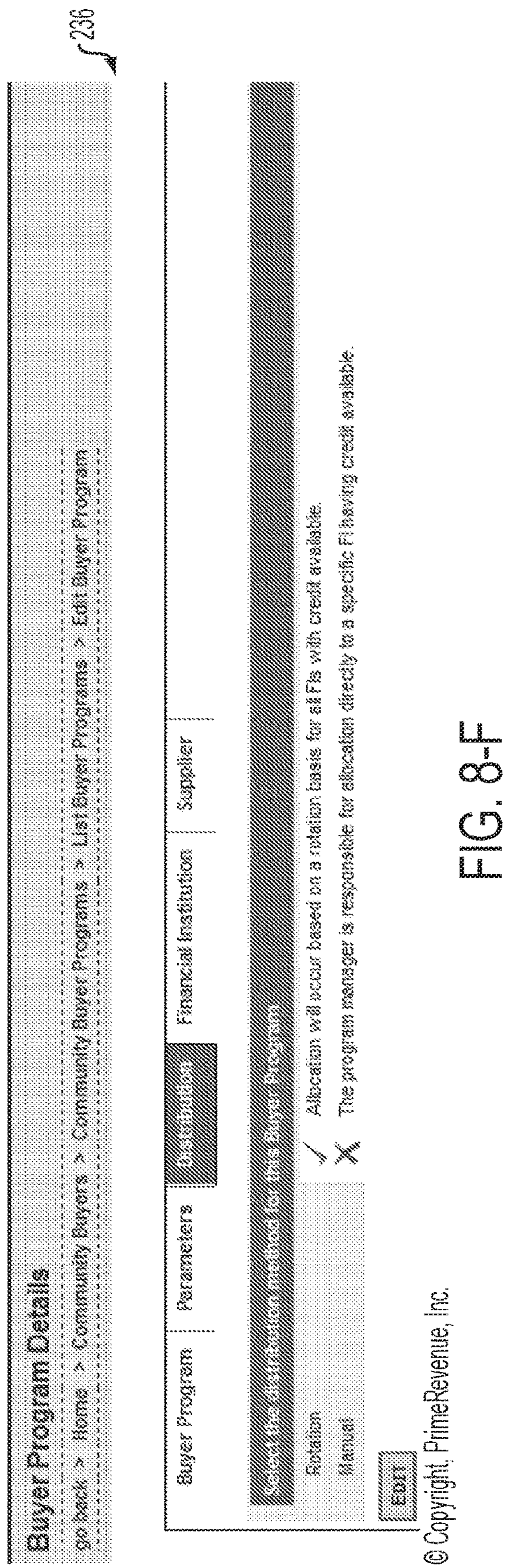
FIG. 8-F

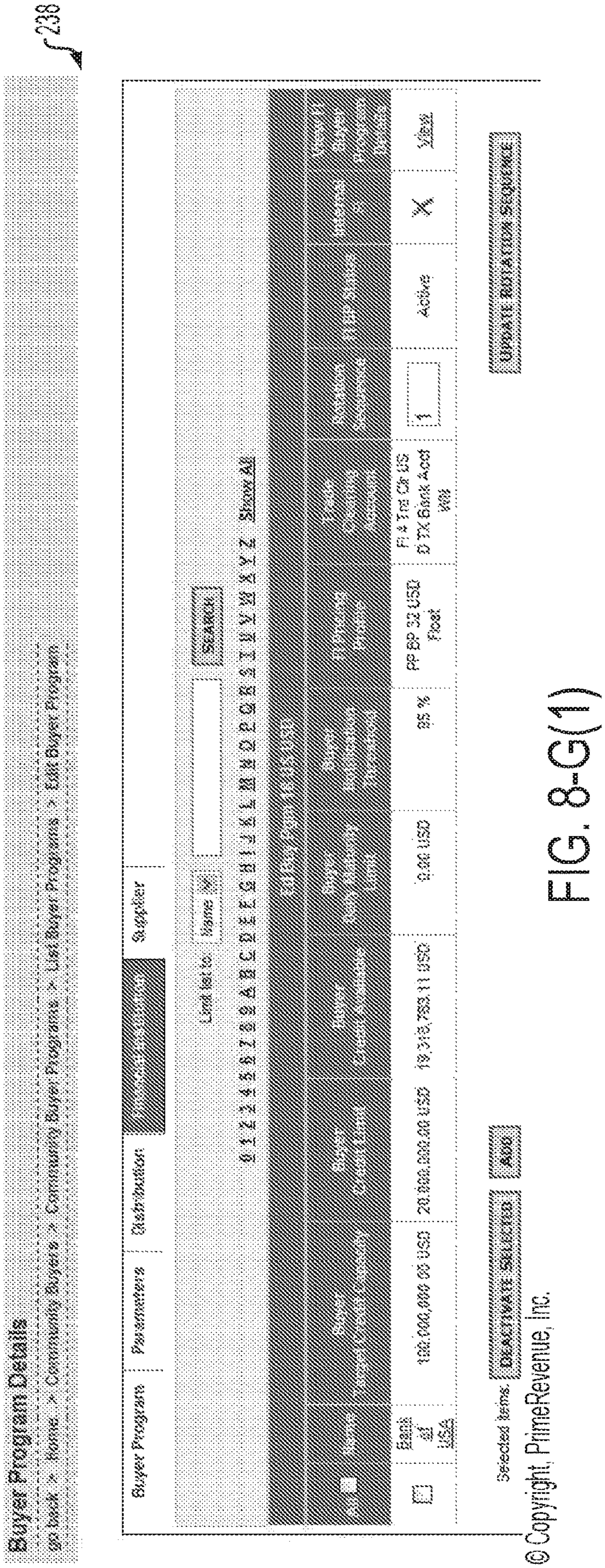
© Copyright, PrimeRevenue, Inc.
FIG. 8-G(1)

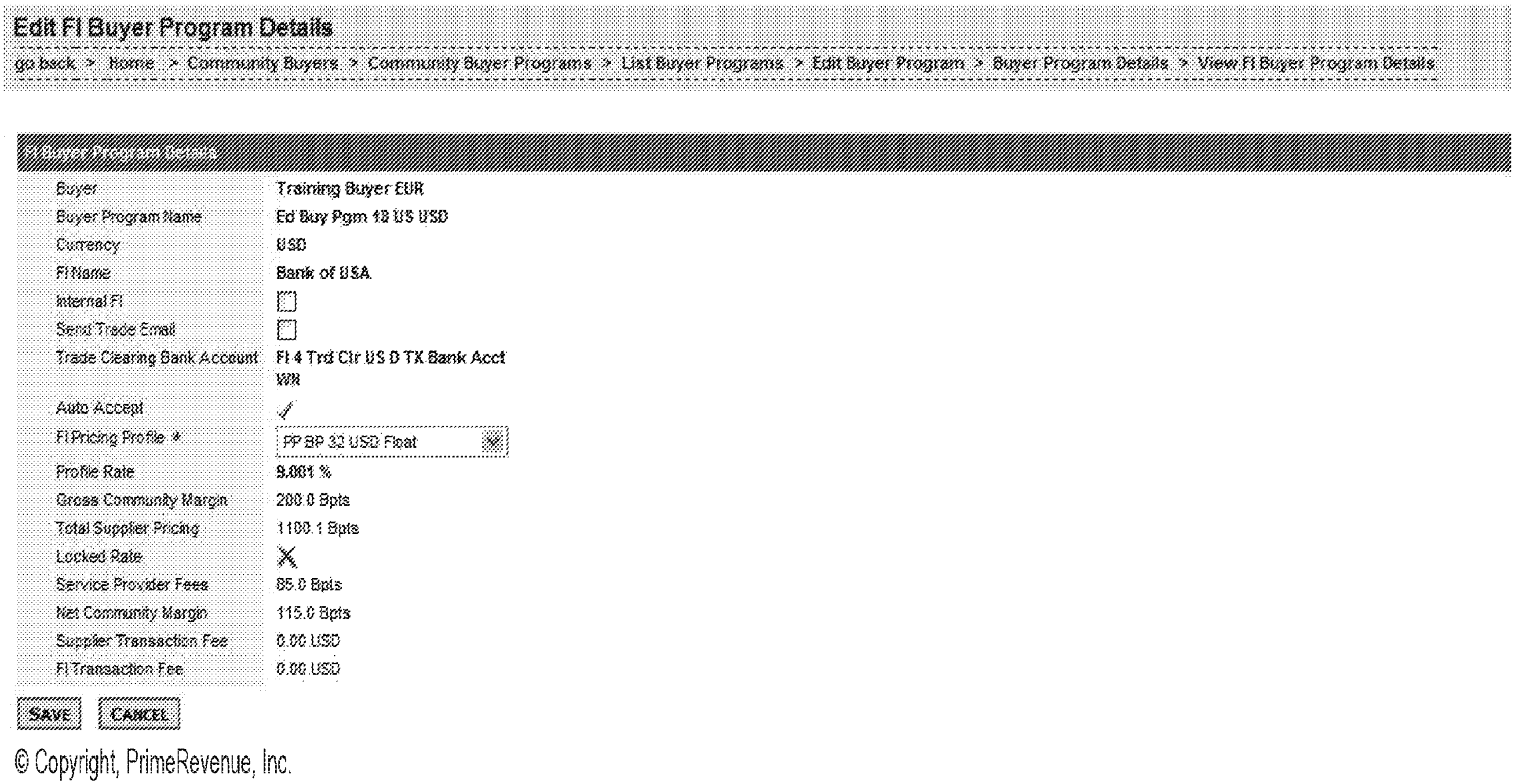
FIG. 8-G(2)

240
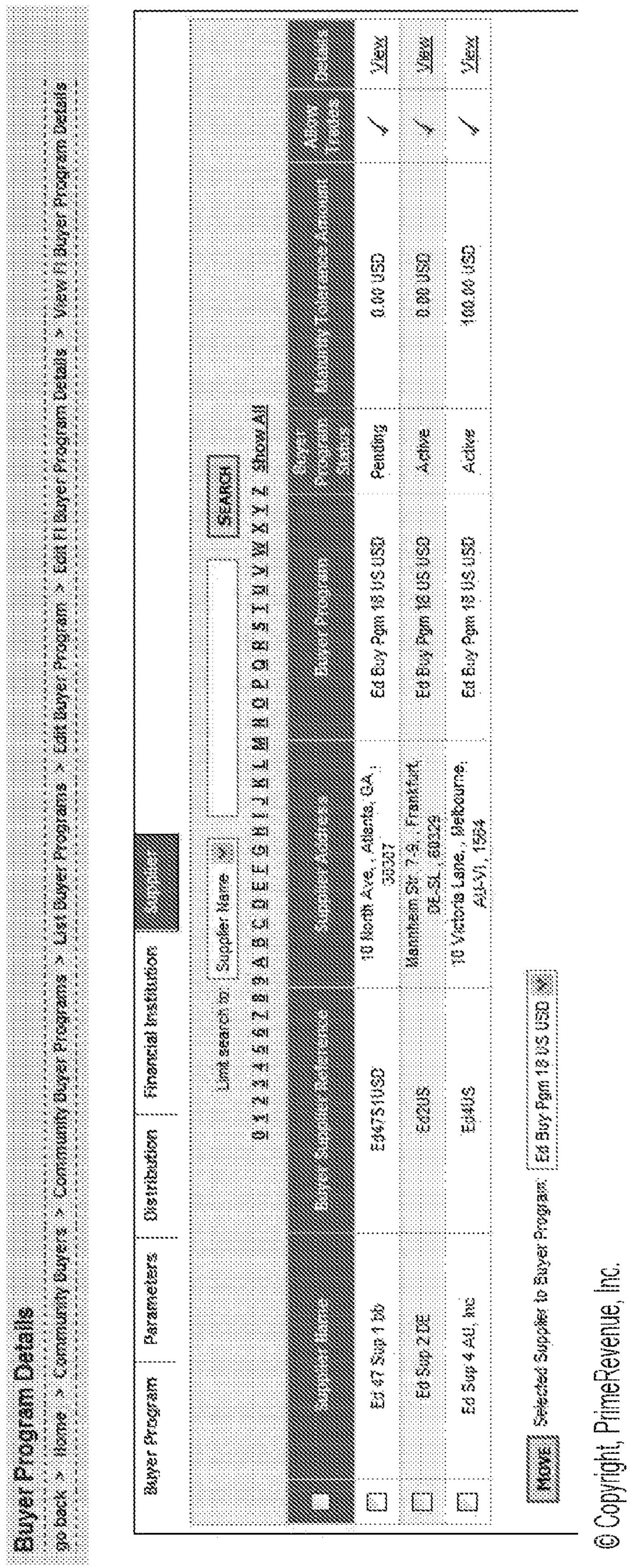
FIG. 8-H

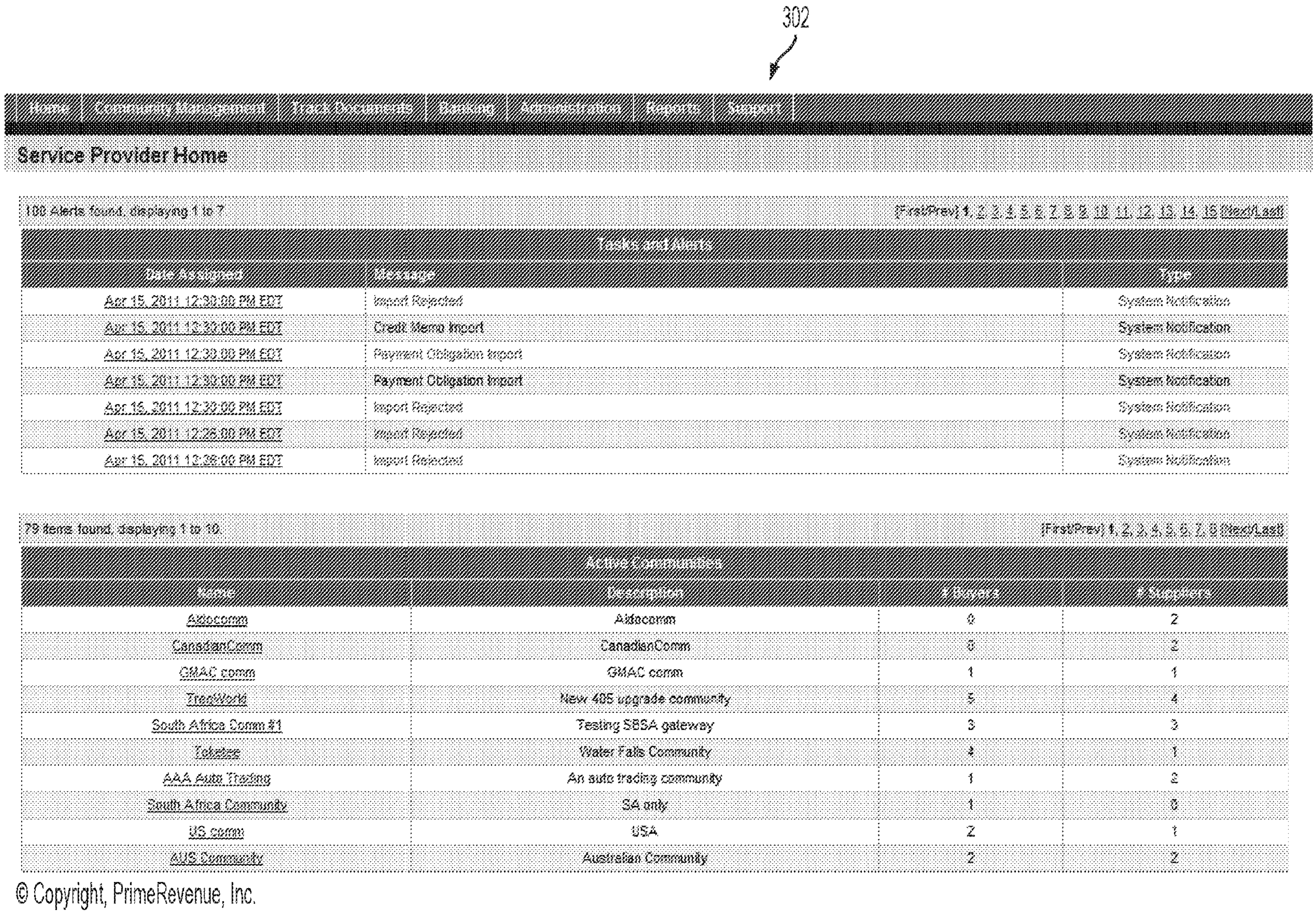
© Copyright, PrimeRevenue, Inc.
FIG. 10-A

336
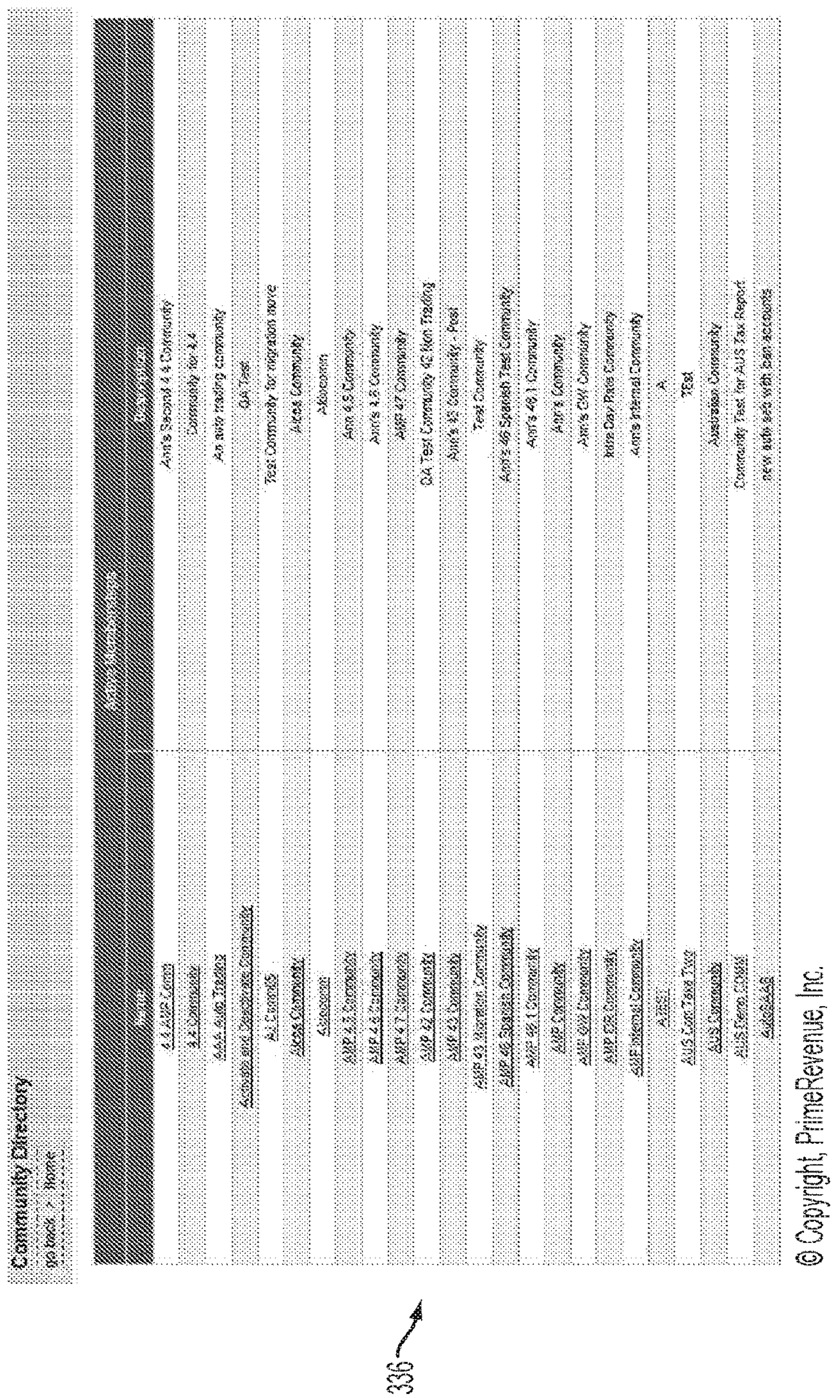
FIG. 10-B
338
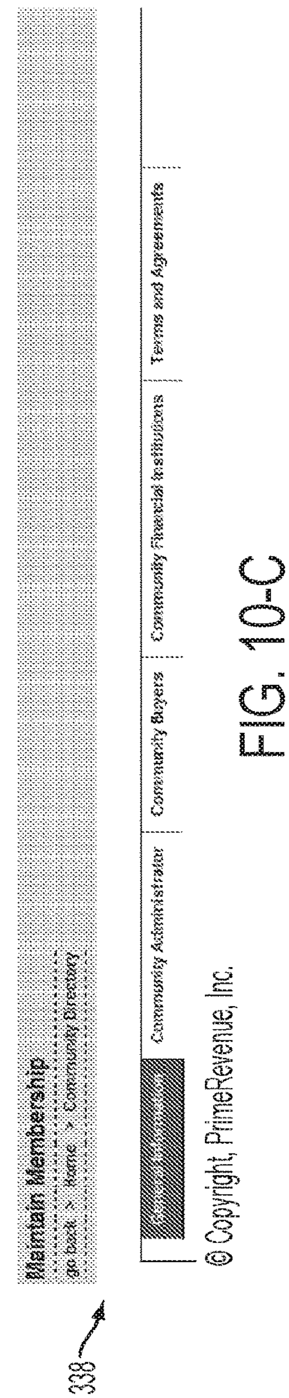
FIG. 10-C

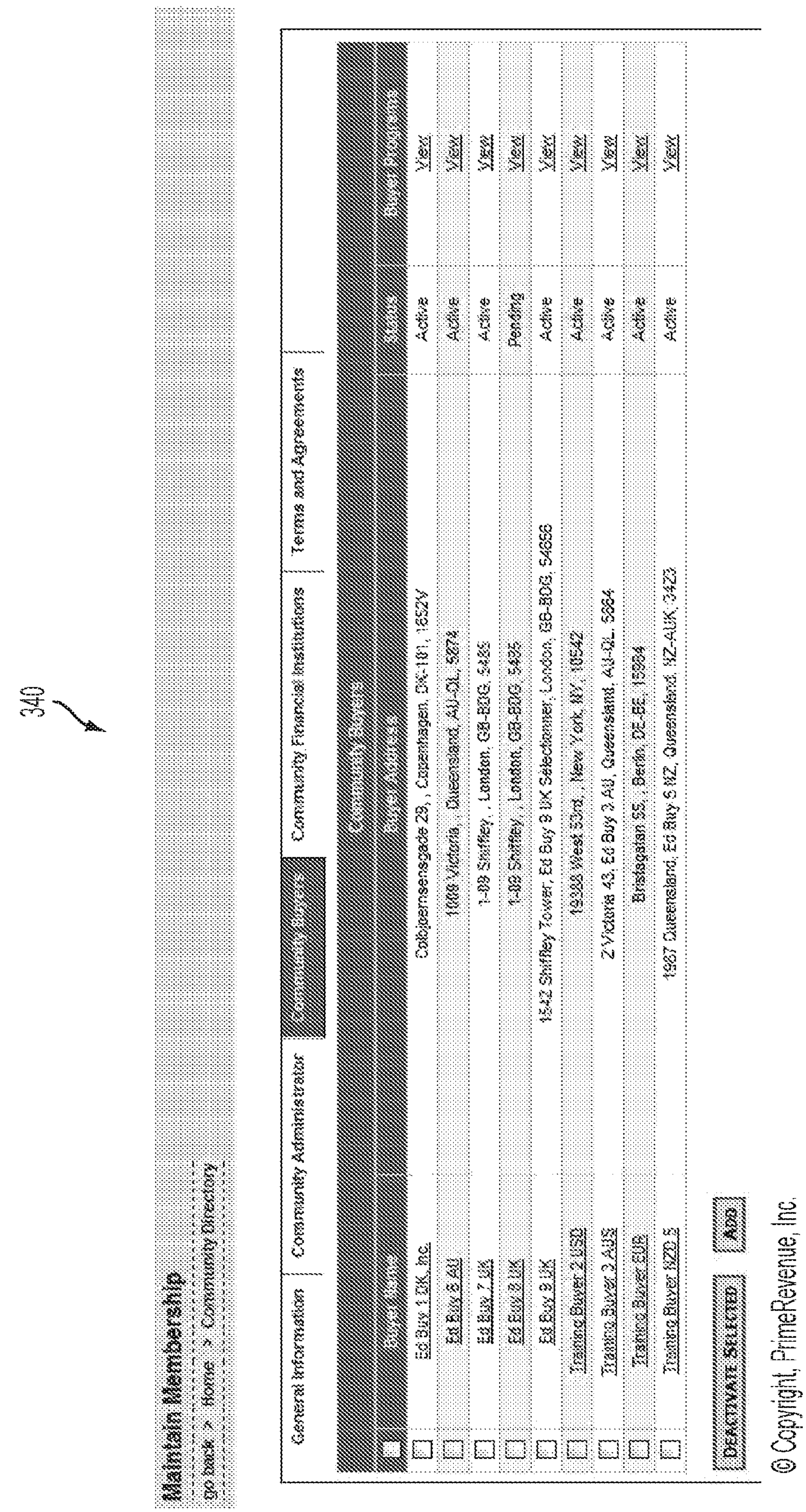
FIG. 10-D

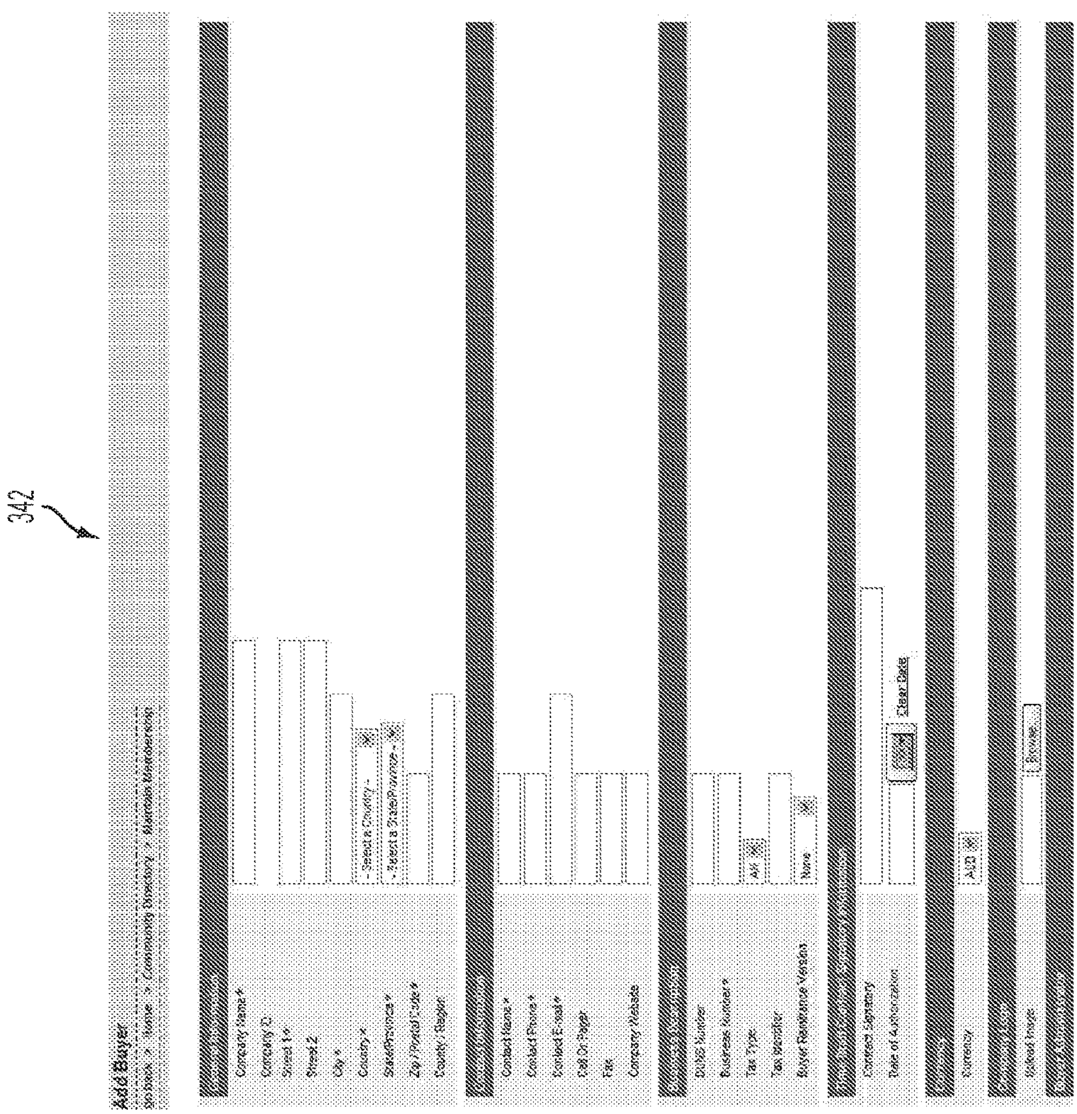
© Copyright, PrimeRevenue, Inc.
FIG. 10-E(1)

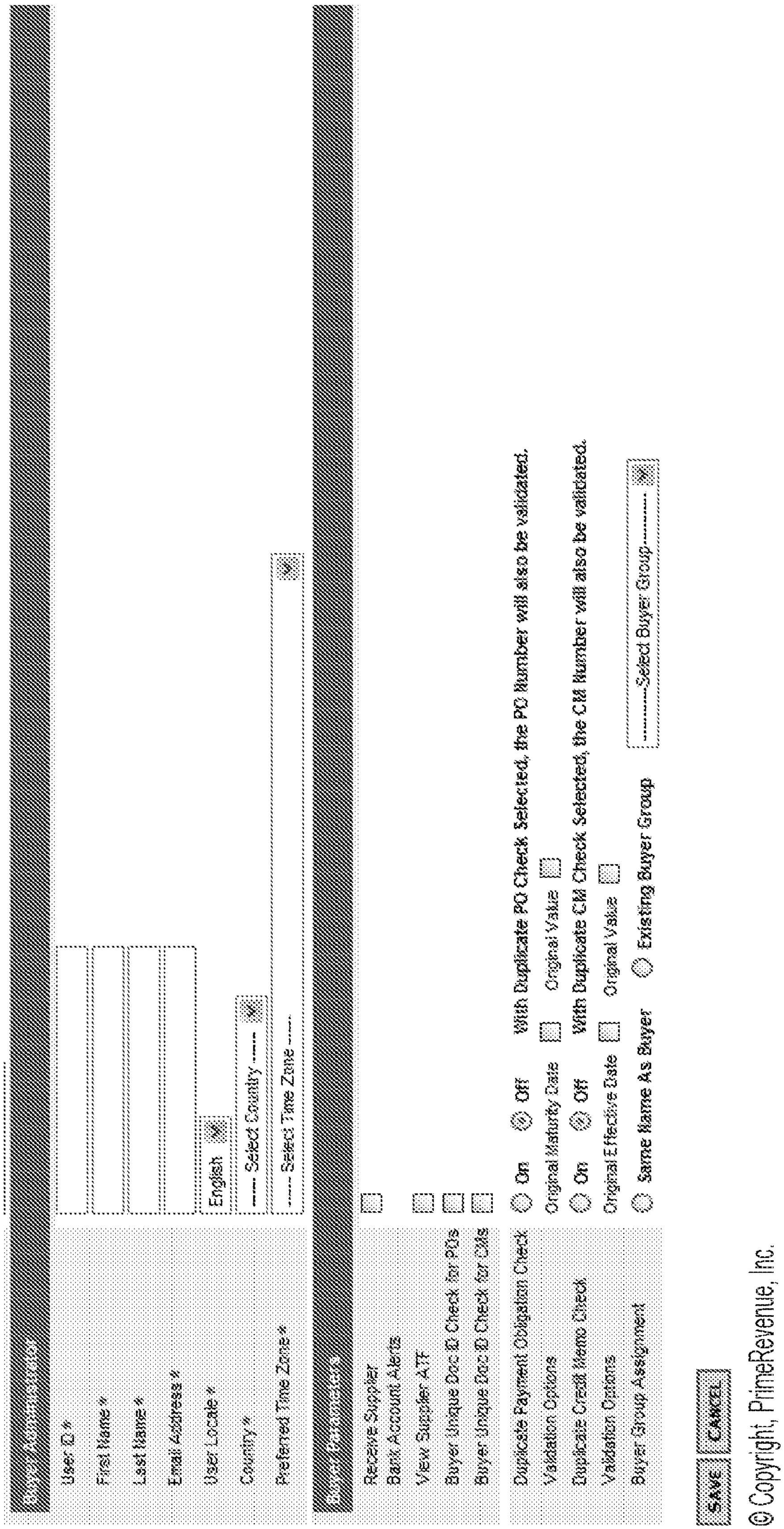
FIG. 10-E(2)

Figure 10:
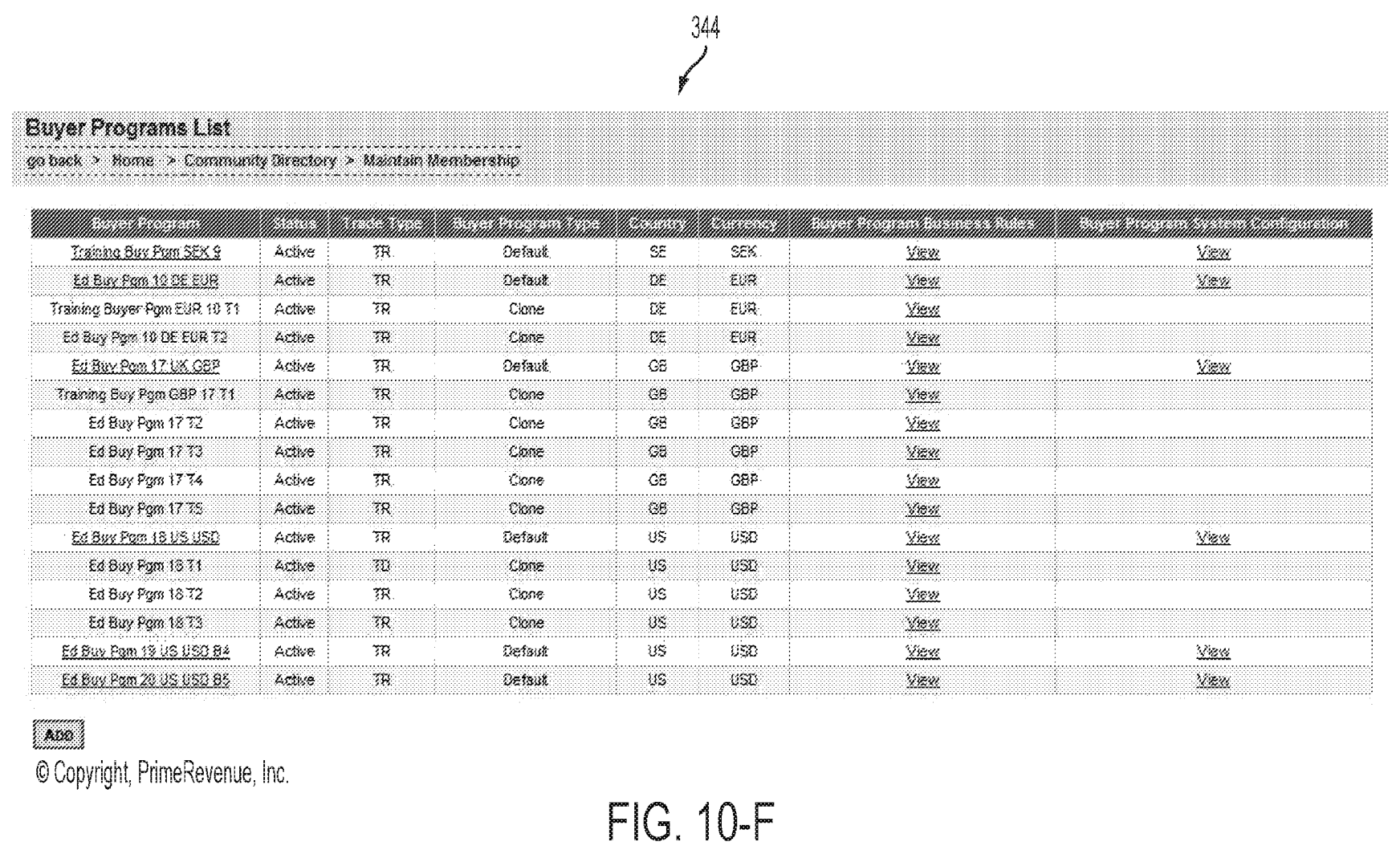

344

Buyer Programs List go back > Home > Community Directory > Maintain Membership

| Buyer Program | Status | Trade Type | Buyer Program Type | Country | Currency | Buyer Program Business Rules | Buyer Program System Configuration |
|---|---|---|---|---|---|---|---|
| Training Buy Pgm SEK 9 | Active | TR | Default | SE | SEK | View | View |
| Ed Buy Pgm 10 DE EUR | Active | TR | Default | DE | EUR | View | View |
| Training Buyer Pgm EUR 10 T1 | Active | TR | Clone | DE | EUR | View | |
| Ed Buy Pgm 10 DE EUR T2 | Active | TR | Clone | DE | EUR | View | |
| Ed Buy Pgm 17 UK GBP | Active | TR | Default | GB | GBP | View | View |
| Training Buy Pgm GBP 17 T1 | Active | TR | Clone | GB | GBP | View | |
| Ed Buy Pgm 17 T2 | Active | TR | Clone | GB | GBP | View | |
| Ed Buy Pgm 17 T3 | Active | TR | Clone | GB | GBP | View | |
| Ed Buy Pgm 17 T4 | Active | TR | Clone | GB | GBP | View | |
| Ed Buy Pgm 17 T5 | Active | TR | Clone | GB | GBP | View | |
| Ed Buy Pgm 18 US USD | Active | TR | Default | US | USD | View | View |
| Ed Buy Pgm 18 T1 | Active | TD | Clone | US | USD | View | |
| Ed Buy Pgm 18 T2 | Active | TR | Clone | US | USD | View | |
| Ed Buy Pgm 18 T3 | Active | TR | Clone | US | USD | View | |
| Ed Buy Pgm 19 US USD B4 | Active | TR | Default | US | USD | View | View |
| Ed Buy Pgm 20 US USD B5 | Active | TR | Default | US | USD | View | View |

ADD

© Copyright, PrimeRevenue, Inc.

FIG. 10-F

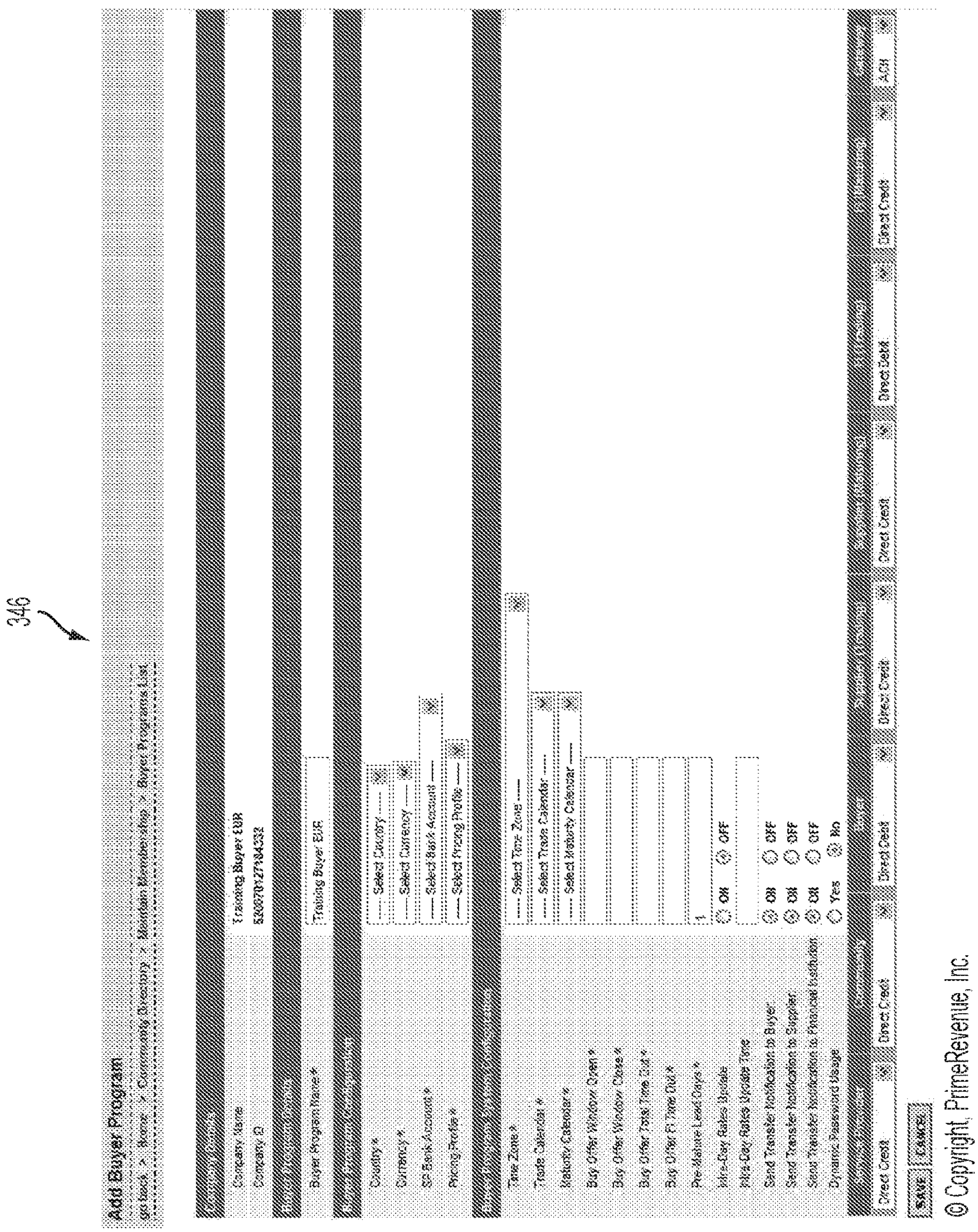
FIG. 10-G

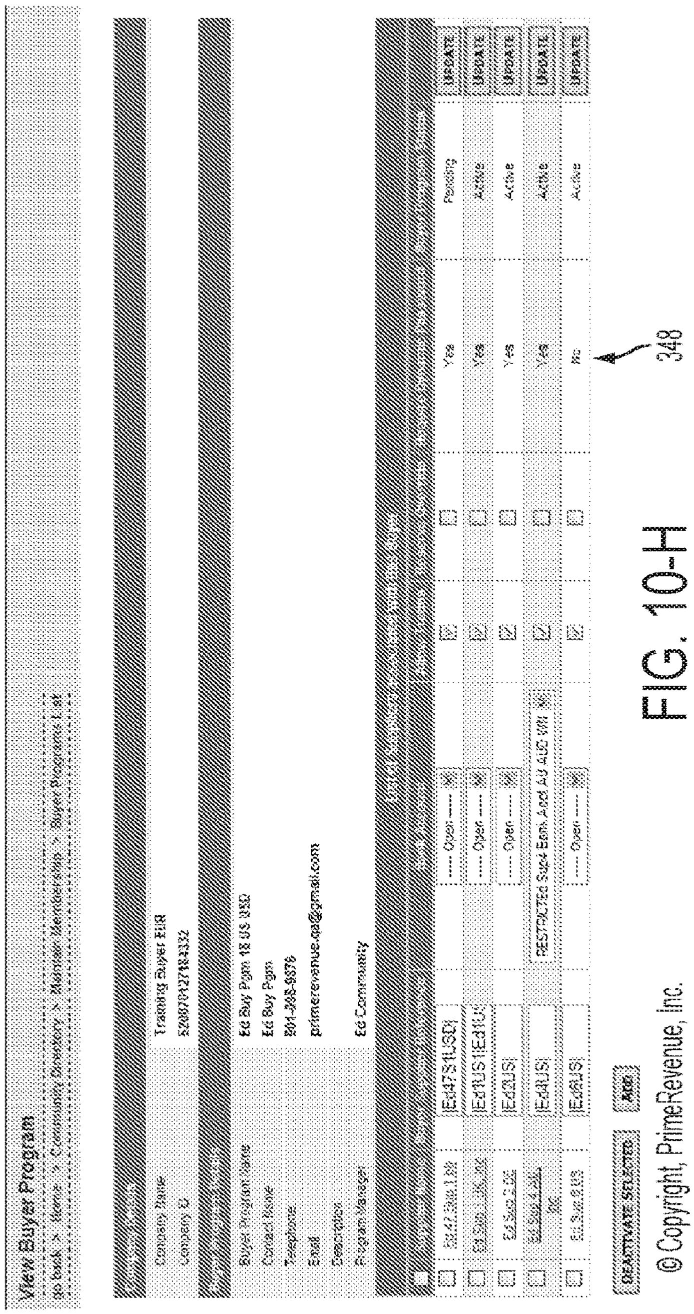
© Copyright, PrimeRevenue, Inc.
FIG. 10-H
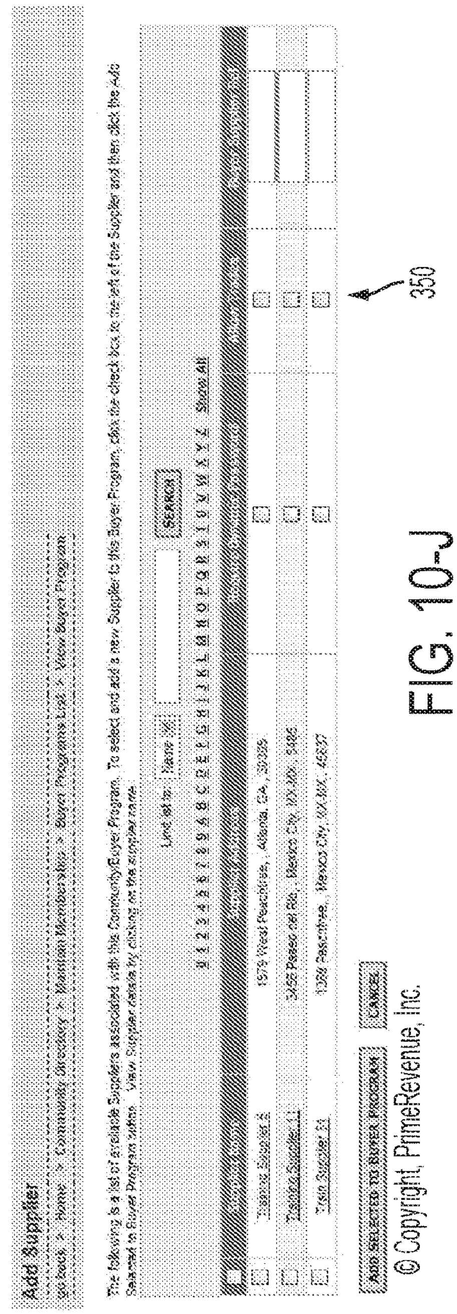
© Copyright, PrimeRevenue, Inc.
FIG. 10-J

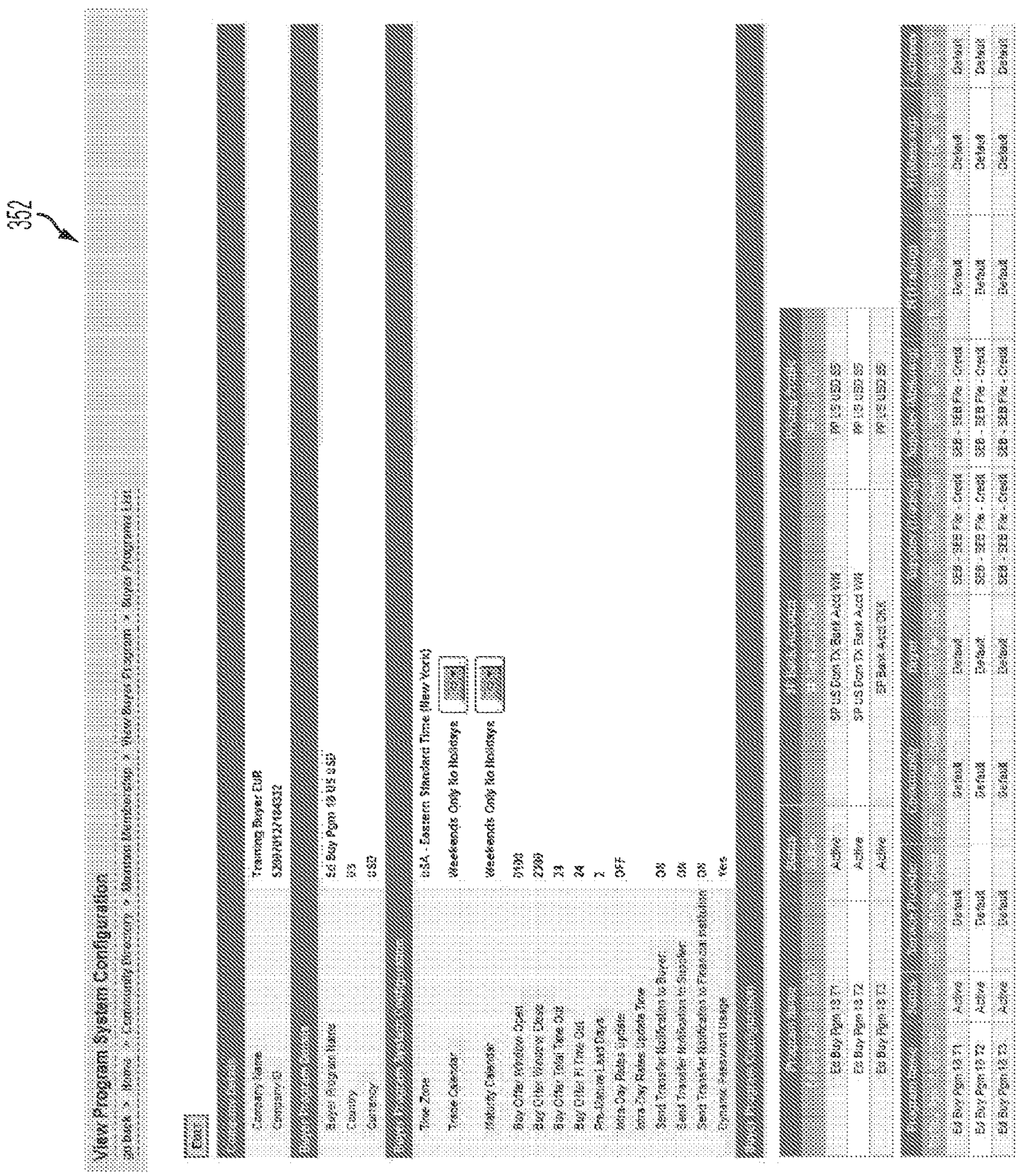
© Copyright, PrimeRevenue, Inc.
FIG. 10-K

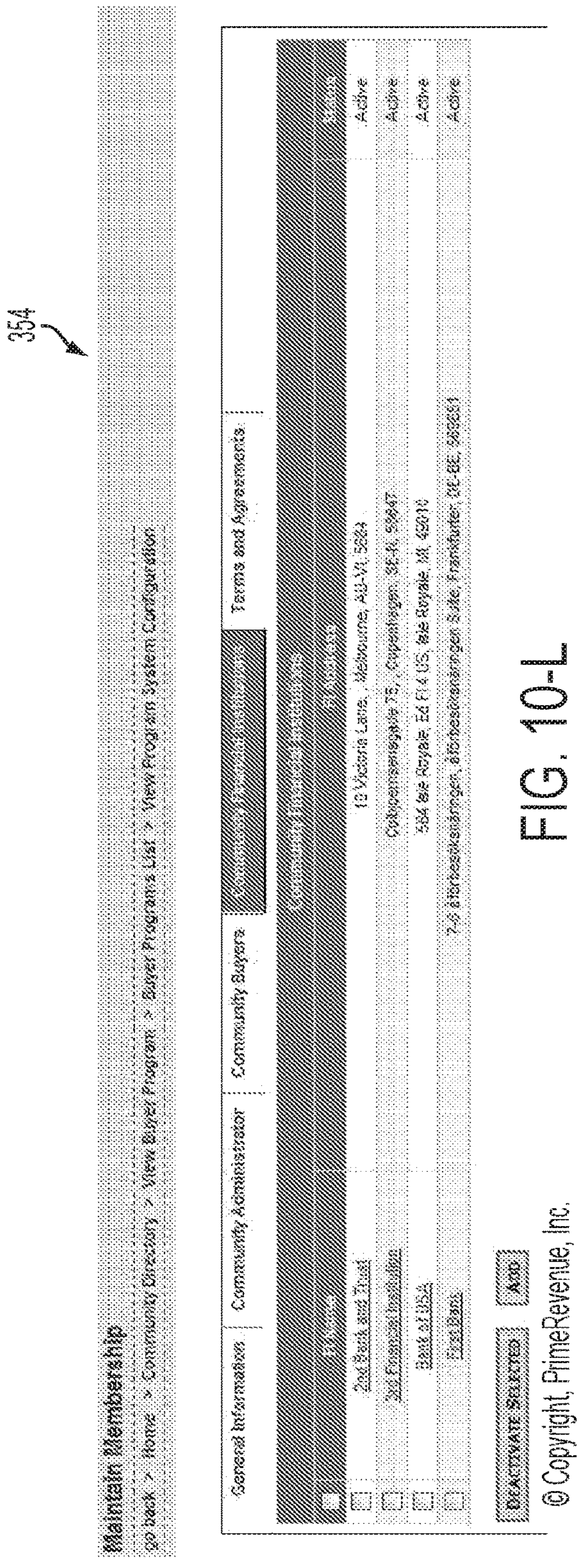
FIG. 10-L
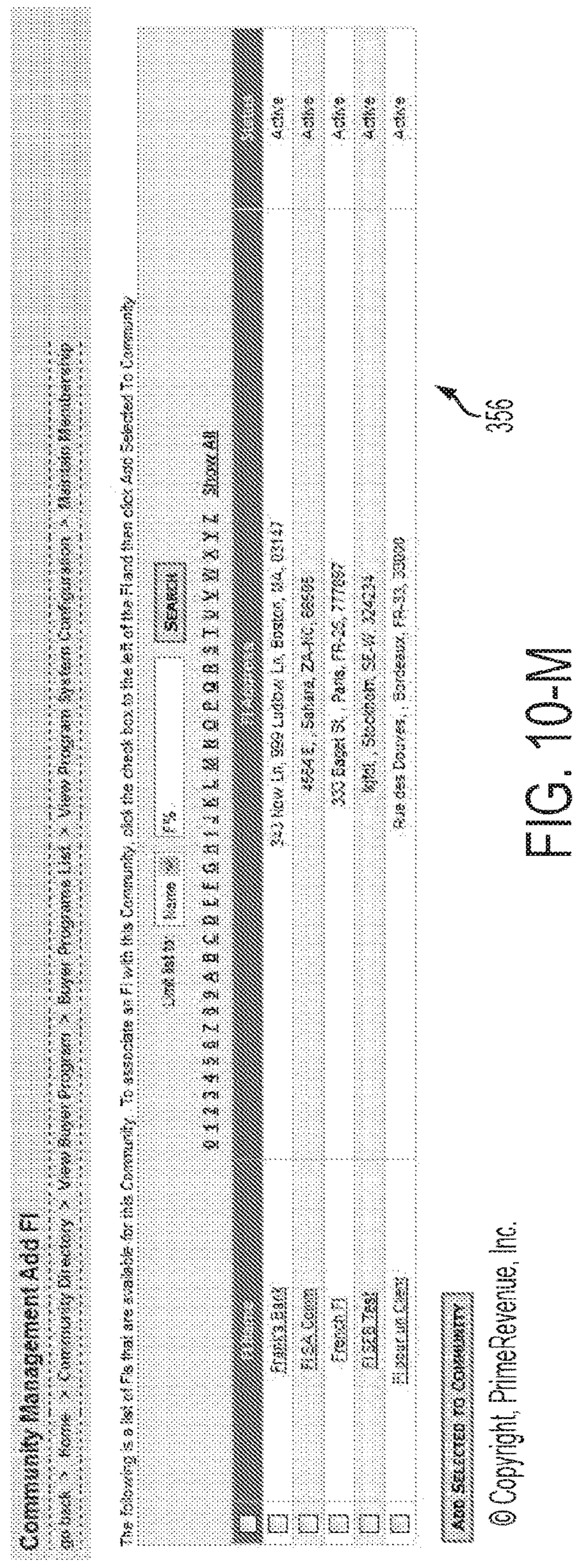
FIG. 10-M

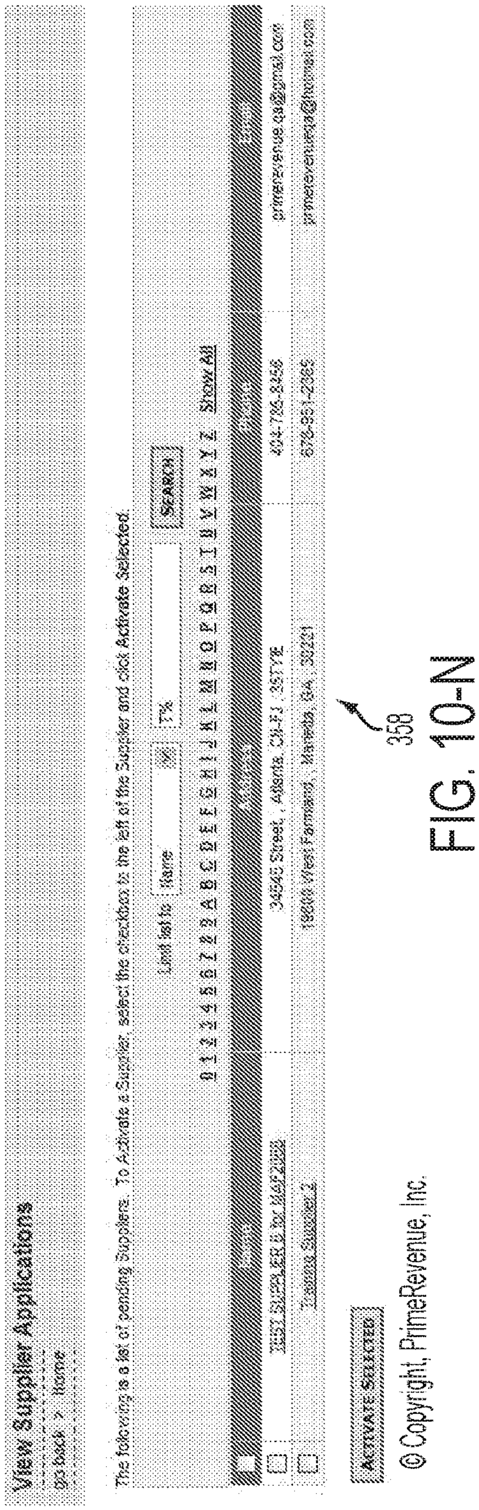
FIG. 10-N
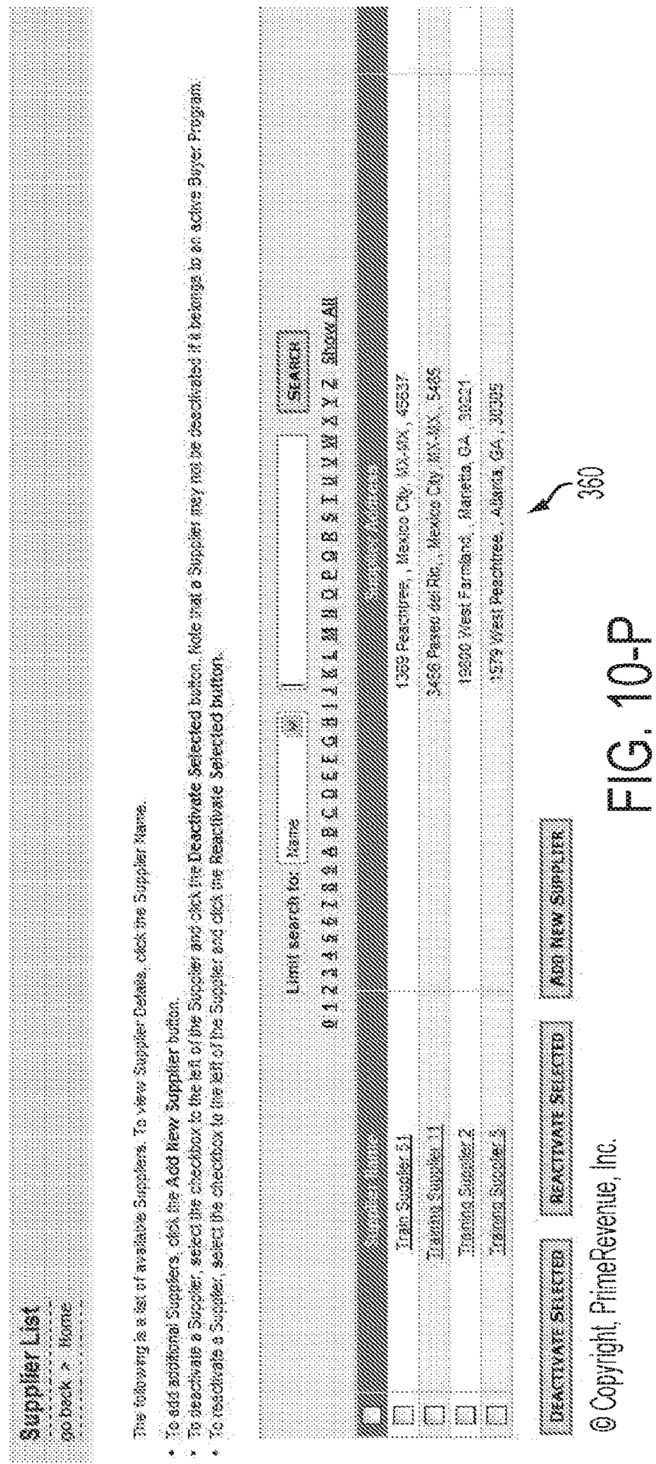
FIG. 10-P

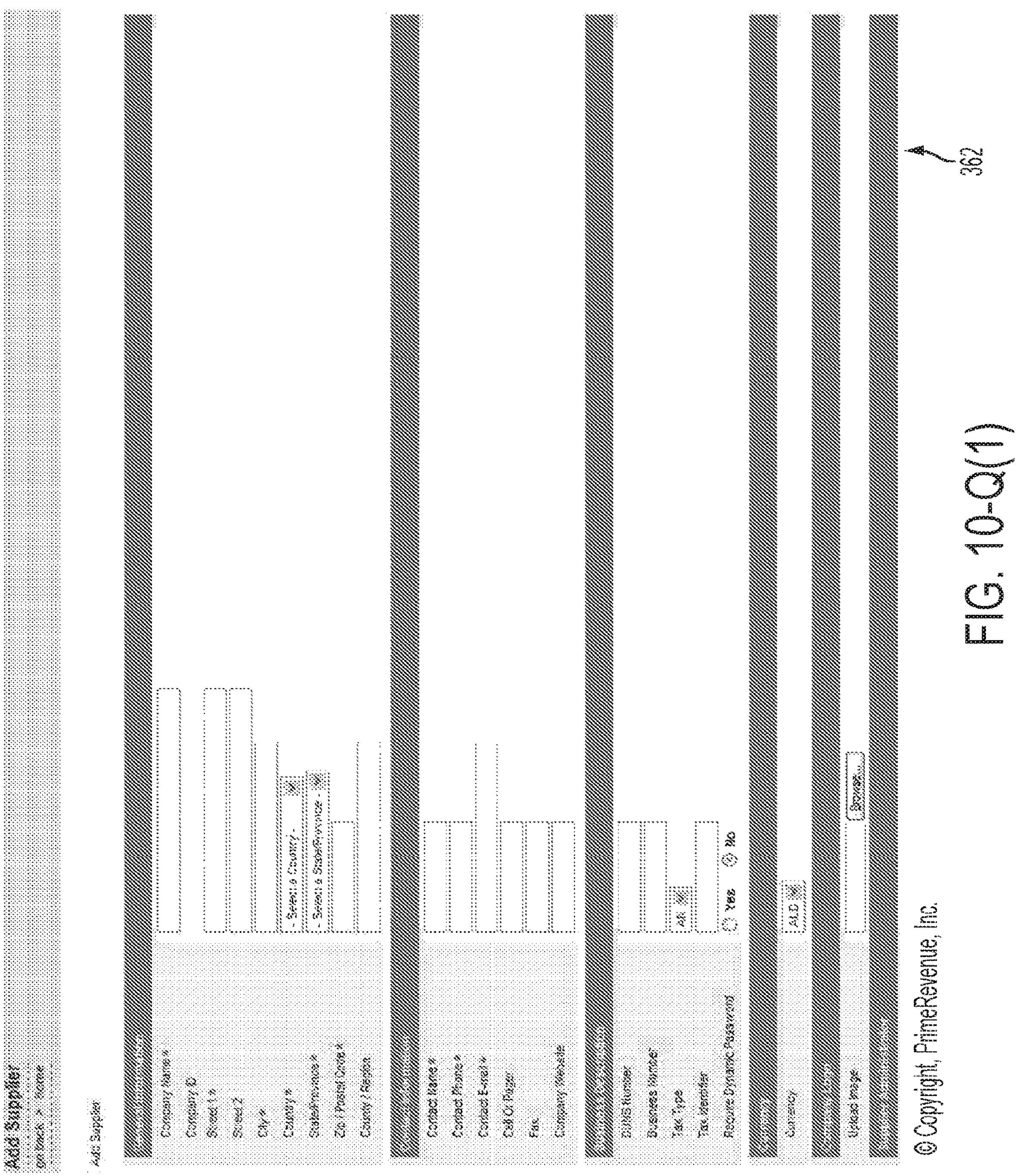
FIG. 10-Q(1)

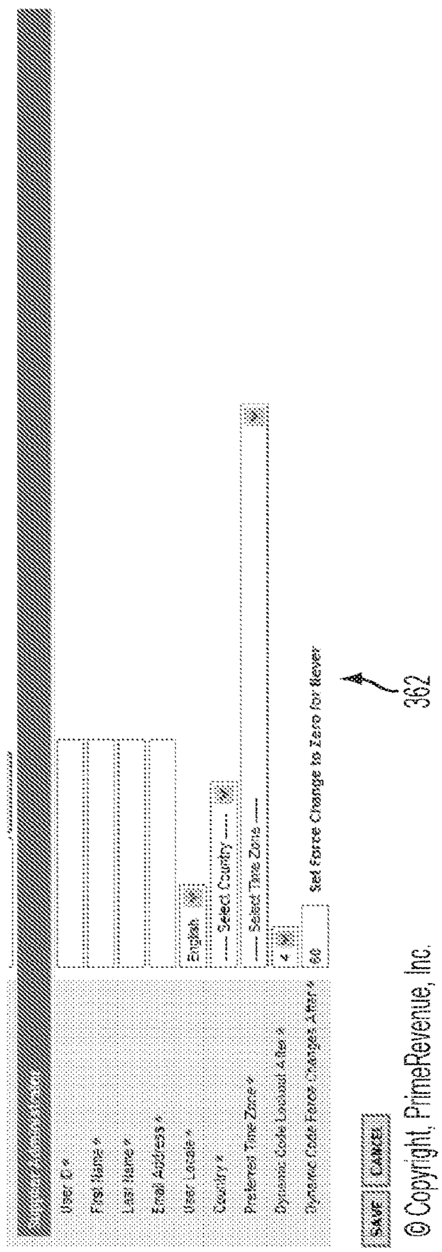
FIG. 10-Q(2)
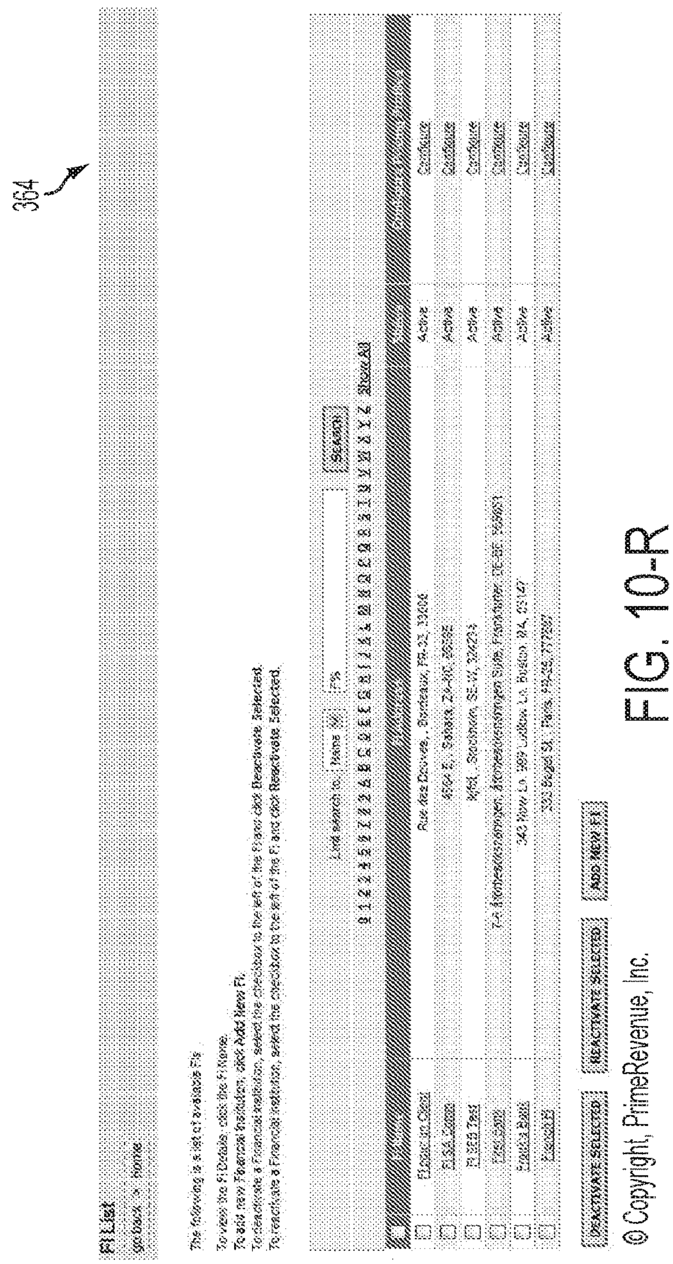
FIG. 10-R

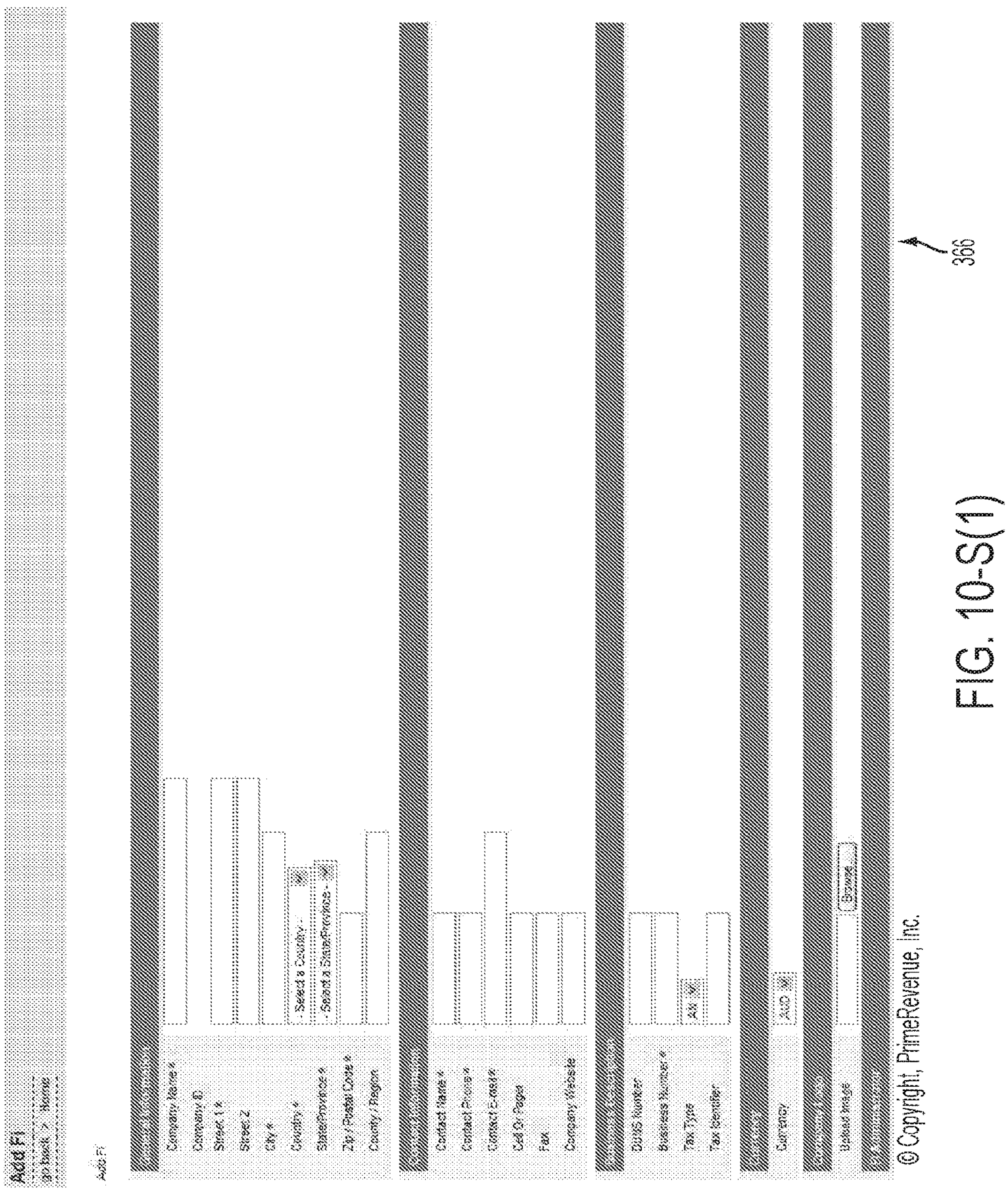
FIG. 10-S(1)

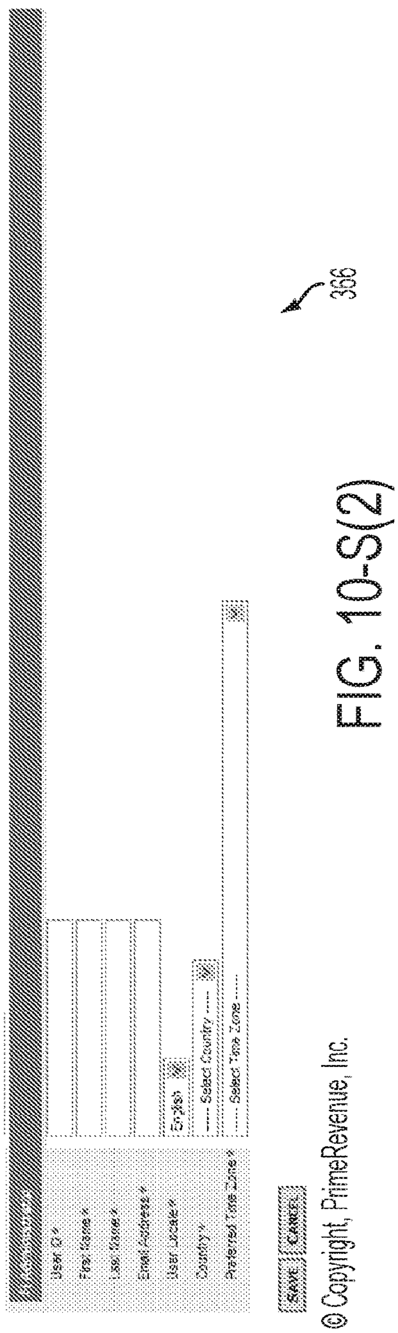
FIG. 10-S(2)
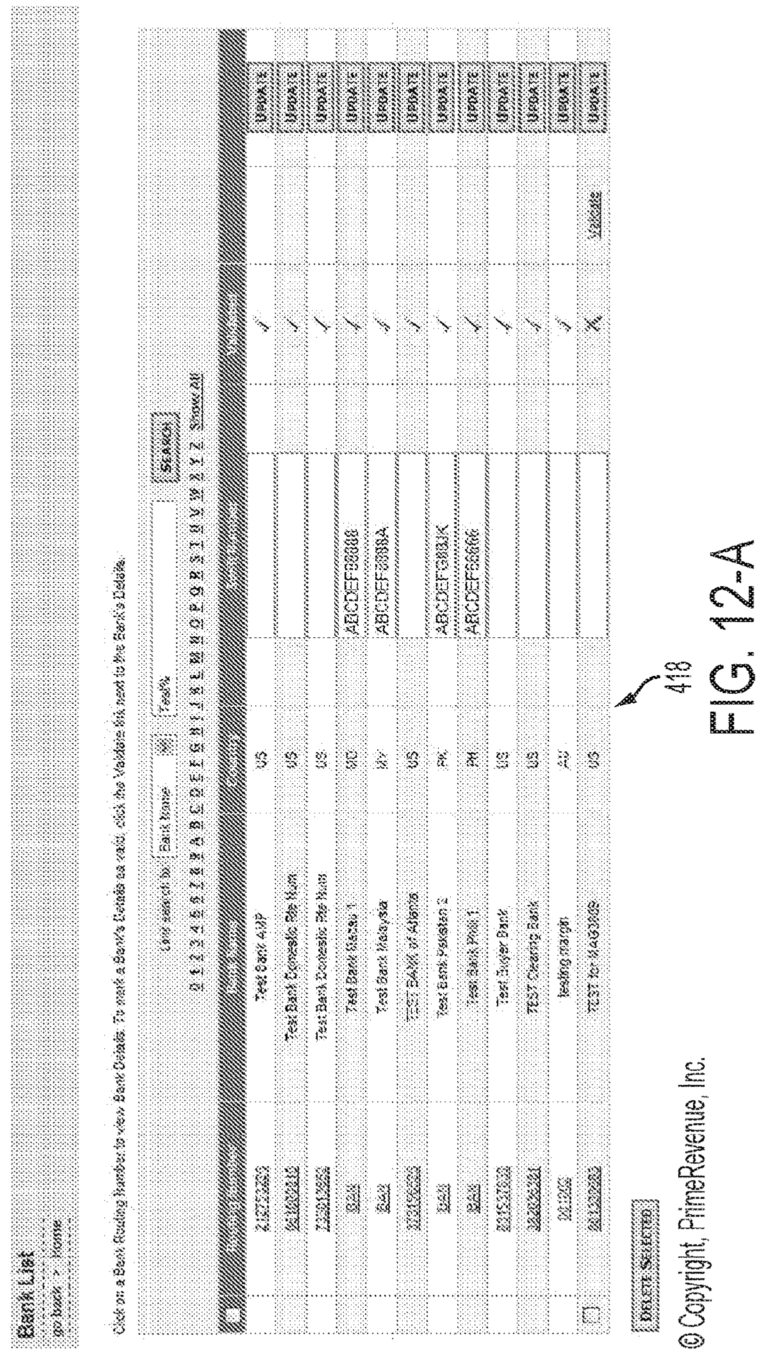
FIG. 12-A

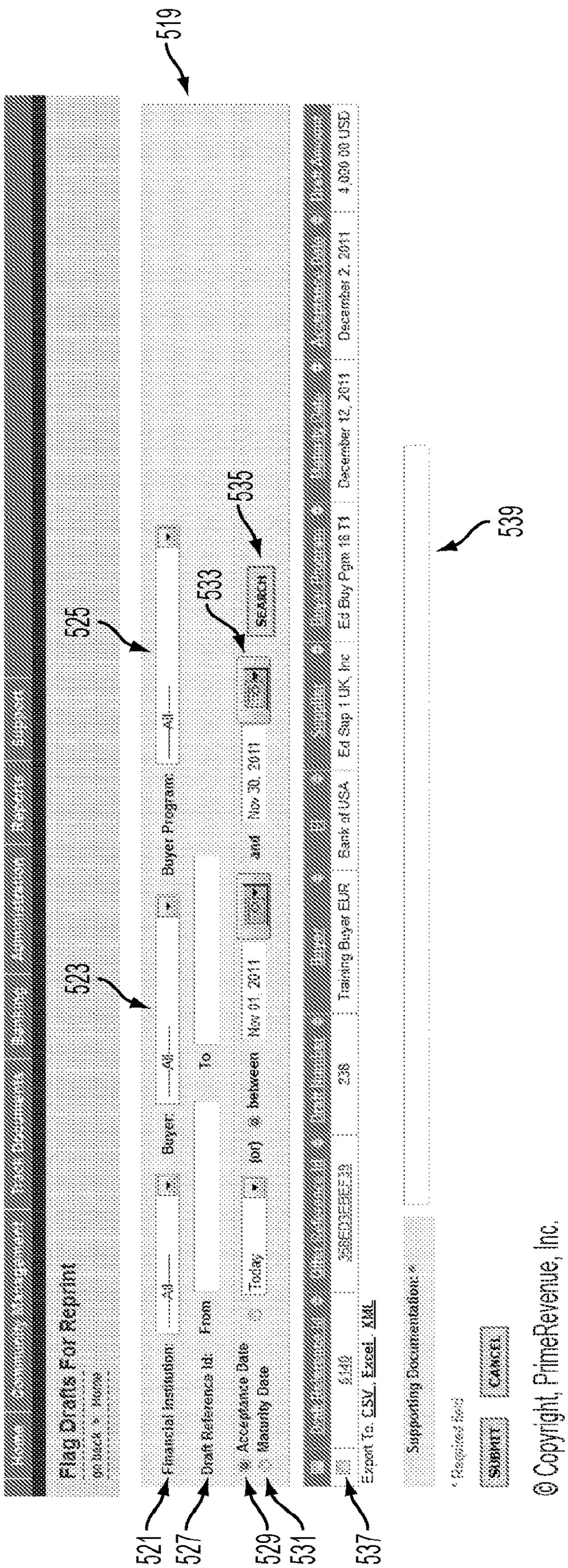
FIG. 10-T

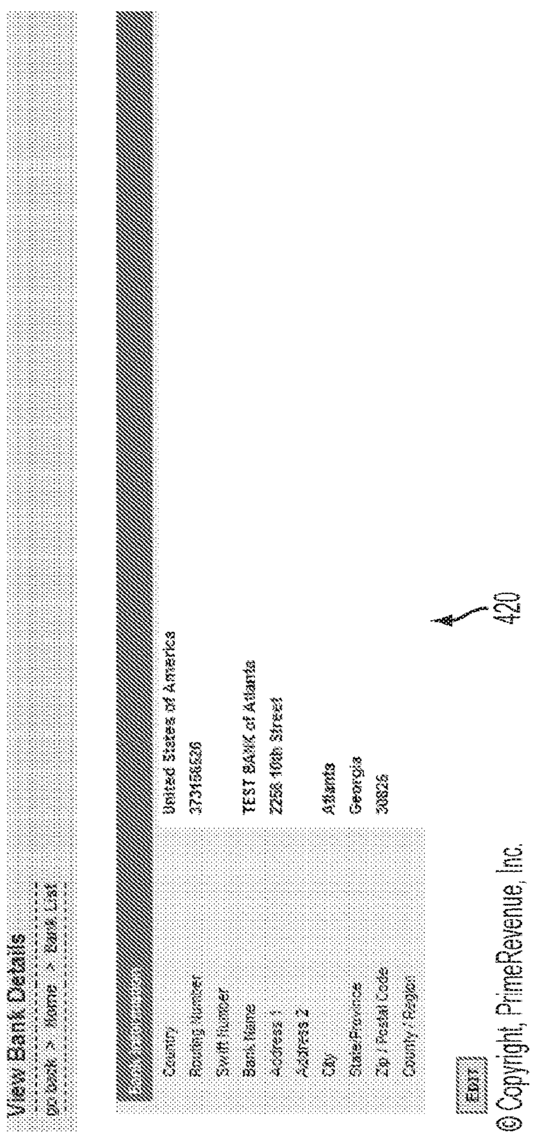
FIG. 12-B
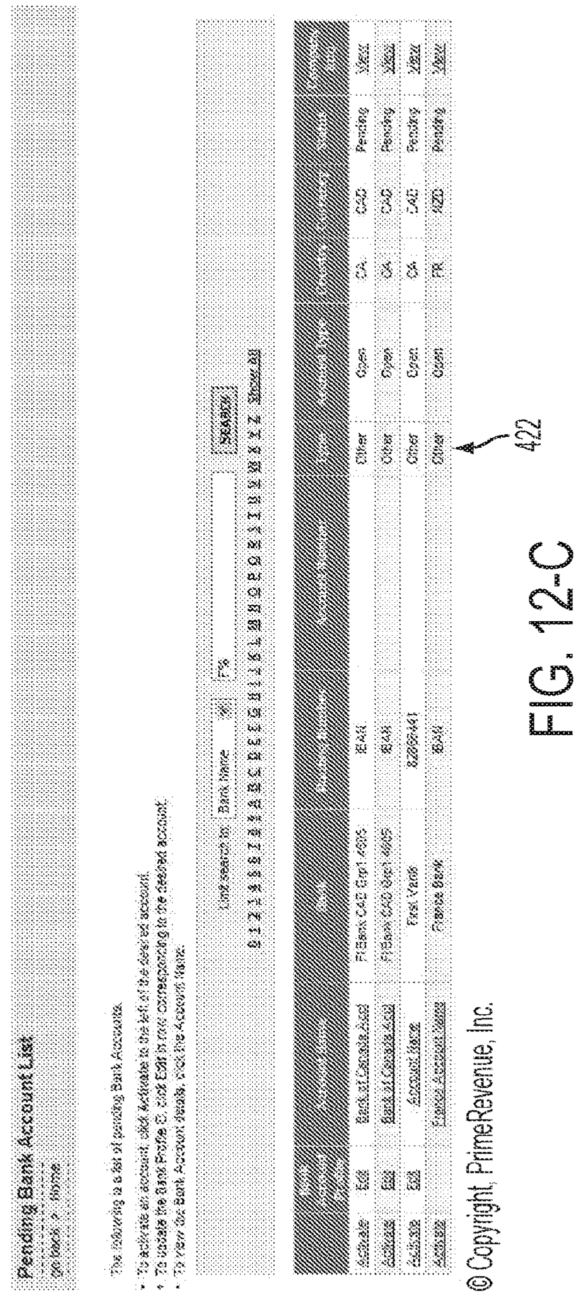
FIG. 12-C

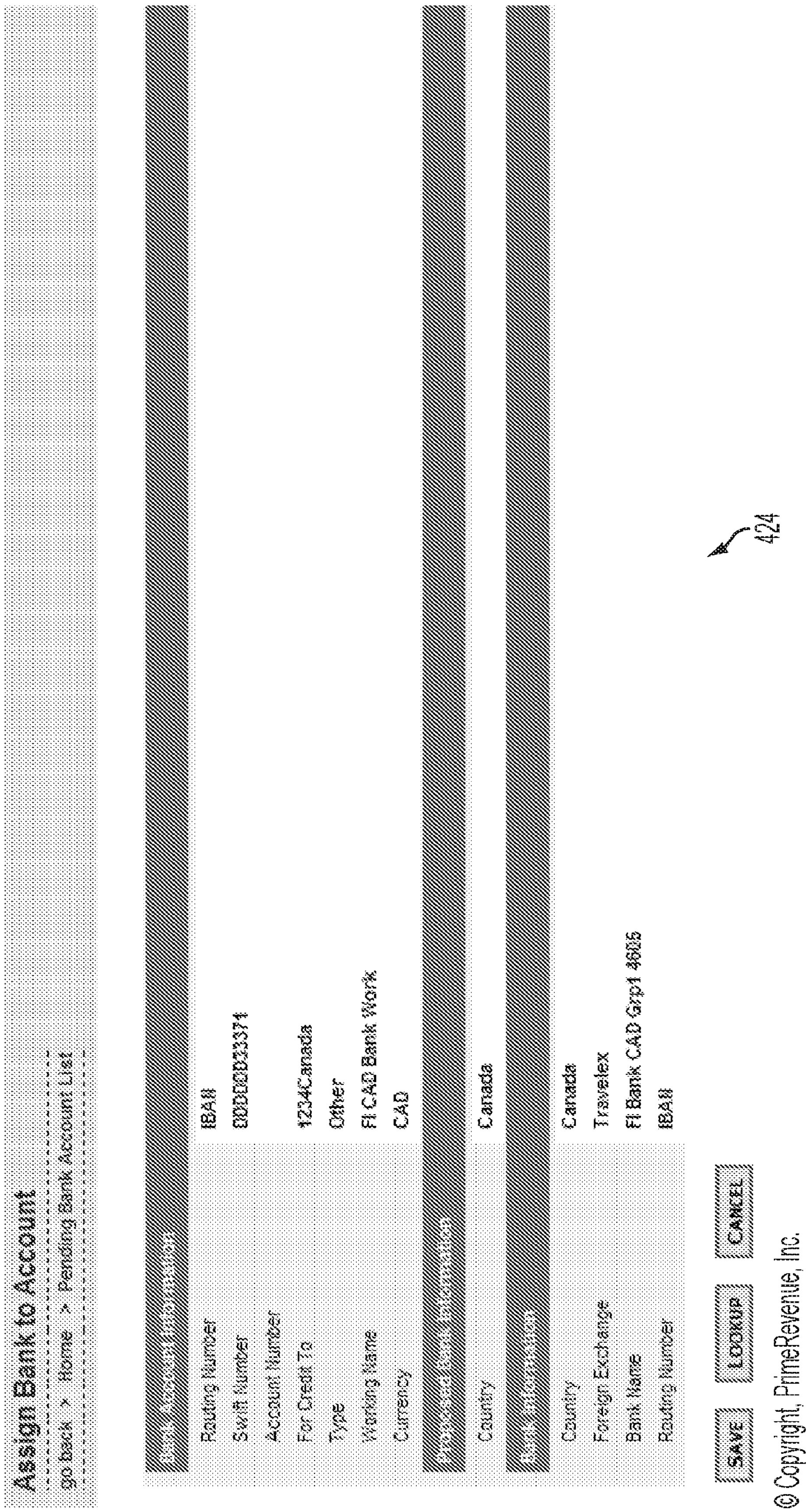
FIG. 12-D

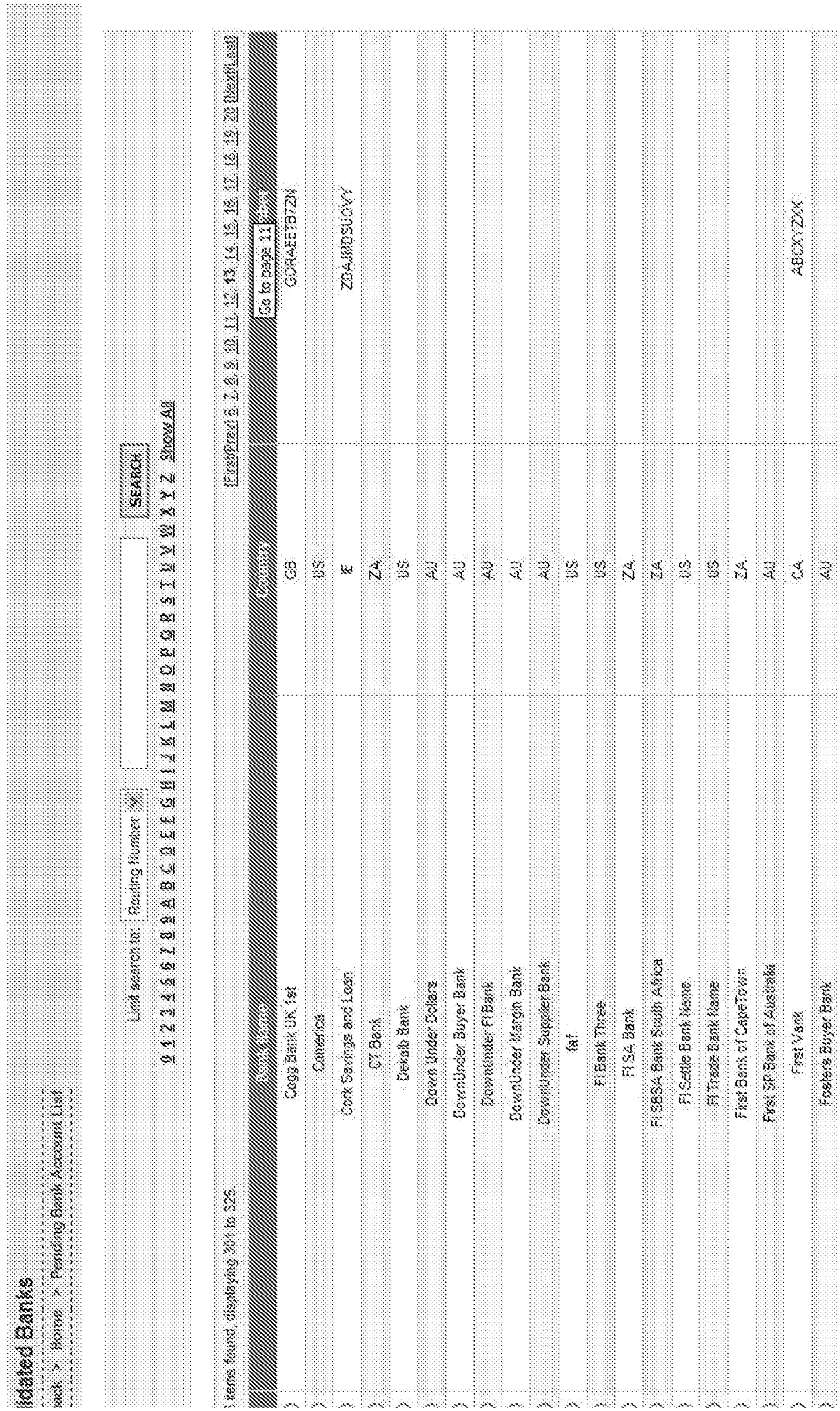
426
FIG. 12-E
© Copyright, PrimeRevenue, Inc.

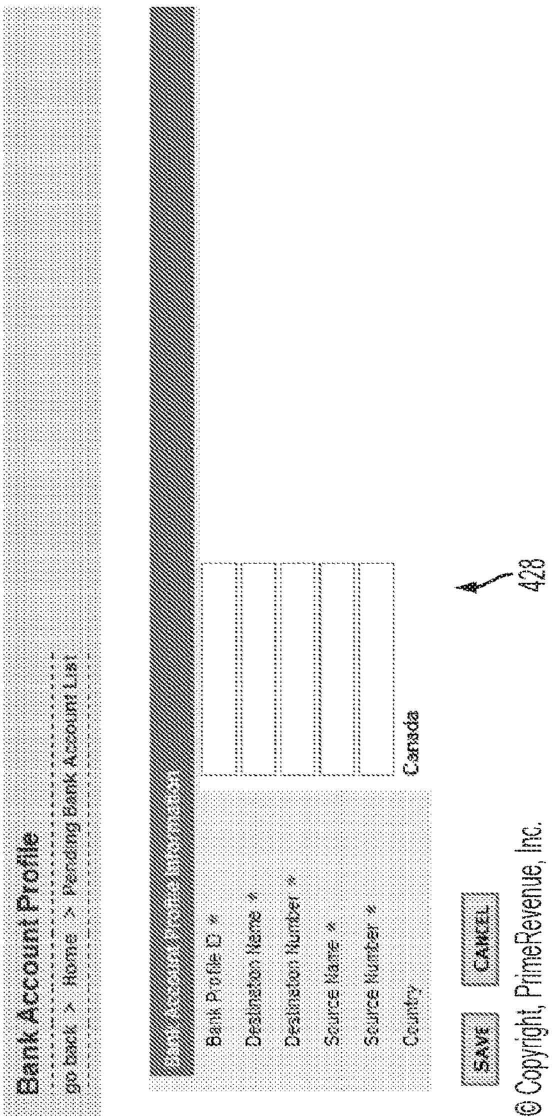
FIG. 12-F
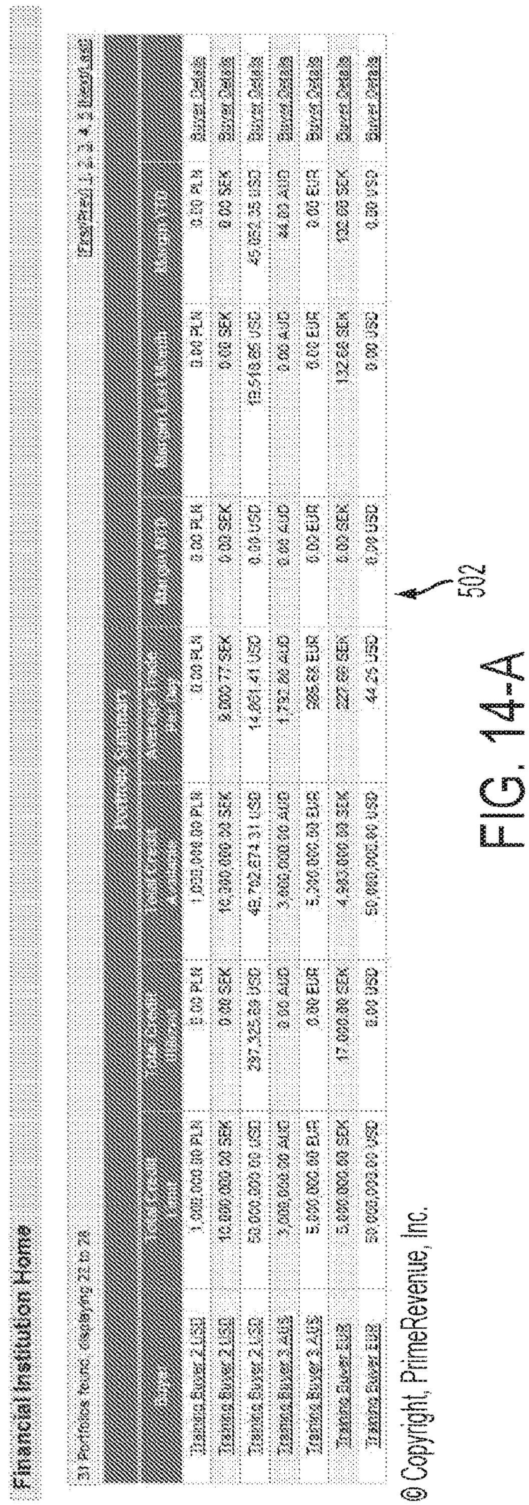
FIG. 14-A

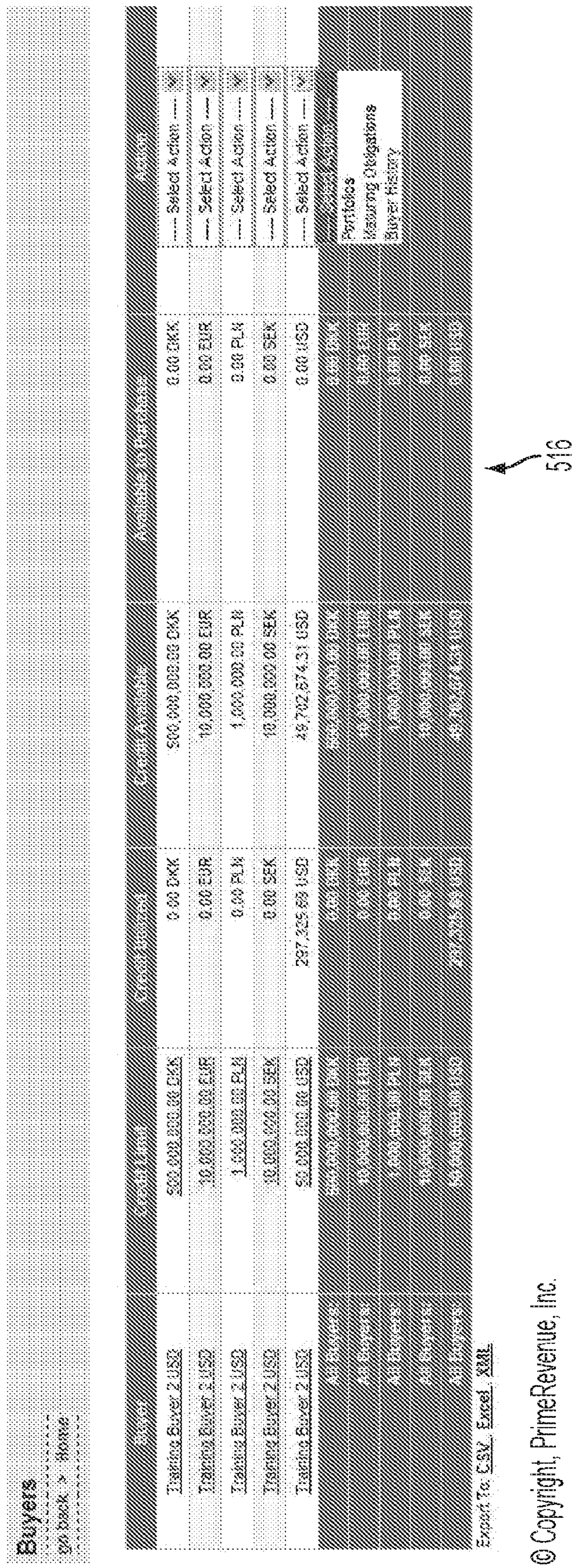
516
FIG. 14-B
© Copyright, PrimeRevenue, Inc.

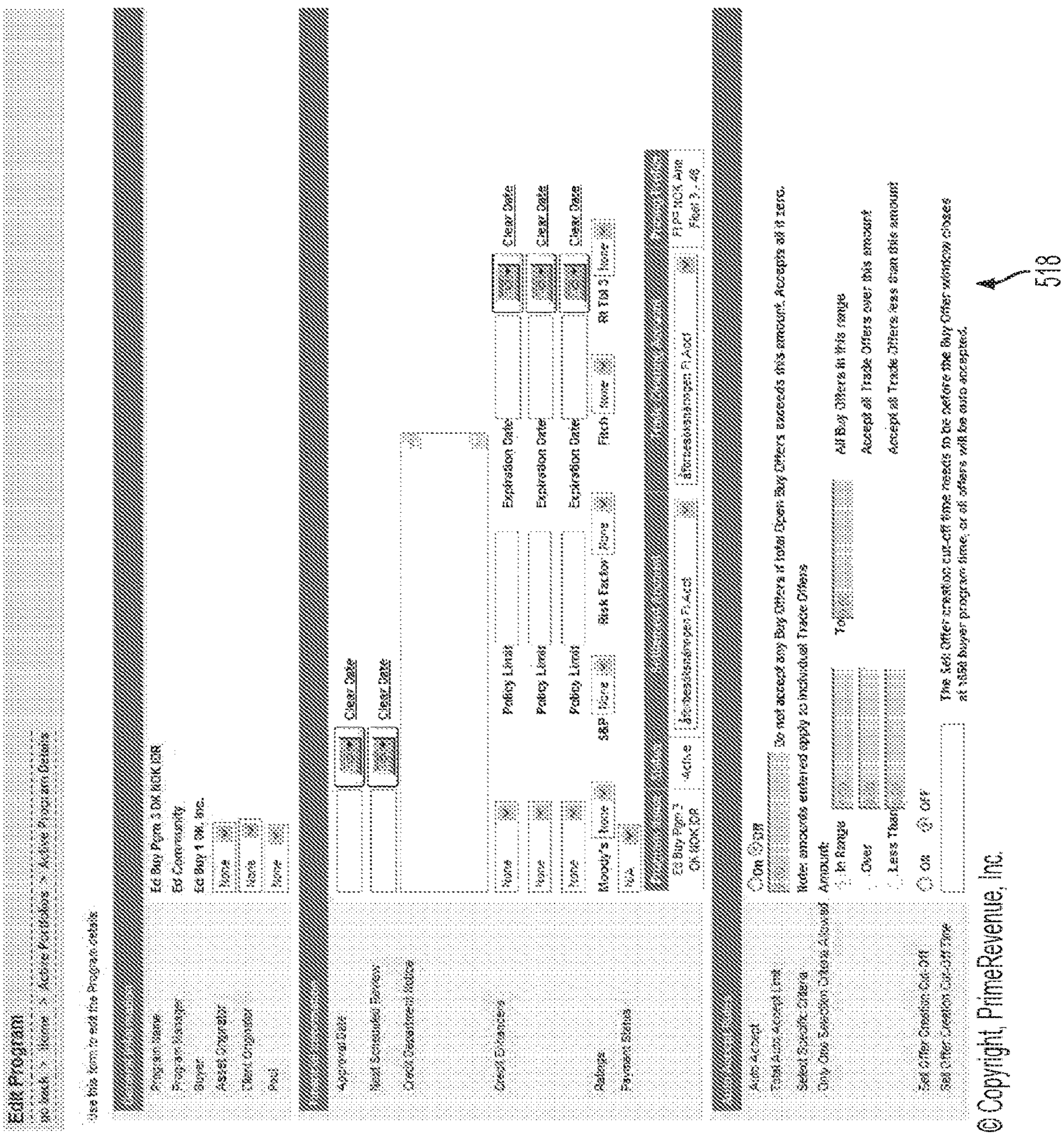
FIG. 14-C

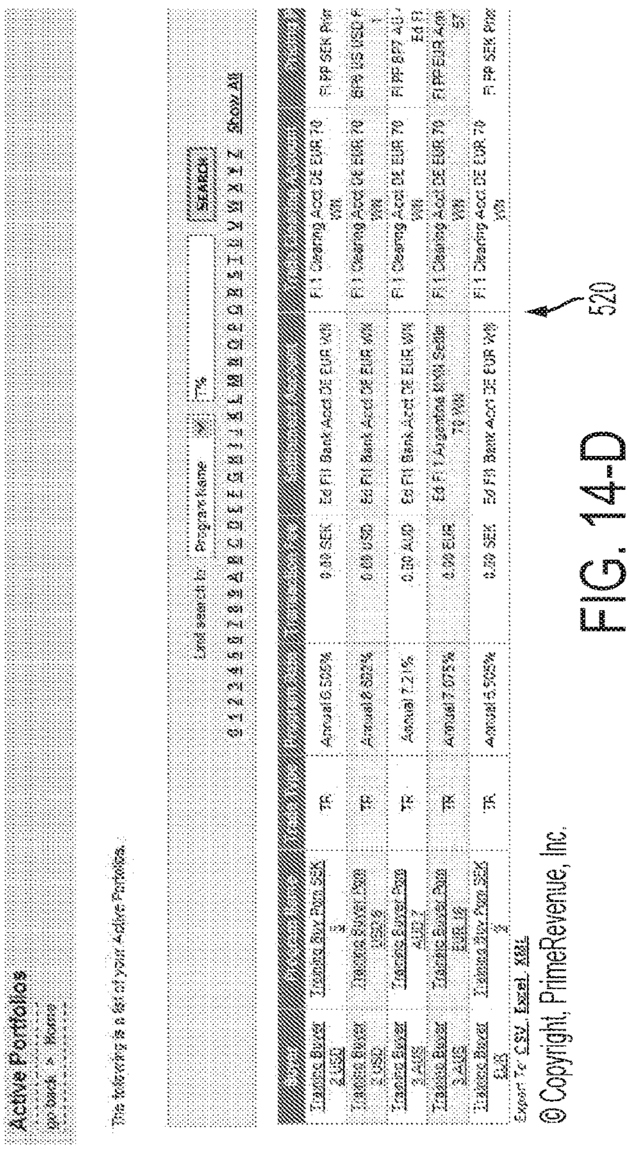
FIG. 14-D
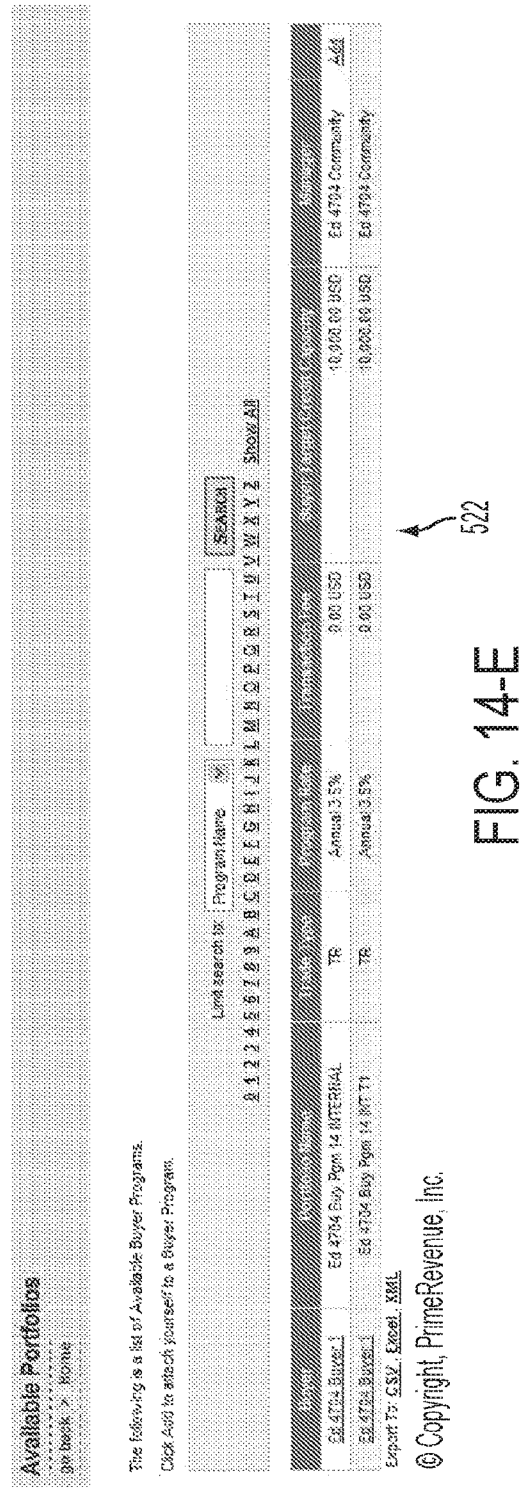
FIG. 14-E

List FI Pricing Profile go back > Home

Figure 14:
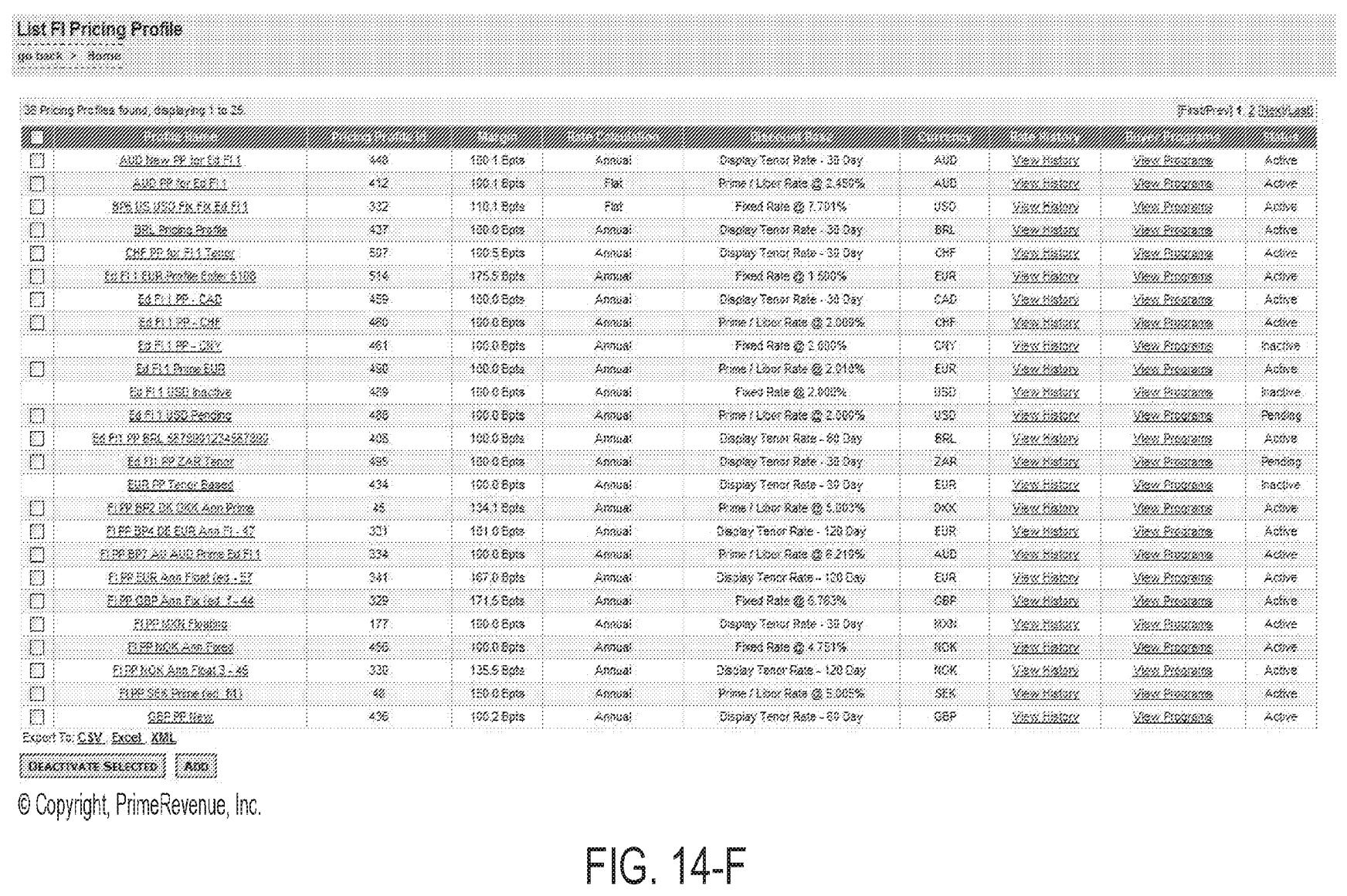

38 Pricing Profiles found, displaying 1 to 25. [First/Prev] 1, 2 [Next/Last]

| ☐ | Profile Name | Pricing Profile Id | Margin | Rate Calculation | Discount Basis | Currency | Rate History | Buyer Programs | Status |
|---|---|---|---|---|---|---|---|---|---|
| ☐ | AUD New PP for Ed FI 1 | 448 | 100.1 Bpts | Annual | Display Tenor Rate - 30 Day | AUD | View History | View Programs | Active |
| ☐ | AUD PP for Ed FI 1 | 412 | 100.1 Bpts | Flat | Prime / Libor Rate @ 2.450% | AUD | View History | View Programs | Active |
| ☐ | BPS US USD Fix Fix Ed FI 1 | 332 | 110.1 Bpts | Flat | Fixed Rate @ 7.701% | USD | View History | View Programs | Active |
| ☐ | BRL Pricing Profile | 437 | 100.0 Bpts | Annual | Display Tenor Rate - 30 Day | BRL | View History | View Programs | Active |
| ☐ | CHF PP for FI 1 Tenor | 507 | 100.5 Bpts | Annual | Display Tenor Rate - 30 Day | CHF | View History | View Programs | Active |
| ☐ | Ed FI 1 EUR Profile Enter $108 | 514 | 175.5 Bpts | Annual | Fixed Rate @ 1.500% | EUR | View History | View Programs | Active |
| ☐ | Ed FI 1 PP - CAD | 459 | 100.0 Bpts | Annual | Display Tenor Rate - 30 Day | CAD | View History | View Programs | Active |
| ☐ | Ed FI 1 PP - CHF | 460 | 100.0 Bpts | Annual | Prime / Libor Rate @ 2.000% | CHF | View History | View Programs | Active |
| | Ed FI 1 PP - CNY | 461 | 100.0 Bpts | Annual | Fixed Rate @ 2.000% | CNY | View History | View Programs | Inactive |
| ☐ | Ed FI 1 Prime EUR | 490 | 100.0 Bpts | Annual | Prime / Libor Rate @ 2.010% | EUR | View History | View Programs | Active |
| | Ed FI 1 USD Inactive | 439 | 100.0 Bpts | Annual | Fixed Rate @ 2.000% | USD | View History | View Programs | Inactive |
| ☐ | Ed FI 1 USD Pending | 480 | 100.0 Bpts | Annual | Prime / Libor Rate @ 2.000% | USD | View History | View Programs | Pending |
| ☐ | Ed FI1 PP BRL 9876901234567890 | 405 | 100.0 Bpts | Annual | Display Tenor Rate - 60 Day | BRL | View History | View Programs | Active |
| ☐ | Ed FI1 PP ZAR Tenor | 489 | 100.0 Bpts | Annual | Display Tenor Rate - 30 Day | ZAR | View History | View Programs | Pending |
| | EUR PP Tenor Based | 434 | 100.0 Bpts | Annual | Display Tenor Rate - 30 Day | EUR | View History | View Programs | Inactive |
| ☐ | FI PP BP2 DK DKK Ann Prime | 45 | 134.1 Bpts | Annual | Prime / Libor Rate @ 5.000% | DKK | View History | View Programs | Active |
| ☐ | FI PP BP4 DE EUR Ann FI - 47 | 331 | 101.0 Bpts | Annual | Display Tenor Rate - 120 Day | EUR | View History | View Programs | Active |
| ☐ | FI PP BP7 AU AUD Prime Ed FI 1 | 334 | 100.0 Bpts | Annual | Prime / Libor Rate @ 8.210% | AUD | View History | View Programs | Active |
| ☐ | FI PP EUR Ann Float (ed. - 57 | 341 | 167.0 Bpts | Annual | Display Tenor Rate - 120 Day | EUR | View History | View Programs | Active |
| ☐ | FI PP GBP Ann Fix (ed. 7 - 44 | 329 | 171.5 Bpts | Annual | Fixed Rate @ 6.763% | GBP | View History | View Programs | Active |
| ☐ | FI PP MXN Floating | 177 | 100.0 Bpts | Annual | Display Tenor Rate - 30 Day | MXN | View History | View Programs | Active |
| ☐ | FI PP NOK Ann Fixed | 495 | 100.0 Bpts | Annual | Fixed Rate @ 4.751% | NOK | View History | View Programs | Active |
| ☐ | FI PP NOK Ann Float 3 - 46 | 330 | 135.5 Bpts | Annual | Display Tenor Rate - 120 Day | NOK | View History | View Programs | Active |
| ☐ | FI PP SEK Prime (ed. 81) | 48 | 150.0 Bpts | Annual | Prime / Libor Rate @ 5.005% | SEK | View History | View Programs | Active |
| ☐ | GBP PP New | 436 | 100.2 Bpts | Annual | Display Tenor Rate - 60 Day | GBP | View History | View Programs | Active |

Export To: CSV, Excel, XML

DEACTIVATE SELECTED ADD

© Copyright, PrimeRevenue, Inc.

FIG. 14-F

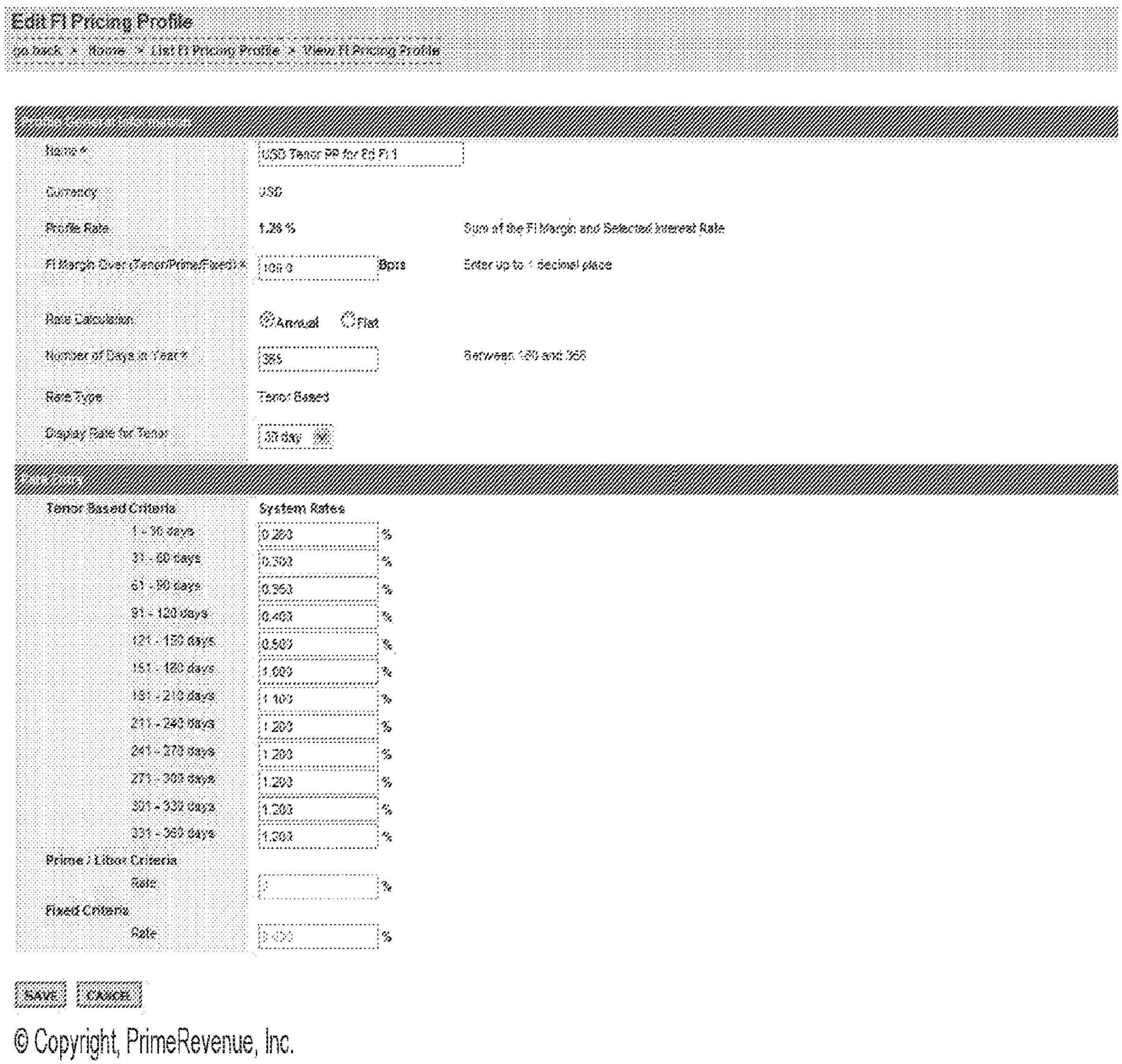
FIG. 14-G

View FI Pricing Profile History go back > Home > List FI Pricing Profile

Figure 14:
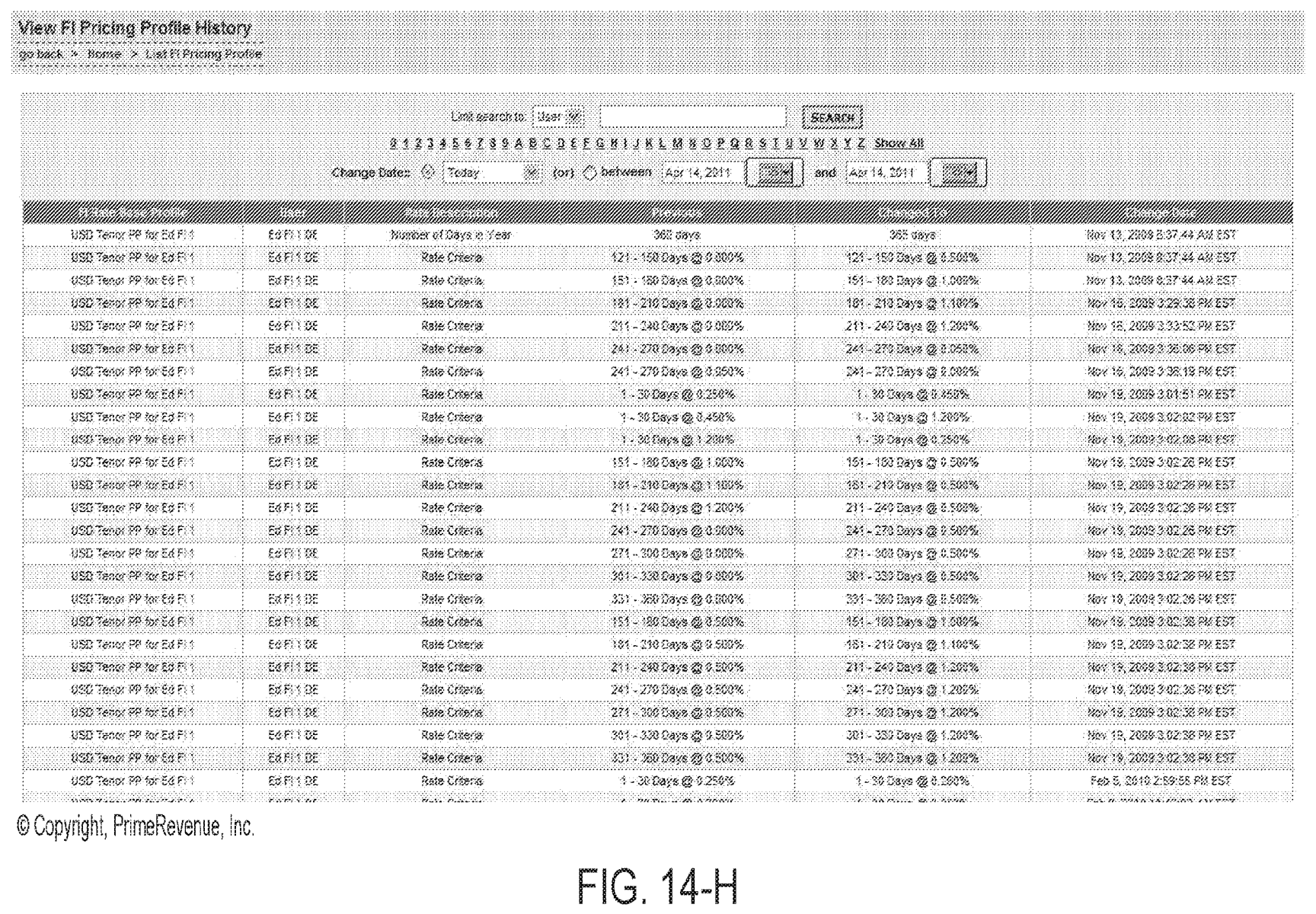

Limit search to: User [SEARCH]

0 1 2 3 4 5 6 7 8 9 A B C D E F G H I J K L M N O P Q R S T U V W X Y Z Show All Change Date: ◯ Today (or) ◯ between Apr 14, 2011 and Apr 14, 2011

| FI Rate Base Profile | User | Rate Description | Previous | Changed To | Change Date |
|---|---|---|---|---|---|
| USD Tenor PP for Ed FI 1 | Ed FI 1 DE | Number of Days in Year | 360 days | 365 days | Nov 13, 2009 8:37:44 AM EST |
| USD Tenor PP for Ed FI 1 | Ed FI 1 DE | Rate Criteria | 121 - 150 Days @ 0.000% | 121 - 150 Days @ 0.500% | Nov 13, 2009 8:37:44 AM EST |
| USD Tenor PP for Ed FI 1 | Ed FI 1 DE | Rate Criteria | 151 - 180 Days @ 0.000% | 151 - 180 Days @ 1.000% | Nov 13, 2009 8:37:44 AM EST |
| USD Tenor PP for Ed FI 1 | Ed FI 1 DE | Rate Criteria | 181 - 210 Days @ 0.000% | 181 - 210 Days @ 1.100% | Nov 16, 2009 3:29:38 PM EST |
| USD Tenor PP for Ed FI 1 | Ed FI 1 DE | Rate Criteria | 211 - 240 Days @ 0.000% | 211 - 240 Days @ 1.200% | Nov 16, 2009 3:33:53 PM EST |
| USD Tenor PP for Ed FI 1 | Ed FI 1 DE | Rate Criteria | 241 - 270 Days @ 0.000% | 241 - 270 Days @ 0.050% | Nov 16, 2009 3:36:06 PM EST |
| USD Tenor PP for Ed FI 1 | Ed FI 1 DE | Rate Criteria | 241 - 270 Days @ 0.050% | 241 - 270 Days @ 0.000% | Nov 16, 2009 3:38:19 PM EST |
| USD Tenor PP for Ed FI 1 | Ed FI 1 DE | Rate Criteria | 1 - 30 Days @ 0.250% | 1 - 30 Days @ 0.450% | Nov 19, 2009 3:01:51 PM EST |
| USD Tenor PP for Ed FI 1 | Ed FI 1 DE | Rate Criteria | 1 - 30 Days @ 0.450% | 1 - 30 Days @ 1.200% | Nov 19, 2009 3:02:02 PM EST |
| USD Tenor PP for Ed FI 1 | Ed FI 1 DE | Rate Criteria | 1 - 30 Days @ 1.200% | 1 - 30 Days @ 0.250% | Nov 19, 2009 3:02:08 PM EST |
| USD Tenor PP for Ed FI 1 | Ed FI 1 DE | Rate Criteria | 151 - 180 Days @ 1.000% | 151 - 180 Days @ 0.500% | Nov 19, 2009 3:02:26 PM EST |
| USD Tenor PP for Ed FI 1 | Ed FI 1 DE | Rate Criteria | 181 - 210 Days @ 1.100% | 181 - 210 Days @ 0.500% | Nov 19, 2009 3:02:26 PM EST |
| USD Tenor PP for Ed FI 1 | Ed FI 1 DE | Rate Criteria | 211 - 240 Days @ 1.200% | 211 - 240 Days @ 0.500% | Nov 19, 2009 3:02:26 PM EST |
| USD Tenor PP for Ed FI 1 | Ed FI 1 DE | Rate Criteria | 241 - 270 Days @ 0.000% | 241 - 270 Days @ 0.500% | Nov 19, 2009 3:02:26 PM EST |
| USD Tenor PP for Ed FI 1 | Ed FI 1 DE | Rate Criteria | 271 - 300 Days @ 0.000% | 271 - 300 Days @ 0.500% | Nov 19, 2009 3:02:26 PM EST |
| USD Tenor PP for Ed FI 1 | Ed FI 1 DE | Rate Criteria | 301 - 330 Days @ 0.000% | 301 - 330 Days @ 0.500% | Nov 19, 2009 3:02:26 PM EST |
| USD Tenor PP for Ed FI 1 | Ed FI 1 DE | Rate Criteria | 331 - 360 Days @ 0.000% | 331 - 360 Days @ 0.500% | Nov 19, 2009 3:02:26 PM EST |
| USD Tenor PP for Ed FI 1 | Ed FI 1 DE | Rate Criteria | 151 - 180 Days @ 0.500% | 151 - 180 Days @ 1.000% | Nov 19, 2009 3:02:38 PM EST |
| USD Tenor PP for Ed FI 1 | Ed FI 1 DE | Rate Criteria | 181 - 210 Days @ 0.500% | 181 - 210 Days @ 1.100% | Nov 19, 2009 3:02:38 PM EST |
| USD Tenor PP for Ed FI 1 | Ed FI 1 DE | Rate Criteria | 211 - 240 Days @ 0.500% | 211 - 240 Days @ 1.200% | Nov 19, 2009 3:02:38 PM EST |
| USD Tenor PP for Ed FI 1 | Ed FI 1 DE | Rate Criteria | 241 - 270 Days @ 0.500% | 241 - 270 Days @ 1.200% | Nov 19, 2009 3:02:38 PM EST |
| USD Tenor PP for Ed FI 1 | Ed FI 1 DE | Rate Criteria | 271 - 300 Days @ 0.500% | 271 - 300 Days @ 1.200% | Nov 19, 2009 3:02:38 PM EST |
| USD Tenor PP for Ed FI 1 | Ed FI 1 DE | Rate Criteria | 301 - 330 Days @ 0.500% | 301 - 330 Days @ 1.200% | Nov 19, 2009 3:02:38 PM EST |
| USD Tenor PP for Ed FI 1 | Ed FI 1 DE | Rate Criteria | 331 - 360 Days @ 0.500% | 331 - 360 Days @ 1.200% | Nov 19, 2009 3:02:38 PM EST |
| USD Tenor PP for Ed FI 1 | Ed FI 1 DE | Rate Criteria | 1 - 30 Days @ 0.250% | 1 - 30 Days @ 0.290% | Feb 5, 2010 2:59:58 PM EST |

© Copyright, PrimeRevenue, Inc.

FIG. 14-H

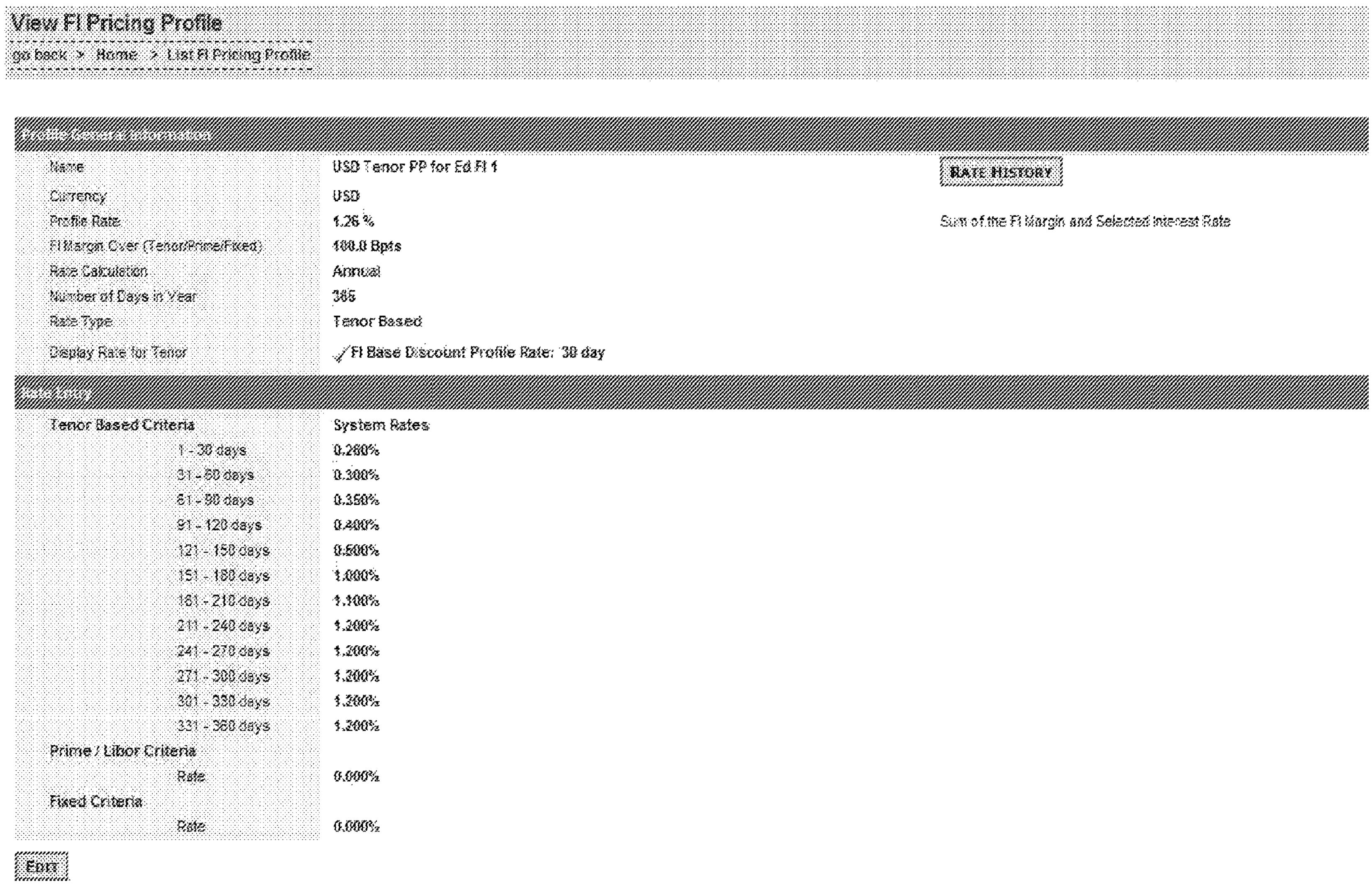
© Copyright, PrimeRevenue, Inc.
FIG. 14-I

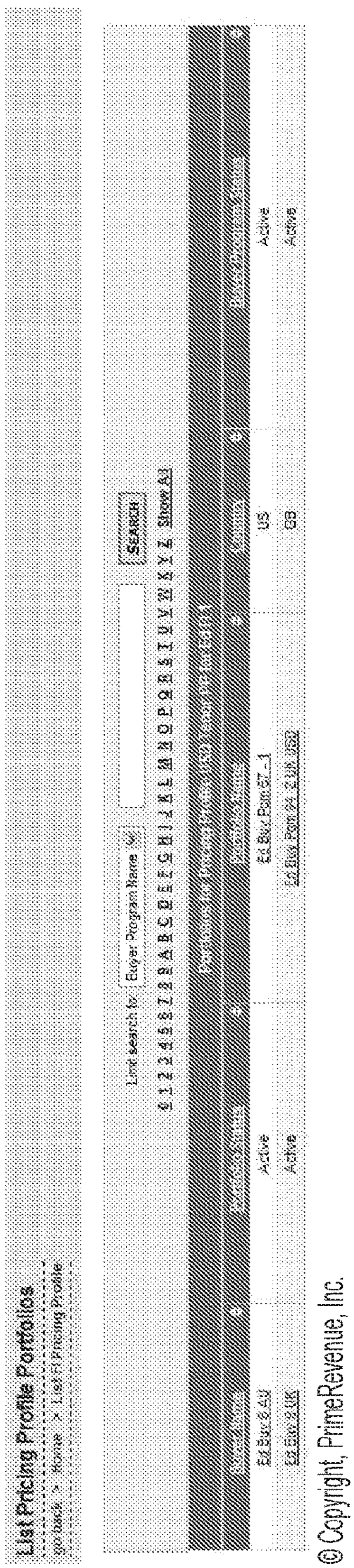
FIG. 14-J
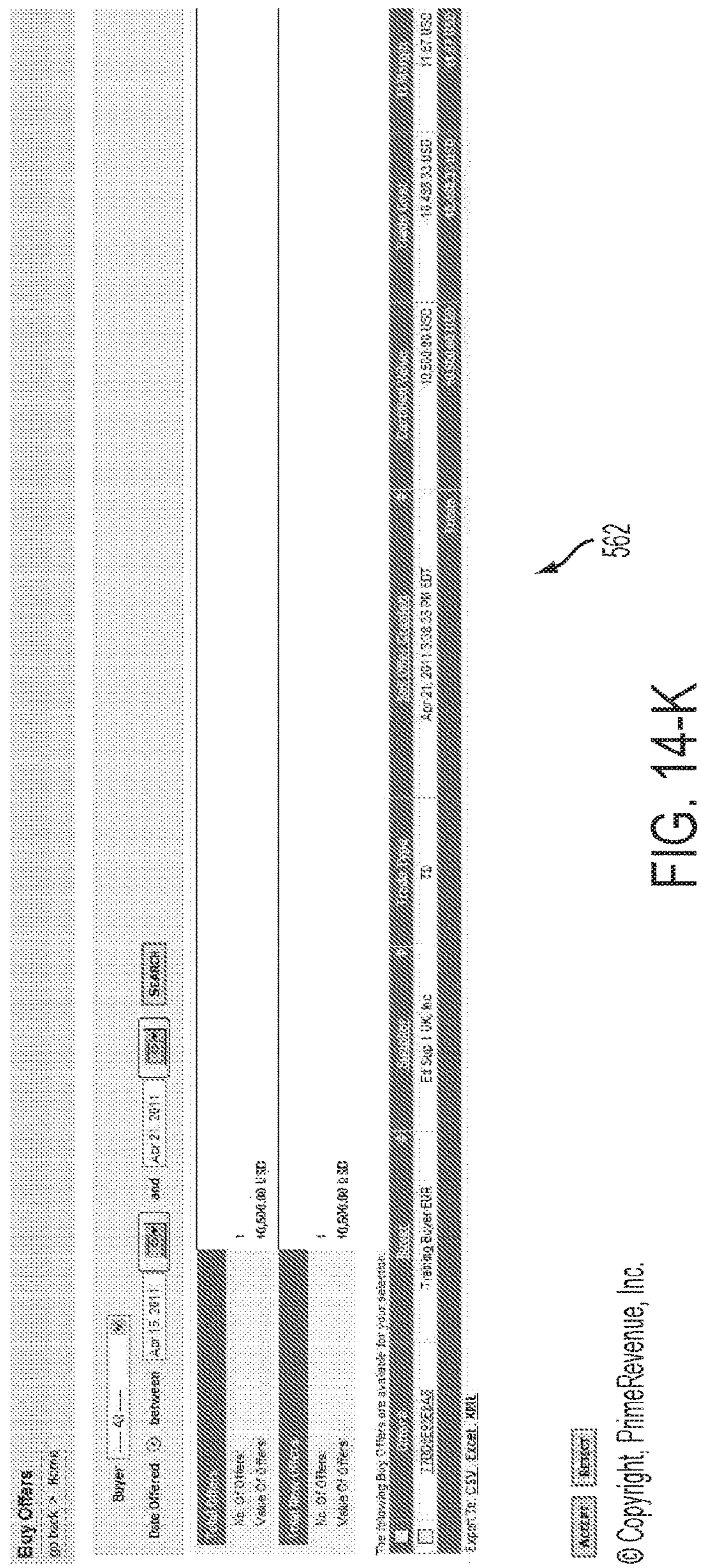
FIG. 14-K

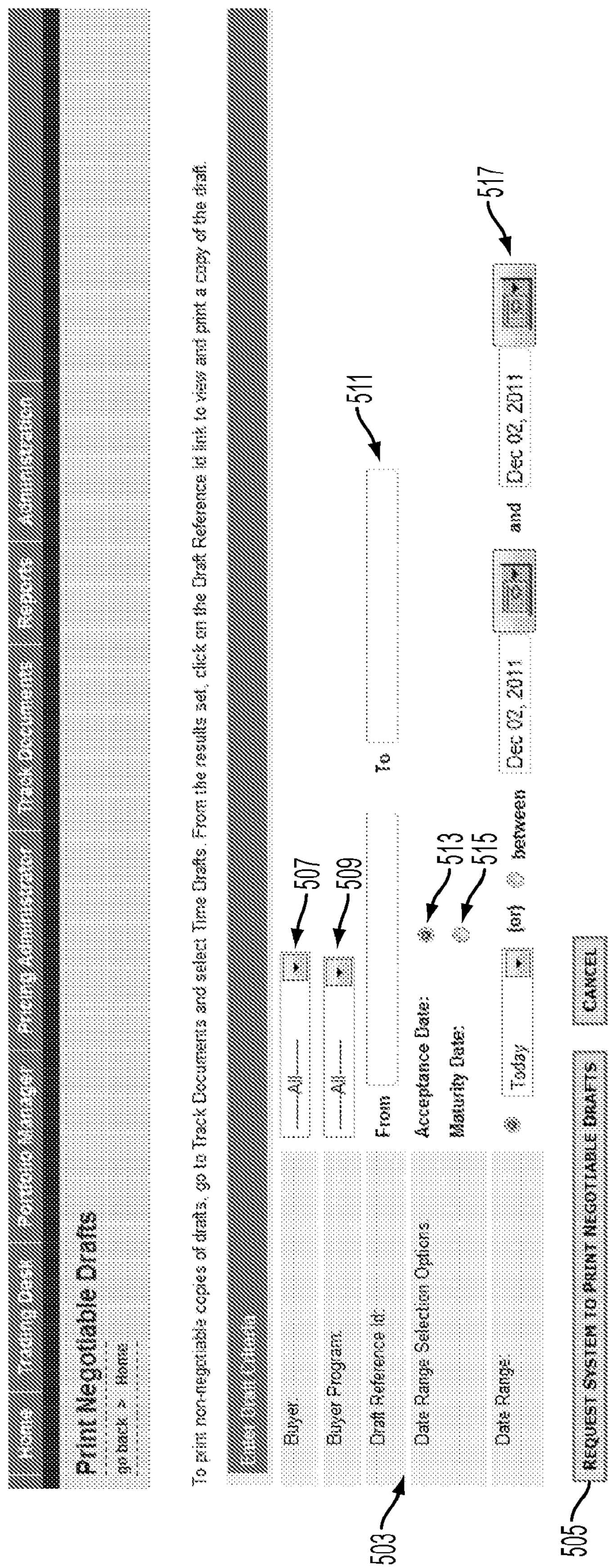
FIG. 14-L

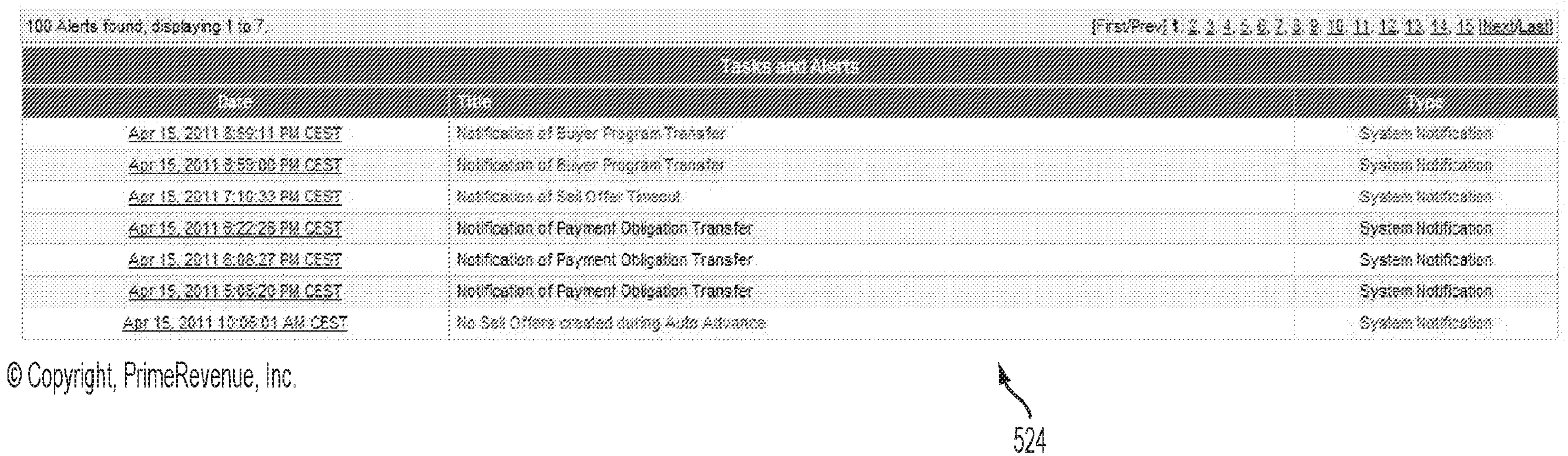
FIG. 15-A
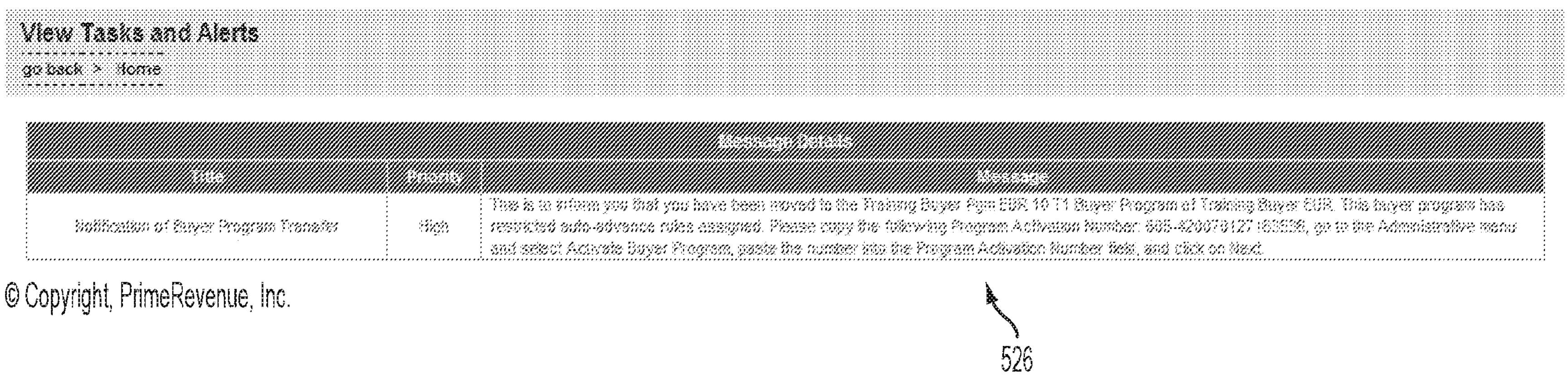
FIG. 15-B

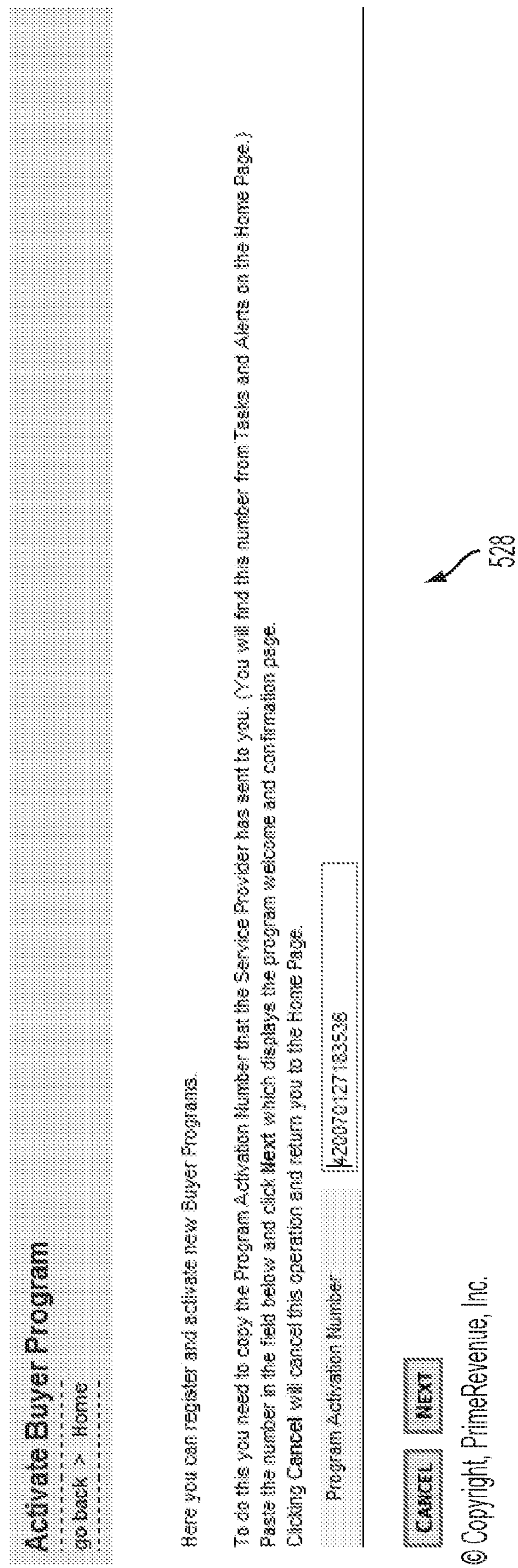
FIG. 15-C

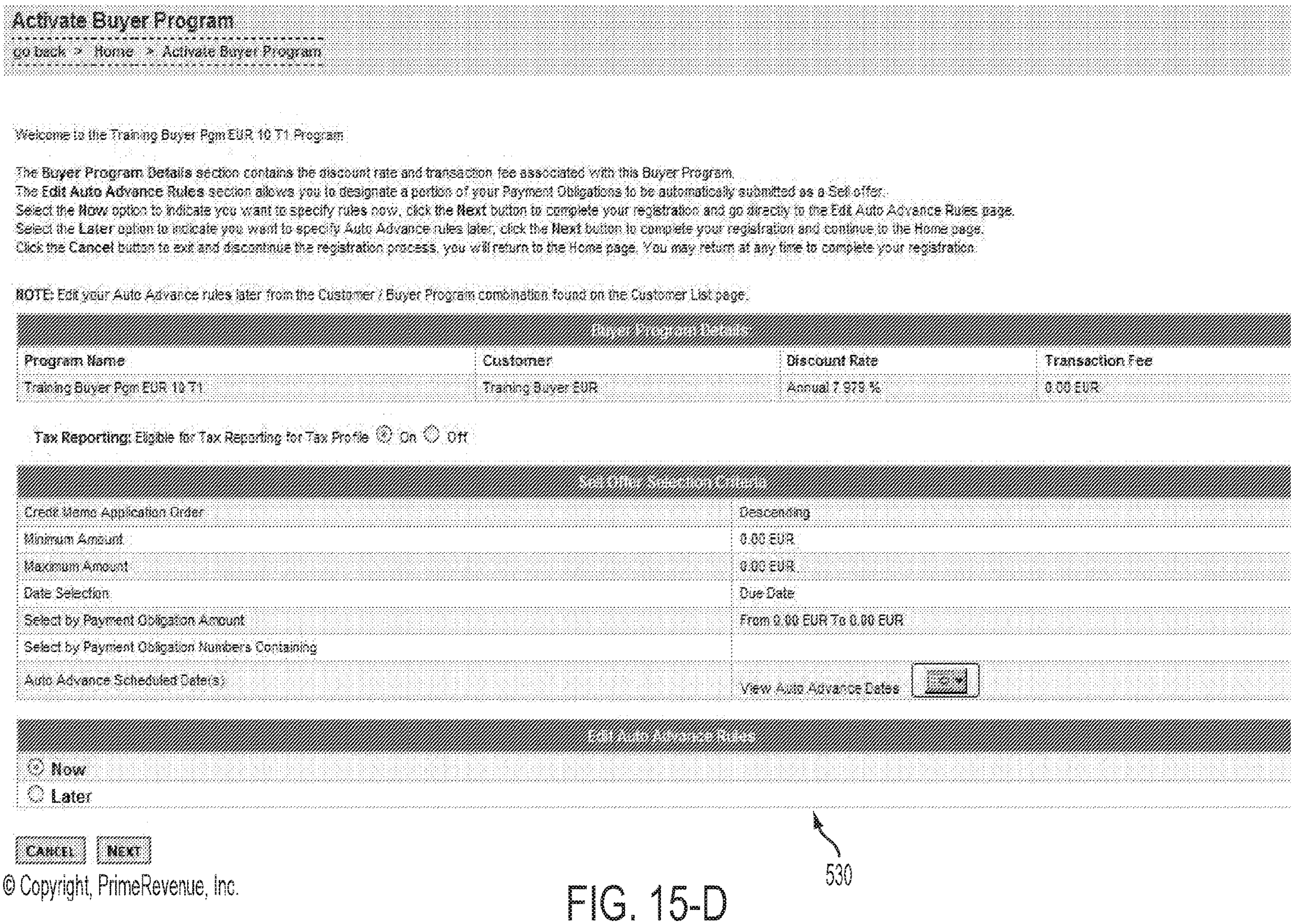
530
FIG. 15-D

Customer List go back > Home

Figure 15:
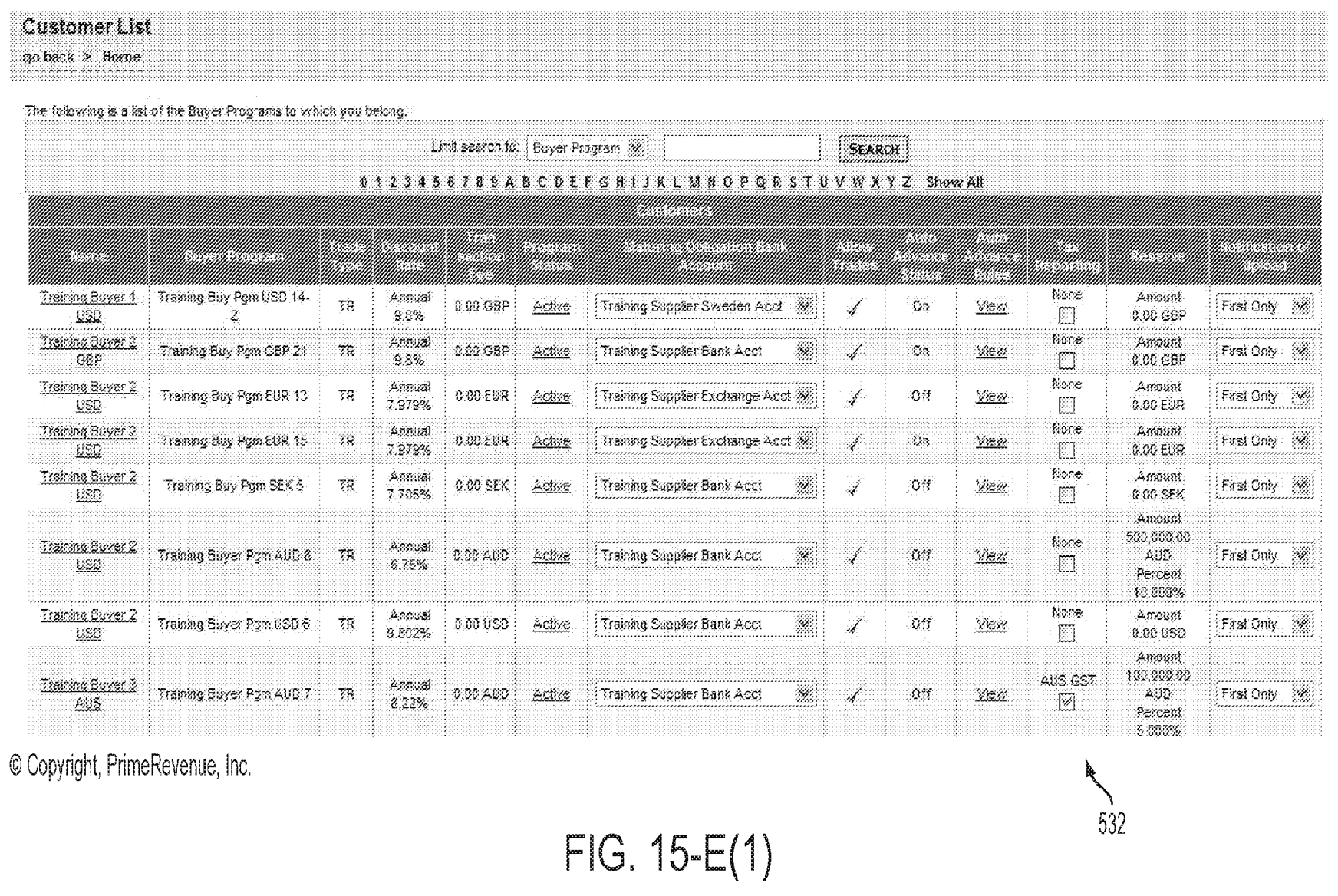

The following is a list of the Buyer Programs to which you belong.

Limit search to: Buyer Program [SEARCH]

0 1 2 3 4 5 6 7 8 9 A B C D E F G H I J K L M N O P Q R S T U V W X Y Z Show All Customers

| Name | Buyer Program | Trade Type | Discount Rate | Transaction Fee | Program Status | Maturing Obligation Bank Account | Allow Trades | Auto Advance Status | Auto Advance Rules | Tax Reporting | Reserve | Notification of Upload |
|---|---|---|---|---|---|---|---|---|---|---|---|---|
| Training Buyer 1 USD | Training Buy Pgm USD 14-2 | TR | Annual 9.8% | 0.00 GBP | Active | Training Supplier Sweden Acct | ✓ | On | View | None ☐ | Amount 0.00 GBP | First Only |
| Training Buyer 2 GBP | Training Buy Pgm GBP 21 | TR | Annual 9.8% | 0.00 GBP | Active | Training Supplier Bank Acct | ✓ | On | View | None ☐ | Amount 0.00 GBP | First Only |
| Training Buyer 2 USD | Training Buy Pgm EUR 13 | TR | Annual 7.979% | 0.00 EUR | Active | Training Supplier Exchange Acct | ✓ | Off | View | None ☐ | Amount 0.00 EUR | First Only |
| Training Buyer 3 USD | Training Buy Pgm EUR 15 | TR | Annual 7.979% | 0.00 EUR | Active | Training Supplier Exchange Acct | ✓ | On | View | None ☐ | Amount 0.00 EUR | First Only |
| Training Buyer 2 USD | Training Buy Pgm SEK 5 | TR | Annual 7.705% | 0.00 SEK | Active | Training Supplier Bank Acct | ✓ | Off | View | None ☐ | Amount 0.00 SEK | First Only |
| Training Buyer 2 USD | Training Buyer Pgm AUD 8 | TR | Annual 6.75% | 0.00 AUD | Active | Training Supplier Bank Acct | ✓ | Off | View | None ☐ | Amount 500,000.00 AUD Percent 10.000% | First Only |
| Training Buyer 2 USD | Training Buyer Pgm USD 6 | TR | Annual 9.802% | 0.00 USD | Active | Training Supplier Bank Acct | ✓ | Off | View | None ☐ | Amount 0.00 USD | First Only |
| Training Buyer 3 AUS | Training Buyer Pgm AUD 7 | TR | Annual 8.22% | 0.00 AUD | Active | Training Supplier Bank Acct | ✓ | Off | View | AUS GST ☑ | Amount 100,000.00 AUD Percent 5.000% | First Only |

© Copyright, PrimeRevenue, Inc.

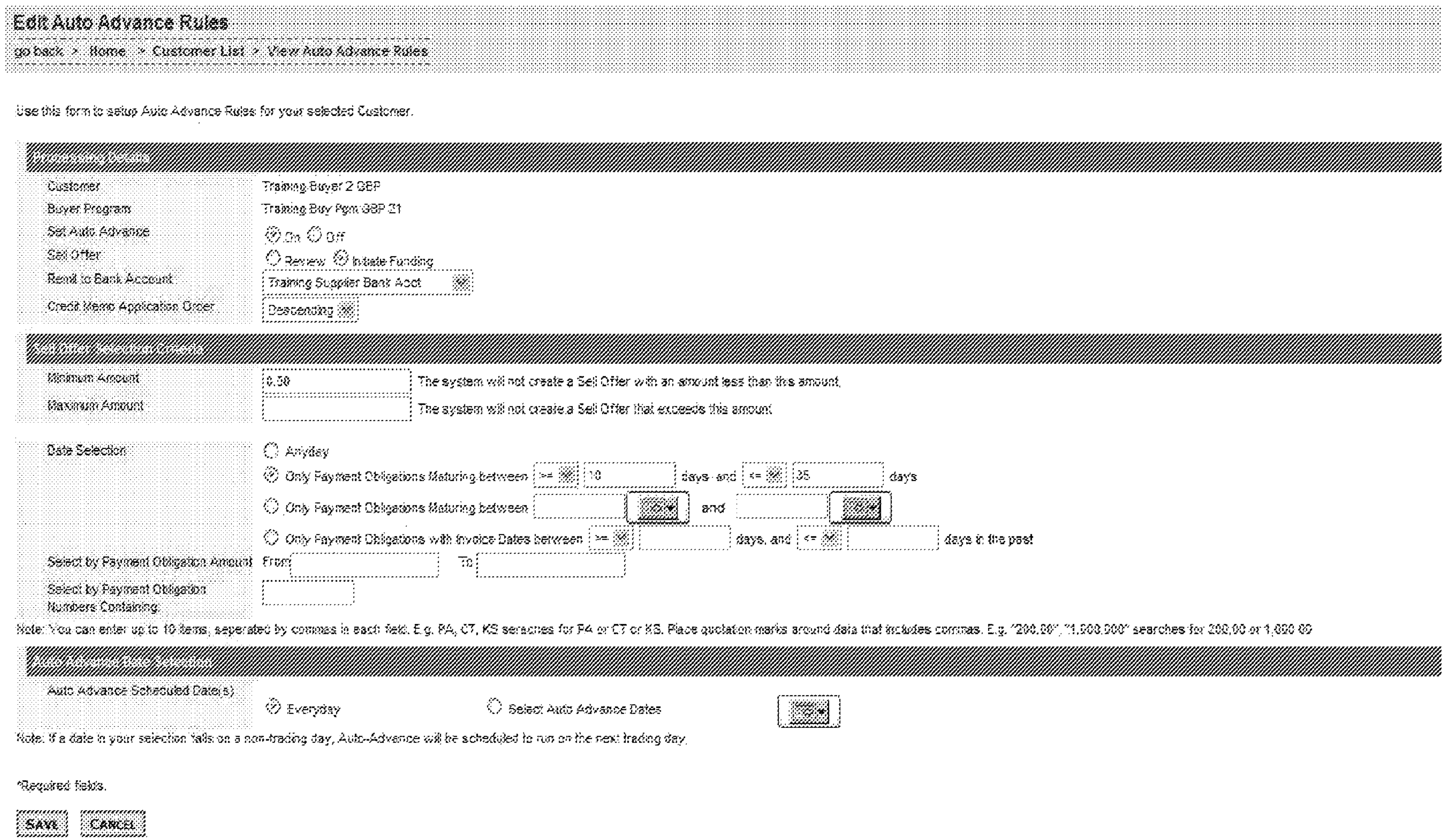
© Copyright, PrimeRevenue, Inc.
FIG. 15-E(2)

Funding - Estimate go back > Home

Figure 15:
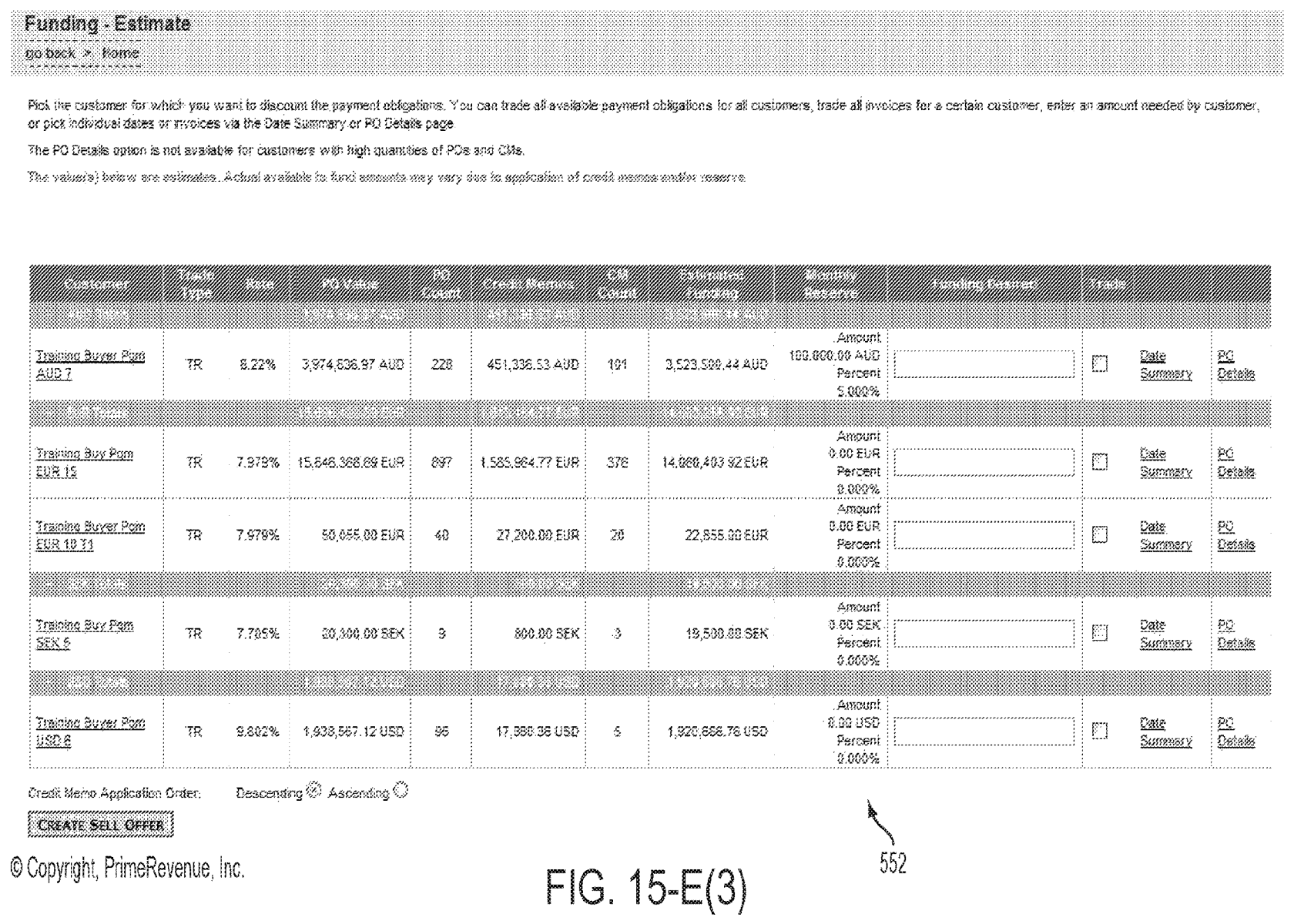

Pick the customer for which you want to discount the payment obligations. You can trade all available payment obligations for all customers, trade all invoices for a certain customer, enter an amount needed by customer, or pick individual dates or invoices via the Date Summary or PO Details page The PO Details option is not available for customers with high quantities of POs and CMs.

The value(s) below are estimates. Actual available to fund amounts may vary due to application of credit memos and/or reserve.

| Customer | Trade Type | Rate | PO Value | PO Count | Credit Memos | CM Count | Estimated Funding | Monthly Reserve | Funding Desired | Trade | | |
|---|---|---|---|---|---|---|---|---|---|---|---|---|
| [illegible] | | | [illegible] | | [illegible] | | [illegible] | | | | | |
| Training Buyer Pgm AUD 7 | TR | 8.22% | 3,974,836.97 AUD | 228 | 451,336.53 AUD | 101 | 3,523,500.44 AUD | Amount 100,000.00 AUD Percent 5.000% | | ☐ | Date Summary | PO Details |
| [illegible] | | | [illegible] | | [illegible] | | [illegible] | | | | | |
| Training Buy Pgm EUR 15 | TR | 7.979% | 15,646,368.69 EUR | 897 | 1,585,964.77 EUR | 376 | 14,060,403.92 EUR | Amount 0.00 EUR Percent 0.000% | | ☐ | Date Summary | PO Details |
| Training Buyer Pgm EUR 18 11 | TR | 7.979% | 50,055.00 EUR | 40 | 27,200.00 EUR | 20 | 22,855.00 EUR | Amount 0.00 EUR Percent 0.000% | | ☐ | Date Summary | PO Details |
| [illegible] | | | [illegible] | | [illegible] | | [illegible] | | | | | |
| Training Buy Pgm SEK 5 | TR | 7.705% | 20,300.00 SEK | 3 | 800.00 SEK | 3 | 19,500.00 SEK | Amount 0.00 SEK Percent 0.000% | | ☐ | Date Summary | PO Details |
| [illegible] | | | [illegible] | | [illegible] | | [illegible] | | | | | |
| Training Buyer Pgm USD 6 | TR | 9.802% | 1,938,567.12 USD | 96 | 17,388.36 USD | 5 | 1,920,658.76 USD | Amount 0.00 USD Percent 0.000% | | ☐ | Date Summary | PO Details |

Credit Memo Application Order: Descending ◉ Ascending ○

CREATE SELL OFFER

© Copyright, PrimeRevenue, Inc.

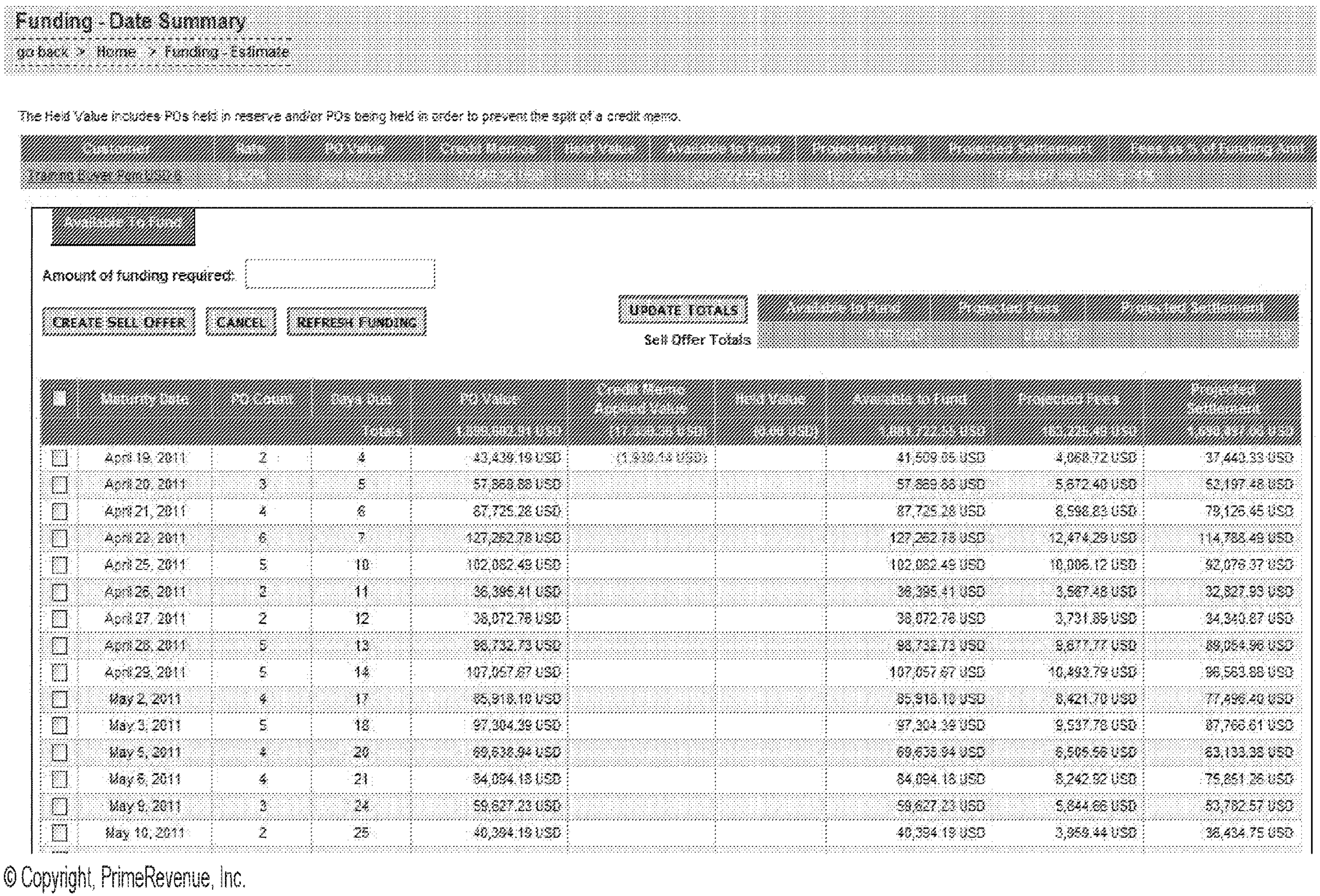
© Copyright, PrimeRevenue, Inc.
FIG. 15-E(3A)

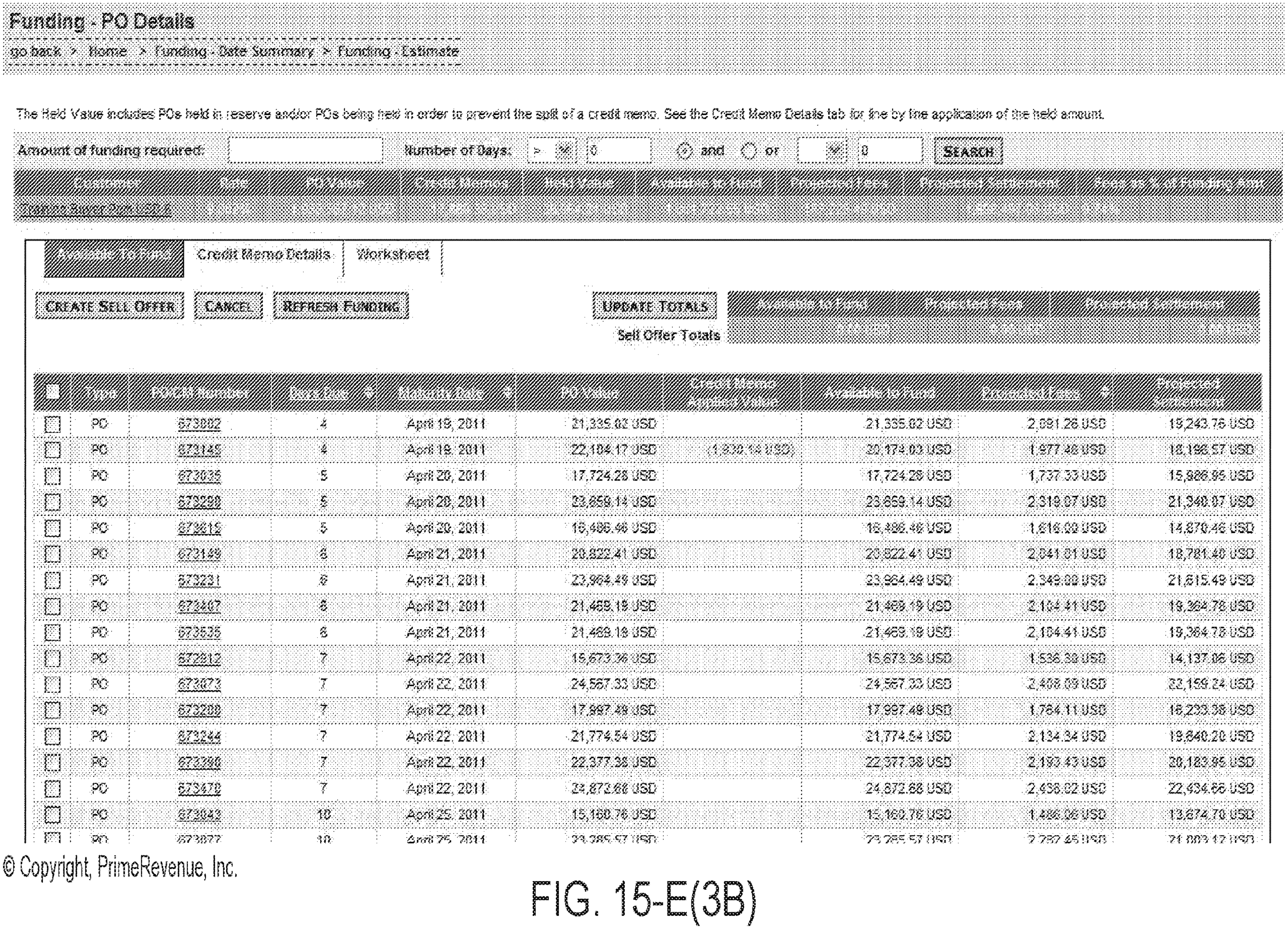
© Copyright, PrimeRevenue, Inc.
FIG. 15-E(3B)

553
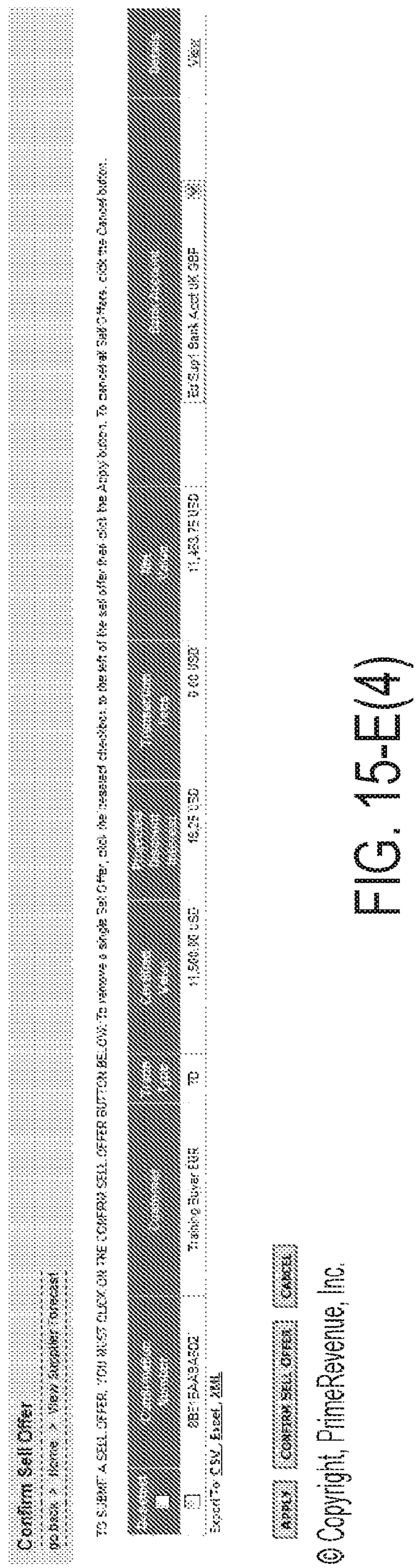
FIG. 15-E(4)

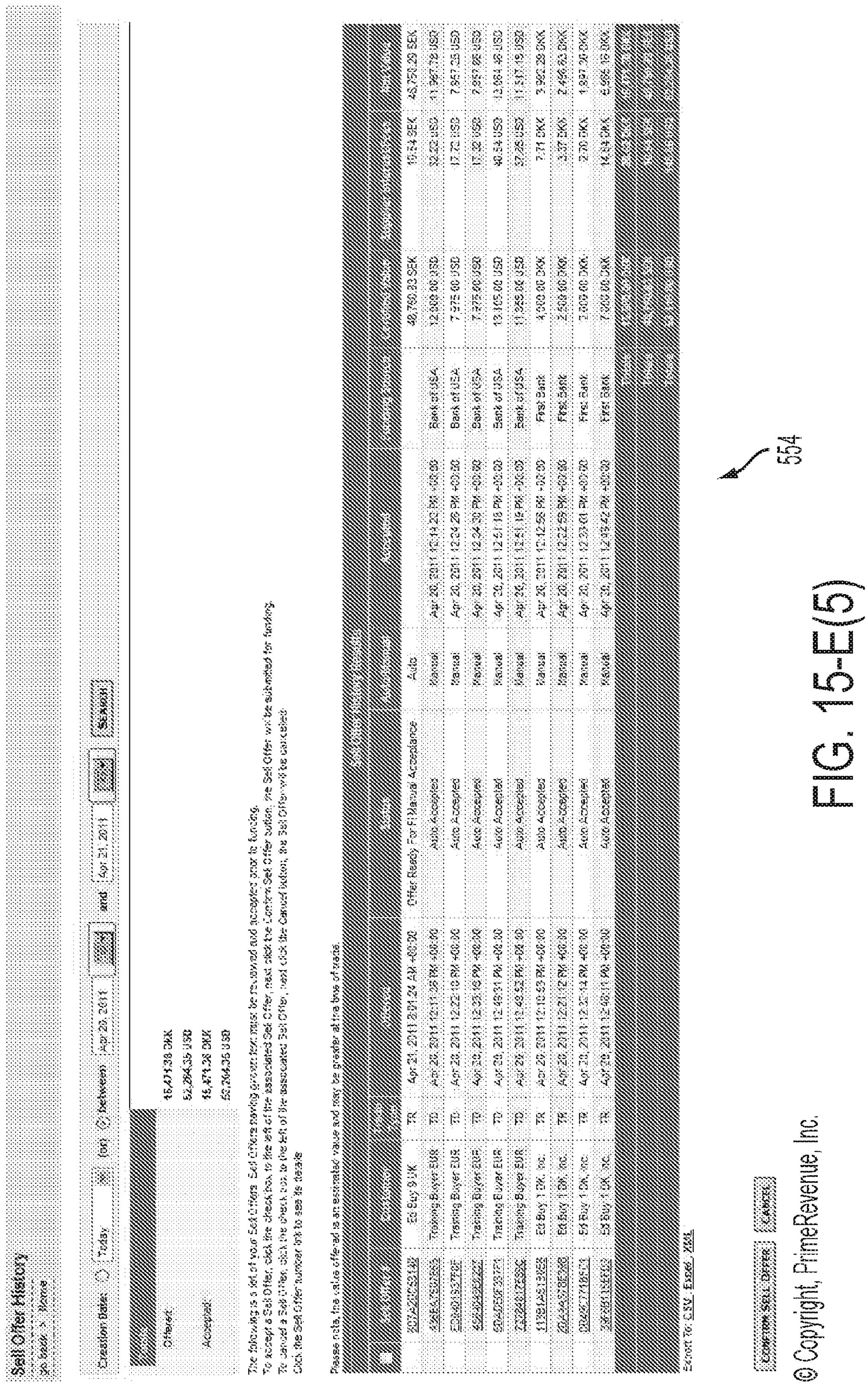
FIG. 15-E(5)
© Copyright, PrimeRevenue, Inc.

557
FIG. 15-E(6)
© Copyright, PrimeRevenue, Inc.

| For: | All Buyers | | Report Date: | Apr 21, 2011 |
|---|---|---|---|---|
| Transaction Date: | Apr 18, 2011 thru Apr 24, 2011 | Payment Obligation Report | Report Time: | 7:05:15 PM +00:00 |
| | | | Requested By: | Ed Sup1 UK |

| # | PO Type | PO Number | Customer | Supplier Reference | FI | Status | Due Date | Maturity Date | Transaction Date | Effective Date | Original Invoice Date | Original Value | Certified Value | Supplier Interest/Fees | Supplier Funds Received |
|---|---|---|---|---|---|---|---|---|---|---|---|---|---|---|---|
| 1 | TD | 1_53513_110427s1bp18 | Training Buyer EUR | Ed1US1 | Bank of USA | Auto Accepted | | Apr 27, 2011 | Apr 20, 2011 | Apr 21, 2011 | Apr 19, 2011 | USD 1,025.00 | USD 1,000.00 | USD 1.94 | USD 998.06 |
| 2 | TD | 1_53522_110427s1bp18 | Training Buyer EUR | Ed1US1 | Bank of USA | Auto Accepted | | Apr 27, 2011 | Apr 20, 2011 | Apr 21, 2011 | Apr 19, 2011 | USD 1,575.00 | USD 1,500.00 | USD 2.92 | USD 1,497.08 |
| 3 | TD | 1_53514_110427s1bp18 | Training Buyer EUR | Ed1US1 | Bank of USA | Auto Accepted | | Apr 27, 2011 | Apr 20, 2011 | Apr 21, 2011 | Apr 19, 2011 | USD 2,050.00 | USD 1,975.00 | USD 3.84 | USD 1,971.16 |
| 4 | TD | 1_53515_110427s1bp18 | Training Buyer EUR | Ed1US1 | Bank of USA | Auto Accepted | | Apr 27, 2011 | Apr 20, 2011 | Apr 21, 2011 | Apr 19, 2011 | USD 2,310.00 | USD 1,500.00 | USD 2.92 | USD 1,497.08 |
| 5 | TD | 2_53514_110428s1bp18 | Training Buyer EUR | Ed1US2 | Bank of USA | Auto Accepted | | Apr 28, 2011 | Apr 20, 2011 | Apr 21, 2011 | Apr 19, 2011 | USD 2,050.00 | USD 1,475.00 | USD 3.28 | USD 1,471.72 |
| 6 | TD | 2_53515_110428s1bp18 | Training Buyer EUR | Ed1US2 | Bank of USA | Auto Accepted | | Apr 28, 2011 | Apr 20, 2011 | Apr 21, 2011 | Apr 19, 2011 | USD 2,310.00 | USD 1,500.00 | USD 3.33 | USD 1,496.67 |
| 7 | TD | 2_53520_110428s1bp18 | Training Buyer EUR | Ed1US2 | Bank of USA | Auto Accepted | | Apr 28, 2011 | Apr 20, 2011 | Apr 21, 2011 | Apr 19, 2011 | USD 2,510.00 | USD 2,500.00 | USD 5.56 | USD 2,494.44 |
| 8 | TD | 2_53516_110428s1bp18 | Training Buyer EUR | Ed1US2 | Bank of USA | Auto Accepted | | Apr 28, 2011 | Apr 20, 2011 | Apr 21, 2011 | Apr 19, 2011 | USD 3,500.00 | USD 0.00 | USD 0.00 | USD 0.00 |
| 9 | TD | 1_53508_110427s1bp18 | Training Buyer EUR | Ed1US1 | Bank of USA | Auto Accepted | | Apr 28, 2011 | Apr 20, 2011 | Apr 21, 2011 | Apr 19, 2011 | USD 6,500.00 | USD 4,000.00 | USD 8.89 | USD 3,991.11 |
| 10 | TD | 3_53513_110429s1bp18 | Training Buyer EUR | Ed1US3 | Bank of USA | Auto Accepted | | Apr 29, 2011 | Apr 20, 2011 | Apr 21, 2011 | Apr 19, 2011 | USD 1,025.00 | USD 1,000.00 | USD 2.50 | USD 997.50 |
| 11 | TD | 1_53538_110427s1bp18 | Training Buyer EUR | Ed1US1 | Bank of USA | Auto Accepted | | Apr 29, 2011 | Apr 20, 2011 | Apr 21, 2011 | Apr 19, 2011 | USD 1,100.00 | USD 0.00 | USD 0.00 | USD 0.00 |
| 12 | TD | 1_53539_110427s1bp18 | Training Buyer EUR | Ed1US1 | Bank of USA | Auto Accepted | | Apr 29, 2011 | Apr 20, 2011 | Apr 21, 2011 | Apr 19, 2011 | USD 2,200.00 | USD 0.00 | USD 0.00 | USD 0.00 |

Page 1 of 3

© Copyright, PrimeRevenue, Inc.

Figure 15:
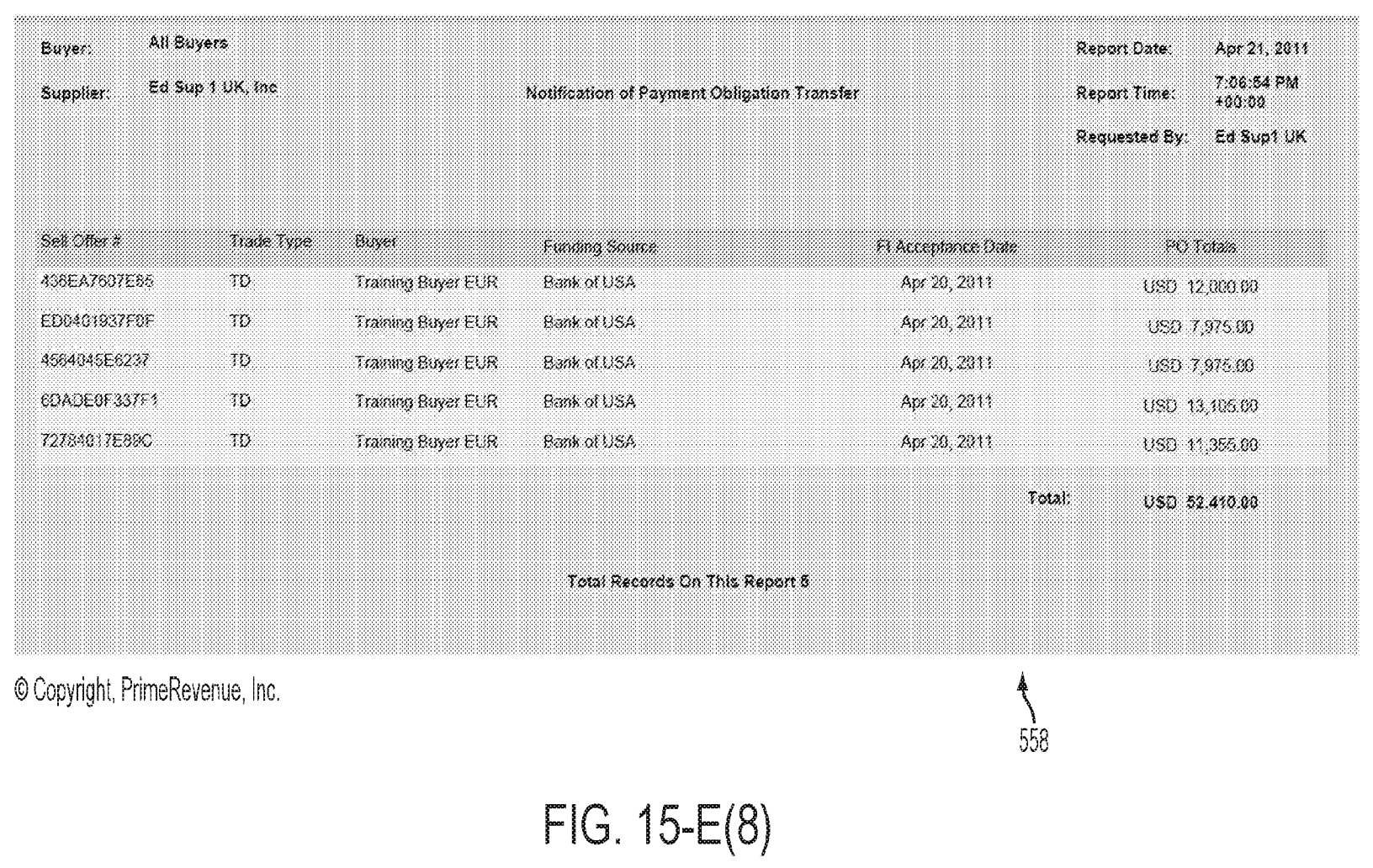

Buyer: All Buyers
Supplier: Ed Sup 1 UK, Inc

Notification of Payment Obligation Transfer

Report Date: Apr 21, 2011
Report Time: 7:06:54 PM +00:00
Requested By: Ed Sup1 UK

| Sell Offer # | Trade Type | Buyer | Funding Source | FI Acceptance Date | PO Totals |
|---|---|---|---|---|---|
| 436EA7607E85 | TD | Training Buyer EUR | Bank of USA | Apr 20, 2011 | USD 12,000.00 |
| ED0401937F0F | TD | Training Buyer EUR | Bank of USA | Apr 20, 2011 | USD 7,975.00 |
| 4564045E6237 | TD | Training Buyer EUR | Bank of USA | Apr 20, 2011 | USD 7,975.00 |
| 6DADE0F337F1 | TD | Training Buyer EUR | Bank of USA | Apr 20, 2011 | USD 13,105.00 |
| 72784017E88C | TD | Training Buyer EUR | Bank of USA | Apr 20, 2011 | USD 11,355.00 |
| | | | | Total: | USD 52,410.00 |

Total Records On This Report 5

© Copyright, PrimeRevenue, Inc.

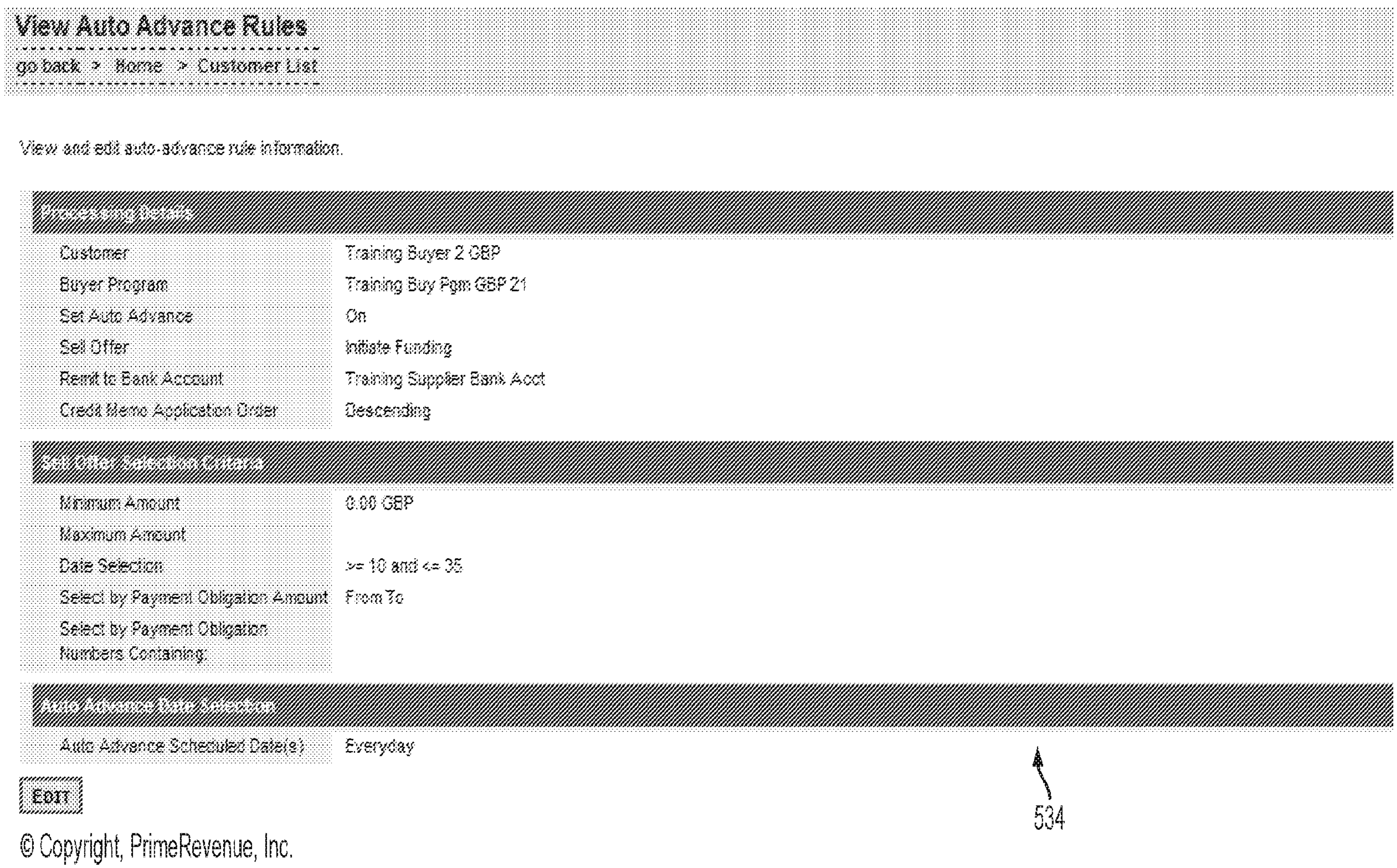
FIG. 15-F

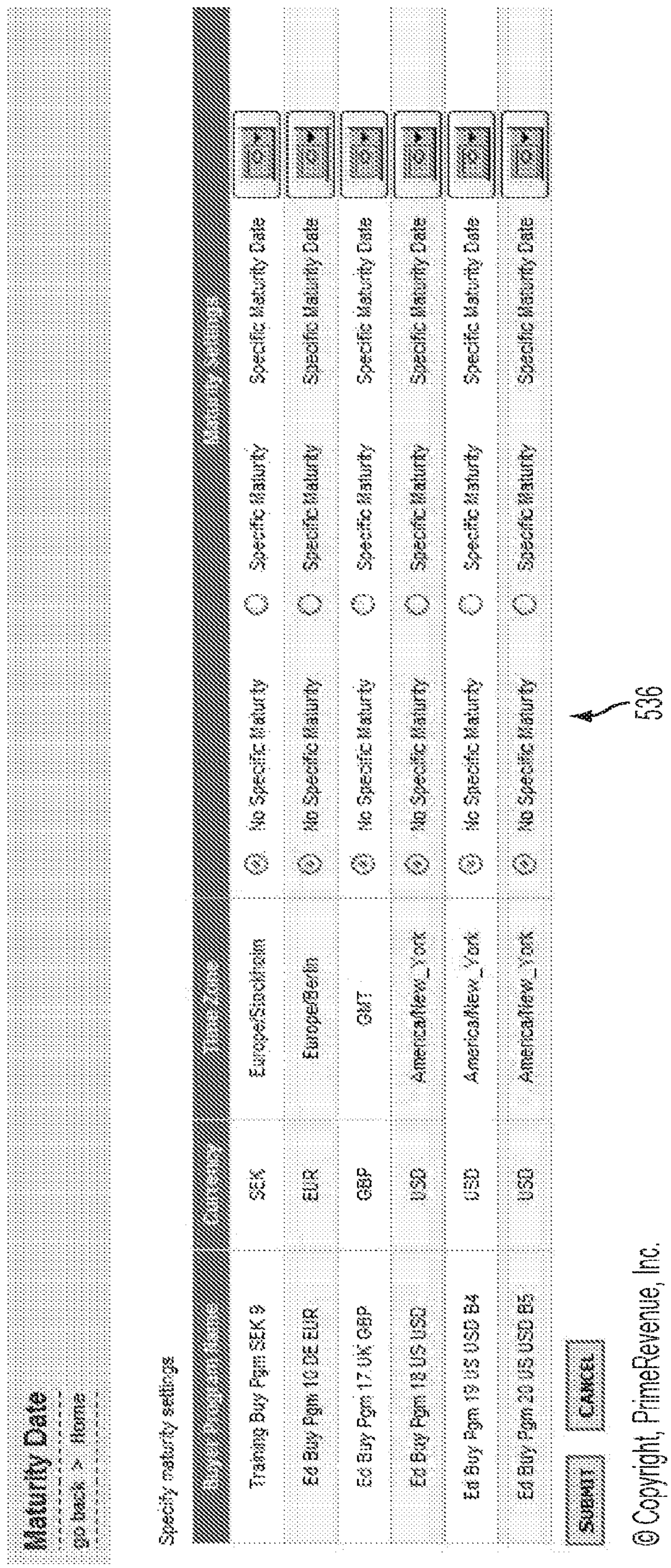
FIG. 15-G

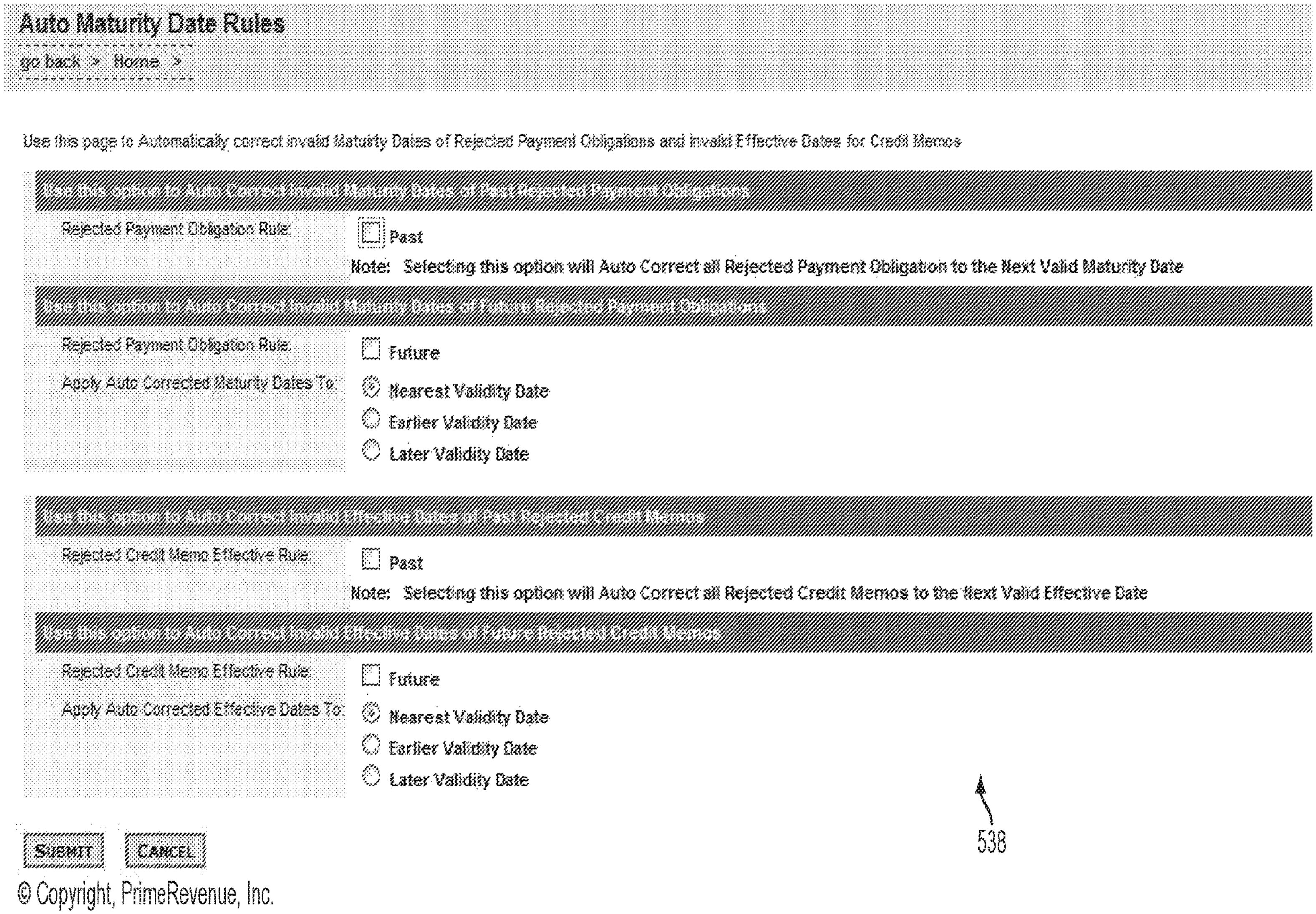
FIG. 15-H

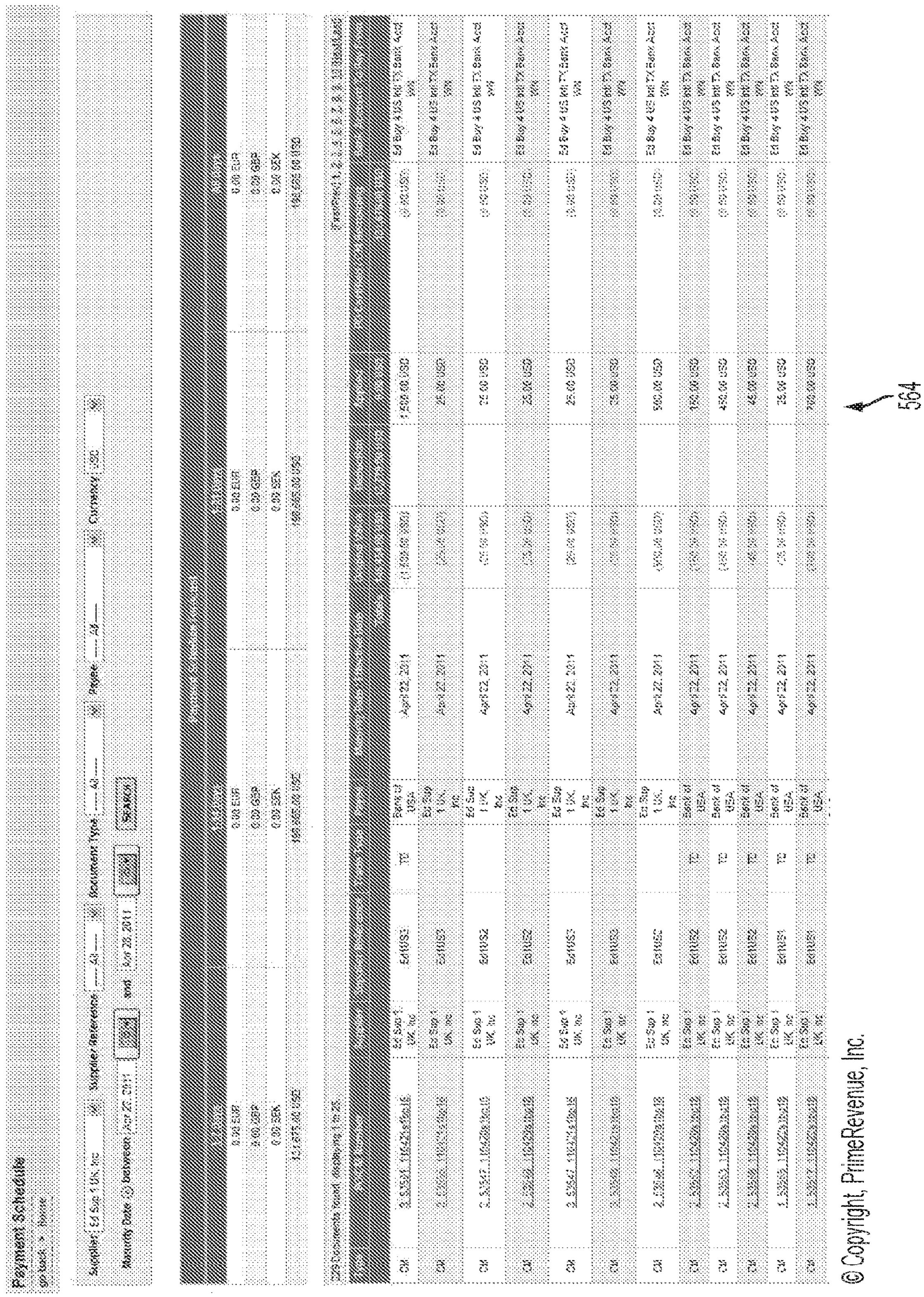
FIG. 15-I(1)

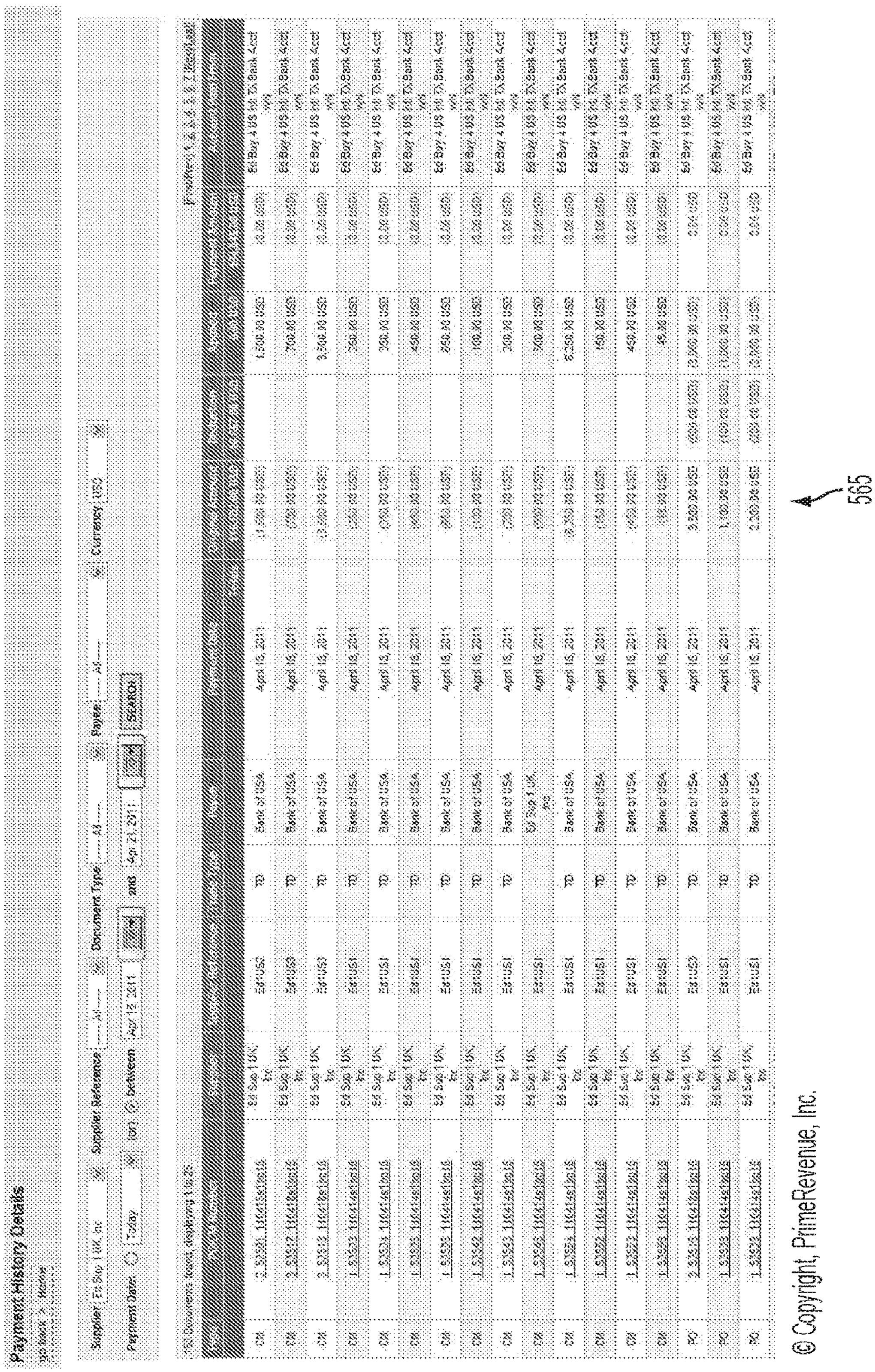
FIG. 15-I(2)

566
FIG. 15-J
© Copyright, PrimeRevenue, Inc.

| | | | | | | | | |
|---|---|---|---|---|---|---|---|---|
| | CM | 1231338_s1bs14 | 8 | May 8, 2007 | [illegible] | | | 0.00 GBP |
| | CM | 1231343_s1bs14 | 8 | May 8, 2007 | (5,715.10 GBP) | | | 0.00 GBP |
| | | | | May 8, 2007 | [illegible] | | | |
| | | | | [illegible] | ( 8,367.25 GBP ) | | | |
| | CM | 1231351_s1bs14 | 7 | May 9, 2007 | (3,202.40 GBP) | | | 0.00 GBP |
| ☐ | PO | 1231252_s1bs14 | 7 | May 9, 2007 | 43,414.18 GBP | | | 43,414.18 GBP |
| ☐ | PO | 1231278_s1bs14 | 7 | May 9, 2007 | 33,440.86 GBP | | | 33,440.86 GBP |
| ☐ | PO | 1231301_s1bs14 | 7 | May 9, 2007 | 41,597.81 GBP | | | 41,597.81 GBP |
| ☐ | PO | 1231302_s1bs14 | 7 | May 9, 2007 | 29,583.80 GBP | (11,589.65 GBP) | | 18,094.15 GBP |
| | | | | May 9, 2007 | 144,914.35 GBP | [illegible] | | 136,547.00 GBP |

© Copyright, PrimeRevenue, Inc.

© Copyright, PrimeRevenue, Inc.

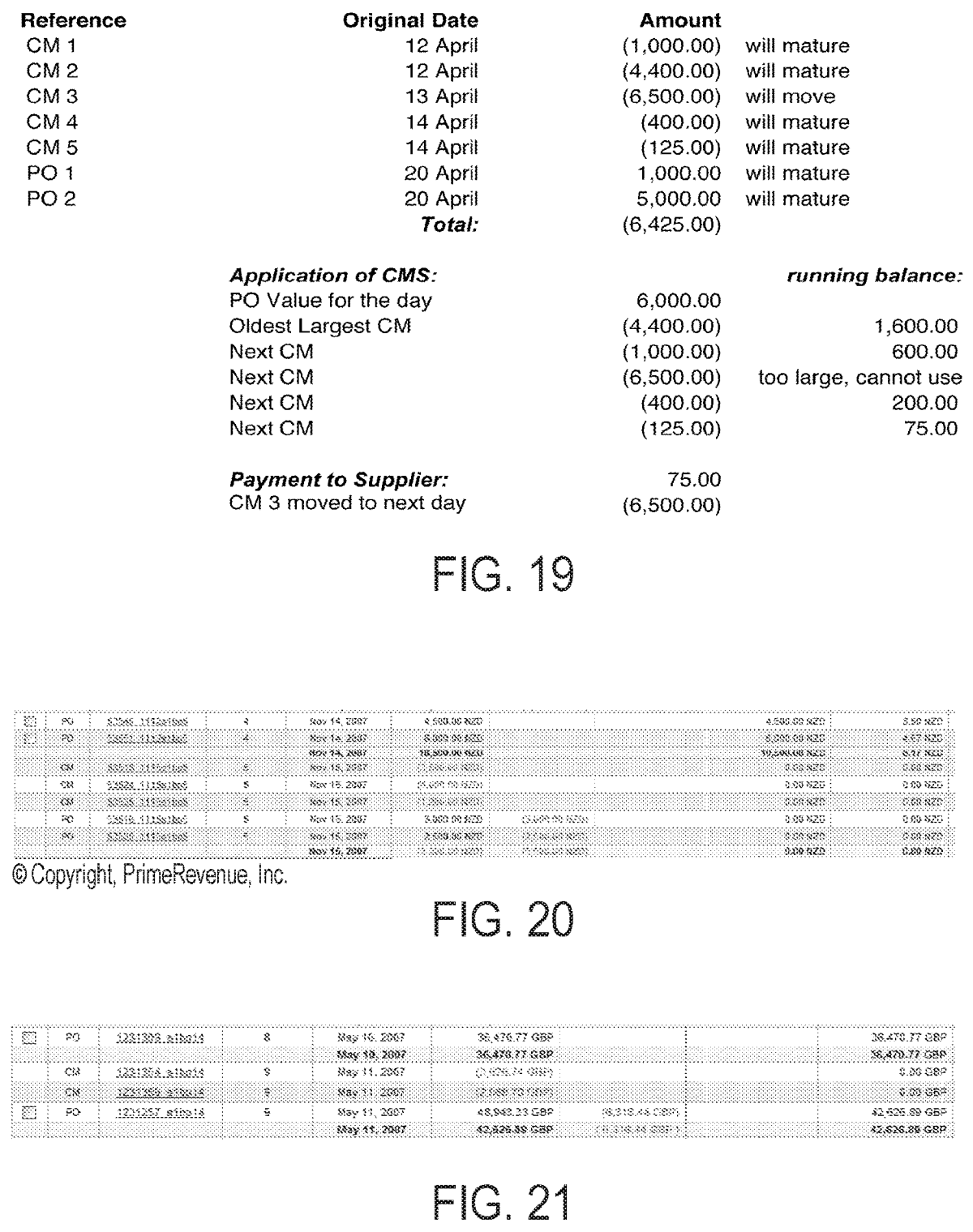

| Reference | Original Date | Amount | |
|---|---|---|---|
| CM 1 | 12 April | (1,000.00) | will mature |
| CM 2 | 12 April | (4,400.00) | will mature |
| CM 3 | 13 April | (6,500.00) | will move |
| CM 4 | 14 April | (400.00) | will mature |
| CM 5 | 14 April | (125.00) | will mature |
| PO 1 | 20 April | 1,000.00 | will mature |
| PO 2 | 20 April | 5,000.00 | will mature |
| | ***Total:*** | (6,425.00) | |

| ***Application of CMS:*** | | ***running balance:*** |
|---|---|---|
| PO Value for the day | 6,000.00 | |
| Oldest Largest CM | (4,400.00) | 1,600.00 |
| Next CM | (1,000.00) | 600.00 |
| Next CM | (6,500.00) | too large, cannot use |
| Next CM | (400.00) | 200.00 |
| Next CM | (125.00) | 75.00 |

| ***Payment to Supplier:*** | 75.00 |
|---|---|
| CM 3 moved to next day | (6,500.00) |

FIG. 19

| | | | | | | | | | |
|---|---|---|---|---|---|---|---|---|---|
| ☐ | PO | [illegible] | 4 | Nov 14, 2007 | 4,500.00 NZD | | | 4,500.00 NZD | 3.50 NZD |
| ☐ | PO | [illegible] | 4 | Nov 14, 2007 | 6,000.00 NZD | | | 6,000.00 NZD | 4.67 NZD |
| | | | | Nov 14, 2007 | 10,500.00 NZD | | | 10,500.00 NZD | 8.17 NZD |
| | CM | [illegible] | 5 | Nov 15, 2007 | [illegible] | | | 0.00 NZD | 0.00 NZD |
| | CM | [illegible] | 5 | Nov 15, 2007 | (5,600.00 NZD) | | | 0.00 NZD | 0.00 NZD |
| | CM | [illegible] | 5 | Nov 15, 2007 | [illegible] | | | 0.00 NZD | 0.00 NZD |
| | PO | [illegible] | 5 | Nov 15, 2007 | 3,000.00 NZD | (3,000.00 NZD) | | 0.00 NZD | 0.00 NZD |
| | PO | [illegible] | 5 | Nov 15, 2007 | 2,500.00 NZD | [illegible] | | 0.00 NZD | 0.00 NZD |
| | | | | Nov 15, 2007 | [illegible] | [illegible] | | 0.00 NZD | 0.00 NZD |

© Copyright, PrimeRevenue, Inc.

FIG. 20

| | | | | | | | | |
|---|---|---|---|---|---|---|---|---|
| ☐ | PO | 1231303_a1bo14 | 8 | May 10, 2007 | 36,470.77 GBP | | | 36,470.77 GBP |
| | | | | May 10, 2007 | 36,470.77 GBP | | | 36,470.77 GBP |
| | CM | 1231354_a1bo14 | 9 | May 11, 2007 | [illegible] | | | 0.00 GBP |
| | CM | 1231359_a1bo14 | 9 | May 11, 2007 | [illegible] | | | 0.00 GBP |
| ☐ | PO | 1231257_a1bo14 | 9 | May 11, 2007 | 48,943.23 GBP | (6,318.44 GBP) | | 42,625.89 GBP |
| | | | | May 11, 2007 | 42,625.89 GBP | [illegible] | | 42,626.89 GBP |

FIG. 21

© Copyright, PrimeRevenue, Inc.

© Copyright, PrimeRevenue, Inc.

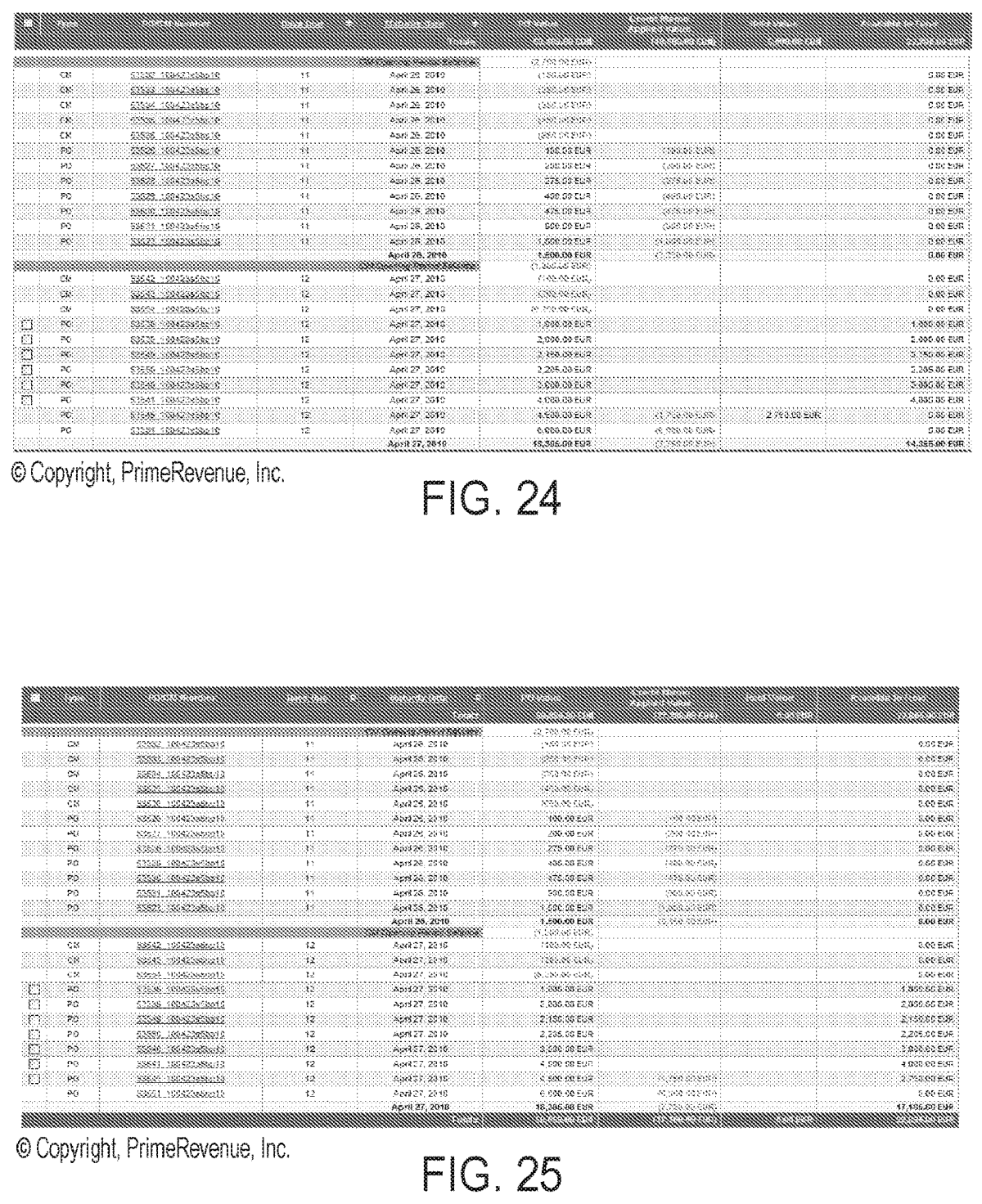

| | | | | | | | | |
|---|---|---|---|---|---|---|---|---|
| | | | | [illegible] | (2,700.00 EUR) | | | |
| | CN | 53532_100423a5bc10 | 11 | April 26, 2010 | (150.00 EUR) | | | 0.00 EUR |
| | CN | 53533_100423a5bc10 | 11 | April 26, 2010 | [illegible] | | | 0.00 EUR |
| | CN | 53534_100423a5bc10 | 11 | April 26, 2010 | (350.00 EUR) | | | 0.00 EUR |
| | CN | 53535_100423a5bc10 | 11 | April 26, 2010 | [illegible] | | | 0.00 EUR |
| | CN | 53536_100423a5bc10 | 11 | April 26, 2010 | (850.00 EUR) | | | 0.00 EUR |
| | PO | 53526_100423a5bc10 | 11 | April 26, 2010 | 100.00 EUR | (100.00 EUR) | | 0.00 EUR |
| | PO | 53527_100423a5bc10 | 11 | April 26, 2010 | 200.00 EUR | (200.00 EUR) | | 0.00 EUR |
| | PO | 53528_100423a5bc10 | 11 | April 26, 2010 | 275.00 EUR | (275.00 EUR) | | 0.00 EUR |
| | PO | 53529_100423a5bc10 | 11 | April 26, 2010 | 400.00 EUR | (400.00 EUR) | | 0.00 EUR |
| | PO | 53530_100423a5bc10 | 11 | April 26, 2010 | 475.00 EUR | (475.00 EUR) | | 0.00 EUR |
| | PO | 53531_100423a5bc10 | 11 | April 26, 2010 | 900.00 EUR | (900.00 EUR) | | 0.00 EUR |
| | PO | 53532_100423a5bc10 | 11 | April 26, 2010 | 1,600.00 EUR | [illegible] | | 0.00 EUR |
| | | | | April 26, 2010 | 1,500.00 EUR | [illegible] | | 0.00 EUR |
| | | | | [illegible] | [illegible] | | | |
| | CN | 53542_100423a5bc10 | 12 | April 27, 2010 | (100.00 EUR) | | | 0.00 EUR |
| | CN | 53543_100423a5bc10 | 12 | April 27, 2010 | [illegible] | | | 0.00 EUR |
| | CN | 53550_100423a5bc10 | 12 | April 27, 2010 | [illegible] | | | 0.00 EUR |
| ☐ | PO | 53535_100423a5bc10 | 12 | April 27, 2010 | 1,000.00 EUR | | | 1,000.00 EUR |
| ☐ | PO | 53538_100423a5bc10 | 12 | April 27, 2010 | 2,000.00 EUR | | | 2,000.00 EUR |
| ☐ | PO | 53539_100423a5bc10 | 12 | April 27, 2010 | 2,150.00 EUR | | | 2,150.00 EUR |
| ☐ | PO | 53556_100423a5bc10 | 12 | April 27, 2010 | 2,205.00 EUR | | | 2,205.00 EUR |
| ☐ | PO | 53540_100423a5bc10 | 12 | April 27, 2010 | 3,000.00 EUR | | | 3,000.00 EUR |
| ☐ | PO | 53541_100423a5bc10 | 12 | April 27, 2010 | 4,000.00 EUR | | | 4,000.00 EUR |
| | PO | 53545_100423a5bc10 | 12 | April 27, 2010 | 4,500.00 EUR | (1,750.00 EUR) | 2,750.00 EUR | 0.00 EUR |
| | PO | 53551_100423a5bc10 | 12 | April 27, 2010 | 6,000.00 EUR | (6,000.00 EUR) | | 0.00 EUR |
| | | | | April 27, 2010 | 18,305.00 EUR | [illegible] | | 14,355.00 EUR |

© Copyright, PrimeRevenue, Inc.

FIG. 24

| | | | | | | | | |
|---|---|---|---|---|---|---|---|---|
| | | | | [illegible] | (2,700.00 EUR) | | | |
| | CN | 53532_100423a5bc10 | 11 | April 26, 2010 | [illegible] | | | 0.00 EUR |
| | CN | 53533_100423a5bc10 | 11 | April 26, 2010 | [illegible] | | | 0.00 EUR |
| | CN | 53534_100423a5bc10 | 11 | April 26, 2010 | (750.00 EUR) | | | 0.00 EUR |
| | CN | 53535_100423a5bc10 | 11 | April 26, 2010 | [illegible] | | | 0.00 EUR |
| | CN | 53536_100423a5bc10 | 11 | April 26, 2010 | [illegible] | | | 0.00 EUR |
| | PO | 53526_100423a5bc10 | 11 | April 26, 2010 | 100.00 EUR | [illegible] | | 0.00 EUR |
| | PO | 53527_100423a5bc10 | 11 | April 26, 2010 | 200.00 EUR | (200.00 EUR) | | 0.00 EUR |
| | PO | 53528_100423a5bc10 | 11 | April 26, 2010 | 275.00 EUR | (275.00 EUR) | | 0.00 EUR |
| | PO | 53529_100423a5bc10 | 11 | April 26, 2010 | 400.00 EUR | (400.00 EUR) | | 0.00 EUR |
| | PO | 53530_100423a5bc10 | 11 | April 26, 2010 | 475.00 EUR | (475.00 EUR) | | 0.00 EUR |
| | PO | 53531_100423a5bc10 | 11 | April 26, 2010 | 500.00 EUR | (500.00 EUR) | | 0.00 EUR |
| | PO | 53532_100423a5bc10 | 11 | April 26, 2010 | 1,500.00 EUR | [illegible] | | 0.00 EUR |
| | | | | April 26, 2010 | 1,500.00 EUR | [illegible] | | 0.00 EUR |
| | | | | [illegible] | [illegible] | | | |
| | CN | 53542_100423a5bc10 | 12 | April 27, 2010 | (100.00 EUR) | | | 0.00 EUR |
| | CN | 53543_100423a5bc10 | 12 | April 27, 2010 | [illegible] | | | 0.00 EUR |
| | CN | 53554_100423a5bc10 | 12 | April 27, 2010 | [illegible] | | | 0.00 EUR |
| ☐ | PO | 53536_100423a5bc10 | 12 | April 27, 2010 | 1,000.00 EUR | | | 1,000.00 EUR |
| ☐ | PO | 53538_100423a5bc10 | 12 | April 27, 2010 | 2,000.00 EUR | | | 2,000.00 EUR |
| ☐ | PO | 53539_100423a5bc10 | 12 | April 27, 2010 | 2,150.00 EUR | | | 2,150.00 EUR |
| ☐ | PO | 53550_100423a5bc10 | 12 | April 27, 2010 | 2,205.00 EUR | | | 2,205.00 EUR |
| ☐ | PO | 53540_100423a5bc10 | 12 | April 27, 2010 | 3,000.00 EUR | | | 3,000.00 EUR |
| ☐ | PO | 53541_100423a5bc10 | 12 | April 27, 2010 | 4,000.00 EUR | | | 4,000.00 EUR |
| ☐ | PO | 53545_100423a5bc10 | 12 | April 27, 2010 | 4,500.00 EUR | [illegible] | | 2,750.00 EUR |
| | PO | 53551_100423a5bc10 | 12 | April 27, 2010 | 6,000.00 EUR | [illegible] | | 0.00 EUR |
| | | | | April 27, 2010 | 18,305.00 EUR | [illegible] | | 17,105.00 EUR |

© Copyright, PrimeRevenue, Inc.

FIG. 25

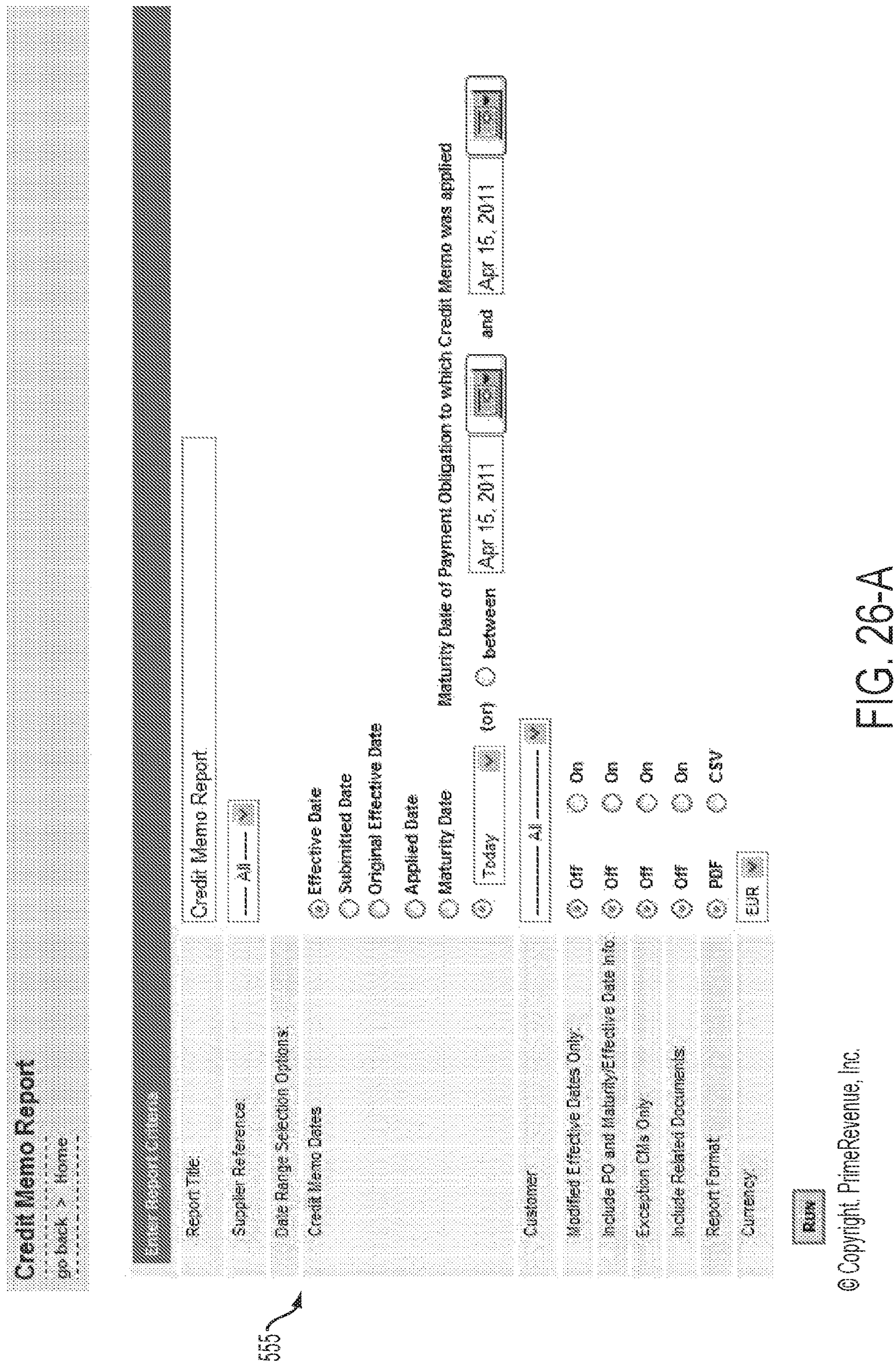
FIG. 26-A

555

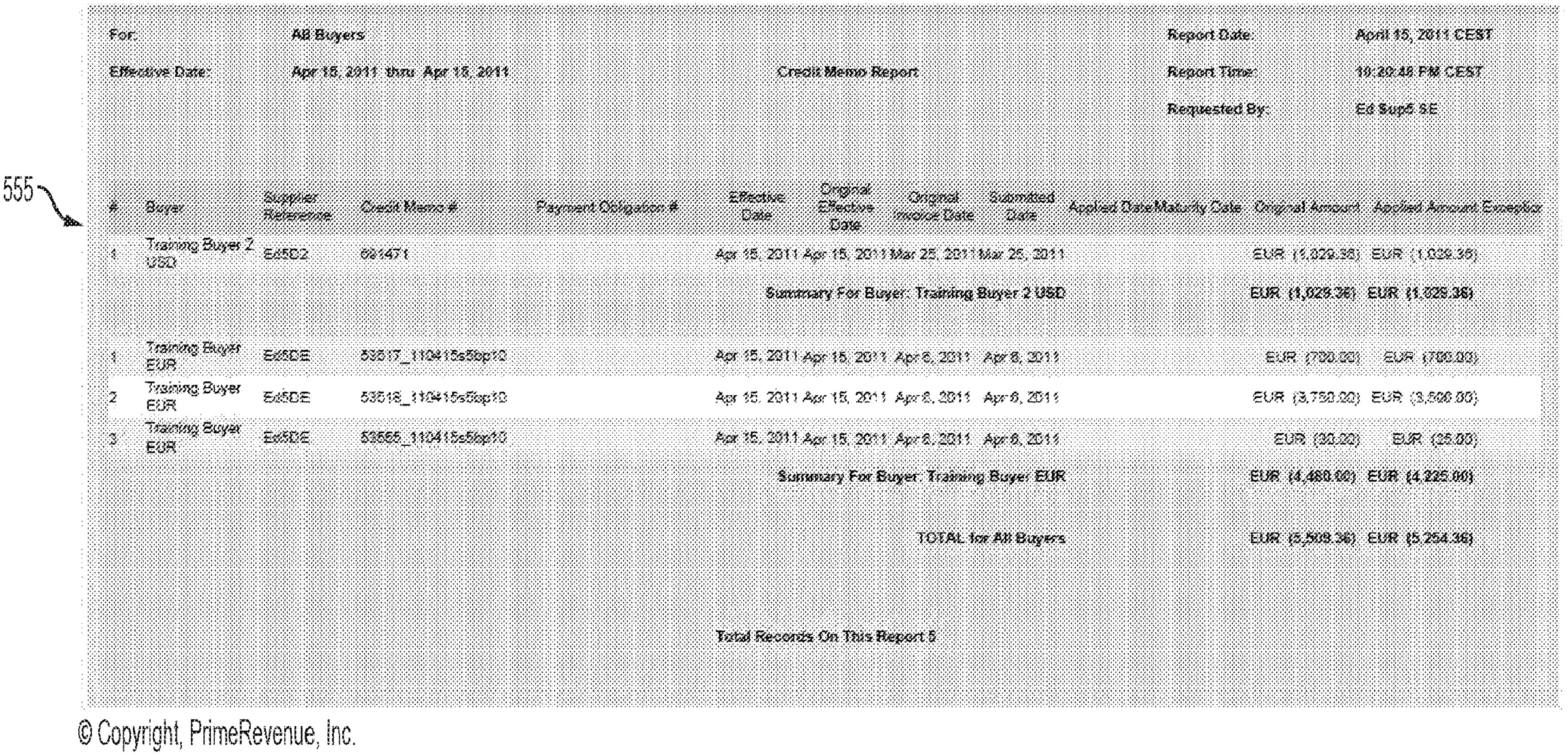

For: All Buyers

Effective Date: Apr 15, 2011 thru Apr 15, 2011

Credit Memo Report

Report Date: April 15, 2011 CEST

Report Time: 10:20:48 PM CEST

Requested By: Ed Sup5 SE

| # | Buyer | Supplier Reference | Credit Memo # | Payment Obligation # | Effective Date | Original Effective Date | Original Invoice Date | Submitted Date | Applied Date | Maturity Date | Original Amount | Applied Amount | Exception |
|---|---|---|---|---|---|---|---|---|---|---|---|---|---|
| 1 | Training Buyer 2 USD | Ed5D2 | 691471 | | Apr 15, 2011 | Apr 15, 2011 | Mar 25, 2011 | Mar 25, 2011 | | | EUR (1,029.36) | EUR (1,029.36) | |
| | | | | | Summary For Buyer: Training Buyer 2 USD | | | | | | EUR (1,029.36) | EUR (1,029.36) | |
| 1 | Training Buyer EUR | Ed5DE | 53517_110415s5bp10 | | Apr 15, 2011 | Apr 15, 2011 | Apr 6, 2011 | Apr 6, 2011 | | | EUR (700.00) | EUR (700.00) | |
| 2 | Training Buyer EUR | Ed5DE | 53518_110415s5bp10 | | Apr 15, 2011 | Apr 15, 2011 | Apr 6, 2011 | Apr 6, 2011 | | | EUR (3,750.00) | EUR (3,500.00) | |
| 3 | Training Buyer EUR | Ed5DE | 53555_110415s5bp10 | | Apr 15, 2011 | Apr 15, 2011 | Apr 6, 2011 | Apr 6, 2011 | | | EUR (30.00) | EUR (25.00) | |
| | | | | | Summary For Buyer: Training Buyer EUR | | | | | | EUR (4,480.00) | EUR (4,225.00) | |
| | | | | | TOTAL for All Buyers | | | | | | EUR (5,509.36) | EUR (5,254.36) | |

Total Records On This Report 5

© Copyright, PrimeRevenue, Inc.

FIG. 26-B

© Copyright, PrimeRevenue, Inc.

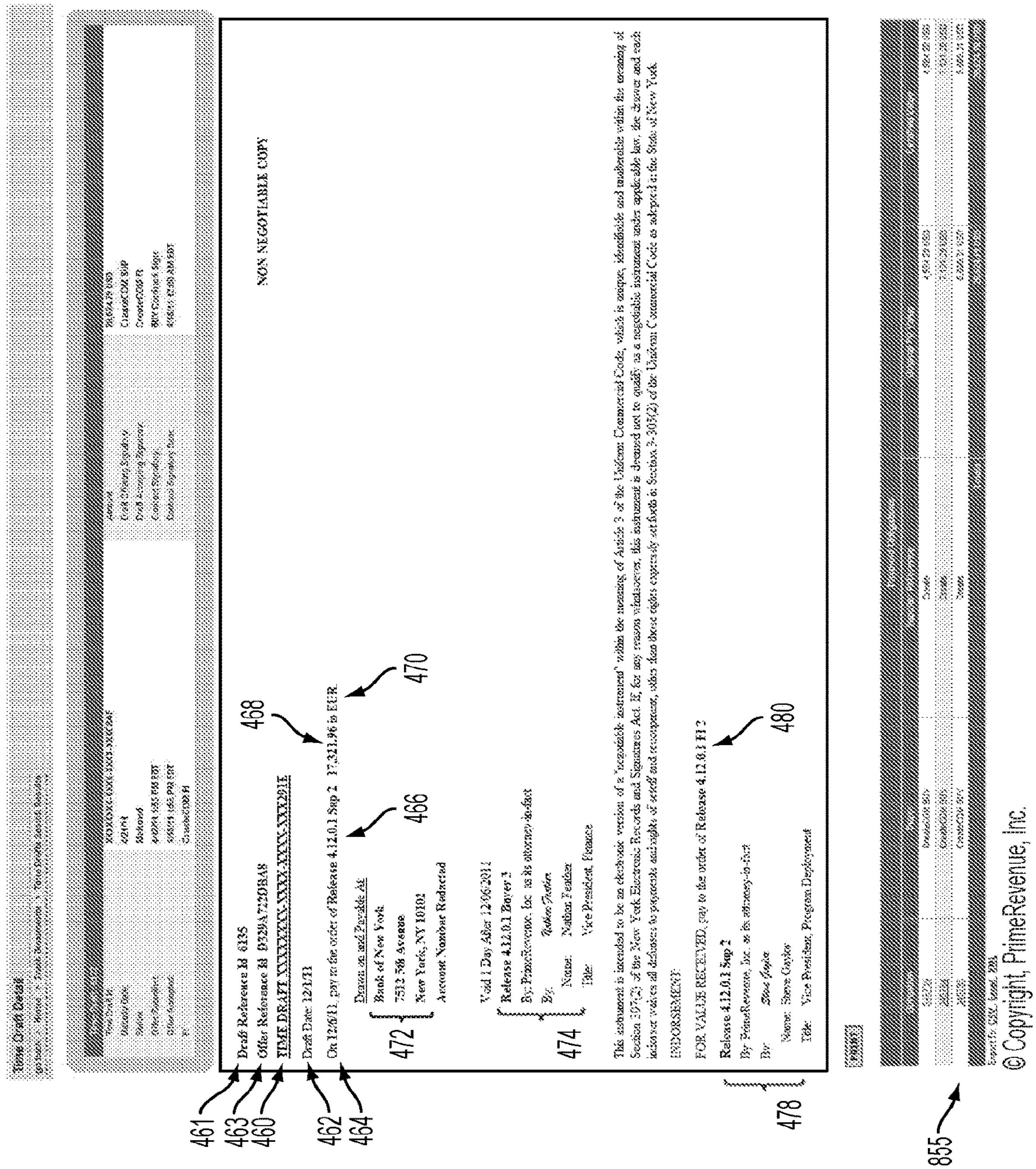
FIG. 28-A

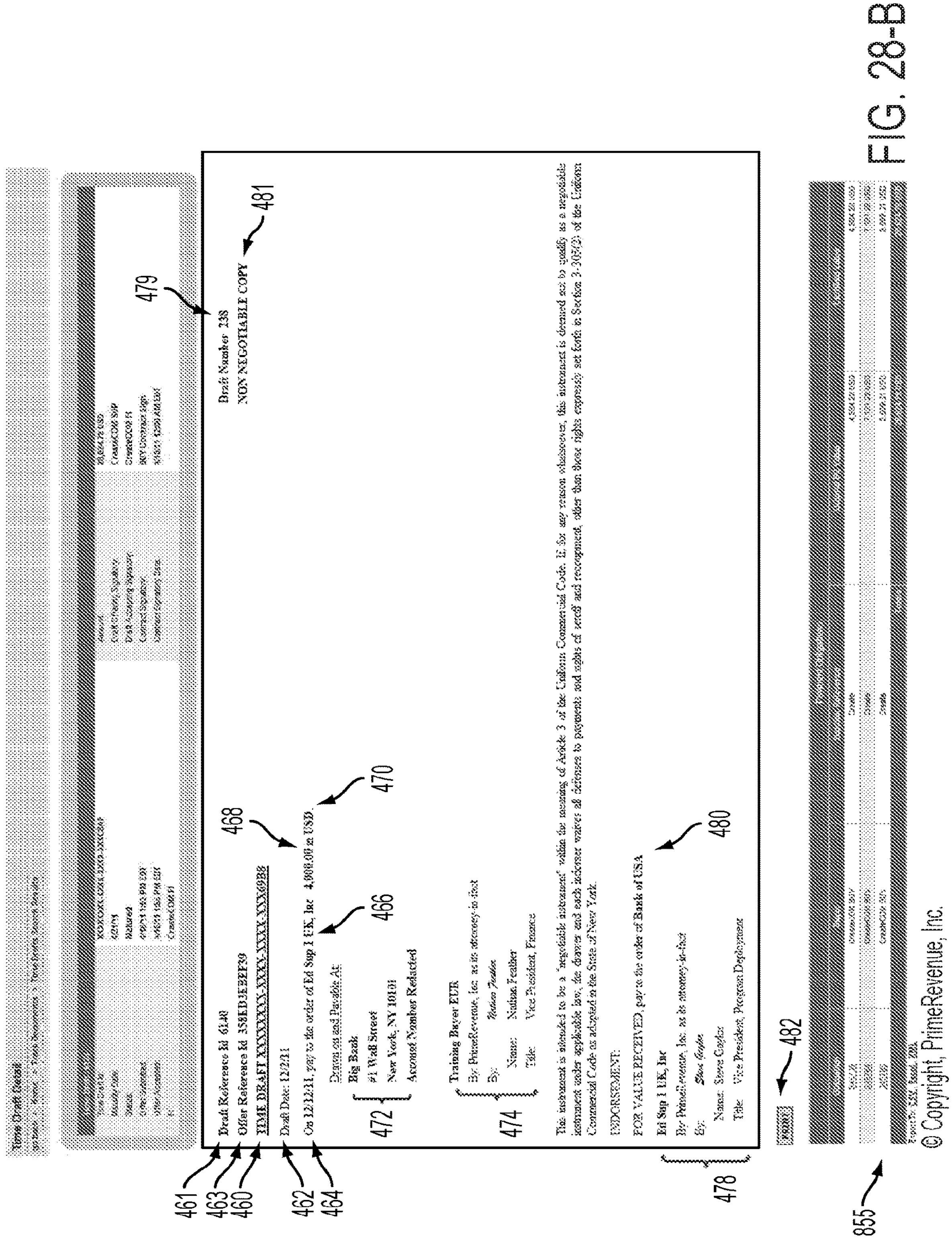
FIG. 28-B

Time Drafts Search Results go back > Home > Track Documents

Figure 31:
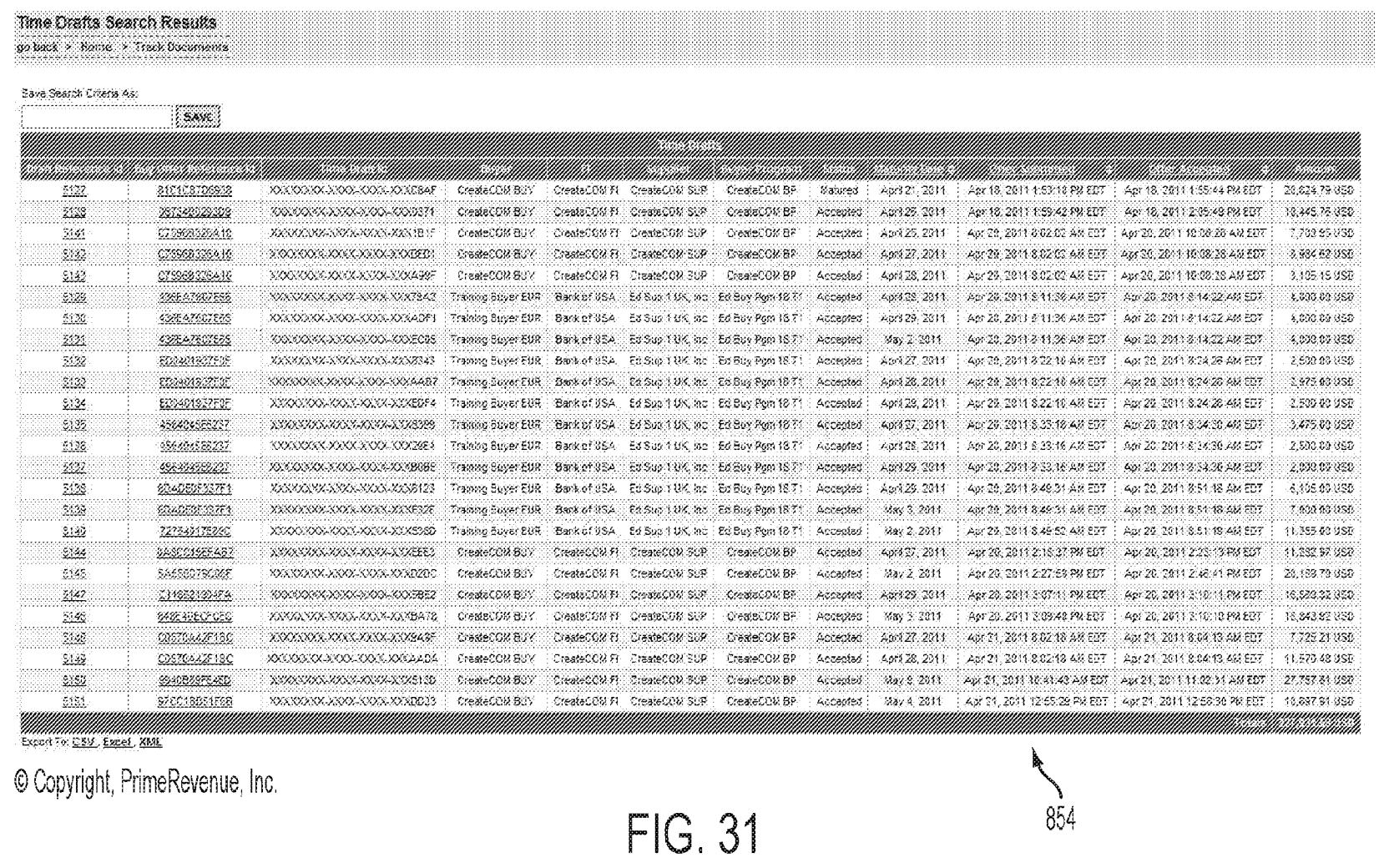

Save Search Criteria As:

SAVE

| | | | Buyer | FI | Supplier | Buyer Program | Status | Maturity Date | Offer Submitted | Offer Accepted | Amount |
|---|---|---|---|---|---|---|---|---|---|---|---|
| 5127 | 81C1C87D6928 | XXXXXXXX-XXXX-XXXX-XXXC84F | CreateCOM BUY | CreateCOM FI | CreateCOM SUP | CreateCOM BP | Matured | April 21, 2011 | Apr 18, 2011 1:53:18 PM EDT | Apr 18, 2011 1:55:44 PM EDT | 20,624.79 USD |
| 5128 | 267342029329 | XXXXXXXX-XXXX-XXXX-XXX0371 | CreateCOM BUY | CreateCOM FI | CreateCOM SUP | CreateCOM BP | Accepted | April 25, 2011 | Apr 18, 2011 1:59:42 PM EDT | Apr 18, 2011 2:05:48 PM EDT | 18,445.76 USD |
| 5141 | C7596B326A10 | XXXXXXXX-XXXX-XXXX-XXX1B1F | CreateCOM BUY | CreateCOM FI | CreateCOM SUP | CreateCOM BP | Accepted | April 25, 2011 | Apr 20, 2011 8:02:02 AM EDT | Apr 20, 2011 10:08:28 AM EDT | 7,703.95 USD |
| 5142 | C7596B326A10 | XXXXXXXX-XXXX-XXXX-XXXDED1 | CreateCOM BUY | CreateCOM FI | CreateCOM SUP | CreateCOM BP | Accepted | April 27, 2011 | Apr 20, 2011 8:02:03 AM EDT | Apr 20, 2011 10:08:28 AM EDT | 8,984.62 USD |
| 5143 | C7596B326A10 | XXXXXXXX-XXXX-XXXX-XXXA99F | CreateCOM BUY | CreateCOM FI | CreateCOM SUP | CreateCOM BP | Accepted | April 28, 2011 | Apr 20, 2011 8:02:02 AM EDT | Apr 20, 2011 10:08:28 AM EDT | 3,105.15 USD |
| 5129 | 432E47607E65 | XXXXXXXX-XXXX-XXXX-XXX7843 | Training Buyer EUR | Bank of USA | Ed Sup 1 UK, Inc | Ed Buy Pgm 18 T1 | Accepted | April 28, 2011 | Apr 20, 2011 8:11:36 AM EDT | Apr 20, 2011 8:14:22 AM EDT | 4,000.00 USD |
| 5130 | 432E47607E65 | XXXXXXXX-XXXX-XXXX-XXXADF1 | Training Buyer EUR | Bank of USA | Ed Sup 1 UK, Inc | Ed Buy Pgm 18 T1 | Accepted | April 29, 2011 | Apr 20, 2011 8:11:36 AM EDT | Apr 20, 2011 8:14:22 AM EDT | 4,000.00 USD |
| 5131 | 432E47607E65 | XXXXXXXX-XXXX-XXXX-XXXEC95 | Training Buyer EUR | Bank of USA | Ed Sup 1 UK, Inc | Ed Buy Pgm 18 T1 | Accepted | May 2, 2011 | Apr 20, 2011 8:11:36 AM EDT | Apr 20, 2011 8:14:22 AM EDT | 4,000.00 USD |
| 5132 | ED2401937F0F | XXXXXXXX-XXXX-XXXX-XXX8343 | Training Buyer EUR | Bank of USA | Ed Sup 1 UK, Inc | Ed Buy Pgm 18 T1 | Accepted | April 27, 2011 | Apr 20, 2011 8:22:10 AM EDT | Apr 20, 2011 8:24:26 AM EDT | 2,500.00 USD |
| 5133 | ED2401937F0F | XXXXXXXX-XXXX-XXXX-XXXA4B7 | Training Buyer EUR | Bank of USA | Ed Sup 1 UK, Inc | Ed Buy Pgm 18 T1 | Accepted | April 28, 2011 | Apr 20, 2011 8:22:10 AM EDT | Apr 20, 2011 8:24:26 AM EDT | 2,975.00 USD |
| 5134 | ED2401937F0F | XXXXXXXX-XXXX-XXXX-XXXE0F4 | Training Buyer EUR | Bank of USA | Ed Sup 1 UK, Inc | Ed Buy Pgm 18 T1 | Accepted | April 29, 2011 | Apr 20, 2011 8:22:10 AM EDT | Apr 20, 2011 8:24:26 AM EDT | 2,500.00 USD |
| 5135 | 4564045E6237 | XXXXXXXX-XXXX-XXXX-XXX8329 | Training Buyer EUR | Bank of USA | Ed Sup 1 UK, Inc | Ed Buy Pgm 18 T1 | Accepted | April 27, 2011 | Apr 20, 2011 8:33:16 AM EDT | Apr 20, 2011 8:34:30 AM EDT | 3,475.00 USD |
| 5136 | 4564045E6237 | XXXXXXXX-XXXX-XXXX-XXX28E4 | Training Buyer EUR | Bank of USA | Ed Sup 1 UK, Inc | Ed Buy Pgm 18 T1 | Accepted | April 28, 2011 | Apr 20, 2011 8:33:16 AM EDT | Apr 20, 2011 8:34:30 AM EDT | 2,500.00 USD |
| 5137 | 4564045E6237 | XXXXXXXX-XXXX-XXXX-XXXB0B8 | Training Buyer EUR | Bank of USA | Ed Sup 1 UK, Inc | Ed Buy Pgm 18 T1 | Accepted | April 29, 2011 | Apr 20, 2011 8:33:16 AM EDT | Apr 20, 2011 8:34:30 AM EDT | 2,000.00 USD |
| 5138 | 824DE0F337F1 | XXXXXXXX-XXXX-XXXX-XXX6123 | Training Buyer EUR | Bank of USA | Ed Sup 1 UK, Inc | Ed Buy Pgm 18 T1 | Accepted | April 29, 2011 | Apr 20, 2011 8:49:31 AM EDT | Apr 20, 2011 8:51:18 AM EDT | 6,105.00 USD |
| 5139 | 824DE0F337F1 | XXXXXXXX-XXXX-XXXX-XXXE92F | Training Buyer EUR | Bank of USA | Ed Sup 1 UK, Inc | Ed Buy Pgm 18 T1 | Accepted | May 3, 2011 | Apr 20, 2011 8:49:31 AM EDT | Apr 20, 2011 8:51:18 AM EDT | 7,600.00 USD |
| 5140 | 72754917E89C | XXXXXXXX-XXXX-XXXX-XXX595D | Training Buyer EUR | Bank of USA | Ed Sup 1 UK, Inc | Ed Buy Pgm 18 T1 | Accepted | May 2, 2011 | Apr 20, 2011 8:49:52 AM EDT | Apr 20, 2011 8:51:18 AM EDT | 11,355.00 USD |
| 5144 | 9A5C0195F4B7 | XXXXXXXX-XXXX-XXXX-XXXEEE3 | CreateCOM BUY | CreateCOM FI | CreateCOM SUP | CreateCOM BP | Accepted | April 27, 2011 | Apr 20, 2011 2:18:37 PM EDT | Apr 20, 2011 2:23:13 PM EDT | 11,232.97 USD |
| 5145 | 5A458079C06F | XXXXXXXX-XXXX-XXXX-XXXD2DC | CreateCOM BUY | CreateCOM FI | CreateCOM SUP | CreateCOM BP | Accepted | May 2, 2011 | Apr 20, 2011 2:27:59 PM EDT | Apr 20, 2011 2:46:41 PM EDT | 20,189.70 USD |
| 5147 | 21162190AFA | XXXXXXXX-XXXX-XXXX-XXX5BE2 | CreateCOM BUY | CreateCOM FI | CreateCOM SUP | CreateCOM BP | Accepted | April 29, 2011 | Apr 20, 2011 3:07:11 PM EDT | Apr 20, 2011 3:10:11 PM EDT | 16,920.32 USD |
| 5146 | 848E40ECFCEC | XXXXXXXX-XXXX-XXXX-XXXBA78 | CreateCOM BUY | CreateCOM FI | CreateCOM SUP | CreateCOM BP | Accepted | May 3, 2011 | Apr 20, 2011 3:09:48 PM EDT | Apr 20, 2011 3:10:10 PM EDT | 18,843.92 USD |
| 5148 | C0570A42F18C | XXXXXXXX-XXXX-XXXX-XXX949F | CreateCOM BUY | CreateCOM FI | CreateCOM SUP | CreateCOM BP | Accepted | April 27, 2011 | Apr 21, 2011 8:02:18 AM EDT | Apr 21, 2011 8:04:13 AM EDT | 7,725.21 USD |
| 5149 | C0570A42F18C | XXXXXXXX-XXXX-XXXX-XXXAAD4 | CreateCOM BUY | CreateCOM FI | CreateCOM SUP | CreateCOM BP | Accepted | April 28, 2011 | Apr 21, 2011 8:02:18 AM EDT | Apr 21, 2011 8:04:13 AM EDT | 11,570.48 USD |
| 5150 | 9940B39FE45D | XXXXXXXX-XXXX-XXXX-XXX513D | CreateCOM BUY | CreateCOM FI | CreateCOM SUP | CreateCOM BP | Accepted | May 9, 2011 | Apr 21, 2011 10:41:40 AM EDT | Apr 21, 2011 11:02:31 AM EDT | 27,757.81 USD |
| 5151 | 97CC18B31F9B | XXXXXXXX-XXXX-XXXX-XXXDB33 | CreateCOM BUY | CreateCOM FI | CreateCOM SUP | CreateCOM BP | Accepted | May 4, 2011 | Apr 21, 2011 12:55:29 PM EDT | Apr 21, 2011 12:56:30 PM EDT | 10,897.91 USD |

Export To: CSV, Excel, XML

© Copyright, PrimeRevenue, Inc.

© Copyright, PrimeRevenue, Inc.

857

© Copyright, PrimeRevenue, Inc.

858

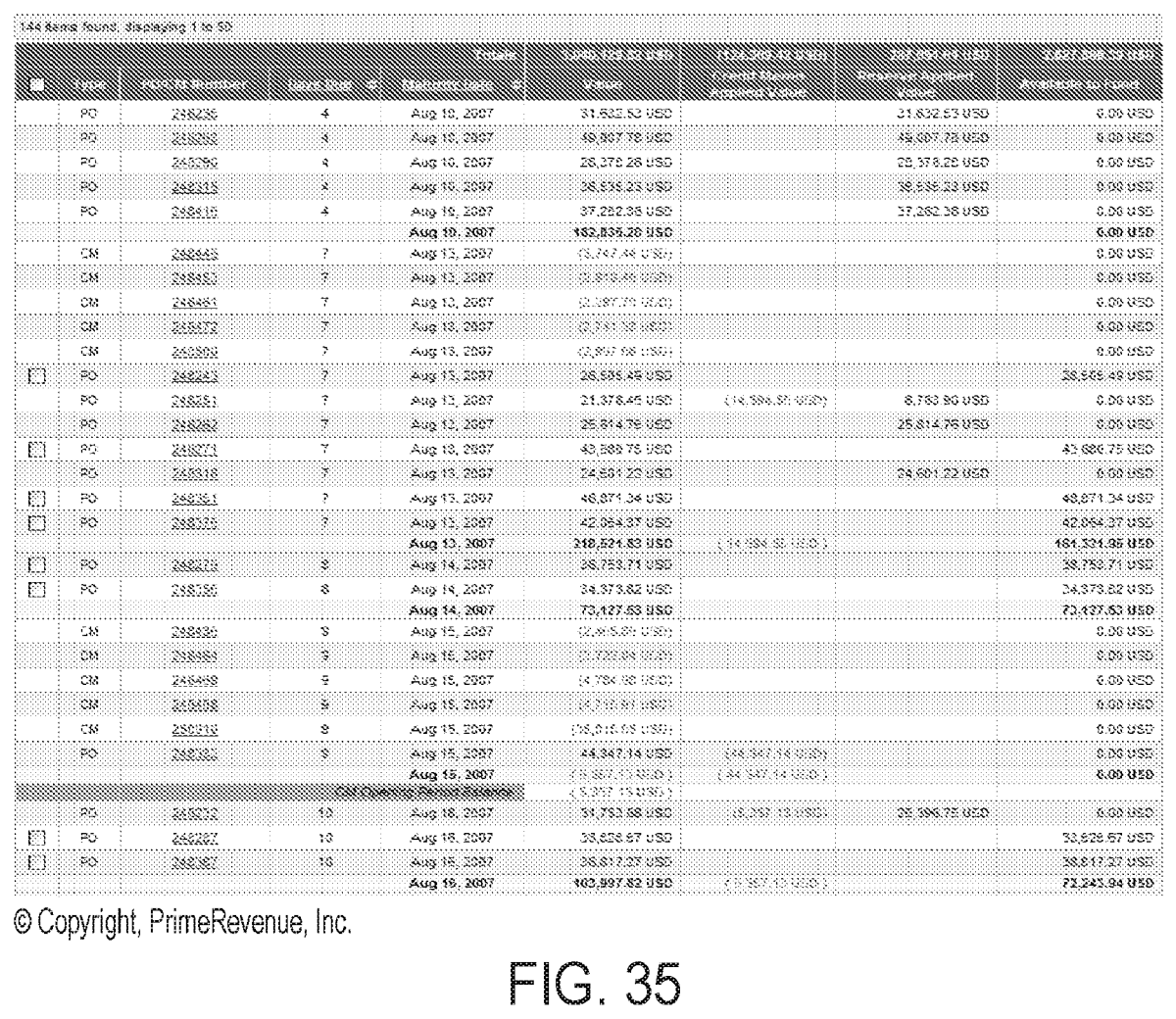

144 items found, displaying 1 to 50

| | | | | Totals | [illegible] | [illegible] | [illegible] | [illegible] |
|---|---|---|---|---|---|---|---|---|
| ☐ | Type | PO/CM Number | [illegible] | Maturity Date | Value | Credit Memo Applied Value | [illegible] Value | Available to Fund |
| | PO | 248236 | 4 | Aug 10, 2007 | 31,632.53 USD | | 31,632.53 USD | 0.00 USD |
| | PO | 248252 | 4 | Aug 10, 2007 | 49,307.78 USD | | 49,007.78 USD | 0.00 USD |
| | PO | 248290 | 4 | Aug 10, 2007 | 28,378.28 USD | | 28,378.28 USD | 0.00 USD |
| | PO | 248315 | 4 | Aug 10, 2007 | 38,535.23 USD | | 38,535.23 USD | 0.00 USD |
| | PO | 248415 | 4 | Aug 10, 2007 | 37,282.38 USD | | 37,282.38 USD | 0.00 USD |
| | | | | **Aug 10, 2007** | **182,835.28 USD** | | | **0.00 USD** |
| | CM | 248445 | 7 | Aug 13, 2007 | (5,747.44 USD) | | | 0.00 USD |
| | CM | [illegible] | 7 | Aug 13, 2007 | ([illegible] USD) | | | 0.00 USD |
| | CM | 248461 | 7 | Aug 13, 2007 | ([illegible] USD) | | | 0.00 USD |
| | CM | 248472 | 7 | Aug 13, 2007 | ([illegible] USD) | | | 0.00 USD |
| | CM | 248500 | 7 | Aug 13, 2007 | (2,897.98 USD) | | | 0.00 USD |
| ☐ | PO | 248243 | 7 | Aug 13, 2007 | 28,595.49 USD | | | 28,595.49 USD |
| | PO | 248251 | 7 | Aug 13, 2007 | 21,378.45 USD | (14,594.55 USD) | 6,783.90 USD | 0.00 USD |
| | PO | 248262 | 7 | Aug 13, 2007 | 25,814.76 USD | | 25,814.76 USD | 0.00 USD |
| ☐ | PO | 248273 | 7 | Aug 13, 2007 | 43,686.75 USD | | | 43,686.75 USD |
| | PO | 248318 | 7 | Aug 13, 2007 | 24,601.22 USD | | 24,601.22 USD | 0.00 USD |
| ☐ | PO | 248351 | 7 | Aug 13, 2007 | 48,871.34 USD | | | 48,871.34 USD |
| ☐ | PO | 248375 | 7 | Aug 13, 2007 | 42,054.37 USD | | | 42,054.37 USD |
| | | | | **Aug 13, 2007** | **218,521.83 USD** | ([illegible] USD) | | **181,331.95 USD** |
| ☐ | PO | 248278 | 8 | Aug 14, 2007 | 38,753.71 USD | | | 38,753.71 USD |
| ☐ | PO | 248356 | 8 | Aug 14, 2007 | 34,373.82 USD | | | 34,373.82 USD |
| | | | | **Aug 14, 2007** | **73,127.53 USD** | | | **73,127.53 USD** |
| | CM | 248430 | 9 | Aug 15, 2007 | (2,815.81 USD) | | | 0.00 USD |
| | CM | [illegible] | 9 | Aug 15, 2007 | ([illegible] USD) | | | 0.00 USD |
| | CM | 248469 | 9 | Aug 15, 2007 | (4,784.93 USD) | | | 0.00 USD |
| | CM | 248558 | 9 | Aug 15, 2007 | ([illegible] USD) | | | 0.00 USD |
| | CM | 250010 | 9 | Aug 15, 2007 | (35,015.65 USD) | | | 0.00 USD |
| | PO | [illegible] | 9 | Aug 15, 2007 | 44,347.14 USD | (44,347.14 USD) | | 0.00 USD |
| | | | | **Aug 15, 2007** | ([illegible] USD) | (44,347.14 USD) | | **0.00 USD** |
| | | | | [illegible] | (5,357.13 USD) | | | |
| | PO | 248272 | 10 | Aug 16, 2007 | 31,753.88 USD | (5,357.13 USD) | 26,396.75 USD | 0.00 USD |
| ☐ | PO | 248287 | 10 | Aug 16, 2007 | 33,626.67 USD | | | 33,626.67 USD |
| ☐ | PO | 248387 | 10 | Aug 16, 2007 | 38,617.27 USD | | | 38,617.27 USD |
| | | | | **Aug 16, 2007** | **103,997.82 USD** | ([illegible] USD) | | **72,243.94 USD** |

© Copyright, PrimeRevenue, Inc.

FIG. 35

| Type | Number | Days | Maturity | Value | CM Applied | Reserve |
|---|---|---|---|---|---|---|
| PO | 248235 | 4 | 10-Aug-07 | 31,632.53 | | 31,632.53 |
| PO | 248263 | 4 | 10-Aug-07 | 49,007.78 | | 49,007.78 |
| PO | 248290 | 4 | 10-Aug-07 | 28,378.28 | | 28,378.28 |
| PO | 248315 | 4 | 10-Aug-07 | 36,535.23 | | 36,535.23 |
| PO | 248416 | 4 | 10-Aug-07 | 37,282.38 | | 37,282.38 |
| PO | 248243 | 7 | 13-Aug-07 | 26,505.49 | | |
| PO | 248251 | 7 | 13-Aug-07 | 21,378.45 | (14,594.55) | 6,783.90 |
| PO | 248262 | 7 | 13-Aug-07 | 25,814.76 | | 25,814.76 |
| PO | 248271 | 7 | 13-Aug-07 | 43,880.75 | | |
| PO | 248316 | 7 | 13-Aug-07 | 24,601.22 | | 24,601.22 |
| PO | 248351 | 7 | 13-Aug-07 | 48,871.34 | | |
| PO | 248376 | 7 | 13-Aug-07 | 42,064.37 | | |
| PO | 248279 | 8 | 14-Aug-07 | 38,753.71 | | |
| PO | 248356 | 8 | 14-Aug-07 | 34,373.82 | | |
| PO | 248332 | 9 | 15-Aug-07 | 44,347.14 | (44,347.14) | |
| PO | 248232 | 10 | 16-Aug-07 | 31,753.88 | (5,357.13) | 26,396.75 |
| PO | 248287 | 10 | 16-Aug-07 | 33,626.67 | | |
| PO | 248367 | 10 | 16-Aug-07 | 38,617.27 | | |
| PO | 248294 | 11 | 17-Aug-07 | 35,306.60 | | |
| PO | 248295 | 11 | 17-Aug-07 | 28,499.64 | | |
| PO | 248305 | 11 | 17-Aug-07 | 24,722.58 | | |
| PO | 248309 | 11 | 17-Aug-07 | 22,159.06 | (11,564.94) | |
| PO | 248312 | 11 | 17-Aug-07 | 36,656.58 | | |
| PO | 248372 | 11 | 17-Aug-07 | 24,119.74 | | |
| PO | 248375 | 11 | 17-Aug-07 | 33,490.23 | | |
| PO | 248394 | 11 | 17-Aug-07 | 22,906.21 | | |

| | |
|---|---|
| **POs** | 4,105,951.85 |
| **CMs** | (168,084.89) |
| **10% Reserve** | 410,595.19 |
| **Calc Reserve:** | 242,510.30 |
| **Applied Reserve** | 266,432.83 |
| **Diff** | 23,922.54 |
| **Last Amt Reserve PO** | 25,814.76 |

© Copyright, PrimeRevenue, Inc.

FIG. 36

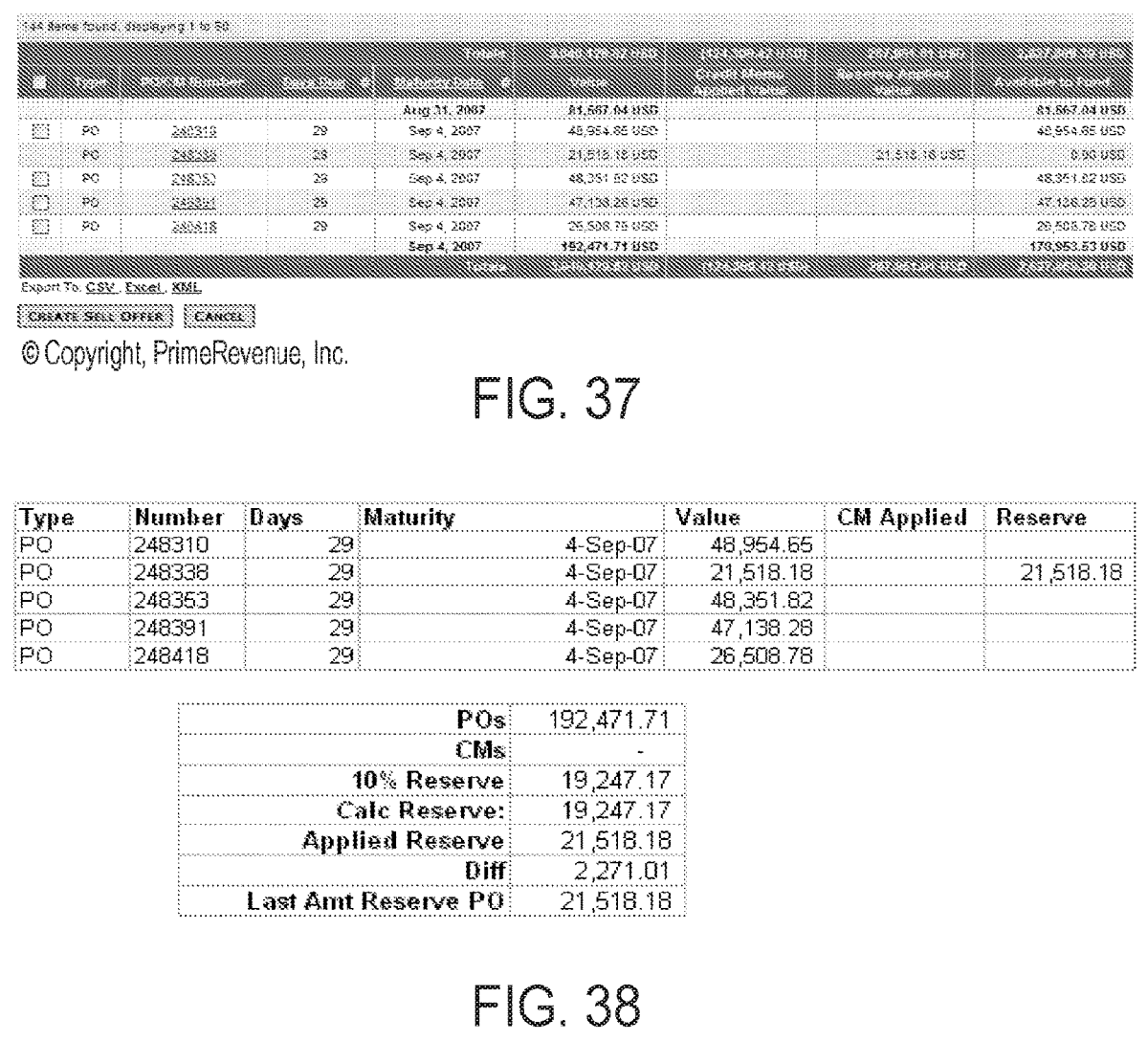

144 items found, displaying 1 to 50

| | Type | PO/CM Number | Days Due | Maturity Date | Value | Credit Memo Applied Value | Reserve Applied Value | Available to Fund |
|---|---|---|---|---|---|---|---|---|
| | | | | Totals | [illegible] | [illegible] | [illegible] | [illegible] |
| | | | | Aug 31, 2007 | 81,567.04 USD | | | 81,567.04 USD |
| ☐ | PO | 248310 | 29 | Sep 4, 2007 | 48,954.65 USD | | | 48,954.65 USD |
| | PO | 248338 | 29 | Sep 4, 2007 | 21,518.18 USD | | 21,518.18 USD | 0.00 USD |
| ☐ | PO | 248353 | 29 | Sep 4, 2007 | 48,351.82 USD | | | 48,351.82 USD |
| ☐ | PO | 248391 | 29 | Sep 4, 2007 | 47,138.28 USD | | | 47,138.28 USD |
| ☐ | PO | 248418 | 29 | Sep 4, 2007 | 26,508.78 USD | | | 26,508.78 USD |
| | | | | Sep 4, 2007 | 192,471.71 USD | | | 170,953.53 USD |
| | | | | Totals | [illegible] | [illegible] | [illegible] | [illegible] |

Export To: CSV, Excel, XML

CREATE SELL OFFER CANCEL

© Copyright, PrimeRevenue, Inc.

FIG. 37

| Type | Number | Days | Maturity | Value | CM Applied | Reserve |
|---|---|---|---|---|---|---|
| PO | 248310 | 29 | 4-Sep-07 | 48,954.65 | | |
| PO | 248338 | 29 | 4-Sep-07 | 21,518.18 | | 21,518.18 |
| PO | 248353 | 29 | 4-Sep-07 | 48,351.82 | | |
| PO | 248391 | 29 | 4-Sep-07 | 47,138.28 | | |
| PO | 248418 | 29 | 4-Sep-07 | 26,508.78 | | |

| | |
|---|---|
| POs | 192,471.71 |
| CMs | - |
| 10% Reserve | 19,247.17 |
| Calc Reserve: | 19,247.17 |
| Applied Reserve | 21,518.18 |
| Diff | 2,271.01 |
| Last Amt Reserve PO | 21,518.18 |

FIG. 38

SUPPLY CHAIN FINANCE SYSTEM

The present application is a continuation of U.S. application Ser. No. 17/134,071, filed Dec. 24, 2020 (now U.S. Pat. No. 11,334,942), which is a continuation of U.S. application Ser. No. 16/036,877, filed Jul. 16, 2018 (now U.S. Pat. No. 10,878,498), which is a continuation of U.S. application Ser. No. 13/734,856, filed Jan. 4, 2013 (now U.S. Pat. No. 10,026,120), which claims the benefit of U.S. provisional patent application Ser. No. 61/584,117, entitled "Supply Chain Finance System" and filed Jan. 6, 2012, the entire disclosure of each of which is hereby incorporated by reference as if set forth verbatim herein and relied upon for all purposes.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright whatsoever.

FIELD OF THE PRESENT INVENTION

The present invention relates generally to electronic commerce financing. One or more preferred embodiments relate to improved supply chain finance management systems and methods for enabling all parties to a "supply chain" (buyers, suppliers, and financial institutions) to collaborate to enable a supplier to negotiate to the financial institution a negotiable instrument on which the buyer is obligor and having a value related to the buyer's accounts payable to the supplier. In a preferred embodiment, this allows negotiation of the instrument to the supplier at a discount from full value that is based on the instrument's maturity date and upon the financial strength of the buyer rather than the financial strength or credit risk of the supplier.

BACKGROUND OF THE PRESENT INVENTION

The present application refers to U.S. patent application Ser. No. 11/756,484, entitled Supply Chain Financing and Credit Memo Systems and Methods, filed May 31, 2007; U.S. patent application Ser. No. 11/561,837, entitled Supply Chain Financing Systems and Methods, filed Nov. 20, 2006; U.S. Provisional Patent Application Ser. No. 60/827,475, entitled Credit-Memo Dispute Handling Processing, filed Sep. 29, 2006; U.S. Provisional Patent Application Ser. No. 60/803,516, entitled Credit Memo Specification, filed May 31, 2006; U.S. Provisional Patent Application Ser. No. 60/799,722, entitled System and Methods for the Supply Chain Financing Platform (WCFP), filed May 9, 2006; U.S. Provisional Patent Application Ser. No. 60/754,518, entitled Payment Obligation System, filed Dec. 28, 2005; and U.S. Provisional Patent Application Ser. No. 60/739,034, entitled Buyer Program System and Method, filed Nov. 22, 2005, the entire disclosures of each of which are incorporated by reference herein.

A supply chain describes the network of vendors, suppliers, manufacturers, subcontractors, service providers, assembly operations, warehousing and distribution centers, end customers or buyers, and other parties that participate in the sale, production, and delivery of a product or service. Such supply chains are focused on satisfying buyer orders for finished goods or services at chosen locations. Typically, each order describes the desired goods or services, the quantity, a cost, and an expected delivery date. Financial institutions or commercial lenders often get involved in the supply chain to provide funding to assist in the financing of such transactions and to support the cash flow of suppliers and buyers.

In a typical business-to-business transaction, a buyer places an order for goods or services from a supplier. This is generally documented by a purchase order. Once the supplier receives the purchase order, the supplier undertakes to fulfill the order by delivering the requested goods or services. The delivery of the requested goods or services may involve many intermediate steps, such as assembly, warehousing, drop shipping, and local transportation, all of which add to the complexity of the distribution chain as well as to the payables.

In general, when a product leaves the supplier, or after a service has been provided, the supplier creates an invoice and communicates the invoice to the buyer. The invoice date is typically the date the invoice is transmitted from the supplier's place of operation, and this invoice date starts a period of time (i.e. "grace period") during which no payment from the buyer is required or expected. This grace period creates, in effect, a credit line established by the supplier on behalf of the buyer, and is generally offered with no interest being charged on the outstanding balance. Often, the supplier offers a discount for payment before the grace period ends. Once the grace period has passed, payment in full is due.

In modern commerce, however, buyers often extend the grace period beyond the supplier's terms as expressed in the original invoice. This may be particularly the case for large scale retailers, who may delay payment to take advantage of the time value of capital. Suppliers, who are typically smaller businesses than their retail buyers, may need to find interim funding to cover cash-flow needs.

To address cash flow needs, a supplier may sell its accounts receivable (A/R) or use the A/R as collateral for a loan to raise capital for operations or other purpose. The term "factoring" is used to describe the sale or collateralization of A/R. The factoring process, however, can be lengthy and cumbersome. For example, suppliers typically must submit detailed paperwork to the factor and follow-up with substantial documentation and proof of invoice validity prior to obtaining cash. Furthermore, the factor typically devalues the supplier's receivable base to some degree, e.g. due to debtors with low credit ratings and/or because it is expected that the supplier's A/R may be reduced by returns and/or other types of chargebacks arising from the underlying transaction. For these reasons, the factor generally only lends up to 80% of the true value of the A/R. Additionally, interest rates in factoring are generally very high (12%+), even for A/R from "investment grade" buyers. All of these drawbacks arise because the factor does not have direct real-time access to the supplier's A/R or visibility into the buyer's accounts payable (A/P) process.

Systems are also known through which a supplier may sell its accounts receivable to a financial institution based upon the strength of the buyer's credit worthiness. In such systems, an entity that is operationally central to the buyer, the supplier, and the financial institution maintains a computer system and one or more interfaces through which the three parties remotely access the system. The buyer uploads to the system information relating to the buyer's accounts payable arising from commercial transactions between the buyer and the supplier outside the system and/or which the supplier has submitted one or more invoices to the buyer. Pursuant to an earlier contractual arrangement between the buyer and the central entity, the uploading of the accounts payable information from the buyer to the central entity establishes an irrevocable contractual obligation from the buyer to pay the total amount due on the uploaded obligation. This irrevocable obligation is in favor of the supplier or the supplier's assignees, such party therefore being a third party beneficiary to the contract between the buyer and the central entity. The supplier, who may access the system and view the uploaded obligation(s), may choose to wait and receive full payment on the underlying accounts payable (accounts receivable to the supplier) or may choose to offer for sale its accounts receivable corresponding to the uploaded obligation. If the supplier chooses to sell the accounts receivable, it so indicates through a notification to the central entity's system via the interface. This notice becomes visible to a financial institution when the financial institution accesses the system through an interface. The sell offer is for an amount discounted from the full amount of the payment obligation. The central entity's system automatically determines the discount amount based on the amount of time between the sell date and the payment obligation maturity date and a discount rate previously entered by the financial institution. The payment obligation maturity date is defined by the uploaded obligation data. This is outside the central entity's system. The maturity date can be, or be related to, the due date for the underlying invoice(s) but can be any date upon which the buyer and supplier agree. The financial institution selects the discount rate at its discretion and may select different discount rates for accounts receivable owing from respective different buyers. That is, the discount accepted by the supplier in the sale of its accounts receivable is based upon the credit worthiness of the buyer rather than the supplier.

If the financial institution chooses to accept the sell offer, then, pursuant to a previous contractual arrangement between the financial institution and the supplier, the financial institution may execute acceptance via notification to the central entity's system, thereby transferring to the financial institution the supplier's third party rights under the buyer's payment obligation. The financial institution then transfers the discounted amount to the supplier, and the buyer pays the financial institution in full upon the maturity date.

Systems are also known in which a financial institution forwards blank trade acceptance draft forms to a supplier. When the supplier and a buyer enter into a commercial transaction under which the supplier provides goods to or performs services for the buyer, the supplier forwards to the buyer its invoice and forwards to a bank a trade acceptance draft, made by (but unsigned by) the buyer, to the supplier, for the amount of the invoice, and indorsed by the supplier in favor of the bank. If the supplier wishes to obtain early payment, the supplier sends to the bank a copy of the underlying invoice and the unexecuted, but indorsed, trade acceptance draft. The bank sends copies of the draft and the invoice to the buyer. Assuming the buyer accepts the transaction, the buyer responds to the bank with confirmation of the trade acceptance draft and a power of attorney in favor of the bank to sign the draft on behalf of the buyer for payment on the draft's maturity date. The financial institution then provides to the supplier a discounted amount based on the length of time to the maturity date and cashes the draft for full value when the maturity date arrives.

SUMMARY OF THE INVENTION

One or more embodiments of the present invention recognizes and addresses the foregoing considerations, and others, or prior art construction and methods. An electronic supply chain finance system utilized by a buyer, a supplier that provides goods and/or services to the buyer, and a financial institution, each of which is remote from the system, has a computer-readable medium containing program instructions and a processor in operative communication with the computer-readable medium. The processor is adapted to execute the program instructions to implement a method including the step of receiving information from the buyer defining a payment obligation from the buyer to the supplier. An offer to sell the payment obligation is received from the supplier. Acceptance of the offer is received from the financial institution. An electronic record for a negotiable instrument is created at the system, wherein the buyer is obligor, and the supplier is obligee of the negotiable instrument, and the negotiable instrument has a payable date based on a maturity date of the payment obligation and a payment value based on a payment amount of the payment obligation. Upon acceptance of the offer by the financial institution, the system provides electronic instructions to the financial institution to print the negotiable instrument, indorsed on behalf of the supplier in favor of the financial institution as the payee at least partially effecting a trade between the supplier and the financial institution prior to the maturity date that is based on the negotiation of the negotiable instrument.

In another embodiment, an electronic supply chain finance system utilized by a buyer, a supplier that provides goods and/or services to the buyer, and a financial institution, each of which is remote from the system and accesses the system through a computer network interface, includes a computer-readable medium containing program instructions, and a processor in operative communication with the computer-readable medium and adapted to execute the program instructions to implement a method. The method includes receiving accounts payable information from the buyer defining a payment obligation from the buyer to the supplier that has a payment value and a payment maturity date. An offer to sell the payment obligation is received from the supplier. An acceptance of the offer is received from the financial institution. Upon receipt of acceptance of the offer by the financial institution, the system provides electronic information to the financial institution to print a negotiable instrument, indorsed on behalf of the supplier to the financial institution as obligee thereof. The negotiable instrument has the buyer as obligor, supplier as obligee (i.e. payee), a payable date based on the maturity date, and a payment value based on the payment amount.

In another embodiment, an electronic supply chain finance system utilized by a buyer, a supplier that provides goods and/or services to the buyer, and a financial institution, each of which is remote from the system and accesses the system through a computer network interface, includes a computer-readable medium containing program instructions and a processor in operative communication with the computer-readable medium and adapted to execute the program instructions to implement a method. The method includes receiving information from the buyer defining a payment obligation from the buyer to the supplier corresponding to a transaction in which the supplier provides the goods and/or services to the buyer. An offer to sell the payment obligation is received from the supplier. An acceptance of the offer is received from the financial institution. An electronic record of a negotiable instrument is created at the system, wherein the buyer is obligor, and the supplier is obligee, of the negotiable instrument, and the negotiable instrument has a payable date based on a maturity date of the payment obligation and has a payment value based on a payment amount of the payment obligation. Upon acceptance of the offer, the system provides electronic instructions to the financial institution to print the negotiable instrument. Pursuant to an agreement by the buyer and the supplier, the negotiable instrument substitutes for and extinguishes all other obligations of the buyer to pay the supplier for the goods and/or services corresponding to the transaction.

In another embodiment, a method of providing funds to a supplier that provides goods and/or services to a buyer includes receiving from the buyer, via a computer network at a computer system remote from the buyer, the supplier, and a financial institution, information defining a payment obligation from the buyer to the supplier corresponding to a transaction in which the supplier provides the goods and/or services to the buyer. An offer to sell the payment obligation is received at the computer system via a computer network. Via a computer network, an acceptance of the offer is received at the computer system from the financial institution. An electronic record for a negotiable instrument is created at the computer system, wherein the buyer is obligor, and the supplier is obligee, of the negotiable instrument, and the negotiable instrument has a payable date based on a maturity date of the payment obligation and a payment value based on a payment amount of the payment obligation. Upon receipt of the acceptance and prior to the maturity date, the system provides electronic instructions to the financial institution to print the negotiable instrument, indorsed on behalf of the supplier in favor of the financial institution as the payee. Upon creation and indorsement of the negotiable instrument, transfer is effected to the supplier from the financial institution of an amount of funds determined by terms of the offer.

The accompanying drawings, which are incorporated in and constitute a part of this specification, illustrate one or more embodiments of the present invention.

BRIEF DESCRIPTION OF THE DRAWINGS

Many aspects of the invention can be better understood with reference to the following drawings. The components in the drawings are not necessarily to scale. An enabling disclosure of the present invention, including the best mode thereof, is set forth in the specification, which makes reference to the appended drawings, in which:

FIG. 1A is a schematic view of a method for a supply chain finance (SCF) system according to an embodiment of the present invention;

FIG. 1B is a schematic representation of agreements between parties of the SCF system of FIG. 1A;

FIGS. 1C, 1D, and 1E illustrate various functions of the SCF system of FIG. 1A in accordance with various embodiments of the present invention;

FIG. 7-A is an exemplary screen image of a list FI pricing profile indicated in FIG. 5 for the buyer program community manager entity of FIG. 3;

FIG. 7-B is an exemplary screen image of a list pricing profile buyer programs page for the buyer program community manager entity of FIG. 3;

FIG. 7-C is an exemplary screen image of a view FI pricing profile history for the buyer program community manager entity of FIG. 3;

FIG. 7-D is an exemplary screen image of a view FI pricing profile for the buyer program community manager entity of FIG. 3;

FIG. 8-A is an exemplary screen image of a community buyers web page for the buyer program community manager entity of FIG. 3;

FIG. 8-B is an exemplary screen image of a list buyer program for the buyer program community manager entity of FIG. 3;

FIG. 8-C is an exemplary screen image of buyer program tabs for the buyer program community manager entity of FIG. 3;

FIGS. 8-D(1)-8-D(2) are exemplary screen images of an edit buyer program for the buyer program community manager entity of FIG. 3;

FIG. 8-E is an exemplary screen image of a buyer program parameter screen for the buyer program community manager entity of FIG. 3;

FIG. 8-F is an exemplary screen image of a distribution screen for the buyer program community manager entity of FIG. 3;

FIGS. 8-G(1) and 8-G(2) are an exemplary screen image of a financial institution screen for the buyer program community manager entity of FIG. 3;

FIG. 8-H is an exemplary screen image of a supplier screen for the buyer program community manager entity of FIG. 3;

FIG. 10-A is an exemplary screen image of a service provider home page as indicated in FIG. 9 for a buyer program service provider entity of FIG. 3;

FIG. 10-B is an exemplary screen image of a community directory for the buyer program service provider entity of FIG. 3 for use with the web page indicated in FIG. 9;

FIG. 10-C is an exemplary screen image of community tabs for the buyer program service provider entity of FIG. 3;

FIG. 10-D is an exemplary screen image of a list of community buyers for the buyer program service provider entity of FIG. 3;

FIGS. 10-E(1) and 10-E(2) illustrate an exemplary screen image of an add buyer page for the buyer program service provider entity of FIG. 3;

FIG. 10-F is an exemplary screen image of a buyer program list for the buyer program service provider entity of FIG. 3;

FIG. 10-G is an exemplary screen image of an add buyer program for the buyer program service provider entity of FIG. 3;

FIG. 10-H is an exemplary screen image of a buyer program (managing suppliers) page for the buyer program service provider entity of FIG. 3;

FIG. 10-J is an exemplary screen image of an add supplier page for the buyer program service provider entity of FIG. 3;

FIG. 10-K is an exemplary screen image of a buyer program system configuration for the buyer program service provider entity of FIG. 3;

FIG. 10-L is an exemplary screen image of a community financial institutions tab for the buyer program service provider entity of FIG. 3;

FIG. 10-M is an exemplary screen image of a community management add financial institution page for the buyer program service provider entity of FIG. 3;

FIG. 10-N is an exemplary screen image of view supplier applications for the buyer program service provider entity of FIG. 3;

FIG. 10-P is an exemplary screen image of a supplier list for the buyer program service provider entity of FIG. 3;

FIGS. 10-Q(1) and 10-Q(2) illustrate an exemplary screen image of an add supplier page for the buyer program service provider entity of FIG. 3;

FIG. 10-R is an exemplary screen image of a financial institution list page for the buyer program service provider entity of FIG. 3;

FIGS. 10-S(1) and 10-S(2) illustrate an exemplary screen image of an add financial institution page for the buyer program service provider entity of FIG. 3;

FIG. 10-T is an exemplary screen image of a draft reprint selection screen for the buyer program community manager entity of FIG. 3;

FIG. 12-A is an exemplary screen image of a bank list as indicated in FIG. 11 for the service provider entity of FIG. 3;

FIG. 12-B is an exemplary screen image of a view bank details for the service provider entity of FIG. 3;

FIG. 12-C is an exemplary screen image of a pending bank account list for the service provider entity of FIG. 3;

FIG. 12-D is an exemplary screen image of an assign bank to account page for the service provider entity of FIG. 3;

FIG. 12-E is an exemplary screen image of a validated banks page for the service provider entity of FIG. 3;

FIG. 12-F is an exemplary screen image of a bank account profile for the service provider entity of FIG. 3;

FIG. 14-A is an exemplary screen image of part of the financial institution home page as indicated in FIG. 13 for the financial institution entity of FIG. 3;

FIG. 14-B is an exemplary screen image of a buyers page for the financial institution entity of FIG. 3;

FIG. 14-C is an exemplary screen image of an active program details edit program for the financial institution entity of FIG. 3;

FIG. 14-D is an exemplary screen image of an active portfolios page for the financial institution entity of FIG. 3;

FIG. 14-E is an exemplary screen image of an available portfolios page for the financial institution entity of FIG. 3;

FIG. 14-F is an exemplary screen image of a list FI pricing profile page for the financial institution entity of FIG. 3;

FIG. 14-G is an exemplary screen image of an edit FI pricing profile page for the financial institution entity of FIG. 3;

FIG. 14-H is an exemplary screen image of a view FI pricing profile page history page for the financial institution entity of FIG. 3;

FIG. 14-I is an exemplary screen image of a view FI pricing profile page for the financial institution entity of FIG. 3;

FIG. 14-J is an exemplary screen image of a list pricing profile portfolio page for the financial institution entity of FIG. 3;

FIG. 14-K is an exemplary screen image of a buy offers page for the financial institution entity of FIG. 3;

FIG. 14-L is an exemplary screen image of a draft print request screen for the financial institution entity of FIG. 3;

FIG. 15-A is an exemplary screen image showing tasks and alerts for the supplier entity of FIG. 3;

FIG. 15-B is an exemplary screen image showing message details for the supplier entity of FIG. 3;

FIG. 15-C is an exemplary screen image showing an activate buyer program for the supplier entity of FIG. 3;

FIG. 15-D is an exemplary screen image showing a welcome and confirmation page for the supplier entity of FIG. 3;

FIG. 15-E(1) is an exemplary screen image showing a customer list page for the supplier entity of FIG. 3;

FIG. 15-E(2) is an exemplary screen image showing an edit auto-advance rules page for the supplier entity of FIG. 3;

FIG. 15-E(3) is an exemplary screen image showing a funding estimate page for the supplier entity of FIG. 3;

FIG. 15-E(3A) is an exemplary screen image showing a funding date summary page for the supplier entity of FIG. 3;

FIG. 15-E(3B) is an exemplary screen image showing a funding payment obligation details page for the supplier entity of FIG. 3;

FIG. 15-E(4) is an exemplary screen image showing a confirm sell offer page for the supplier entity of FIG. 3;

FIG. 15-E(5) is an exemplary screen image showing a sell offer history page for the supplier entity of FIG. 3;

FIG. 15-E(6) is an exemplary screen image showing a payment obligation and credit memo history page for the supplier entity of FIG. 3;

FIG. 15-E(7) is an exemplary screen image showing a payment obligation report page for the supplier entity of FIG. 3;

FIG. 15-E(8) is an exemplary screen image showing a notification of payment obligation transfer page for the supplier entity of FIG. 3;

FIG. 15-F is an exemplary screen image showing a view auto-advance rules page for the supplier entity of FIG. 3;

FIG. 15-G is an exemplary screen image showing a maturity date page for the buyer entity of FIG. 3;

FIG. 15-H is an exemplary screen image showing an auto maturity date rules page for the buyer entity of FIG. 3;

FIGS. 15-I(1)-15-I(2) are exemplary screen images showing a payment schedule page for the buyer entity of FIG. 3;

FIG. 15-J is an exemplary screen image showing a supplier list page for the buyer entity of FIG. 3;

FIG. 19 is a table illustrating credit memo functionality for the data illustrated in FIG. 17;

FIG. 20 is an exemplary screen image illustrating credit memo functionality in the system illustrated in FIG. 1A;

FIG. 21 is an exemplary screen image illustrating credit memo functionality in the system illustrated in FIG. 1A;

FIG. 24 is an exemplary screen image illustrating credit memo functionality in the system illustrated in FIG. 1A;

FIG. 25 is an exemplary screen image illustrating credit memo functionality in the system illustrated in FIG. 1A;

FIGS. 26-A and 26-B illustrate an exemplary screen image illustrating report criteria features of the buyer program of FIG. 3;

FIG. 28-A is an illustration of a user interface page displaying a representation of an electronic time draft created according to the method as in FIGS. 1A-1E;

FIG. 28-B is an illustration of a user interface page displaying a representation of a printable time draft created according to the method as in FIGS. 1A-1E;

FIG. 31 is an exemplary screen image illustrating search results accessible from the screen shown in FIG. 30;

FIG. 35 is an exemplary screen image of a partial supplier view of payment obligations in a system as in FIG. 1A;

FIG. 36 is a spreadsheet illustration of a reserve calculation based on the information illustrated in FIG. 35;

FIG. 37 is an exemplary screen image of a partial supplier view of payment obligations in a system as in FIG. 1A; and FIG. 38 is a spreadsheet illustration of a reserve calculation based on the information illustrated in FIG. 37.

Figure 2:
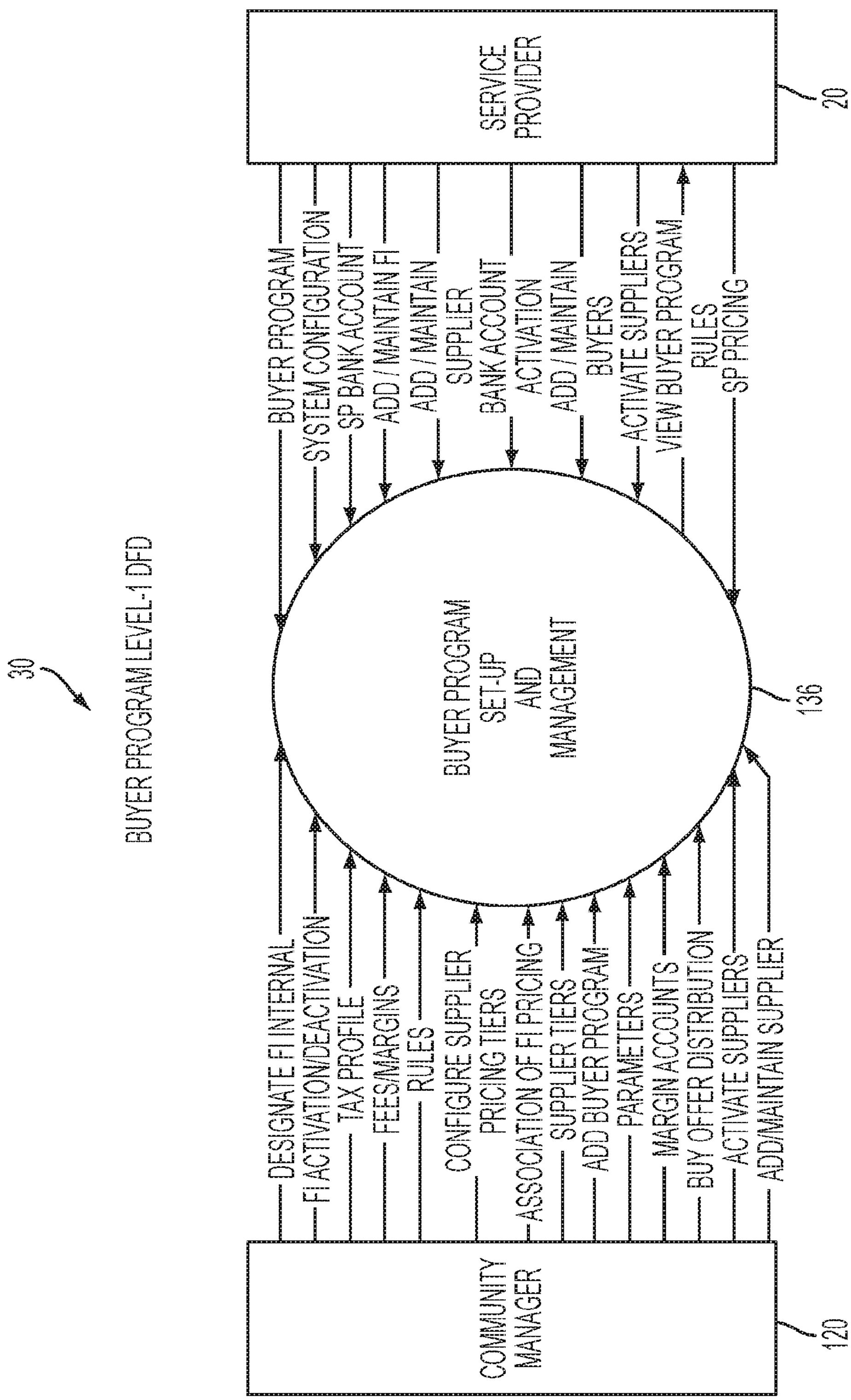
FIG. 2 is a schematic illustration of data flow transfer from a community manager and a service provider to and from a buyer program setup and management process for the supply chain finance system of FIG. 1A.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawing. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention relates generally to electronic commerce financing and, more particularly, to improved financial supply chain management and methods. In a preferred embodiment, a supplier negotiates a negotiable instrument to a financial institution in return for an amount discounted from the instrument's full value.

Supply Chain Finance System

The supply chain finance (SCF) system of one or more presently-described embodiments is a closed loop financial system that integrates, within defined communities, buyers and associated suppliers and financial institutions. Many buyers, suppliers, and financial institutions interact with the system and may belong to and participate within one or more separate communities. For instance, a party may be a buyer in one customer community and a supplier in another. The SCF system is intended to supplement, within supply chain relationships, the relationships between buyers and their suppliers that exist outside the SCF system.

As is discussed herein, information is exchanged between the system and the buyers, suppliers, and financial institutions. The SCF system, including its computerized system and database system, is preferably remote from the buyers, suppliers, financial institutions, and their computerized systems. "Remote" does not necessarily refer to the parties' physical relationships, but instead indicates that the parties do not have control over each other's computerized systems, including databases and data thereof. The parties may be remote from each other, not necessarily indicating spatial separation, but instead indicating that one remote party does not have control over the other remote party's data and computer systems.

Each party to a community has access, preferably within a web-hosted environment, to a common and controlled set of financial and non financial supply chain information. In particular, the SCF system enables a buyer to upload electronic output from its accounts payable (A/P) system with approved payables data, such as payee, payable date, amount, etc. The accounts payable are "approved" in that the buyer has approved the A/P for payment. Since, pursuant to agreement between the buyer and the system, uploading of an A/P obligation from the buyer to the system creates an irrevocable obligation on the buyer's part to pay the obligation value to the supplier, system operation in this embodiment is based on a presumption that an uploaded A/P obligation corresponds to A/P that the buyer has approved for payment.

In the presently-described embodiments, operation of the SCF system assumes the A/P obligation is defined by data that populates the buyer's A/P system and, therefore, is expected to correspond to invoices the buyer receives from the suppliers. As indicated in the discussion below, contracts among the parties may assume or require a relationship between the A/P obligation and supplier invoices. Such association is not generally required for system operation, however, and a buyer could simply input A/P data into its A/P system for upload to SCF system 10, or manually upload A/P data to system 10, that defines an obligation to the supplier but that has no correlation to supplier invoices.

The particular data uploaded from the buyer A/P system that defines the A/P obligation may vary as desired and/or depending on the structure of and information available in the buyer A/P system, but in a preferred embodiment the data is sufficient to define an obligation of the buyer to pay the supplier a certain amount on a certain date. Elsewhere herein, "obligation" may refer to the contractual, irrevocable obligation created when the buyer uploads the A/P obligation data to system 10, but the A/P obligation refers to an obligation owed by the buyer to the supplier outside system 10. For each A/P obligation, the A/P data uploaded to system 10 preferably includes at least the amount of the obligation owed by the buyer to the supplier, the supplier's identity, and the date payment of the amount is due from the buyer to the supplier.

As noted, the A/P obligation need not necessarily correspond to supplier invoices, but nonetheless the A/P obligation will typically be associated with invoices, and the present discussion proceeds under that assumption. In that regard, a database system 452 (FIG. 29) of system 10 includes a record for each uploaded A/P obligation that may include information related to supplier invoices that may also be pulled from the buyer's A/P system. The invoice data, or member content, is ancillary in that it is not used in the funding transaction effected through system 10, but it is available to the supplier, as described below, so that the supplier has the ability to reconcile the A/P obligation with invoice data in the supplier's accounts receivable (A/R) system. The invoice data may include any information desired by the parties, for example the invoice number, invoice date, supplier name, buyer name, and possibly codes indicating the goods and/or services underlying the invoices.

In general, the buyer's A/P system may be configured to create, automatically or by the buyer's manual operation of the A/P system, A/P obligation data by aggregating data relating to one or more invoices in the buyer's A/P system, so that the obligation amount is the sum of the amounts of the selected invoices. The obligation date is preferably a date upon which payment is due on the aggregated invoices, and so in a preferred methodology, all invoices comprising a single A/P obligation are due on the same day. Concurrent invoices are not necessary, however, and the buyer and/or its A/P system could aggregate one or more invoices having different due dates and choose a maturity date to apply to the A/P obligation as a whole, e.g. the earliest invoice due date or a date based on agreement between the buyer and supplier reached outside the system.

Pursuant to an agreement between the buyer and an entity that controls parameters governing the SCF system's operation with regard to payment obligations and negotiable instruments (described below) (in the presently-described embodiments, the community manager) among a given group of one or more buyers, suppliers and financial institutions, when the buyer uploads the A/P obligation data into the SCF system, each discrete A/P obligation becomes an irrevocable payment obligation on behalf of the buyer for the benefit of the supplier, as is described in greater detail below. The amount of the irrevocable obligation is the amount of the A/P obligation, and the irrevocable obligation's maturity date is the A/P obligation's due date.

At any time, a supplier can log into the SCF system and view the amount and exact maturity date of each such irrevocable payment obligation arising from an A/P obligation posted by one of its buyers. The SCF system then allows the supplier, optionally, to propose the substitution of one or more negotiable instruments for the payment obligations and negotiate the negotiable instruments, or to sell the payment obligations without substitution by a negotiable instrument, prior to their maturity date(s) at a discounted value.

Suppliers may choose to receive cash for any (or all) of these negotiable instruments or payment obligations at any point up until a configurable cut-off date just prior to the original maturity date of each payment obligation. Pursuant to an agreement between the supplier and the SCF system entity, proceeds from negotiation of an instrument or sale of payment obligations corresponding to supplier accounts receivable satisfy those accounts receivable, thereby resolving the external accounts receivable/accounts payable obligation. Suppliers, thus, have the option of obtaining cash and closing selected accounts receivable from particular buyers rather than merely seeking loans based on individual or bundled accounts receivable through a factoring transaction.

Within the SCF system, payment may be reduced to as little as forty-eight hours from current terms, which can be as long as sixty days or more. In preferred embodiments, the SCF system is an automated, secure service that may be delivered by a virtual private network (VPN), eliminating manual and labor intensive processes. Similarly, in another embodiment, the SCF system communicates with remote parties via secure sockets layer (SSL) encryption protocol embedded in the parties' Internet web browsers. While either a VPN or an SSL communication system could be used, both encompassed by the present disclosure, an SSL communication allows the parties to avoid the need for the remote parties to accept local software from the SCF system and can be preferred where such local software is not desired.

The present SCF system enables buyers to manage payment terms while simultaneously allowing suppliers to close corresponding accounts receivable in return for early payment at low financing rates that have been pre-established by a financial institution.

The SCF system provides suppliers with transaction visibility and payment certainty around buyer-approved receivables, reducing the amount of cash tied up in the order-to-cash cycle. By receiving payments on demand, suppliers can reduce costs and eliminate the need to offer early payment discounts to buyers. Because the early payment received by suppliers from financial institutions through use of the SCF system is not a loan, the early payment settles the invoice without incurring debt on the supplier's balance sheet.

The following provides a logical view of the SCF system by detailing the process flow and describing each participant's role in this process. FIG. 1A describes the parties, components, processes, and information flow within a single community within an SCF system 10.

Preferably, SCF system 10 is provided as a hosted computer system. Normally, no software needs to be installed on the computer system of any participating buyer 106, supplier 108, or financial institution 110. Preferably, for security purposes, all electronic communications to and from the SCF system 10 use encrypted transmissions over the public Internet, in conventional manner. It should be noted that SCF system 10 enables cross-border transactions without the use of letters of credit.

SCF system 10 provides services to groups of entities involved in the funding transaction, each group known as a customer community or community. A typical customer community comprises a single large buyer 106 of goods and services (and possibly its affiliated companies (i.e., multiple related buyers); collectively, "buyer"), the suppliers 108 to that buyer 106 ("suppliers"), and financial institutions 110 who may elect to acquire the payment obligations of the buyer 106 to suppliers 108 ("FIs" or "financial institutions"). A customer community is a group of buyers, suppliers and financial institutions that effect transactions via system 10 that are managed by, and that are based on agreements executed with, a given community manager 120. A single community manager may manage multiple customer communities, but a given customer community is managed by a single community manager (even where the community manager is embodied by more than one entity). The community manager organizes the various parties into communities in its discretion. Typically, as noted above, a community will have a single buyer or group of related buyers, e.g. common subsidiaries, but the community manager may assign multiple, unrelated buyers (in the present embodiment, via the service provider, who sets up buyers) to a community if it chooses. A community manager has access to all data in its community, and may therefore easily replicate data as needed. The other parties, i.e. the buyers, suppliers, and financial institutions, do not have privileges or functions on a community basis.

A buyer program is a set of rules or parameters that govern trades. A buyer program defines, for example, currency, time zone, and definition of holidays. A buyer program has only one buyer. All trades made within a buyer program are made pursuant to the rules of that buyer program.

As more fully discussed hereinafter, a community manager 120 (FIG. 1A), or a system service provider or operator 20 where the service provider functions both as the service provider and the community manager, for a specific community, enters into the agreements with buyer 106, each supplier 108, and each financial institution 110, and the supplier and financial institution enter an agreement between themselves, that govern transactions effected via system 10. In the presently-described embodiments, the service provider maintains, operates, and hosts the computers and database systems described herein, making sure that the physical equipment operates properly and that data is transferred and stored successfully. The community manager is responsible, for a given customer community, for operating system 10 from a functional standpoint, interfacing via a system user interface with the computer program that runs on the computer system to set parameters and performing the functions described herein, at an administrative level, and entering into and managing the contracts among the parties in the customer community. A single entity may function as the system administrator and one or more community managers, or different entities may perform these functions.

Each of these agreements may be defined between the community manager and one other party or between the supplier and the financial institution, such that there are no three-way or four-way agreements, but in the presently-described embodiments the community manager/supplier agreement and the supplier/financial institution agreement are consolidated into a single agreement, the on-line supply chain finance agreement ("OSA").

The following is a list of participants in the SCF system 10 and a general description of their roles:

1. Community manager 120 is responsible for organizing participants for trading on system 10 and for defining the parameters under which those participants trade. As described below, trades occur within buyer programs, one or more of which are defined for a given community. For each buyer program, the community manager may define:

a. Restricted auto-advance rules—i.e. rules (applicable to all suppliers on a buyer program) governing automatic trading of obligations loaded to system 10 by buyers.

b. Financial institutions pricing profiles—i.e. pricing rules applicable to trades conducted through the buyer program by a given financial institution. This is typically defined as a pair of interest rates applied against the total value of an obligation offered for sale by a supplier, resulting in a fee to the financial institution. Financial institutions may also add FI pricing profiles and may edit pricing profiles applicable to them.

c. Supplier transaction fee—an optional fee, applied as an addition to the financial institution fee (typically as a flat fee per transaction), resulting in a fee shared between the service provider and the community manager.

d. Financial institution transaction fee—an optional fee applied as an addition to the financial institution fee (typically as a flat fee per transaction) resulting in a fee shared between the service provider and the community manager.

e. Minimum and maximum cut off dates. The minimum cutoff date is a minimum number of days before an obligation's maturity date that system 10 will allow the obligation to be traded. Beyond this number of days prior to the obligation's maturity date, the obligation may not be traded. The maximum cutoff date is the maximum number of days prior to an obligation's maturity date that an obligation is eligible to be traded.

f. Reserves—a minimum value of obligations uploaded from a given buyer that must be present before obligations from the buyer may be traded. In general, system 10 requires the reserve amount remain untraded, and so the system does not allow trades of obligations from the buyer where such trades would cause the total value of untraded obligations from that buyer to drop below the reserve amount.

g. Buyer payment (maturing clearing) account number—a number for an account from which payments from the buyer are made, for the making of which the community manager issues payment instructions.

h. Community manager (margin) account number—a number for an account to which community manager fees are directed.

i. Minimum and maximum sell offer amounts—limits set by the community manager generally upon agreement with financial institutions on the buyer program. These limits, if enacted, place high and low boundaries on the amount of any given trade.

j. Financial institutions. The community manager may assign to a buyer program any financial institutions present in the customer community to which the buyer program is assigned. A buyer may also be a financial institution, and in that event an entity may be both a buyer and a financial institution.

k. Pricing profile assignments. The community manager assigns pricing profiles to financial institutions, so that the assigned pricing profile is applied to trades involving that financial institution.

l. Financial institution sequencing rules. If a buyer program has multiple financial institutions, the community manager may define rules governing how financial institutions are selected for trades under the buyer program, as described below.

m. Suppliers. The community manager may set up suppliers and assign to a buyer program any suppliers present in the customer community to which the buyer program is assigned.

2. Service provider 20 is responsible for maintaining and operating the SCF system computers and databases, as well as maintaining computer codes that drive the SCF system. The service provider validates all bank accounts entered by the parties and provides system user password support and maintenance. For a given buyer program, the service provider defines:

a. Service provider pricing schedules—i.e. pricing rules applicable to trades conducted through the buyer program. This is typically defined as a percentage applied against the total value of an obligation offered for sale by a supplier, resulting in a fee to the service provider.

b. Payment processing rules. For each community the service provider defines a method (e.g. ACH or EDI) by which payments as described herein are effected.

c. Country, currency and time zone. These parameters define, for example, the currency in which trades in the buyer program are defined and the time zone that governs timing triggers.

d. Buy offer window open and close—times of day between which buy offers can be accepted.

e. Buyers. The service provider sets up buyers and may assign a buyer program to any buyer present in the customer community.

f. Initial community set up.

g. Suppliers. The service provider, in addition to the community manager, may set up suppliers and may assign suppliers to buyer programs.

h. Buyer groups. The service provider may assign multiple buyers in a buyer program to a buyer group, enabling reporting on a group basis.

i. Bank profile data.

j. Financial Institutions. The service provider sets up financial institutions in the system and assigns them to communities.

3. Buyers: Buyers 106 electronically submit A/P obligations into SCF system 10. Buyers 106 also provide bank account information and other company information as required to enable settlement of obligations to the obligee (FI or supplier) of obligations defined through system 10 at the maturity date.

4. Suppliers: Suppliers 108 submit offers to sell system-defined obligations originating from buyers 106 as trades to obtain financing, e.g. through the negotiation of one or more negotiable instruments substituted for each given obligation or the sale of the obligations themselves. Suppliers 106 receive the obligation value when entering into a trade, discounted by applicable fees. Suppliers 106 may submit obligations for trade by bundling obligations into sell offers, which are then presented to financial institutions 110 as buy offers.

5. Financial institutions: Financial institutions 110 provide the funding liquidity to the buyer program(s) to which they belong. Financial institutions are system 10 users that accept sell offers from suppliers 108. When a financial institution 110 accepts a sell offer, it is contractually obligated to pay the supplier 108 the trade value as stated on the trade offer at time of acceptance, pursuant to the agreement between the financial institution and the community manager. If a trade occurs within a buyer program set up for negotiable instrument trades, then upon acceptance of a sell offer, system 10 creates one or more negotiable instruments having a collective value preferably the same as the collective value of the payment obligation(s) in the sell offer and having respective maturity dates preferably the same as the respective maturity dates of the payment obligation(s) in the sell offer. In one embodiment, the negotiable instruments comprise time drafts, with the buyer as drawer, drawn on a bank account owned or controlled by the buyer (i.e. funds may be paid from the account on the buyer's behalf at the buyer's instruction or at the instruction of an entity given appropriate authority by the buyer), and with the supplier as obligee. Supplier 10 negotiates the draft to the financial institution by electronically indorsing the draft over to the financial institution, either directly or pursuant to a power of attorney granted to the community manager. The SCF system obligations, now embodied by the negotiable instrument (s), will be paid to the financial institution 110 by buyers 106 on their maturity dates at the full obligation value. If the buyer program is set up for trades of the payment obligations and associated trade receivables, then upon acceptance of the sell offer, the system notes the trade, which occurs in accordance with the contracts. Again, however, the SCF obligations will be paid to the financial institution 110 by buyers 106 on the maturity dates at the full obligation value.

6. Banks: Banks 18 are the monetary institutions that perform the actual transfer of funds and notification of funds transfer to SCF system 10. Once notified, system 10 tracks all payments and performs all notifications to the respective system 10 parties, including maintenance of historical information.

Contracts

SCF system 10 is implemented using three basic agreements: the Customer Managed Service Agreement ("CMSA"), the FI Agreement, and the On-Line Supplier Agreement ("OSA"). The parties to these agreements are shown in FIG. 1B. Community manager 120 enters into agreements with buyer 106 (for each buyer, a CMSA), each supplier 108 (for each individual supplier, and a financial institution agreeing to fund obligations between the buyer and that supplier, an OSA, and with each financial institution 110 (for each individual financial institution, an FI Agreement). A more detailed discussion of the contracts is provided below.

The CMSA is an agreement between the buyer and the community manager. The agreement (in an embodiment in which trades are effected with time drafts) has the following general terms relevant to the present discussion:

A "payment obligation" is a buyer's obligation to pay for goods or services relating to a particular invoice, the amount and the currency of which were submitted by the buyer to the community manager via the SCF system. A payment obligation includes all obligations to pay associated with the provision of such goods or services, including the right to receive all taxes, shipping, interests, penalties, and other charges attributable to such payment obligation, free of any adverse claim other than credit memos entered into the SCF system prior to a supplier submitting a sell offer corresponding to such payment obligation to the SCF system.

A "draft" is an electronic draft or a paper draft, as applicable, based upon the drafts program elected by the buyer when setting up a program in the SCF system, that is an order to pay at a definite time as set forth in Section 3-104 of the UCC.

An "electronic draft" is a negotiable instrument within the meanings of Articles 3 and 4 of the UCC, that is issued in electronic form and maintained by the community manager and/or SCF system as the designated custodian thereof, and for which there is one unique, identifiable and unalterable version that cannot be copied except in a form that is readily identifiable as a copy, all in compliance with the Electronic Signatures and Records Act, Article III of the New York State Technology Law.

A "paper draft" is a negotiable instrument within the meaning of Articles 3 and 4 of the UCC.

To "sign" is to affix any symbol executed or adopted with the present intention to authenticate a paper draft, or to affix any electronic signature to an electronic draft, as applicable, based upon the drafts program elected by buyer when setting up a program in the SCF system, whether as the issuer thereof and obligor thereunder, or as the obligee and indorser thereof.

The buyer agrees that, by submitting a payment obligation to the SCF system, the buyer has an irrevocable legal, valid and binding obligation to pay (A) with respect to any time draft issued to evidence such payment obligation, the face amount of such draft on the maturity date, or (B) with respect to all payment obligations for which a draft has not been issued, the certified amount on the maturity date. The buyer's obligation, as set forth in the previous sentence is not subject to any adverse claim. By way of explanation, the gross amount of any payment obligation may be reduced from time to time by buyer's submission of credit memos up until the time (a) a supplier submits a sell offer with respect to such payment obligation into the SCF system or (b) if a supplier does not submit a sell offer with respect to such payment obligation, the maturity date of such payment obligation. Should buyer have any adverse claims of any nature whatsoever related to the provision of goods and services by the applicable supplier to the buyer associated with a payment obligation, including claims related to shipment, delivery, damage, defect, performance, failure to meet specifications, or failure to meet expressed or implied warranties, the buyer may submit a credit memo to the SCF system. If a supplier has submitted a sell offer with respect to such payment obligation prior to submission by the buyer of the applicable credit memo or no sell offer has been submitted and such payment obligation has reached its maturity date, such credit memo will be applied to other existing or future payment obligations of the buyer to the applicable supplier for which such supplier has not made a sell offer or which have not otherwise reached their respective maturity dates.

The buyer covenants to provide to a community manager buyer payment account information and other information as is requested by the community manager to enable settlement via electronic transfer of payment obligations to the supplier on the maturity date, or drafts to a financial institution, on the draft maturity date. Buyer will execute and deliver such other and further documents and instruments as necessary or reasonably required for the community manager to settle, via electronic transfer, payment obligations and drafts. The buyer agrees and authorizes the community manger to electronically transfer funds from a customer payment account, with respect to each draft on the applicable draft maturity date, to the financial institution purchasing the draft or, with respect to each payment obligation outstanding on its maturity date, to the applicable supplier. The buyer agrees to maintain and fund the customer payment account so long as any payment obligations or drafts are outstanding.

In accordance with the applicable OSA, a supplier may, at such supplier's sole option, make an offer to sell all of such supplier's right, title and interest in and to a draft to be issued by the buyer (pursuant to the CMSA) in the amount of one or more payment obligations (but in no event a portion of any such payment obligation) by submitting an offer to the SCF system. Such sell offer will be irrevocable until the earliest to occur of (A) the purchase of such draft by a purchaser, (B) the draft maturity date applicable to such sell offer, or (C) the draft offer termination date applicable to such sell offer. In accordance with the applicable OSA, if such sell offer relates to multiple payment obligations, such sell offer will specify the aggregate amount of all payment obligations corresponding to such sell offer. In addition, a supplier will not be entitled to submit a sell offer with respect to multiple payment obligations unless the maturity dates of all such payment obligations are the same date.

In accordance with the applicable OSA, upon making of a sell offer, the community manager will create a proposed draft on the SCF system that (A) is in the form shown in FIG. 28A or 28B, as applicable, depending upon the drafts program elected by the buyer, (B) is to the order of such supplier, (C) is equal in amount to the Certified Amount of such payment obligations, (D) is denominated in the currency of the relevant payment obligations (all of which will be the same currency), provided that such currency can be cleared through a bank located in New York, New York, and (E) has a draft maturity date that is (1) a business day, (2) the same maturity date as such payment obligations and (3) at least three days after the date of such sell offer. In accordance with the applicable OSA, at the time such proposed draft is created, it will be signed (electronically, with respect to an electronic draft) either by the applicable supplier or by the community manger on behalf of such supplier, or signed (with respect to a paper draft) by the community manager on behalf of such supplier, each pursuant to a power of attorney, for the purpose of indorsing for negotiation such proposed draft to a purchaser in the event that the corresponding sell offer is accepted by the purchaser.

Buyer agrees that if a sell offer is accepted by a financial institution, then upon such acceptance, buyer authorizes the community manager to sign and issue the proposed draft, which is created in accordance with the applicable OSA, pursuant to a power of attorney, ordering buyer's bank to pay on the applicable draft maturity date and date the proposed draft the date on which the financial institution accepts the sell offer, or if such date is not a business day, the next business day thereafter. The community manager agrees to sign and issue the proposed draft and date the draft with such date, such that the proposed draft will be a draft that is issued by the buyer as the obligor thereunder on the draft purchase date.

In accordance with the applicable OSA, upon issuance of the draft, the applicable supplier's signature (whether electronically signed on an electronic draft by the supplier or by the community manager on behalf of the supplier, or signed on a paper draft by the community manager on the supplier's behalf pursuant to a power of attorney) will, in fact, be an indorsement to negotiate the draft by the supplier to the order of the financial institution that accepted the sell offer.

All payment obligations, drafts, payments, debits, and credits made by buyers, suppliers and financial institutions to the SCF system with respect to any payment obligation or any draft, including payments on any invoice and the amounts reflected on credit memos, will be made in the currency of the relevant payment obligation, provided that such currency can be cleared through a bank located in New York, New York The parties consent to the communication and delivery of offers and acceptances and matters related thereto (including the creation of binding contracts, as well as the submission of each sell offer, the acceptance thereof, electronic signing thereof, the issuance, indorsement, and negotiation of drafts in electronic form and by electronic means, and all other communications related thereto) through the SCF system even though such actions are by electronic means rather than in writing on paper. The parties agree that such actions will be valid and binding obligations of the parties, as if such actions had been taken in writing on paper. The parties acknowledge and agree that any communications from or actions of a party using such party's identifications and passwords, including the application of such party's electronic signature, will be binding on the party. Each party waives any claim or defense that any such offers, acceptances, issuances, indorsements, negotiations, contracts, and other communications and actions are not binding or enforceable or do not have their intended effect as a result of their being communicated electronically rather than in writing.

The buyer acknowledges and agrees that (i) each draft created pursuant to agreements related to the SCF system and issued by the buyer pursuant to the CMSA is subject to and governed by the UCC, (ii) each electronic draft is intended to be an electronic version of a negotiable instrument within the meaning of Article 3 of the UCC, which is unique, identifiable and unalterable within the meaning of § 307(2) of the New York Electronic Records and Signatures Act, (iii) upon its issuance, such draft shall evidence buyer's obligation to pay for the goods and services that gave rise to the payment obligations evidenced by such draft, and buyer's sole obligation thereafter with respect to the payment for such goods and services will be to pay such draft in accordance with its terms, and (iv) each draft that is negotiated to a financial institution is purchased free of any right of setoff or recoupment or adverse claim. To the extent that the terms of any draft are inconsistent with the terms of the corresponding payment obligations, the terms of the draft will control.

Buyer appoints the community manager as its agent and true and lawful attorney-in-fact, to act in the buyer's name, place and stead, solely for the purpose of executing and signing buyer's name as the issuer of drafts, the form of which are created pursuant to the applicable OSA, and issued pursuant to the CMSA, and grants to the community manager all power necessary for the community manager to sign each draft on behalf of the buyer and date each draft the draft purchase date applicable to the draft, for the purpose of issuing such draft on the draft purchase date and binding buyer as the issuer thereof and obligor under such draft. The community manager is authorized to sign each draft using buyer's name, or on behalf of buyer, without stating the name of the community manager or its capacity under the CMSA. This appointment and grant is deemed coupled with an interest, and may be revoked only by written notice of termination of the CMSA.

The Financial Institution Agreement (in an embodiment in which trades are effected with time drafts) is between the financial institution and the community manager. Its relevant terms include the following:

A "payment obligation" is an obligation of a buyer to pay for goods or services relating to a particular invoice, the amount and currency of which have been submitted by the buyer to the community manager, for example through the Supply Chain Finance system (SCF) system whether or not earned by performance. A payment obligation includes all obligations to pay associated with the provision of such goods or services, including the right to receive all taxes, shipping, interest, penalties, and other charges attributable to the payment obligation, free of any adverse claim other than credit memos entered into the SCF system prior to supplier's submitting a sell offer corresponding to the payment obligation to the SCF system.

A "draft" is an electronic draft or a paper draft, as applicable, based upon the drafts program elected by the financial institution when setting up a program in the SCF system, that is an order to pay at a definite time as set forth in Section 3-104 of the UCC.

An "electronic draft" is a negotiable instrument within the meanings of Articles 3 and 4 of the UCC, that is issued in electronic form and maintained by the community manager and/or SCF system as the designated custodian thereof, and for which there is one unique, identifiable and unalterable version that cannot be copied except in a form that is readily identifiable as a copy, all in compliance with the Electronic Signatures and Records Act, Article III of the New York State Technology Law.

A "paper draft" is a negotiable instrument within the meaning of Articles 3 and 4 of the UCC.

To "sign" is to affix any symbol executed or adopted with the present intention to authenticate a paper draft, or to affix any electronic signature to an electronic draft, as applicable, based upon the drafts program elected by buyer when setting up a program in the SCF system, whether as the issuer thereof and obligor thereunder, or as the obligee and indorser thereof In accordance with the applicable OSA, a supplier may designate the financial institution as a financial institution that may purchase drafts owing to the supplier under an OSA entered into amount the supplier, the community manager, and the financial institution. In addition, the financial institution acknowledges and agrees that the financial institution may only participate in a customer community so long as the applicable buyer agrees. Upon receipt of the fully executed OSA amount a supplier, the community manager and the financial institution, and receipt of the notice of satisfied conditions (a notice by the financial institution to the community manager and a supplier that the supplier has fulfilled requirements of the financial institution to join the applicable customer community) from the financial institution, the community manager will designate the financial institution as a person that can purchase drafts owing to the supplier on the SCF system, in accordance with this agreement and the applicable OSA. The financial institution further acknowledges and agrees that transmission of the notice of satisfied conditions to the community manager constitutes the financial institution's confirmation that the terms of this agreement apply to the financial institution's purchases of drafts from the supplier on the SCF system.

In accordance with the applicable CMSA, a buyer may, from time to time, submit one or more payment obligations to the SCF system. Upon such submittal and the payment obligation being made available for viewing by the applicable supplier in the SCF system, in accordance with the applicable OSA, such supplier may, at the supplier's sole option, make an offer to sell to the financial institution all of the such supplier's right, title and interest in and to a draft to be issued by such buyer in the amount of one or more payment obligations (but in no event a portion of any such payment obligation), by submitting an offer to the SCF system. In accordance with the applicable OSA, such sell offer will be irrevocable until the earliest to occur of (A) the purchase of such draft by a financial institution, (B) the draft maturity date applicable to such draft, or (C) the draft offer termination date applicable to such sell offer. In accordance with the applicable OSA, if such sell offer relates to multiple payment obligations, such sell offer will specify the aggregate amount of all payment obligations corresponding to the sell offer. In addition, a supplier will not be entitled to submit a sell offer with respect to multiple payment obligations unless the maturity dates of all such payment obligations are the same date.

In accordance with the applicable OSA, upon the making of a sell offer, the community manager will create a proposed draft on the SCF system that (i) is in the form of FIG. 28A or 28B, as applicable, depending upon the drafts program elected by the financial institution, which form shall also be attached as an exhibit to the OSA; (ii) is to the order of the applicable supplier; (iii) is equal in amount to the Certified Amount of the relevant payment obligations as described in the Financial Institution Agreement; (iv) is denominated in the currency of the relevant payment obligations (all of which will be in the same currency), provided, that such currency can be cleared through a bank located in New York, New York; and (v) has a draft maturity date that is (a) a business day, (b) the same maturity date as such payment obligations, and (c) at least three days after the date of such sell offer. In accordance with the applicable OSA, at the time such proposed draft is created, it will be signed (electronically, with respect to an electronic draft) either by the applicable supplier or the by the community manager on behalf of such supplier, or signed (with respect to a paper draft) by the community manager on behalf of such supplier, each pursuant to a power of attorney, for the purpose of indorsing for negotiation such proposed draft to the financial institution.

The financial institution acknowledges that if a customer community includes more than one financial institution, the community manager permits a sell offer to be viewed by only one financial institution at a time, and each sell offer may be directed only to a single financial institution.

Once a supplier makes a sell offer, and such sell offer is made available for viewing by the financial institution on the SCF system and is directed to the financial institution, the financial institution may, at its sole option, accept such sell offer and elect to purchase, via negotiation, the draft (upon it being signed (electronically signed in the case of an electronic draft) and issued by the community manager on behalf of the applicable buyer), without recourse to supplier except as specifically set forth in the applicable OSA. The financial institution will have no obligation to purchase, via negotiation, any draft unless it confirms its agreement thereto by submitting an acceptance of the sell offer to the community manager via the SCF system.

In accordance with the applicable CMSA, upon acceptance of a sell offer by the financial institution, the community manager will (i) sign and issue the draft on behalf of the applicable buyer, pursuant to a power of attorney, ordering buyer's bank to pay on the applicable draft maturity date, and (ii) date the draft the draft purchase date. In accordance with the applicable CMSA, upon signing the draft, the community manager will issue the draft on behalf of such buyer pursuant to a power of attorney. In accordance with the applicable OSA, upon issuance of such draft, the applicable supplier's signature (whether electronically signed on an electronic draft by such supplier or by the community manager on behalf of such supplier, and/or printed on a paper draft by the community manager on behalf of such supplier, each pursuant to a power of attorney) will, in fact, be an indorsement to negotiate such draft by such supplier to the order of the financial institution. Financial institution further acknowledges that the community manager will sign (electronically or physically) drafts on the applicable buyer's and supplier's behalf pursuant to a power of attorney, solely upon instructions provided by such buyer or such supplier, as applicable, and the financial institution consents to the community manager acting in this capacity as agent and attorney-in-fact for both the buyer and the supplier. The financial institution hereby waives any claims that actions taken by the community manager on both the buyer's and supplier's behalf pursuant to the powers of attorney granted in the CMSA and OSA, as applicable, are voidable under any legal theory, including but not limited to, dual agency theory.

In accordance with the applicable OSA, the price for the purchase of a draft is the Net FI Amount (the face amount of any draft less the financial institution fee). On the draft purchase date applicable to such draft, the financial institution will pay into the financial institution payment account the Net FI Amount, and the community Manager, on behalf of such supplier (pursuant to a power of attorney) will negotiate the related draft(s) to the financial institution. Notwithstanding the foregoing, if the acceptance of a sell offer by the financial institution and the depositing of the applicable Net FI Amount by the financial institution occurs after the funding program time (a relevant cut-off time established pursuant to documents establishing parameters and rules for a particular customer community for business transactions to occur on a particular business day) on the next draft purchase date, the Net FI Amount will reflect the amount such Net FI Amount would be on the next business day.

If an acceptance of a sell offer and deposit of the Net FI Amount occurs on or before the funding program time on the applicable draft purchase date, the community manager will issue electronic payment instructions (i) to transfer the net supplier amount (the face amount of any draft, less the sum of the FI fee and the community manager fee) from the FI payment account (a designated bank account established and maintained by financial institution in its own name, which is used for the deposit of funds payable by financial institution, and for which the community manager has been notified of the bank and account number) to the supplier receipt account (a bank account established and maintained by a supplier in its own name, which is used for the receipt of funds payable to supplier), and (ii) to transfer the community manager fees from the FI payment account to a community manager, both on that same business day. If an acceptance of a sell offer and deposit of the Net FI Amount occurs after the funding program time on the applicable draft purchase date, the Net FI Amount will reflect the amount such Net FI Amount would be on the next business day, and the community manager will issue electronic payment instructions on the next business day to transfer the net supplier from the FI payment account to the supplier receipt account, with the funds to be credited to the supplier receipt account on the next following business day. Notwithstanding the foregoing, in the event that the bank that maintains either the FI payment account or the supplier receipt account is closed on such business day, then the community manager may issue electronic payment instructions on the next business day on which both such banks are open.

If the financial institution has purchased a draft, on the draft maturity date for such draft and in accordance with this agreement, the OSA, and/or the CMSA, the community manager will issue electronic payment instructions to pay the face amount of the draft from the buyer payment account (a designated bank account established and maintained by a buyer in its own name, which is used for paying Certified Amounts on their respective maturity dates and paying the face amount of drafts on their respective draft maturity dates) to the FI receipt account (a designated bank account established and maintained by the financial institution in its own name, which is used for the receipt of funds payable to the financial institution, and for which the community manager has been notified of the bank and account number) on the draft maturity date.

The community manager acknowledges that the financial institution is not obligated to accept any sell offer, and the decision by the financial institution to accept or decline any sell offer is in the financial institution's sole discretion. The financial institution acknowledges that no supplier is obligated to submit any sell offer to the financial institution, and the decision of such supplier to submit any sell offer is in the supplier's sole discretion.

The financial institution covenants to provide the community manager bank account information and other information as is required to facilitate the payment via electronic funds transfer of each draft purchase price on the applicable draft purchase date and the face amount of each draft on the applicable draft maturity date. The financial institution will execute and deliver such other and further documents and instruments necessary or reasonably required for the community manager to settle via electronic funds transfer the purchase of drafts from suppliers, the receipt of payment from buyers, and the payment of any community manager fees by suppliers. The financial institution agrees and authorizes the community manager to issue electronic payment instructions to electronically transfer funds (i) from the FI payment account and (ii) into the FI receipt account, in each case in accordance with the Financial Institution's Agreement.

All payment obligations, drafts, payments, debits, and credits made by buyers, suppliers and financial institutions pursuant to the SCF system with respect to any payment obligations, including payments on any invoice or any draft, amounts reflected on credit memos, and payments into the FI payment account, will be made in the currency of the relevant payment obligation, provided that such currency can be cleared through a bank located in New York, New York The parties consent to the communication and delivery of offers and acceptances, and matters related thereto (including the creation of binding contracts, as well as the submission of sell offers, the acceptance thereof, electronic signing thereof, the issuance, indorsement and negotiation of electronic drafts in electronic form and by electronic means, and all other communications related thereto) through the SCF system, even though such actions are by electronic means rather than in writing on paper. The parties agree that such actions will be valid and binding obligations of the parties, as if such actions had been taken in writing on paper. The parties acknowledge and agree that any communications from or actions of a party using such party's identifications and passwords, including the application of such party's electronic signature, will be binding on such party. Each party waives any claim or defense that any such offers, acceptances, issuances, indorsements, negotiations, contracts, and other communications and actions are not binding or enforceable or do not have their intended effect as a result of their being communicated electronically rather than in writing. The financial institution will not allow any individual to access the SCF system using a user identification and password unless that individual is the designated employee for whom the SCF system created that user identification and password.

The OSA is among the community manager, supplier, and financial institution. In an embodiment in which trades are effected with time drafts, its relevant provisions include:

A "draft" is an electronic or paper draft, as applicable, based upon the drafts program to which the supplier has been assigned, that is an order to pay at a definite time as set forth in Section 3-104 of the UCC.

An "electronic draft" is a negotiable instrument within the meanings of Articles 3 and 4 of the UCC, that is issued in electronic form and maintained by the community manager and/or SCF system as the designated custodian thereof, and for which there is one unique, identifiable and unalterable version that cannot be copied except in a form that is readily identifiable as a copy, all in compliance with the Electronic Signatures and Records Act, Article III of the New York State Technology Law.

A "paper draft" is a negotiable instrument within the meaning of Articles 3 and 4 of the UCC.

To "sign" is to affix any symbol executed or adopted with the present intention to authenticate a paper draft, or to affix an electronic signature to an electronic draft, as applicable, based upon the draft program to which the supplier has been assigned.

In accordance with the applicable CMSA, a buyer may, from time to time, submit one or more payment obligations to the SCF system. Upon such submittal and the payment obligation being made available for viewing by the supplier in the SCF system, the supplier may, at the supplier's sole option, make a sell offer to the financial institution to sell one or more payment obligations (but in no event a portion of any such payment obligation), by either manually submitting an offer to the SCF system or by electing for the SCF system to submit auto-advance sell offers. Such sell offer will be irrevocable until the earliest to occur of (a) the purchase of such draft by the financial institution, (b) the draft maturity date applicable to such sell offer, or (c) the draft offer termination date applicable to such draft offer. The draft offer termination date is a date set in the SCF system for a customer community upon which the sell offer will automatically terminate. Supplier may submit multiple sell offers at any time, but supplier will not be entitled to submit a sell offer with respect to multiple payment obligations unless the maturity dates of all such payment obligations of the same date. If such sell offer relates to multiple payment obligations, such sell offer will specify the aggregate amount of all payment obligations corresponding to the sell offer.

Upon the making of a sell offer, the community manager will create a proposed draft on the SCF system that (a) is in the form of FIG. 28A or 28B, as applicable, based upon the draft program to which supplier has been assigned, (b) is to the order of the applicable supplier, (c) is equal in amount to the Certified Amount of the relevant payment obligations, (d) is denominated in the currency of the relevant payment obligations (all of which will be in the same currency) provided that such currency can be cleared through a bank located in New York, New York, and (e) has a draft maturity date that is (i) a business day, (ii) the same maturity date as such payment obligations and (iii) at least three days after the date of such sell offer. At the time such proposed draft is created, it will be signed (electronically signed with respect to an electronic draft) either by supplier or by the community manager on behalf of supplier, or signed (with respect to a paper draft by the community manager on behalf of such supplier electronically on a draft record and/or by printing the requisite signature on the paper draft, each pursuant to a power of attorney, for the purpose of indorsing for negotiation such proposed draft to the financial institution in the event that the corresponding sell offer is accepted by the financial institution. The supplier acknowledges and agrees that unless such proposed draft is signed by the community manager on the applicable buyer's behalf pursuant to a power of attorney, such proposed draft will not constitute an enforceable instrument.

Once supplier makes a sell offer, and such sell offer is made available for viewing by the financial institution on the SCF system and directed to the financial institution, the financial institution may, at its sole option, accept such sell offer and elect to purchase, via negotiation, the draft (upon it being signed and issued by the community manager on behalf of the applicable buyer), without recourse to the supplier except as specifically set forth herein. The financial institution will have no obligation to purchase any draft unless it confirms its agreement thereto by submitting an acceptance of the sell offer to the SCF system.

If supplier has set option parameters on the SCF system so that the supplier manually submits a sell offer, supplier will sign the proposed draft at the time it submits the sell offer to the SCF system. In the case of an auto-advance sell offer, the community manager will sign (electronically sign with respect to an electronic draft) the proposed draft, created in accordance with this agreement on behalf of the supplier as authorized under the OSA. The supplier acknowledges and agrees that the supplier's signature (whether electronically signed on an electronic draft by supplier or by the community manager, or signed on a paper draft by the community manager on behalf of such supplier electronically on a draft record and/or by printing the requisite signature on a paper draft, each pursuant to the power of attorney as authorized by the OSA) will, in fact, constitute supplier's indorsement to negotiate such draft by the supplier to the order of the financial institution in the event that the financial institution accepts the sell offer and the draft is signed (electronically and/or physically) by the community manager on behalf of the applicable buyer.

In accordance with the applicable CMSA, upon an acceptance of a draft offer by a purchaser, the community manager will (a) sign and issue the draft on behalf of the buyer, pursuant to a power of attorney, ordering the buyer's bank to pay on the applicable draft maturity date and (b) date the draft with the draft purchase date. In accordance with the applicable CMSA, upon the signing of the draft, the community manager will issue the draft on behalf of such buyer pursuant to power of attorney. Upon the issuance of such draft, the supplier's signature (whether electronically signed on an electronic draft by supplier or by the community manager, or signed on a paper draft by the community manager, on behalf of the supplier electronically on a draft record and/or by printing the requisite signature on a paper draft, each pursuant to a power of attorney) will, in fact, be an indorsement to negotiate the draft by supplier to the order of the financial institution.

The price for the purchase of a draft will be the Net FI Amount, provided, however, in the event that the draft offer consists of more than one payment obligation having the same maturity date, the Net FI Amount will be the aggregate of all Net FI Amounts for such bundled payment obligations. On the draft purchase date applicable to such draft, the financial institution will pay into the FI payment account the Net FI Amount, and the community manager, on behalf of the supplier (pursuant to a power of attorney) will negotiate the related draft to the financial institution. Notwithstanding the foregoing, if the acceptance by the financial institution occurs after the funding program time on the applicable draft purchase date, the Net FI Amount will reflect the amount such Net FI Amount would be on the next business day. In accordance with the Financial Institution Agreement, if (i) an acceptance of a sell offer and deposit of the Net FI Amount occurs on or before the funding program time on the applicable draft purchase date, the community manager will issue electronic payment instructions to transfer the net supplier amount from the FI payment account to the supplier receipt account (a bank account established and maintained by supplier in its own name which is used for the receipt of funds payable to the supplier, and for which the community manager has been notified of the bank and account number) on that same business day, and (ii) if an acceptance of a sell offer and deposit of the Net FI Amount occurs after the funding program time on the applicable draft purchase date, the Net FI Amount will reflect the amount such Net FI Amount would be on the next business day, and the community manager will issue electronic payment instructions to transfer the net supplier amount from the FI payment account to the supplier receipt account on the next business day with the funds to be credited to the supplier receipt account on the next following business day. Notwithstanding the foregoing (and in accordance with the Financial Institution Agreement), in the event that the bank that maintains either the FI payment account of the supplier receipt account is closed on such business day, then the community manager may issue electronic payment instructions on the next business day on which both such banks are open. To the extent the terms of any draft are inconsistent with terms of the corresponding payment obligations, the terms of the draft control. The financial institution may negotiate, sell or otherwise transfer a draft to any person. Notwithstanding anything in this agreement to contrary, the financial institution does not assume and will not be deemed to assume any obligations, undertakings, liabilities or responsibilities of the supplier, all of which will remain with the supplier.

The supplier acknowledges and agrees that (a) upon the buyer's issuance of a draft, such draft will evidence the buyer's obligation to pay for the goods and services that gave rise to the payment obligations evidenced by the draft, and the buyer's sole obligation thereunder with respect to payment of goods and services will be to pay the draft in accordance with its terms, (b) each draft is subject to and governed by the provisions of the UCC, and (c) upon the indorsement and negotiation of the draft to a financial institution by the community manager, on behalf of the supplier (pursuant to a power of attorney)t, supplier will cancel any accounts receivable associated with such payment obligation or draft reflected in its books and records.

If, on the maturity date of any payment obligation, supplier has not made a sell offer with respect to such payment obligation or any sell offer corresponding to such payment obligation has not been accepted by financial institution by the draft offer termination date, then the community manager will issue electronic payment instructions to transfer the certified amount from the applicable buyer payment account to the supplier receipt account. In the event that the bank that maintains either such buyer payment account or supplier receipt account is closed on such business day, then the community manager will issue electronic payment instructions on the next business day on which both such banks are open.

The supplier covenants to provide the community manager bank account information and other information as required to enable the electronic settlement of drafts on the draft purchase date and payment obligations at the maturity date. The supplier will execute and deliver such other and further documents and instruments necessary or reasonably required for the community manager to settle, via electronic funds transfer, drafts, receipt of payments from the buyer, and the payment of any community manager fees. The supplier agrees and authorizes the community manager to electronically transfer funds to the supplier receipt account in accordance with the OSA.

The supplier will pay the community manager the community manager fee for each draft purchased by the financial institution. The supplier authorizes the community manager to issue electronic payment instructions against the applicable FI payment account to pay the community manager fee to the community manager, at the same time that the community manager issues electronic payment instructions to fund the net supplier amount (the face amount of any draft, less the sum of the financial institution fee and the community manager fee) from such FI payment account to the supplier receipt account. The supplier acknowledges that the amount of the FI fees and the community manager fees will not be reflected separately in the information provided to the supplier by the SCF system, but the SCF system will display to the supplier the net supplier amount with respect to each sell offer. In accordance with the financial institution agreement, on the draft purchase date, the community manager will issue electronic payment instructions to pay the community manager fee to the community manager on the same business day as the draft purchase date. Notwithstanding the foregoing, in the event that the bank that maintains the FI payment account is closed on such business day, then the community manager may issue electronic payment instructions on the next business day on which such bank is open. The supplier will be responsible for payment of all taxes imposed by any authority related to the OSA, the provision of goods and services by supplier to any buyer, use of the SCF system, the provision by the community manager of related services, or amounts received by the supplier as a result of the supplier's use of the SCF system, other than taxes relating the income of the community manager, any financial institution or any buyer arising from the transactions contemplated by the OSA, the CMSA, and/or the Financial Institution Agreement, which taxes will be the obligation of the person receiving such income.

If the financial institution has purchased a draft, on the draft maturity date applicable to such draft and in accordance with the OSA and the CMSA, and the Financial Institution Agreement, the community manager will issue electronic payment instructions to pay the certified amount from the buyer payment account to the FI receipt account on that day. Further, the financial institution will mark the original draft in its possession as "paid in full" or will destroy the draft once it receives the relevant Certified Amount.

All payment obligations, drafts, payments, debits, and credits made by suppliers, buyers and financial institutions pursuant to the SCF system with respect to any payment obligation or any draft, including payment on any invoice, amounts reflected on credit memos, and payments to a FI payment account, will be made in the currency of the relevant payment obligation, provided the such currency can be cleared through a bank located in New York, New York The supplier acknowledges and agrees that any buyer may use the SCF system to submit and apply credit memos in accordance with the terms of the OSA and any applicable CMSA, and; (a) if a sell offer has not been entered by the supplier with respect to a payment obligation prior to the date and time the credit memo relating to such payment obligation is submitted to the SCF system, the credit memo amount will be applied to reduce the amount of the certified amount that relates to the goods and services subject to the buyer's claims; or (b) if a sell offer has been entered by a supplier in the SCF system with respect to a payment obligation, and such sell offer has not terminated prior to the date and time the credit memo relating to such payment obligation is submitted to the SCF system, the credit memo amount will not be applied to reduce such certified amount but rather will be applied to reduce the gross amount (the amount of a respective payment obligation originally submitted to the SCF system by a buyer, which amount may include monies for taxes, shipping, and other charges payable with respect to or otherwise applicable thereto, so long as such amount does not change over time) of payment obligations with respect to the supplier that have not yet been offered for sale.

Supplier appoints the community manager as its agent and true and lawful attorney-in-fact, to act in the supplier's name, place and stead, solely for the purpose of executing and signing supplier's name in accordance with the procedures set forth herein, and grants to the community manager all powers necessary for the community manager to sign each proposed draft for the purpose of indorsing such draft to such financial institution in the event that such financial institution purchases the draft. The community manager is authorized to sign each draft using the supplier's name, or on behalf of supplier without stating the name of the community manager or its capacity under the OSA. This appointment and grant is deemed coupled with an interest, and may be revoked only by written notice of termination of the OSA.

Supplier further acknowledges that the community manager will sign drafts on the applicable buyer's behalf pursuant to a power of attorney, solely upon instructions provided by the buyer, and supplier consents to the community manager acting in this capacity as agent and attorney-in-fact for the buyer. Supplier waives any claims that actions taken by the community manager on the buyer's behalf pursuant to the power of attorney granted herein are voidable under legal theory, including but not limited to, dual agency theory.

In another embodiment, the community manager and each supplier enters a respective two-party agreement, rather than the three-way OSA, without the financial institution being a party to the agreement and in which the supplier agrees to present drafts for sale via the SCF system, for purchase by any financial institution that is authorized to purchase drafts on the SCF system. Once a given supplier presents an offer on the SCF system to sell a draft, the SCF system automatically selects the particular financial institution to which to forward the offer, based on criteria for which the parties have agreed, e.g. which financial institution has sufficient capacity to purchase the drafts encompassed by the offer, and in the correct currency, and/or which financial institution can or will accept the offer with the most favorable discount rate. The community manager and financial institution enter agreements governing the terms and conditions under which a financial institution may be selected and may accept such sale offers.

Processes

The processes associated with the SCF system 10 are as follows.

1. Process Payment Obligations a. The processing of obligations 12 typically begins when system 10 receives A/P obligation data for a customer community of SCF system 10. The A/P data is received directly from a buyer 106 in an electronic format, preferably from the buyer's accounts payable system. Pursuant to the CMSA, the system's receipt of the A/P obligation data establishes a payment obligation ("PO") having a value equal to the uploaded A/P obligation value and a maturity date equal to the uploaded obligation's maturity date. The contractual obligation is from buyer 106 to pay the payment obligation's full value to the supplier at a defined time (its "maturity date"); i.e., the PO is value and time definite and, in most cases, buyer 106 cannot change either once the PO is established within SCF system 10. Although not necessary for system operation, the transaction among the parties presumes that the PO is associated with the supplier's accounts receivable that correspond to the buyer's account payable, and as noted above, the A/P obligation data may identify supplier invoices that underlie the A/P obligation so that the supplier can reconcile the SCF system payment obligation against its accounts receivable.

b. System 10 matches the PO against a supplier 108. When the service provider sets up the buyer in system 10, system 10 assigns a buyer ID number to the buyer. The buyer, in turn, includes this buyer ID in each A/P obligation it uploads to system 10. Upon receiving an A/P obligation, the system first checks to see if the buyer ID matches a buyer registered with the system. If so, that defines the customer community, since in one preferred embodiment, a buyer can belong to only one customer community. Next, system 10 checks to see if the supplier identified in the uploaded obligation is a supplier registered on system 10 for this community. Suppliers are also assigned ID numbers when the community manager sets up the suppliers in system 10, but buyers also assign suppliers ID numbers and provide those numbers to system 10. As noted herein, a buyer may have multiple buyer programs within a given community, and a supplier may belong to multiple buyer programs. Thus, as it is possible for the same buyer and supplier to trade within multiple buyer programs, the system requires the buyer to assign a different and unique ID number for each supplier and per each buyer program within which the buyer trades with that supplier. For instance, if the buyer trades with the supplier in two buyer programs, the buyer assigns the supplier two ID numbers. The buyer includes the respective supplier ID in the uploaded A/P obligation data for obligations to that supplier, and the combination of the buyer ID, supplier ID and currency allows the system to identify the buyer program to which a given uploaded obligation belongs. If the payment is not matched to a buyer and a supplier, or if a problem exists in the record format or data fields, an exception is created and passed to the community manager and/or buyer 106 for further evaluation.

2. Process Trades

A trade is comprised of one or more payment obligations. A trade begins as a sell offer from the supplier and is presented as a buy offer to a financial institution (for convenience, the present discussion may describe the offer as the "sell" offer, regardless whether from the supplier's or the financial institution's perspective). The purpose of a trade is to transfer from the supplier to the financial institution one or more payment obligations that have future payment dates, or to negotiate from the supplier to the financial institution one or more negotiable instruments that substitute for one or more system payment obligations and that have future payment dates, at a discounted rate to provide the supplier immediate access to funds. A trade is comprised of a sell offer and an acceptance thereof.

a. The processing of trades 14 occurs on a daily basis, for obligations that have been uploaded. SCF system 10 looks to see if supplier 108 has auto-advance criteria established for the buyer 106 associated with the underlying payment obligations. If auto-advance rules are established, a sell offer is created and submitted through SCF system 10 automatically. Otherwise, supplier 108 manually creates a sell offer using the system 10 functionality. Supplier 108 initiates sell offers, which may comprise one or more payment obligations that the supplier is owed by buyer 106. A sell offer may comprise multiple payment obligations with various maturity dates. It is the initial stage of the trade. The sell offer indicates the amount the supplier 108 will receive for the payment obligation, as well as fees and charges associated with the trade. The submission of a sell offer results in the creation of a buy offer which then becomes visible to the associated financial institution.

b. After a sell offer has been created, SCF system 10 distributes the sell offer as a buy offer to the appropriate financial institution(s) 110, as described below, for acceptance based on a method previously selected for that buyer's buyer program (as is described in greater detail hereinafter). When buy offers are created, they have a status of "requested." When the buy offer is accepted by the financial institution, the status changes to "auto-accepted" or "manually-accepted," depending on the method by which acceptance occurs, and, when all drafts on the trade have been paid, the status is changed to "matured." Trade acceptance occurs when the buy offer has been accepted by the financial institution. The acceptance of the buy offer can be manual or an automated process depending upon the auto accept rules and other factors, such as financial institution available/open credit limit.

c. In an embodiment in which trades are based on time drafts, when the supplier makes a sell offer, system 10 creates one or more proposed electronic time drafts corresponding to the payment obligations comprising the accepted sell offer. In the presently described embodiments, the proposed time draft comprises the title portion of a time draft record (described below), which is linked to its corresponding payment obligation(s) by an identification field that links the record to a sell offer record that in turn identifies the payment obligations. As noted above, a sell offer may have a plurality of corresponding payment obligations selected by the supplier. System 10 checks the maturity date of each obligation comprising the sell offer. If all obligations have the same maturity date, then system 10 creates a single proposed electronic time draft having a maturity date equal to the single sell offer maturity date. If the sell offer comprises obligations having multiple different maturity dates, the system creates a separate proposed electronic time draft for each maturity date. In another embodiment, system 10 only allows the supplier to select payment obligations having the same maturity to be part of a given sell offer.

d. Pursuant to the OSA, creation of one or more electronic time drafts based on a buy/sell offer authorizes the community manager, through a power of attorney granted by the supplier to the community manager, to indorse the electronic time draft over to the financial institution as the payee. Indorsement occurs by saving in the draft record in database 452 an identification of a person authorizing the indorsement, along with a date and time stamp identifying when the indorsement occurs. At this point, the proposed draft has not yet been signed by or on behalf of the buyer, and so the draft is not yet a negotiable instrument, and the supplier's indorsement does not yet negotiate the draft to the financial institution.

e(1). When the financial institution accepts the sell offer, then pursuant to a power of attorney granted in the CMSA, the community manager (via SCF system 10) electronically signs the draft(s) corresponding to the payment obligations that comprise the sell offer, on behalf of the buyer. At this point, the drafts become negotiable instruments, and the existing supplier indorsements then negotiate the drafts to the financial institution. Pursuant to the FI Agreement, upon negotiation of the drafts, the electronic records comprising the drafts remain with the community managers as custodian for the financial institution. The amount for each draft is the sum of the values of the obligation(s) having that draft's proposed maturity date. The payee, or obligee, of each accepted draft is the supplier, and the drawer is the buyer who is the obligor under the obligations in the sell offer. The accepted draft identifies the buyer's bank and the account at that bank upon which the draft is drawn. The buyer's CMSA provides the community manager with a power of attorney to sign and thereby create the time draft on behalf of the buyer. The time draft is created in accordance with Section 307(2) of the New York Electronic Records and Signatures Act (NYERSA), and thereby has legal effect as a negotiable instrument, and the drawer's bank account is preferably located in the State of New York, United States. System 10 stores this information in one or more records in the system database in association with a globally unique identifier (GUID) created for that record and a reference identification. The system encrypts the GUID and stores the encrypted GUID in the record in the database for the time draft. Encryption information may be stored in a facility separate from system 10.

e(2). In an embodiment utilizing printable drafts, the community manager also signs a proposed electronic draft on behalf of the buyer immediately upon the draft's acceptance by the financial institution. Thus, as in the case of all-electronic drafts, the electronic drafts corresponding to printable drafts become negotiable instruments at this point. Pursuant to the FI Agreement, once the financial institution accepts a sell offer, the financial institution is required to print the draft(s) corresponding to the payment obligations that comprise the sell offer by close of business on the day the financial institution accepts the offer. To do this, a user at the financial institution accesses SCF system 10, selects the relevant proposed electronic drafts, and requests that system 10 print those drafts. In one embodiment, the financial institution user communicates with system 10 via a graphical user interface that system 10 presents to the user in response to the user's login over the Internet or other remote connection. As described in more detail below, the user interface provides a screen through which the user may select the drafts for printing by entering criteria upon which system 10 bases a search of its database to thereby select the desired drafts. In one exemplary embodiment, the selection screen has an interactive icon labeled "request system to print negotiable drafts" or other appropriate term. Having selected the search criteria in the screen, the user activates this icon, causing system 10 to execute the search and select the draft records in the database that meet the selected criteria. In this embodiment, system 10 does not present the selected drafts for display to the user, but instead prepares one or more print requests to print the selected drafts. System 10 creates this request in the same manner a server presenting screen content to a user accessing the server's website creates a print request when the user selects a "print" option directly from the displayed screen content, the difference being that system 10 creates the request without displaying the content. The structure of such print requests should be understood in this art and is, therefore, not discussed in detail herein. In general, however, the print request includes data from the database corresponding to the selected drafts and instructions controlling the format of the printed data. As the user is communicating with the system 10 user interface through a secure Internet connection, system 10 returns the print request to the user's computer over that connection in the same manner as a website server returns a print request in response to activation of a "print" command from displayed information on a website screen. The print request causes the financial institution user's computer to create a print dialog box for the user, so that when the user activates the user's local print function through the resulting print dialog box, the financial institution's computer system prints the draft(s).

As noted above, electronic records subject to the NYERSA or similar legislation become negotiable instruments in electronic form upon meeting certain criteria, but an electronic marking of such records as void destroys the electronic record as a negotiable instrument and allows a printed draft to replace the electronic draft within underlying transactions. Accordingly, upon a draft's printing via the system, system 10 changes the draft record in its database to include a first legend "PRINTED" and a second legend "VOID" (or "NON NEGOTIABLE COPY") and the printed draft is therefore the only negotiable instrument corresponding to the obligations in the sell offer. Where the electronic records and drafts are subject to statutes and/or common law that does not recognize electronic negotiable instruments, the electronic records are not negotiable instruments, even upon application of the buyer's signature, and the printed draft(s) is/are the first negotiable instrument(s) created via system 10 for the corresponding obligation(s).

The amount for each draft is the sum of the values of the obligation(s) having that draft's proposed maturity date. The payee, or obligee, of each accepted draft is the supplier, and the drawer is the buyer who is the obligor under the obligations in the sell offer. The accepted draft identifies the buyer's bank and the account at that bank upon which the draft is drawn. The buyer's CMSA provides the community manager with a power of attorney to sign and thereby create the time draft on behalf of the buyer.

f. The maturity date for each payment obligation (contractual, if no sell offer is made or if the sell offer is not accepted or if the system does not use time drafts, or pursuant to an electronic or printed time draft, if the offer is accepted and the buyer program is set up for time drafts) in the trade offer initiates payment to the payee (financial institution 110, if the offer is accepted, or supplier 108, if no offer is made or if the offer is not accepted) by buyer 106 for the full amount of the payment obligation. Payments from buyer 106 to the payee (financial institution 110 or supplier 108) are batched and settled at the end of each business day. As noted above, the necessary information is processed through the buyer program clearing bank account to facilitate payment.

g. When a bank 18 makes payments on behalf of any participant in SCF system 10, the bank sends remittance advice notifications to SCF system 10 regarding the payment details. The remittance advice notifications are made up from the ANSI 820s and ANSI 824, or similar format, which are passed back to the SCF system 10, where they are recorded and communicated to the appropriate parties.

h. Once a financial institution accepts a sell offer, supplier 108 receives notification that the sell offer has been accepted, and the status of both the buy offer and the sell offer is changed to accepted. Pursuant to the time-draft OSA, once the one or more electronic or printed time drafts corresponding to the offer have been indorsed and negotiated, financial institution 110 is obligated to pay supplier 108 the trade value amount (which is less than the value of the time draft/obligation, due to charges imposed by financial institution 110, the operator of SCF system 10, and potentially others) contained in the sell offer. Where trades are based on trade receivables, the financial institution is obligated to pay the supplier the trade value amount contained in the sell offer following acceptance.

3. Process Payment a. The processing of payments 16 occurs once the financial institution accepts the sell offer. At this point, financial institution 110 is contractually obligated under the OSA to pay supplier 108 the trade offer's value amount. As stated herein, and as will be appreciated by those skilled in the art, what act constitutes an "acceptance" may be different for different financial institutions and agreed upon by the parties in the FI Agreement and the OSA. Acceptance of the buy offer initiates payment to supplier 108 and negotiation of the corresponding electronic or printed time draft(s) to the financial institutions, or transfer of the payment obligation where trades are based on trade receivables, thereby transferring the obligation for buyer 106 to pay the financial institution the full value of all payment obligations on the buy offer.

b. SCF system 10 provides necessary financial institution 110, supplier 108, service provider, and community account information to banks 18 to enable banks 18 to perform the required financial transactions to complete the trade. Supplier 108 receives the trade value of the buy offer, and the specified bank account of financial institution 110 is debited for the trade value along with any fees associated with the trade, as described herein. Service provider 20 and community manager 120 also receive payment for assessed fees, if any. Clearing accounts are used to transfer all funds. Additional fees may also be paid to other financial partners such as brokers or co-marketers, as non-limiting examples.

c. The maturity date for each electronic or printed time draft (or payment obligation where trades are based on trade receivables) in the trade initiates payment to financial institution 110 for the full amount of the draft. As above, the necessary information is passed to banks 18 to facilitate payment.

d. When payments are made by bank 18 on behalf of any participant in SCF system 10, the bank sends remittance advice notifications to SCF system 10 regarding the payment details. The remittance advice notifications ANSI 820s and ANSI 824, or similar format, are passed back to SCF system 10 where they are recorded and communicated to the appropriate parties.

e. Suppliers 108 that do not elect to trade their payment obligations are also paid via SCF system 10. In such cases, the transfer of funds occurs exactly as stated above, and supplier 108 is paid the full payment obligation amount from the designated buyer bank account. A clearing account is used to transfer or disburse all funds. As described above and hereinafter, the concept of disbursing funds includes actual disbursement or transfer of funds or the providing of instructions or a request to the appropriate financial institution or bank to wire or transfer funds from one specified account to another in a specific amount and at a specified date/time.

FIG. 1C illustrates operation of SCF system 10 in connection with a non-funded transaction between buyer 106 and supplier 108. At step 1, supplier 108 provides goods or services after buyer 106 has requested them, typically through the buyer's issuance of a purchase order. At step 2, after a purchase order is received, supplier 108 accepts the purchase order and provides the requested goods or services. After supplying the goods, supplier 108 generates and delivers an invoice to buyer 106. These steps occur outside SCF system 10. They do not have to occur in this order. They do not have to involve purchase orders or invoices.

Step 3 refers to the uploading of accounts payable information from the accounts payable system of buyer 106 to SCF system 10. As noted above, a payment obligation in the buyer A/P system is an approved supplier invoice of buyer 106 that has been entered into the buyer's accounts payable system. After the goods have been provided or are underway, buyer 106 may choose to upload data corresponding to a payment obligation to SCF system 10. Uploading payment obligations is voluntary; buyer 106 is under no obligation to input any payment obligation. Also as noted above, uploading payment obligation data creates an irrevocable payment obligation pursuant to the CMSA for that amount of money buyer 106 agrees to pay to supplier 108, or on the supplier's behalf, on the maturity date. Buyer 106 agrees, pursuant to the CMSA, that the payment obligation cannot change over time, except through the issuance of credit memos. If buyer 106 has some reason to reduce the amount owed to supplier 108, the buyer may input credit memos into SCF system 10, specifying the amount (the credit memo amount) that should be reduced from the amount of the payment obligation, with one important exception, relating to credit memos received after the payment obligation is sold, as discussed below.

In one preferred embodiment, account payable may be uploaded from the buyer ERP system along with one or more deductions. Thus, for example, assume the buyer's A/P system has a $100 dollar invoice from a supplier but that before uploading the data to system 10, the buyer is aware that the invoice amount should be reduced $5. The buyer may note the $5 as a deduction against the $100 amount, and when the data uploads to system 10, system 10 defines a payment obligation in the net amount of $95. Deductions may not be entered after the A/P data is uploaded, for a given payment obligation. Deductions may also be entered for credit memos. Thus, for example, a $100 credit memo may be uploaded with a $5 deduction, resulting in a $95 credit memo.

Fundamentally, the payment obligation created pursuant to the CMSA when the buyer posts a payment obligation pursuant to the SCF system is not an account receivable. The payment obligation creates an obligation of buyer 106 to pay a certain sum (the certified amount) on a certain day (the maturity date). Buyer 106 has an irrevocable and binding obligation to pay the certified amount on the maturity date to supplier 108 or, if one or more transfers have occurred, to the applicable transferee. Buyer 106 agrees that its submission of payment obligation data to SCF system 10 constitutes the buyer's irrevocable agreement to pay the certified amount on the maturity date to supplier 108 or any person to whom one or more electronic or printed time drafts corresponding to the payment obligation have been negotiated, as applicable. Buyer 106 also agrees with community manager 120 that the certified amount can be wire transferred by the manager out of a buyer payment account 40 on the maturity date, without further approvals from the buyer. These agreements by buyer 106 are made with community manager 120, not supplier 108, but the payment rights are enforceable by supplier 108 or financial institution 110, as applicable. Such third party rights do not exist in accounts receivable. In addition, buyer 106 typically has the ability to set off claims against an account receivable, but buyer 106 has no such right related to the payment of the certified amount unless created independently, as discussed below. Finally, the amount of the payment obligation is not necessarily the amount of the actual underlying account receivable, but it preferably is equal to the account receivable.

In presently-described embodiments, a payment obligation created pursuant to the CMSA upon the buyer uploading A/P data is an obligation of buyer 106 separate from the accounts payable (accounts receivable to the supplier) obligation arising from the transaction between the buyer and supplier outside the SCF system. Upon the payment obligation's creation, and pursuant to the OSA, supplier 108 agrees that the creation and payment of the payment obligation or draft is a set-off (in the amount of the certified amount) against the account receivable to which it relates. Supplier 108 further expressly agrees, pursuant to the OSA, that the creation of and payment of a payment obligation does not waive any rights of buyer 106 against the supplier in the underlying transaction. Finally, buyer 106 expressly agrees in the CMSA that supplier 108 does not waive any rights to be paid amounts of the underlying account receivable in excess of the certified amount.

The certified amount, with respect to a payment obligation arising from a buyer obligation originally posted by buyer 106, is the gross amount of the payment obligation less the sum of all deduction and credit memo amounts attributable to supplier 108 that (i) have not been applied against prior such payment obligations and (ii) are posted prior to the date and time a supplier posts an irrevocable offer to fund the applicable payment obligation. Thus, the certified amount is determined on the earlier of (a) the date and time supplier 108 posts an irrevocable offer to fund the payment obligation or (b) the maturity date. If supplier 108 has already posted an irrevocable offer when the credit memo is posted, the applicable credit memo amount will be applied to other existing or future payment obligations, if any, for which an irrevocable offer has not been posted.

Pursuant to the OSA, supplier 108 may make an irrevocable offer to sell to financial institution 110 all of the supplier's right, title, and interest in and to one or more payment obligations that are posted to SCF system 10 free and clear of any adverse claim, such irrevocable offer to remain in effect until the earliest to occur of (i) financial institution 110 exercising its right to purchase the payment obligation or a time draft substituted for such payment obligation, (ii) the maturity date, or (iii) a date and time specified in the documentation provided by community manager 120 for SCF system 10. In an embodiment in which trades are based on time drafts, the OSA defines the draft offer termination as the date the draft offer automatically terminates. The system also defines a time out parameter for traded receivables. The financial institution typically sets this parameter, as a number of hours after the offer occurs in which the financial institution may accept the offer. If the financial institution does not accept the offer within that time, the payment obligation(s) underlying the offer are available again for trade.

In the presently-described embodiments, payment obligations displayed on SCF system 10 arise from buyer A/P data that is automatically batch uploaded with no manual intervention. In most situations, a payment obligation begins as an output from the accounts payable system of buyer 106 and is translated into a format that can be uploaded into SCF system 10. As should be understood, the buyer's A/P system is likely to be an enterprise resource planning (ERP) system that may have certain capabilities to output data from the system. For each buyer payment obligation, system 10 needs the buyer's ERP system to identify at least the buyer (by ID number), the obligation's total amount, maturity date, and supplier (by ID number). As noted above, the A/P buyer data may also include data describing invoices that comprise the buyer payment obligation. The SCF system does not use specific invoice data to effect transactions, but the system acquires and provides such data as member content to allow the supplier to reconcile payment obligations with invoices in the supplier's accounts receivable ERP system. The particular data included in invoice data may therefore vary, although it generally includes the supplier's invoice number, the invoice issue date, and the invoice maturity date. Regardless of the particular data content from the buyer ERP system, however, the buyer ERP system may be configured to collect buyer obligation data in a predetermined manner, for example upon selection by the buyer manually through the buyer's operation of its ERP system or automatically upon a given event such as receipt of a supplier invoice and the invoice's approval in the ERP system. The ERP system may be configured to collect the needed, and optional, data from one or more invoices and put the data into a file for batch upload to system 10. Given a known format of the ERP data, the system 10 operator may configure system 10 to receive the data and correlate the data to the payment obligation information described herein. Data may be exchanged by various suitable means, for example file transfer protocol to or from FTP servers at system 10 or at the buyer, respectively. Once the SCF system receives A/P data defining a payment obligation, the system database creates a respective database record for each obligation containing the information, including member content, for the obligation.

SCF system 10 is intended to have as little effect as possible on the existing relationship between buyer 106 and supplier 108. However, inputting a payment obligation changes the existing relationship between buyer 106 and supplier 108 in two ways. The CMSA specifically allows supplier 108 and any transferee (i.e., financial institution 110) to rely on the two requirements set forth below.

First, by inputting a payment obligation, buyer 106 agrees (pursuant to the CMSA) to pay a specified amount of money subject only to any limitations that may be set forth in the CMSA and independent of claims or defenses that might otherwise be available to the buyer with regard to an accounts payable obligation. Except as set forth in a credit memo (as provided under the CMSA), buyer 106 is agreeing with community manager 120 that the money must be paid. Because credit memos input after a payment obligation transfer, or after the negotiable instrument is created and negotiated to the applicable financial institution 110, do not affect the obligation to pay that particular obligation or negotiable instrument, and because such trades normally occur rapidly after the payment obligation is input, buyer 106 frequently will not be able to set off any credit memo claims against the payment obligation to which the claim relates. However, SCF system 10 does allow credit memos to set off future payment obligations. This means that SCF system 10 may be used effectively with credit memos particularly where buyer 106 and supplier 108 have an ongoing relationship with each other such that future payments will be due to the supplier. The CMSA and OSA are not intended to affect the underlying rights of buyer 106 and supplier 108 related to the provision of goods and services. Rather, any rights or obligations between those parties associated with improper performance, warranty claims, and the like remain intact.

Second, by inputting a payment obligation, buyer 106 agrees that it will pay the amount of the payment obligation (less credit memo amounts) on a specific date: the maturity date. This prevents buyer 106 from extending payments beyond when they are due as independently agreed between the buyer and supplier. As noted above, the maturity date of the A/P payment obligation uploaded to system 10 is preferably established automatically by the buyer's ERP system to be, or to be based upon, the maturity date of one or more invoices comprising the A/P payment obligation. Also as noted above, however, the establishment of the buyer payment obligation maturity date, and more generally the acceptance by the buyer's ERP system, occurs outside system 10, and system 10 does not attempt to confirm maturity date validity. Accordingly, the data uploaded from the buyer ERP system preferably includes member content that includes underlying invoices so that the supplier can review the payment obligation and confirm it conforms to the supplier's expectations.

At step 4, once a payment obligation has been input into SCF system 10, the system makes that payment obligation visible to supplier 108 when the supplier logs onto the system.

At step 5, on or before the maturity date, buyer 106 makes sure that there is enough money in buyer payment account 40 to cover the payment obligation. A buyer may use a "zero balance account" for buyer payment account 40 that automatically transfers funds to account 40 in the certified amount as and when needed.

At step 6, on the maturity date, SCF system 10 automatically generates an electronic funds transfer instruction to the bank of buyer 106, instructing the bank to transfer the certified amount (the gross amount of the payment obligation less all applicable credit memo amounts) from buyer payment account 40 to a supplier receipt account 42. The electronic funds transfer instruction normally is issued in the evening before the maturity date, but can be more than one day prior, so that funds clear overnight and are available on the maturity date. The buyer's bank is preset when the buyer is set up in system 10.

At step 7, upon receipt of the electronic funds transfer instruction, the bank of buyer 106 transfers the certified amount to supplier receipt account 42. Community manager 120 does not take actual possession of any funds, and there is no interaction with financial institution 110 at this step.

FIG. 1D illustrates operation of the SCF system for a funded transaction, i.e. when a payment obligation is transferred, or a draft is negotiated, to financial institution 110 from supplier 108. Steps 1 through 4 of FIG. 1D are similar to steps 1 through 4 described above with respect to FIG. 1C and, therefore, are not described with respect to FIG. 1D. Because the events described with respect to FIG. 1D occur before the maturity date, a step corresponding to step 5 described above with respect to FIG. 1C is not shown. Steps 6 and 7 described above with respect to FIG. 1C do not occur in this situation.

At step 5, the payment obligation uploaded from buyer 106 is displayed to supplier 108 via the user interface as a record showing the payment obligation's amount, maturity date, and buyer. As noted above, the supplier may also view member content to confirm the underlying invoices. After the payment obligation is made visible to supplier 108, the supplier can offer to sell the payment obligation to financial institution 110 by entering an irrevocable offer to sell the payment obligation in SCF system 10. As described in more detail below, the supplier may submit a sell offer manually through an SCF system interface by viewing a payment obligation and activating a button on the user interface page to thereby submit the offer. In this instance, the SCF system associates the sell offer with the payment obligation linked to the user interface page from which the sell offer was made. In an auto-advance mode, the system automatically submits sell offers after payment obligations are created.

As discussed in more detail below, in manual mode, the system allows supplier 108 to select multiple payment obligations to offer for sale in a single sell offer. If the supplier selects multiple obligations, the SCF system associates the sell offer with all selected payment obligations. In auto-advance mode, the SCF system preferably automatically bundles all payment obligations that meet the auto-advance rules at the time the auto-advance process runs.

The sell offer is then made visible to financial institution 110 (step 5 has two arrows on the chart). Generally, the irrevocable offer remains in effect until the earlier of the time it is accepted by financial institution 110 or until a specified daily cutoff, which is configurable for the financial institution.

At step 6, if financial institution 110 elects to accept the sell offer, it then inputs an acceptance into SCF system 10. SCF system 10 can be configured to purchase all proposed drafts from a particular supplier 108 (so that acceptance occurs automatically), some proposed drafts according to certain criteria (again, automatically), or only manually by financial institution 110 via a user interface to system 10. In certain embodiments, in which the SCF system operates within and/or as part of a financial institution, so that the SCF system and the financial institution are effectively the same, the SCF system nonetheless receives acceptance of the sell offer in that the financial institution, through its operation of the system, directly or automatically causes the system to proceed with the transaction, i.e. based on the financial institution's acceptance. SCF system 10 can also be configured to let more than one financial institution 110 participate. As noted above, for example, financial institution 110 may elect to purchase up to a specified total dollar amount, and thereafter a second financial institution 110 would step in. In the embodiments described herein, however, two financial institutions do not access to the same irrevocable offer at the same time. In an embodiment in which trades are based on time drafts, when supplier 108 submits a sell offer to the SCF system, whether manually through the system user interface or automatically through the auto-advance mode, and the financial institution accepts the offer, whether automatically or manually, the system creates one or more electronic time draft records, whether for electronic time drafts or for printable drafts, corresponding to each accepted payment obligation.

To create the electronic or printable time draft for a given accepted sell offer, the SCF system processor first checks the maturity dates of all payment obligations associated with the sell offer. If all payment obligations have the same maturity date, the SCF system creates a single proposed time draft to correspond to all payment obligations. If there are payment obligations associated with the sell offer that have different maturity dates, the SCF system creates a separate proposed time draft for each maturity date, so that there is one proposed time draft that corresponds to all payment obligations for a given maturity date.

Each time draft exists as an electronic record that may comprise entries in one or more tables in the SCF system database. The following data items comprise a part of a record:

| Record Group | Data Item |
|---|---|
| Title | title identification |
| | offer identification |
| | supplier identification |
| | supplier user |
| | date/time offer submitted |
| | number of drafts |
| | auto-advance |
| Body | record identification |
| | reference identification for display purposes |
| | draft number |
| | date/time draft created |
| | maturity date |
| | buyer contract signatory |
| | authorization date |
| | payee/obligee |
| | supplier user who submits offer |
| | date/time offer submitted |
| | total certified value of payment obligations on maturity date |
| | number of payment obligations on maturity date |
| | trade type = time draft |
| | buy offer identification |
| | identification whether offer was auto-advanced |
| | time draft identifier |
| | financial institution login identification |
| | financial institution user who accepts offer |
| | date/time draft is accepted |
| | financial institution identification |
| | identification whether offer is auto-accepted |
| | print status, i.e. blank, or, e.g., PRINTED and/or VOID |

The title portion of the record is created when the supplier submits the sell offer. The body portion of the record is created when the financial institution accepts the offer.

The time draft identifier is a globally unique identifier (GUID) that may be created in any well-understood manner. The creation of GUID's should be well understood in this art and is therefore not discussed in detail herein. The body record identification is an internally-designated ID number used by system 10 for database access and management purposes.

The draft number is a respective number applied to each draft record that is unique among all draft records stored in the database for use by the SCF system.

The payee is the supplier. This information is obtained from the supplier user's login information.

The maturity date is the maturity date for the payment obligation or payment obligations from which the draft arises. The system obtains this information from the payment obligation record or records corresponding to the payment obligations underlying the proposed time draft. As a draft will correspond only to payment obligations having the same maturity date, there is no need to reconcile dates at this point.

There are three possible status conditions: proposed, accepted, and matured. The initial status is "proposed," meaning that the time draft (or, that portion of the draft in the title portion) has been created and is subject to a sell offer, but the financial institution has not accepted the offer. When the financial institution accepts the offer, the status is changed to "accepted." At this point, and when the buyer's signature is applied to the draft as described in further detail below, the time draft becomes a negotiable instrument and represents an existing obligation. This is true for both electronic and printed drafts. Once that obligation has been satisfied, the system changes the status to "matured," meaning that the record no longer represents an existing obligation and is no longer a negotiable instrument.

The record includes the date and time the supplier submits the sell offer, either manually or automatically via auto-advance mode.

The record includes the date and time the financial institution accepts the offer.

The record identifies a user at the financial institution to which the sell offer is directed. In a preferred embodiment, a financial institution agrees to fund drafts associated with payment obligations for one or more given buyers. The community manager then associates the financial institution with the buyer in the SCF system database, and the system thereafter submits all proposed drafts for that buyer to the associated financial institution. Alternatively, the community manager may associate multiple financial institutions with a given buyer and may select financial institutions to which to direct proposed drafts based on a predetermined criteria, for example based on financial institution lending capacity, or on an alternating basis, or a priority sequence under which a first financial institution receives all sell offers until outstanding obligations from the buyer to that financial institution reach a certain level, and then second financial institution receives sell offers until outstanding obligations from the buyer to that financial institution reach a predetermined level, and then a third financial institution, etc. In a still further embodiment, drafts are first presented to the community manager, which has the option of acquiring one or more drafts and then assuming the functions and role of the financial institution as described herein. After negotiation of the draft to the community manager, the community manager may negotiate the draft to a subsequent acquirer at its discretion on a market for negotiable instruments.

The record includes the total value of all payment obligations, as previously reduced by credit memos (if any), from which the draft arises.

The record identifies the person who submitted the sell offer. If the sell offer was executed by the supplier manually, the offer will have been initiated by an individual associated with the supplier who logged into the SCF system through an SCF system user interface. The individual will have previously registered with the system and thereby obtained a user name and password. The SCF system database stores the individual's identification in association with its user name and password. If the offer was submitted via the system's auto-advanced function, the individual associated with the supplier who authorized the auto-advance function on behalf of the supplier is stored as the person who submitted the offer. This individual is also recorded in the SCF system database.

The record identifies the individual associated with the buyer who executed the CMSA on behalf of the buyer. This is also a record entry maintained in the SCF system database.

The currency (for example, United State dollars, Japanese Yen, or Euros) by which the draft amount is denominated is not identified in the above-referenced list but may be considered part of the time draft record. As noted above, this parameter is stored globally for the buyer program, rather than at the draft level. The CMSA defines the currency, and the currency information is maintained at the SCF system database.

The record identifies the date the buyer provided authorization to the community manager to sign drafts on behalf of the buyer, in this embodiment—the execution date of the CMSA.

As noted above, invoice data may be associated with drafts in the database as a sequence of data entries for each invoice listed in the member content for the payment obligation from which the draft arises. Each invoice is identified by invoice number and invoice date. This date may be considered part of or associated with the time draft record.

The buyer's bank, upon which the draft amount is drawn, may also be considered part of the time draft record. This data point is stored globally at the buyer program level. Similarly, the drawer bank account number, i.e. the number of the account from which the draft amount will be paid, is defined at the buyer program level and may be considered part of the time draft record. This information is submitted to the community manager with the CMSA and is input to the system database when the service provider sets up the buyer in system 10.

The time draft identifier is stored, in association with the time draft record, in an encrypted form. The time draft identifier may be encrypted using multi-layer or single layer methods and may be encrypted independently of or in conjunction with a trusted party. This record is stored at the SCF system database, which is located at a primary location 450 (FIG. 29) at which the SCF system processor and database reside. A replica of the SCF system programming and database is maintained and stored at a separate location 451 (FIG. 29), preferably geographically remote from the primary location 450. The database data is exactly replicated at the secondary location If the primary system fails for any reason, such that the system may not operate and/or retrieve data, then a network connection 453 is switched at a data center (not shown) from primary location 450 to secondary location 451, which thereby becomes the primary location.

The electronic time draft record is a single, identifiable, and unalterable record, such that the record is ascertainable as the original time draft. Although a copy of the record is maintained at the secondary location, the record maintained at the primary location is ascertainable as the original by the data center switch connecting the primary system to the network connection. Furthermore, the system ascertains that the original record is unaltered. For example, all or some portions of the time draft record, and in one embodiment all portions legally required to make a draft a negotiable instrument, may be hashed, and the hash stored in a separate database table. The system repeatedly performs the hash at the primary system and compares the hash with the stored hash. If the present hash matches the stored hash, the system has verified that the time draft record is unaltered. Possession of the electronic time draft may thus be defined as control of the single, identifiable, and unalterable record, such that the record is ascertainable as the original, subject to contractual obligations by such custodial entity.

As noted above, the title portion of the draft record is populated at creation of the draft database record with the name of the individual associated with the supplier who submitted the sell offer. Pursuant to the OSA, application of this person's name to this field is an indorsement of the proposed time draft in favor of the financial institution (i.e., the entity identified in the "financial institution" field) as payee. As noted above, the supplier is the original payee, and this indorsement is of the supplier's rights as payee over to the financial institution. At this time, however, the buyer contract signatory is blank. Since the drawer has not yet signed the proposed time draft, the time draft is not yet made, even though it already has the supplier's indorsement in favor of the financial institution.

Once the financial institution accepts the sell offer, the SCF system processor fills the financial institution login identification and financial institution acceptance user for the record of each accepted time draft associated with the offer, along with a date and time stamp indicating when the offer was accepted. If the offer was accepted by the financial institution manually through an SCF system interface, a user associated with the financial institution will have logged into the system and selected the sell offer for acceptance. Because the user's user name and password are associated with the user's identity, the SCF system identifies the user upon receipt of the acceptance and thereby applies that identity to these fields for each draft associated with the now-accepted sell offer. If the financial institution accepts sell offers via an auto-accept mode of system 10, the draft accepting signatory is an individual who authorized auto-acceptance on the financial institution's behalf. This person's identity is stored in the system database.

Pursuant to the CMSA, the financial institution's acceptance of the sell offer authorizes the community manager to sign the draft on behalf of the drawer, i.e. the buyer. Thus, in the case of both electronic and printable time drafts, upon the financial institution's acceptance of the draft and the application of the financial institution signatory to the draft record, the SCF system processor retrieves the name of the individual associated with the buyer who executed the CMSA on behalf of the buyer (this data is stored in a record field in the SCF system database) and applies this name to the record for each time draft associated with the now-accepted sell offer. This step effects signature on behalf of the drawer of, and thereby completes, each such time draft pursuant to the power of attorney granted to the community manager in the CMSA. Because of the buyer's signature, and because each record is associated with a single, unalterable and identifiable record as described above, each draft is now an electronic negotiable instrument according to the law governing the system.

In the case of printed drafts, when the financial institution prints the draft, the system applies a "PRINTED" legend, and a "VOID" and/or "NON-NEGOTIABLE COPY" legend), to the electronic record in the SCF database, thereby voiding the electronic record as a negotiable instrument in favor of the printed negotiable instrument.

It is possible that the financial institution does not successfully print the negotiable instrument, e.g. because of a printer failure or other mechanical or system problem. In that event, the financial institution may request that the SCF system allow the financial institution to reprint the draft, according to a procedure described in more detail below.

Pursuant to the CMSA and the OSA, the buyer and supplier agree that an electronic time draft or printed time draft, once created, substitutes for the payment obligation(s) from which the time draft is derived. That is, the time draft is the remaining obligation, and the contractual payment obligations no longer exist. Furthermore, pursuant to those same agreements, the buyer and supplier agree that the buyer's execution of time drafts satisfies payment of the invoices underlying the payment obligations for which the time drafts substitute, thus extinguishing the buyer's accounts payable obligation to the supplier for those invoices, as well as the supplier's corresponding accounts receivable. Thus, the time draft should be the only obligation for payment by the buyer to the supplier arising from the underlying transaction.

The SCF system database maintains a time draft template in the forms illustrated in FIG. 28A (electronic time draft) and 28B (printable time drafts). When any of the supplier, buyer or financial institution accesses the SCF system via an SCF system graphical user interface, and elects to view an electronic time draft to which that entity is a party, the SCF system process populates the fields of the template of FIG. 28A with data, as described above, from the SCF system database record for that draft. In a field 460, the SCF system processor populates the decrypted time draft identifier, indicating a series of X's as a redaction of the identifier, except for the final four digits. A draft reference ID (for display purposes, in the record data above) is provided at 461. Field 463 is the offer reference identification, and field 462 is the date the sell offer was accepted, and thus the date the draft was created. Field 464 is the maturity date. Field 466 is the payee, in this instance the supplier. Field 468 is the amount. Field 470 is the currency. Field 472 is the drawer bank. Field 474 is the contract signatory. Note that since, as described above, the SCF system applies the buyer contract signatory to the draft record pursuant to a power of attorney granted to the community manager by the buyer, the presently-described embodiment displays at 474 an image of a signature of a community manager officer, signing the draft for the community manager on behalf of the buyer pursuant to the buyer's power of attorney. Field 478 is the draft offer signatory. Since, as described above, the SCF system applies the supplier representative's name to the draft record pursuant to a power of attorney granted to the community manager by the supplier, the presently-described embodiment displays at 478 an image of a signature of a community manager officer, signing the draft for the community manager on behalf of the supplier pursuant to the supplier's power of attorney. This is the signature that represents the draft's indorsement from the supplier to the financial institution, and field 480 is the financial institution to which the draft is indorsed. A print button 482 allows a viewer to print a hard copy of the instrument. At least, however, as the time draft identifier is not visible, this image of the draft is itself not identifiable as the draft and is not a negotiable instrument. This is emphasized by the legend "Non-Negotiable Copy" as indicated in the image, which prints when the image prints.

In an embodiment utilizing printable drafts, the supplier, buyer, or financial institution may also view an image of the draft record, as shown in FIG. 28B. When any of the supplier, buyer, or financial institution accesses the SCF system via an SCF system graphical user interface, and elects to view a printable time draft record to which that entity is a party, the SCF system process populates the fields of the template of FIG. 28B with data, as described above, from the SCF system database record for that draft. A Draft Reference ID (for display purposes, in the record data above) is provided at 461. Field 463 is the offer reference identification, and field 462 is the date the sell offer was accepted, and thus the date the draft was created. Field 464 is the maturity date. Field 466 is the payee, in this instance the supplier. Field 468 is the amount. Field 470 is the currency. Field 472 is the drawer bank. Field 474 is the contract signatory. Note that since, as described above, the SCF system applies the buyer contract signatory to the draft record pursuant to a power of attorney granted to the community manager by the buyer, the presently-described embodiment displays at 474 an image of a signature of a community manager officer, signing the draft for the community manager on behalf of the buyer pursuant to the buyer's power of attorney. Field 478 is the draft offer signatory. Since, as described above, the SCF system applies the supplier representative's name to the draft record pursuant to a power of attorney granted to the community manager by the supplier, the presently-described embodiment displays at 478 an image of a signature of a community manager officer, signing the draft for the community manager on behalf of the supplier pursuant to the supplier's power of attorney. This is the signature that represents the draft's indorsement from the supplier to the financial institution, and field 480 is the financial institution to which the draft is indorsed. A unique draft number (described above, and in more detail below) is shown at 479, and a "NON NEGOTIABLE COPY" legend is shown at 481. When it is printed by the financial institution according to the procedure discussed below with regard to FIG. 14-L, the draft is a negotiable instrument, but when the user viewing the record shown at FIG. 28B prints the image locally, using print button 482, the image prints with the NON-NEGOTIABLE COPY legend, as shown in the figure. When the financial institution requests a printed draft through the screen at FIG. 14-L, the print instruction does not include the legend, so that the printed draft includes all the information in FIG. 28B, in the format shown in the figures, except for the legend. If, as is also described below, the draft record is for a reprinted draft, the "Draft Number" label at 479 becomes "Reprinted Draft Number," both in the view page and any financial institution print requests. Although not shown in FIG. 28B, the draft may also print with a legend of "VOID AFTER 90 DAYS" or similar message.

If, as is described in more detail below, the financial institution user requests that a printable draft record be printed as a negotiable instrument, SCF system computer 456 (FIG. 29) sends FI computer system 110 a print instruction via a secure Internet connection by which system 110 sends system computer 456 a print request, causing the financial institution computer system to print a draft as shown in FIG. 28B (except for the NON-NEGOTIABLE COPY legend). Simultaneously, the SCF system computer modifies the draft's record in database 452 to include "PRINTED" and "VOID" legends, and the printed instrument is the only negotiable instrument corresponding to the offer reference. As noted above, instead of the secure Internet connection, the SCF system may communicate with the FI computer system via a virtual private network. In such an embodiment, a VPN may be defined between any SCF system computer and a single FI computer system computer, i.e. a printer, such that the SCF system prints drafts via a printer spool.

Still referring to FIG. 1D, once an irrevocable sell offer is accepted, then steps 7 through 13 occur in rapid succession. As a result of the OSA, supplier 108 agrees that all of its right, title, and interest in and to the drafts will be sold, assigned, and transferred to financial institution 110 via negotiation of associated drafts, without any further action or documentation on the part of supplier 108, buyer 106, or financial institution 110. As part of the CMSA, buyer 106 agrees that any draft that is transferred by supplier 108 will be recognized by the buyer as having been validly sold and assigned to the relevant transferee. Pursuant to the Financial Institution Agreement, the sell offer's acceptance and resulting execution of time drafts associated with the payment obligations on the buyer's behalf, along with the supplier's indorsement to the financial institution, negotiate the drafts to the financial institution's possession. In the case of electronic drafts, the community manager retains custody of the drafts on the financial institution's behalf. At step 7, for trade receivables and electronic or printable time drafts, financial institution 110 first deposits the net financial institution amount into a financial institution payment account 44. Financial institution 110 may also use a "zero balance account" for this purpose. Once an acceptance has been registered in SCF system 10 and the net financial institution amount deposited into financial institution payment account 44, the trade receivable's or draft's purchase is agreed by the parties to be complete, as a function of the contracts. Title to a draft, whether electronic or printable, changes from supplier 108 to financial institution 110, in that the time draft(s) is/are negotiated from the supplier to the financial institution at this time.

The net financial institution amount is the face amount of the draft minus the financial institution fee and any supplier transaction fees and/or financial institution transaction fees. A "total supplier pricing" is the sum of four components: (a) the FI base rate, (b) FI margin, (c) service provider rate, and (d) community manager rate. The FI base rate and FI margin are defined in the financial institution pricing profile. The service provider rate is defined by the service provider pricing profile. The community manager rate is defined by the community manager in the buyer program, as the net community margin. All four rates are preferably defined as basis points that are applied against the face value of the draft (or the total value of the payment obligation, where trades are based on trade receivables) and applied for the number of days between offer acceptance and draft maturity. In an alternative embodiment, however, they may be defined as basis points applied against the draft face amount or payment obligation amount without considering time. The FI base rate is typically a function of a base interest rate, such as LIBOR. The FI margin is an added interest rate for risk and financial institution return. The service provider rate determines the base service provider fee, and the community manager rate determines the base community manager fee.

As discussed above, the community manager may, optionally, define supplier transaction fees and financial institution transaction fees. If such fees are defined, then the total amount provided to the supplier is the face amount of the draft or total payment obligation amount, minus the sum of the total supplier pricing, the supplier transaction fee, and the financial institution transaction fee. Where the two latter fees are not applied, then the net supplier amount is the face amount of the draft, minus the total supplier pricing.

This step in the process differs from typical factoring arrangements. Financial institution 110 takes title, not just a lien, to the draft or trade receivable (in embodiments in which trade receivables are traded, title to the trade receivables passes through system 10 pursuant to the party agreements and state UCC filings that designate title is or can be traded through the system). If for any reason buyer 106 fails to pay the draft or trade receivable obligation, financial institution 110 has no right to sell the draft or receivable back to supplier 108 or have any other recourse against the supplier in the absence of supplier fraud. Financial institution 110 therefore relies on the financial strength of buyer 106 when it purchases the draft or a trade receivable. Because the buyer's creditworthiness is likely to be better than that of supplier 108, financial institution 110 can offer either better rates (due to less risk) or receive better returns (due to less risk, such as bad debts), or both.

Normally, as long as acceptance occurs before a particular cutoff time during a day, an electronic funds transfer instruction is issued the evening of the day the proposed draft is accepted, at step 8. SCF system 10 will issue the electronic funds transfer instruction to transfer the net supplier amount from financial institution payment account 44 to supplier receipt account 42, at step 9. Community manager 120 does not take possession of any portion of the net financial institution amount, other than the community manager fee.

At the same time as steps 8 and 9 occur, community manager 120 issues at step 10 a second electronic funds transfer instruction to transfer the community manager fee, and a third electronic funds transfer instructions to transfer the service provider fee, from financial institution payment account 44 to a CM receipt account 48 at step 11.

FIG. 1E illustrates the steps triggered at the maturity date. Once a draft has been negotiated to financial institution 110, the flows of money on the maturity date are different from those shown in FIG. 1C. As in FIG. 1C, on the evening before the maturity date, buyer 106 deposits the face amount of the draft in buyer payment account 40, at step 1.

Usually on the evening before the maturity date, or several days before, community manager 120 issues at step 2 an electronic funds transfer instruction to transfer the face amount of the draft from buyer payment account 40 to financial institution receipt account 46, at step 3 on the maturity date.

System Configuration

Figure 29:
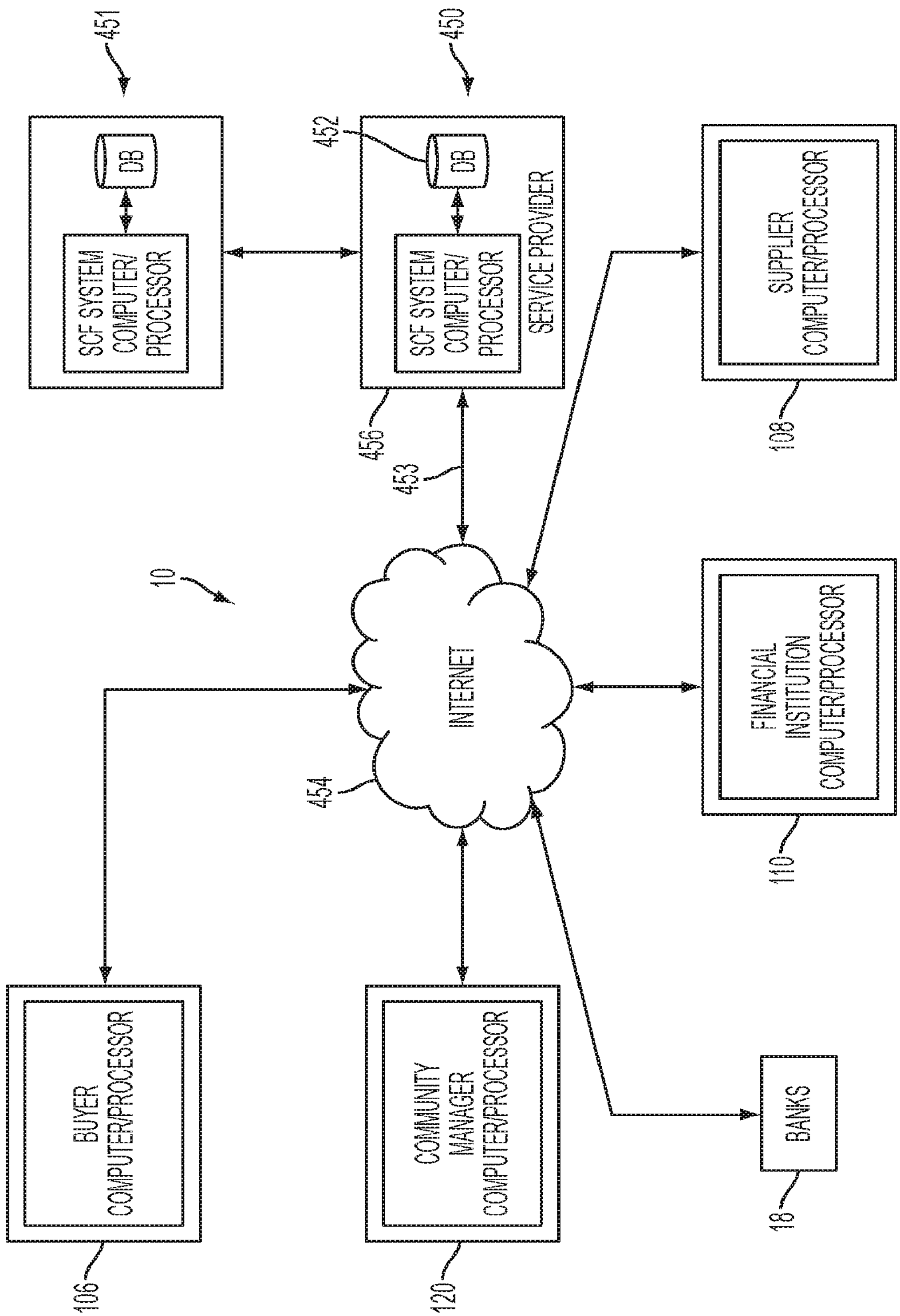
FIG. 29 is a schematic illustration of a system within which a method as in FIGS. 1A-1E is executed.

The system 10 may be practiced in one or more suitable electronic configurations. As shown in FIG. 29, system 10 is principally effected at a primary computing location 450. As discussed elsewhere herein, the system may include a mirror-image secondary computer system 451. As the computer and database configuration of primary system 450 and secondary system 451 are the same, only the arrangement of primary system 450 is described herein, although it should be understood that this discussion is applicable to both systems. Thus, with reference to primary system 450, system 10 comprises a computing device 450 suitable for practicing the embodiments described herein. Computing device 450 may take many forms, including but not limited to one or more computer, workstation, server, network computer, quantum computer, optical computer, Internet appliance, mobile device, application specific processing device, database server, etc. Alternative implementations of computing device 450 may have fewer components, more components, or components that are in a configuration that differs from the specific configuration described herein. The components of system 450 may be implemented in hardware-based logic, software-based logic, and/or logic that is a combination of hardware and software-based logic (for example, hybrid logic); therefore, the components of system 400 are not limited to a specific type of logic.

In the presently-described embodiment, system 450 comprises a processor having one or more cores and memory. The processor may include hardware or software-based logic to execute instructions on behalf of the computing device 450. In one implementation, the processor may include one or more distinct processors, such as a microprocessor. In one implementation, the processor may include hardware, such as a digital signal processor (DSP), a field programmable gate array (FPGA), a graphics processing unit (GPU), an application specific integrated circuit (ASIC), a general-purpose processor (GPP), etc., on which at least one or more components of system 450 can be executed. In another implementation, the core(s) may be configured for executing software stored in the memory or other programs for controlling computing system 450.

Computing system 450 may include one or more tangible non-transitory computer-readable storage media for storing one or more computer-executable instructions or software for implementing exemplary embodiments. For example, memory included in association with computer system 450 may store computer-executable instructions or software, for example instructions for implementing and processing every module of a programming environment. The memory may include a computer system memory or random access memory (RAM), such as dynamic RAM (DRAM), static RAM (SRAM), extended data out RAM (EDO RAM), EEPROM, CD-ROM, DVD or other types of optical storage medium or magnetic storage device or removable non-volatile storage device, etc., or a combination thereof.

In one implementation, a processor of system 450 may include a virtual machine ("VM") for executing instructions located in the computer memory. The virtual machine can be provided to handle a process running on multiple processors so that the process appears to be using only one computing resource rather than multiple. It should be understood that the virtual machine may be configured to span across multiple electronic devices similar to computing system 450. Virtualization can be employed in the electronic system 450 so that infrastructure and resources in the electronic device can be shared dynamically. Multiple virtual machines may be resident on the processor of system 450.

Computing system 450 may also include a hardware accelerator, such as implemented in an ASIC, FPGA, or the like, in order to speed up the general processing rate of the computing system.

Additionally, computing system 450 may comprise a network interface to interface to a local area network or wide area network, such as the Internet, through a variety of connections including, but not limited to, standard telephone lines, local area network or wide area network links (for example, T1, T3, 56 kb, X.25), broadband connections (for example integrated services digital network ("ISDN")), frame relay, asynchronous transfer mode ("ATM"), wireless connections (for example 802.11), high-speed interconnects (for example, Infini Band, gigabit, Ethernet, Myrinet) or any combination of the above. The network interface may include a built-in network adapter, network interface card, personal computer memory card international association ("PCMCIA") network card, card bus network adapter, wireless network adapter, universal serial bus ("USB") network adapter, modem or any other suitable device for interfacing computer system 450 to any type of network capable of communication and performing the operations described herein.

Computer system 450 may include one or more input/output (I/O) devices such as a keyboard, multi-touch interface, a pointing device, for example a mouse, or any combination thereof for receiving instructions from a user. Computing device 450 may include other suitable I/O peripherals as should be understood by those skilled in the art.

Computer device 450 may also comprise one or more visual display devices operatively connected to the input devices. A graphical user interface ("GUI") may be shown on the display device in order to present to the GUI to a user.

A storage device, indicated at 452, may also be associated with computing system 450. Storage device 452 may be, for example, a hard-drive, CD-ROM or DVD, zip drive, tape drive, flash memory, memory stick or other suitable tangible computer readable storage medium capable of storing information, including any storage device accessible by computer and/or processors of computing system 450 via a network interface. Storage device 452 may be useful for storing application software programs, rules engines, data repositories, one or more databases, and an operating system. It should be understood that storage 452 may be segmented across multiple storage devices so that, for example each of the applications may reside on a separate storage device. Databases may be managed by database software, such as (but not limited to), Oracle Database, IBM DB 2, mySQL server, and Microsoft SQL server.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, some of the inventions are described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, mobile device, handheld device, tablet computer, scanner, or the like. These and other input devices are often connected to the processing unit through known electrical, optical, or wireless connections.

The system operating system may be any suitable operating system, such as any of the versions of the Microsoft windows operating system systems, the different releases of the Unix and Linux operating systems using the Linux Kernel, any version of the MACOS for computing devices provided by Apple Inc. of Cupertino, California, any embedded operating system, any real-time operating system, any open source operating system, any proprietary operating system, any operating systems for mobile electronic devices, or any other operating system capable of being executed by computing system 450 and performing the operations described herein. The operating system may be run in native mode or emulated mode.

Exemplary embodiments may be provided in one or more electronic-device readable programs embodied on or in one or more mediums, such as a non-transitory electronic device-readable storage medium. The mediums may be, but are not limited to, a hard disk, a compact disk, a digital versatile disk, a flash memory card, a programmable read only memory (PROM), a random access memory (RAM), a read only memory (ROM), magnetoresistive random access memory (MRAM), or a magnetic tape.

In general, the electronic-device readable program may be implemented in any programming language. Some examples of languages that may be used include Python, C, C++, C#, JAVA, JAVASCRIPT, a hardware description language (HDL), UML, PLC, etc. It should be understood that different components of system 450 may be implemented in different and/or multiple programming languages. Further, the computer readable programs may be implemented in a hardware description language or any other language that allows prescribing computation. The software programs may be stored on or in one or more mediums as object code. The instructions in the programming languages may be executed by one or more processors to implement the computer readable program described in the programming languages, or alternatively the instructions may be implemented directly by hardware components other than a processor.

FIG. 29 illustrates an exemplary distributed implementation suitable for use with the exemplary embodiments described herein. A system may include computing system 450, a network 454, a service provider 456, a buyer computing system 106, a financial institution computing system 110, and a supplier computing system 108, although it should be understood that other embodiments may include more devices, fewer devices, or devices in arrangements that differ from the arrangement of FIG. 29 without departing from the scope of the presently-disclosed embodiments of the present invention.

As should be understood, network 454 transports data from a source to destination. Embodiments of network 454 may use network devices, such as routers, switches, firewalls, and/or servers and connections (for example, links) to transport data. Network 454 may be a hardwired network using wired conductors and/or optical fibers and/or may be a wireless network using free-space optical, radio frequency ("RF"), and/or acoustic transmission paths. In one implementation, network 454 may be a substantially open public network, such as the internet. In another implementation, the network 454 may be a more restricted network, such as a corporate virtual network. Network 454 may thus include LANs, WANs, Metropolitan Area Network ("MAN"), wireless networks (for example, using IEEE 802.11, Bluetooth, etc.), etc., or any combination thereof. Network 454 may use middleware, such as common object request broker architecture ("CORBA") or distributed component object model ("DCOM"). Implementations of network and/or devices operating on networks described herein are not limited to any particular data type, protocol, architecture/configuration, etc.

Service provider 456 may include a device that makes a service available to another device. For example, service provider 456 may include an entity (for example, an individual or a corporation) that provides one or more services to a destination using a server and/or other devices. Services may include instructions that are executed by a destination to perform an operation. Alternatively, a service may include instructions that are executed on behalf of a destination to perform an operation on the destination's behalf. Similarly, computer systems 106, 110 and 108 may be configured as one or more computing devices, possibly with one or more memory storage devices, similar to the configuration of system 450, and these systems may include devices that receive, store, and transmit information over network 454.

Buyer Program

The buyer program is a financial mechanism for establishing critical system processing rules from the SCF perspective. Rules are configured in the buyer program that determine the financial aspects associated with system trading and funding. The buyer program allows for configurable functionality such as (1) setting financial institution pricing profiles, (2) distribution of interest and fee splits between community participants, (3) distribution of buy offers to financial institutions, (4) setting currencies and time zone, (5) setting trading windows (i.e. the hours in the day within which an offer can be accepted for a given draft), (6) time-out values for trade acceptance, (7) participating suppliers and financial institutions, (8) trading limits that protect financial institutions from exceeding monetary thresholds, (9) interest rate display daily, monthly or annually, (10) automatic distribution of sell offers, (11) automatic generation of sell offers, (12) settlement gateways, (13) remittance advice reporting, (14) clearing accounts, (15) distribution of interest and fees to community participants and (16) supplier pricing, among others.

FIG. 2 is a buyer program data flow diagram 30 illustrating data flow transfer from the community manager 120 and the service provider 20 to and from a buyer program setup and management process 136 (see also FIG. 3) for the supply chain finance system 10 of FIG. 1A. Each data flow may contain one or more parameters, rules or other configuration items.

Buyer program 100 (FIG. 3) may be configured by a community manager 120 and a service provider 20. The division of duties between community manager 120 and service provider 20 may be separated when the functions are performed by separate entities, with each having independent login components. Upon logging into system 10 (FIG. 1A), each entity may access the features and functionality directly related to that entity. Service provider 20 has access to the buyer program 100 details for support purposes but may not modify any financial-related fields. Service provider 120 also manages several key buyer program 100 parameters that are operationally related to and necessary for the set-up and operation of buyer program 100.

In FIG. 2, the data flow between service provider 20 and buyer program 100 via buyer program set-up 136 represents those processes that are primarily performed via a series of interfaces as part of the set-up and system management of buyer program 100 and those entities associated with the program. They include functionality such as (1) configuration of the buyer program system parameters, (2) service provider (SP) bank account setup and management, (3) adding and maintaining the financial institutions entity, (4) adding and maintaining the supplier entity, (5) viewing bank account activation requests and confirming bank account information, (6) adding and maintaining the buyer entity, (7) activating suppliers to buyer programs once the supplier entity has been set-up, (8) viewing buyer program rules should configuration issues occur that require the service provider's attention, and (9) establishing and maintaining service provider pricing and fee distribution.

In FIG. 2, the data flow between community manager 120 and buyer program 100, again via buyer interfaces for program set-up 136, represents those processes that are primarily performed after service provider 120 has laid the groundwork for buyer program 100. They are processes that are independent of those performed by service provider 20 yet are dependent upon the service provider's role in the initial set-up and ongoing management of the entities that participate in the program. They include functionality such as (1) designating internal FIs for buyer programs, (2) activating and deactivating FIs to buyer programs, (3) setting up and maintaining tax profiles where applicable, (4) establishing fees and margins for all buyer programs, (5) setting various rules that control how the buyer program processes payment obligations and payments, (6) configuring suppliers into their respective buyer program tiers, (7) associating FI pricing profiles to buyer programs, (8) setting up the default buyer program and related buyer program tiers, (9) configuring parameters that control minimum and maximum sell offer amounts, cut off days etc., (10) setting up and assigning bank accounts, (11) distributing buy offers that require manual distribution, and (12) activating suppliers into the buyer program. Also, buyer programs are set up to trade either trade receivables or time drafts and if time drafts, to trade as non-printable or printable electronic drafts. This buyer program parameter is defined at the community level.

Buyer Program Set-Up

Figure 3:
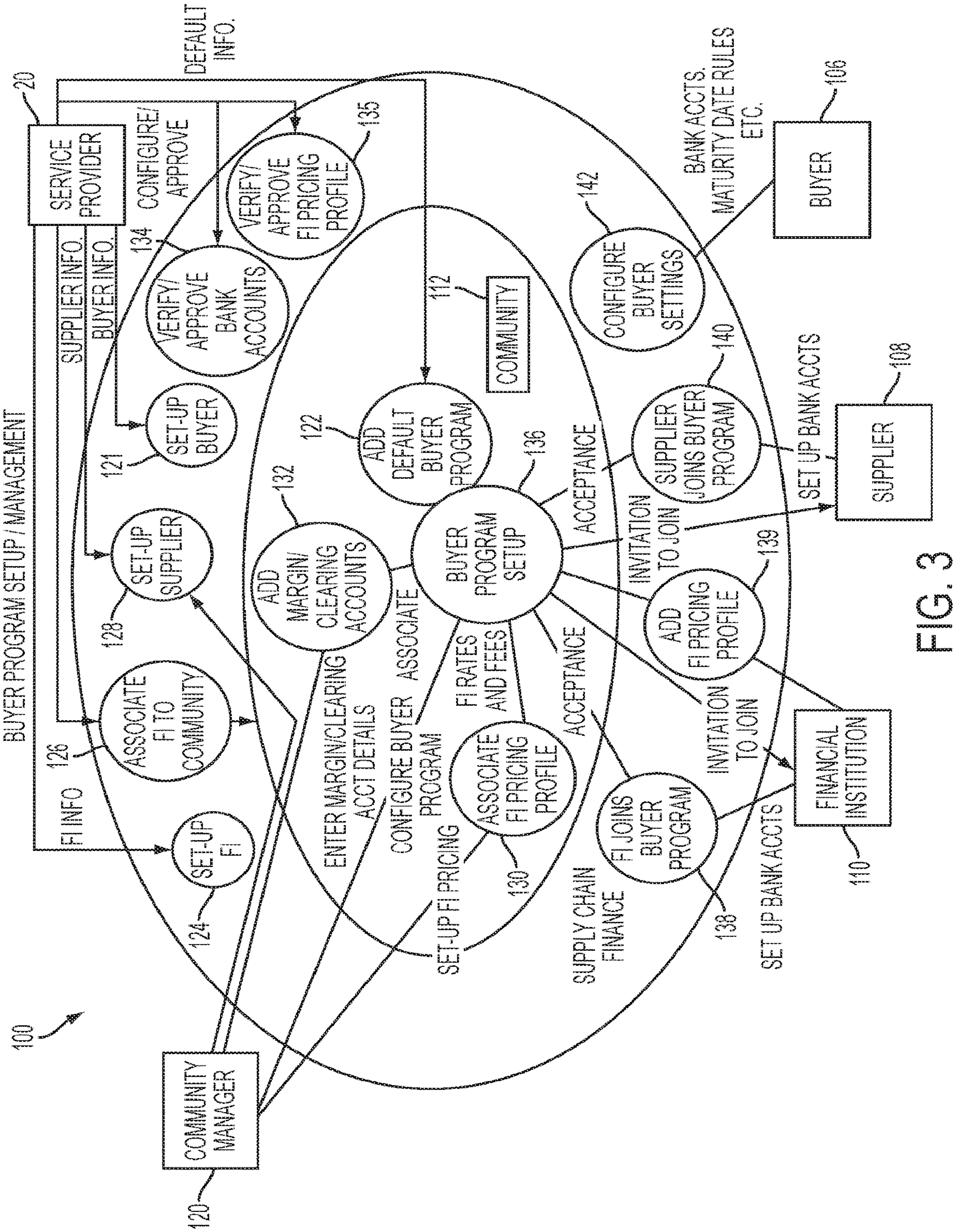
FIG. 3 is a schematic illustration of a process for setup and management of a buyer program associated with a supply chain finance system as in FIG. 1A.

FIG. 3 is an overview of an exemplary process for the setup and management of a buyer program (indicated at 100 as a set of parameters and rules defined and effected by the processes illustrated in FIG. 3) for financial supply chain management. Setting up and maintaining a buyer program 100 is a series of processes. Although the processes are typically performed in a specific order during initial setup of the buyer program 100, the same processes are also utilized during day-to-day management of the buyer program 100 and may thus be performed in any sequence necessary. A series of setup tasks correspond to each process. Some processes are performed by service provider 20 while other processes are performed by community manager 120. Supplier 108, buyer 106 and financial institution 110 entities are also involved during the setup process. It should be understood that the steps for setting up the buyer program 100 may differ from this exemplary embodiment. Some steps may be omitted or additional steps may be included. Additionally, the steps need not necessarily conform to the order given in this non-binding example.

Default Buyer Program Set-Up—Service Provider

A service provider 20 module (see FIG. 9) is used to set up and configure the SCF platform. The SCF platform includes communities, and each community 112 includes one or more buyer programs 100. Buyer program 100 related components include communities 112, suppliers 108, buyers 106, financial institutions 110, default buyer programs and bank accounts.

A service provider 20 setup scenario for a buyer program 100 typically begins with the set-up buyer step 121. Service provider 20 enters into database 452 (FIG. 29) buyer 106 information such as name, address, contact information and user ID.

An add default buyer program step 122 enters parameters that are system 10 related and control trading and funding activities. Other parameters for the new buyer program 100 are included for initializing the currency, service provider bank account, service provider pricing and time zone.

A set-up FI step 124 adds a first time financial institution 110 to community 112. This step does not apply if an existing financial institution 110 is being used by buyer program 100. The associate FI to community step 126 links financial institution 110 to a community 112. At this point, financial institution 110 does not actually participate, as it has not yet received an invitation to join buyer program 100.

A set-up supplier step 128 adds and activates suppliers 108 so that they may be associated with buyer program 100. A buyer 106 may have a large number of suppliers 108 that are not currently on the SCF platform. Suppliers 108 must be added and activated in order to be associated with buyer program 100. A supplier 108 is added by adding company information and the initial supplier admin user ID. User ID information is typically communicated to supplier 108 via email. Of course, suppliers 108 that are already added or associated with buyer program 100 need not be added again. Service provider 20 approves the added suppliers 108 via a web interface before the suppliers 108 can be added to a buyer program 100. Once the suppliers 108 have been added (if necessary) and other buyer program set up has been completed, service provider 20 accesses the default buyer program and associates the supplier 108 to the buyer program 100. Of course, a supplier 108 that has been previously added may also be associated to the buyer program 100. Note, as indicated in FIG. 3, that community manager 120 may also add and activate suppliers via process 128.

In the verify/approve bank accounts 134 step, service provider 20 verifies that all bank account information and authorization data entered in the system are correct. This step is not normally performed using the web interface; however, once this step has been successfully completed, service provider 20 configures and activates the bank account using the SCF system 10. Service provider 20 also verifies financial institution pricing profiles (that have been entered by the financial institution) against pricing on which the parties have agreed in the contracts at 135. Prior to the verification step, the financial institution will have entered its pricing profiles, typically per currency, at 139.

Default Buyer Program Set-Up—Community Manager

Community manager 120 performs default buyer program set-up 136 and is responsible for configuring and updating buyer programs 100. Before suppliers 108 can trade, the initial setup configures and activates buyer program 100 with at least one supplier 108 and one financial institution 110 active. Once buyer program 100 is active, community manager 120 continues to monitor and manage the program using tools provided on the SCF platform. A supplier cannot be added to a buyer program until the buyer program is active, which occurs once the community data is entered, a financial institution has accepted the buyer program, a buyer has entered bank account information, and the service provider has verified bank account information.

Figure 5:
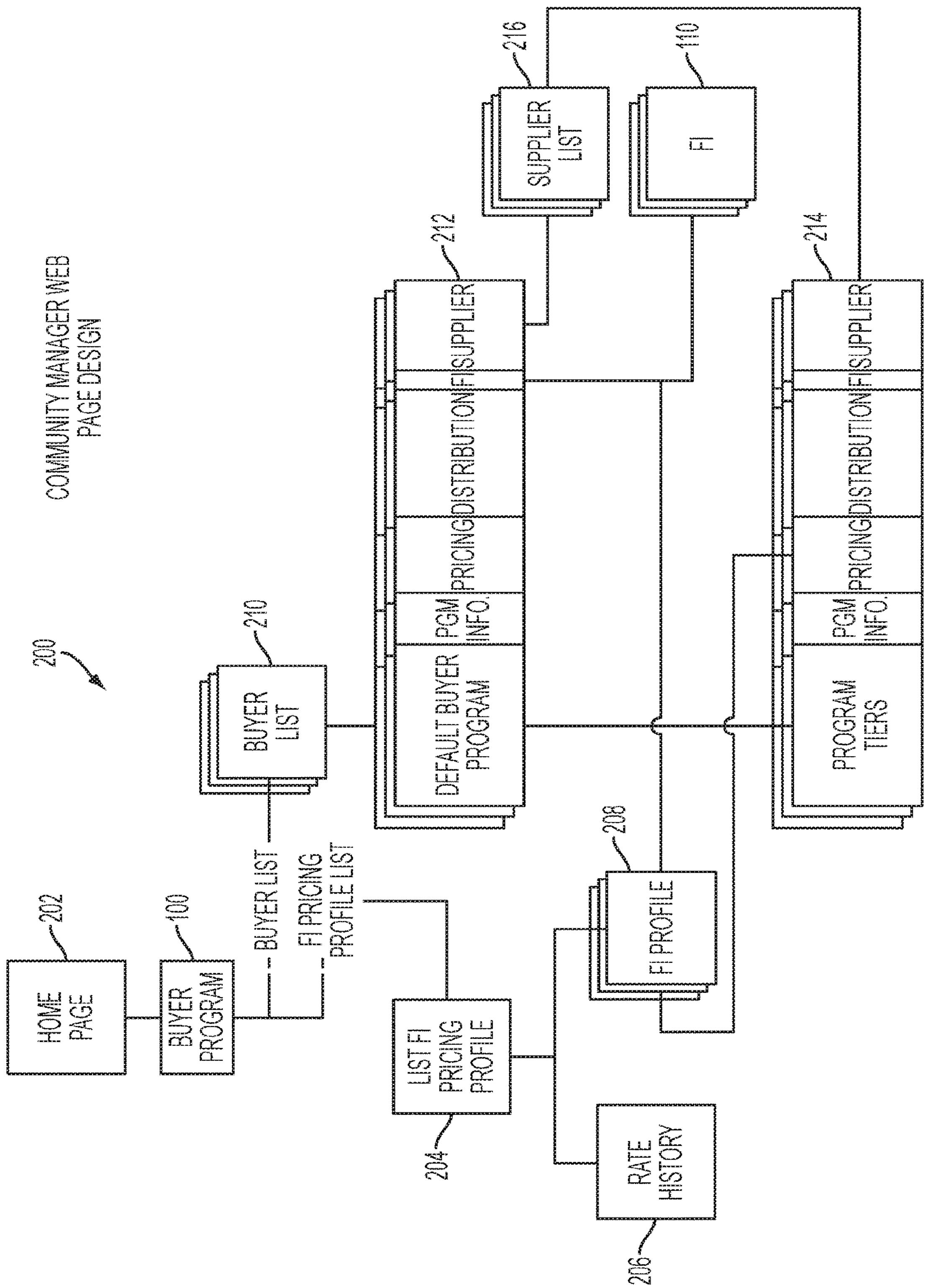
FIG. 5 is a diagram illustrating buyer program community manager web page features for the buyer program of FIG. 3.

A community manager 120 setup scenario for a default buyer program 100 includes an associate FI pricing profile step 130. Community manager 120 has access to an FI pricing profile list 204 (FIG. 5). The FI pricing profile list 204 provides access to details of FI pricing profiles 208 (FIG. 5) and rate history 206 (FIG. 5). The FI pricing profile 208 contains the pricing provided to financial institution 110 as part of the funding process. Included are base rate and margin basis points that financial institution 110 receives when accepting a buy offer.

An add margin/clearing accounts step 132 adds margin and/or clearing accounts if they do not yet exist. Community manager 120 uses the margin/maturing clearing account feature to add new accounts. Of course, if the margin/clearing accounts already exist, then the add margin/clearing accounts 132 step may be skipped. The margin account is the account into which the community manager fees are paid. The maturity clearing account is the account from which payments are made on maturing trade receivables or time drafts to financial institutions (if traded) or suppliers (if not traded).

Parameters within the buyer program 100 are initialized during buyer program set-up 136. These parameters are discussed in further detail below and occur within a buyer program tab, a parameters tab, a distribution tab, a financial institutions tab, and a supplier (see FIG. 8-C).

During buyer program set-up 136, buyer program tab parameters (e.g. whether the buyer program will trade based on trade receivables or time drafts and, if time drafts, whether electronic or printable drafts), including company details, buyer program details, buyer program parameters, restrict auto-advance rules, community manager details and interest calculation rules, are initialized.

During buyer program set-up 136, parameter tab parameters, including net community margin, supplier transaction fee, minimum trade cut off days, maximum trade cut off days, reserve, margin account, maturing clearing account, rate display, tax profile, minimum amount (sell offer) and maximum amount (sell offer), are initialized.

During buyer program set-up 136, distribution tab parameters, including rotation and manual, are initialized. The rotation parameter is initialized when more than one financial institution 110 is included in the buyer program 100. The manual parameter is initialized when the community manager 120 distributes buy offers.

During buyer program set-up 136, financial institutions tab parameters, including deactivate FI, add FI, associate FI pricing profile, and modify rotation sequence, are initialized.

During buyer program set-up 136, the supplier tab has no information, because suppliers cannot be added until set-up has been completed. After set-up, however, the supplier tab allows community manager 120 to view all suppliers on the buyer program and to move suppliers 108 between buyer program tiers.

During buyer program set-up 136, an add buyer program capability allows community manager 120 to set-up buyer program tiers. The community manager 120 may organize suppliers 108 into separate tiers and assign different rates and fees, or other parameters, to each tier.

It should be noted that aside from the buyer program tab, the parameter tab and the financial institution tab (detail section), buyer program tier 214 parameters are typically inherited from the default buyer program 100.

Buyer Program Set-Up—Financial Institution

Once community manager 120 has associated a financial institution 110 to buyer program 100 at 126, financial institution 110 receives an invitation to join. As part of a sign-up process, financial institution 110 uses a portfolio manager user interface 503 (FIG. 13) (discussed below) to join the buyer program at 138 and to set important buyer program 100 parameters, including bank account information, contact information, credit limits, and auto accept rules.

Buyer Program Set-Up—Supplier

Once service provider 20 or community manager 120 has associated supplier 108 to buyer program 100, supplier 108 receives an invitation to join the buyer program if auto-advance rules are active for the buyer program. As part of the sign-up process, supplier 108 uses an activate buyer program user interface (discussed below) to join the buyer program at 140. Generally, the supplier will set up its bank accounts during its set-up in the system, but the supplier may perform any administrative tasks such as auto-advance set-up. If a buyer program is not active for auto-advance, then the supplier is not notified when the service provider or community manager adds the supplier to the buyer program. Since the supplier will have the ability to manually choose whether to trade any obligation in that program, the supplier's agreement to enter the program is not necessary, although in another embodiment the supplier's agreement is always obtained.

Buyer Program Set-Up—Buyer

Similarly, because buyer 106 selectively and voluntarily uploads A/P data to create payment obligations, it is not necessary for buyer 106 to register for a buyer program 100 once the CMSA is established. Several set-up tasks are necessary, however, and buyer 106 therefore configures buyer settings at process 142, including setting maturity dates, auto correct maturity dates and bank accounts. As noted above, the system retrieves maturity dates from the information provided in the buyer's A/P data. System 10 defines certain default rules, however, that can affect whether a given maturity date is valid, e.g. that maturity dates cannot coincide with weekends or holidays. Buyer 106 may add its own rules (e.g. change maturity date to nearest Wednesday) and/or rules governing how to set maturity dates when the default rules are violated.

Buyer Program Entities

Figure 4:
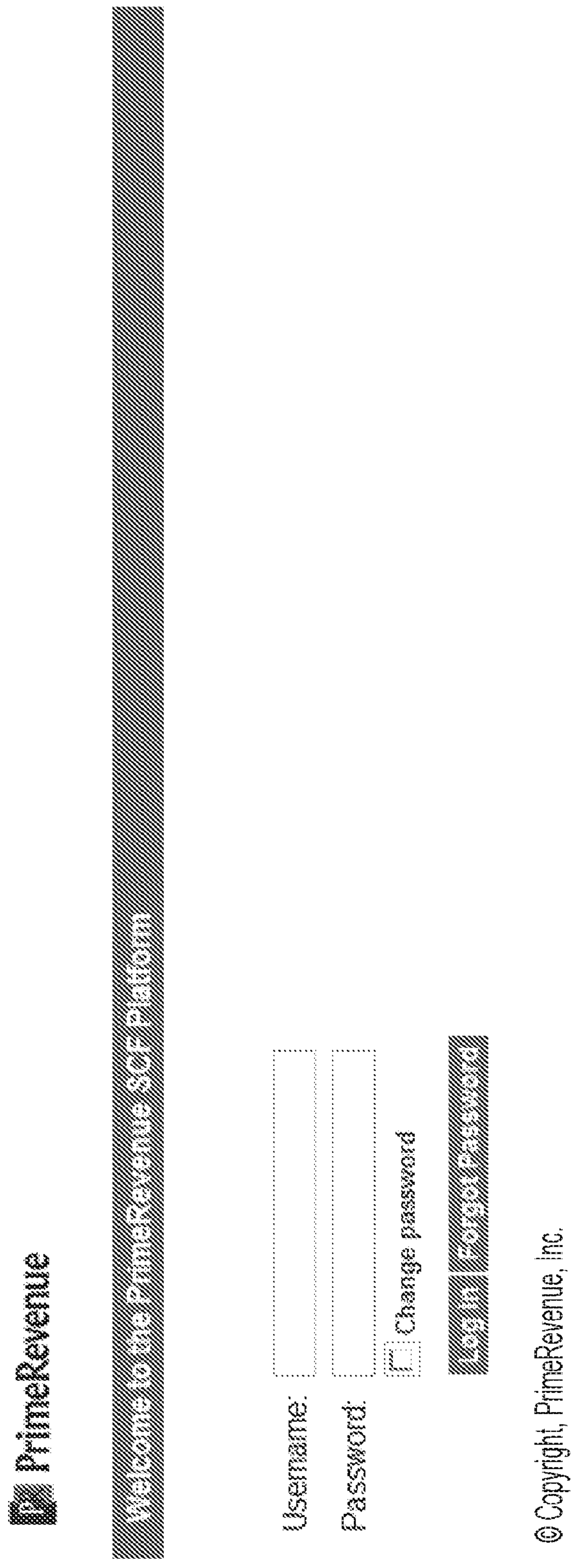
FIG. 4 is an exemplary user log in web page of buyer program entities for the process of FIG. 3.

System 10 maintains and presents a separate user interface for each community entity. Upon accessing system 10 via a network connection over Internet 454 (FIG. 29), system 10 presents a login screen at FIG. 4 to the accessing party, requesting a username and password. Since at set-up each community entity is associated in the database with its entity type (i.e. financial institution, buyer, supplier, service provider, or community manager), entry of the party's username and password allows the system to identify the correct entity type for the accessing party and thereby present the correct user interface to the accessing party. The web page interface for each entity is configured for the needs of that entity, and each is discussed below as it relates to buyer program 100.

Community Manager

FIG. 5 is a diagram illustrating buyer program community manager web page features 200. The community manager web features, as are the other pages and, more generally, the interfaces described herein, are presented to the user via Internet connection 454 (FIG. 29) by the SCF system 456 processor. A community manager home page 202 contains a buyer list 210 (i.e. a list of all buyers in a community) and summary buyer information that pertains to all buyer programs 100 for that buyer 106. Additionally, community manager 120 may access buyer programs 100 for each buyer 106 displayed.

Buyers 106 are given in the buyer program buyer list 210. Buyers may have multiple buyer programs 100. However, a given buyer program may also be associated with one or more buyer program tiers. A buyer program tier is largely a replica of the parent buyer program, but with slight changes specific to a given one or more suppliers. Thus, if a buyer has a group of suppliers that the buyer considers related, but yet for which it may wish to have individual parameters to some degree, the community manager (in conjunction with the buyer and/or a financial institution) sets up one or more buyer program tiers grouped, within a buyer program group, with the original buyer program from which the tiers originate. A group of buyer program tiers and the parent buyer program may or may not be considered a collective buyer program, depending on the context. For example, the trade window parameter is defined at the group level, while FI pricing profiles are specific to a given buyer program or program tier. The community manager has the capability to organize suppliers 108 in a supplier list 216 into different buyer program tiers 214 for the same buyer 106. Buyer program 100 capabilities also provide for association of a unique FI pricing profile 208 to any buyer program tier 214 within a buyer program 100.

Community manager 120 may view FI pricing profiles 208 and view rate history 206. Additional pricing capability related to buyer program tiers 214 may also be added. Buyer program 100 capabilities also provide for association of a unique FI pricing profile 208 to any buyer program tier 214 within a buyer program 100.

From the buyer program 100, community manager 120 can view supplier list 216 containing suppliers 108 that are active in buyer program 100. A buyer program tier associates a given supplier 108 with a series of parameters, including FI pricing profiles, so that these parameters apply to trades involving that supplier under that tier. Thus, from a buyer program interface 212, community manager 120 can group suppliers 108 into buyer program tiers 214 so that suppliers 108 having been assigned to that profile receive specific financial pricing considerations, including but not limited to trade cut off days, FI base rate, FI margin, service provider rate, community manager rate, supplier transactions fee (if any), and financial transaction fee (if any). The community manager rate and service provider rate can be combined into a gross community margin rate, e.g. where a single entity is both the service provider and the community manager. Where the entities are distinct, however, the community manager may enter only a net community margin (i.e. only the community manager rate), and the service provider separately enters the service provider rate. In the former instance, total supplier pricing is equal to the financial institution fee plus the gross community margin fee plus any financial institution and/or service provider transaction fees, but in the latter, gross community margin is replaced by net community margin and service provider rate.

Further details regarding community manager 120 functionality are discussed below in conjunction with exemplary screen images for that particular functionality.

Figure 6:
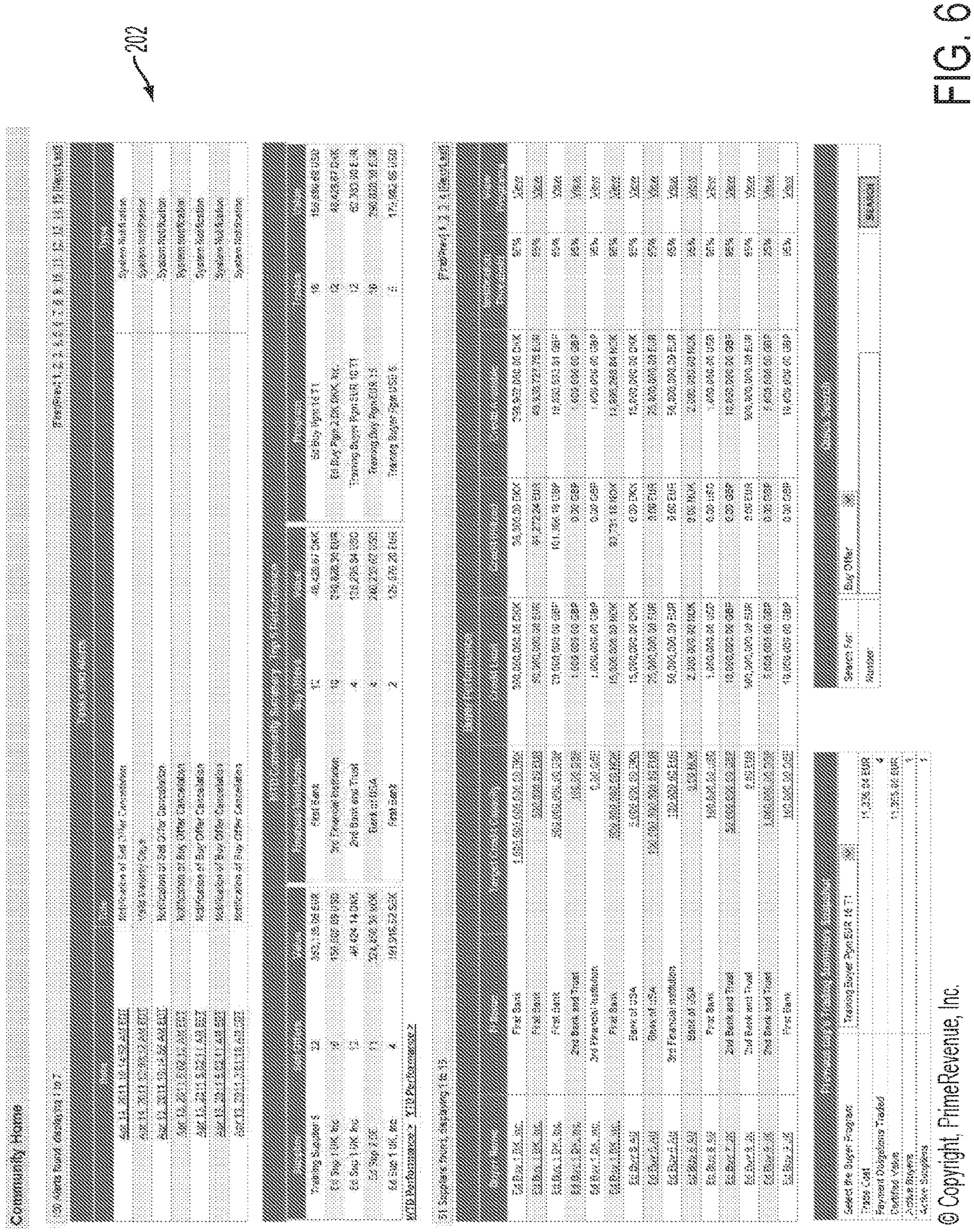
FIG. 6 is an exemplary screen image of the home page indicated in FIG. 5 for a buyer program community manager entity of FIG. 3.

FIG. 6 is an exemplary screen image of community manager home page 202. The screen presents summary information pertaining to all buyer/financial institution/currency combinations within the given community and general summary information relating to the community. In addition, community manager 120 may access a list of buyer programs for each buyer 106 displayed. The summary information presented includes (1) a table of tasks and alerts, (2) month-to-date community summary containing performance summaries by supplier, financial institutions, and buyer program, (3) buyer performance summary, (4) previous day's trading summary snapshot and (5) a quick search capability.

The month-to-date community summary table enables visibility and access to the trades for the community. The total number of sell offers and the cumulative value of those offers are displayed for the top five suppliers 108. The total number of buy offers and the cumulative value of those offers are displayed for the top five financial institutions 110. The total number of trades and the cumulative value of those trades are given for the top five buyer programs 100.

The section for buyer performance presents summary information for a buyer/financial institution/currency combination and includes buyer name, FI name, target credit capacity, credit limit, credit utilized and credit available. A view program selection allows for viewing the buyer programs 100 for the selected buyer 106.

Parts of the summary information presented on the community manager home page may be shown as hyperlinks, indicating that further information may be accessed regarding that particular information. For example, a view buyer program option is presented in the buyer performance section. Selecting one of the view links opens a list of buyer programs for that buyer, from which information about those buyer programs is available.

FI Pricing Profile

FIG. 7-A is an exemplary screen image 220 of list FI pricing profile functionality 204 shown in FIG. 5. The FI pricing profile provides buyer program 100 with the rates and fees associated with the financial institutions 110 participating in the buyer program 100. The FI pricing profile is associated to the buyer program 100 by community manager 120 at 130 (FIG. 3). The list FI pricing profile web page is accessed from a buyer program 100 pull-down menu.

As noted above, FI pricing profiles 208 (FIG. 5) may be added by the financial institution rather than the community manager, but in another embodiment the community manager also has, or only has, the ability to add such profiles. FI pricing profile 208 allows the financial institution to set up a single pricing profile and use it across any number of buyer programs 100. The pricing profile is discussed in greater detail below. FIG. 7-B is a screen available to the community manager from list pricing profile function 204 (FIG. 5) that lists all buyer programs to which the pricing profile is assigned.

FIG. 7-C is an exemplary screen image 224 of view FI pricing profile history functionality, as indicated at 206 in FIG. 5. Rate history 206 maintains all changes to the FI pricing profile and can be accessed from the list of FI pricing profiles (see FIG. 7-A). Rate history 206 may also be accessed from the view FI pricing profile page (see FIG. 7-D below).

Rate history 206 displays the previous value and the changes to value for all parameters on the FI pricing profile (see FIG. 7-D). History entries also include date/time stamp and the name of the user initiating the change. A search capability is also available.

FIG. 7-D is an exemplary screen image 226 of view FI pricing profile functionality. Information regarding profile financial information and rate selection criteria is displayed. The FI pricing profile information, as set by the financial institution, is displayed. As noted above, the FI pricing profile history may be accessed via the rate history 206 selection.

If the FI pricing profile is changed, then pricing for all buyer programs 100 related to that pricing profile is also changed. The FI pricing profile is currency specific and is assigned to a particular buyer program 100 when the buyer program 100 currency setting matches the FI pricing profile setting. The FI pricing profile provides the FI pricing for the buyer program 100 and defines the FI base rate and the FI margin.

The profile financial information includes the name of the profile, the currency specified, the profile rate in basis points, the FI margin over (monthly/prime/fixed) in basis points, the rate calculation (annual or flat) and the number of days in year for the rate calculation. The FI pricing profile is currency specific and matches that of the associated buyer program 100. The profile rate is displayed as a percentage (but could be displayed in basis points) and is the sum of the FI base rate (depending on the rate selection criteria) and the FI margin over. The FI margin over is the margin that financial institution 110 will receive over the FI base rate (monthly, prime, or fixed). For example, if the fixed FI rate is set at 6%, and the FI margin over is 100 basis points, then the profile rate will be 700 Bpts (basis points) or 7%. The rate calculation can be annual or flat. For an annual rate calculation, the rate is spread across the total number of days remaining to maturity (i.e. it is the rate, divided by the number of days in the year, multiplied by the number of days to maturity). For a flat rate calculation, the rate is applied against the entire amount, and the days to maturity are not considered. The number of days in year is used to specify the number of days when calculating an annual rate.

The rate selection criteria specifies the way the interest rate (i.e. FI base rate) is applied to payment obligations. A "tenor based" option allows the financial institution to enter an FI base rate specific to the number of days between the maturity date and the date the trade occurs. The days may be grouped into thirty day, or other, increments. The "Prime/Libor" and "Fixed" rate options apply one rate, regardless of the time difference. Regardless of the way in which the FI box rate is defined, it will be treated as defined by the "RateType" parameter.

Buyer List

FIG. 8-A is an exemplary screen image 228 of the community manager's web page showing buyer list 210 (FIG. 5). It contains a list of buyers 106 and allows the community manager to view all associated buyer programs 100 for a given buyer, via the "view program" link. From that page (not shown), the community manager can view individual buyer programs or program groups, as shown in FIG. 8-B. Returning to FIG. 8-A, summary information for the buyer 106 is provided, including the total target credit capacity, credit limit, credit utilized and credit available.

Buyer Programs List

FIG. 8-B is an exemplary screen image 230 of the list buyer programs web page accessed from the community buyer programs list (not shown). The community buyer program list page may be accessed from the community buyer list page (see FIG. 8-A) or from the community manager home page (see FIG. 6). The buyer programs list page provides information such as status (active, pending, etc.), trade type (i.e. whether trade receivable or time draft), total supplier pricing, and gross community pricing, and also enables community manager 120 to view buyer program 100 and buyer program tier 214 details (the first view is the parent buyer program; the last three are buyer program tiers), deactivate buyer program tiers 214, and add buyer program tiers 214.

Buyer Program

When a buyer program 100 is first added, it is a default buyer program 100. A buyer 106 may have multiple default buyer programs 100. Each of the multiple default buyer programs 100 may have a different specified currency, and some or all of the multiple default buyer programs 100 may have the same currency. The default buyer program 100 may be further subdivided into sub-programs or buyer program tiers 214. The community manager 120 may utilize buyer program tiers to organize suppliers 108 under different pricing profiles for the same buyer 106.

Multiple Buyer Programs for a Buyer

The default buyer program 100 has features not available to a buyer program tier 214 and are used to (1) manage the financial institutions 110 participating in the buyer program 100, (2) manage the financial institution 110 distribution criteria, (3) provide default pricing information to buyer program tiers 214 at the time they are added and (4) join financial institutions 110 to the default buyer program 100. Buyer program tiers 214 are the other buyer programs 100 that are added to the customer's initial default buyer program 100. It should be noted that the service provider 20 adds the initial default buyer program 100 and the community manager 120 updates that program and, if needed, adds buyer program tiers 214 as sub-programs under the default buyer program 100.

When first added, buyer program tiers 214 contain the default buyer program 100 financial institutions 110, distribution and pricing. Buyer program tiers 214 may view, but not update, financial institution 110 information and distribution type. Suppliers 108 may be moved to and from buyer program tiers 214 to default buyer programs 100. Pricing information may be changed on any or all buyer program tiers 214.

Configuring the Default Buyer Program

FIG. 8-C is an exemplary screen image 231 of the buyer program tabs representing the areas of the buyer programs 100. A default buyer program 100 can be accessed from the buyer program list (FIG. 8-B). The buyer program 100 is segmented into five areas or tabs containing information related to (1) buyer program information, (2) parameters, (3) distribution, (4) financial institution and (5) supplier. The buyer program information contains general information about the buyer program 100. The parameters tab provides information about the buyer program's trading parameters. The distribution tab is used to determine how trades are distributed to the various financial institutions 110 participating in the buyer program 100. The financial institution tab provides for changing financial institution 110 information in initial or default buyer programs 100. The supplier tab provides for adding suppliers 108 to a buyer program 100 or assigning suppliers 108 to other buyer programs 100.

Configuring the default buyer program 100 is performed by completing information in each of the five tabs discussed above. Information about the buyer program 100 is entered by a user, and configuration is complete when the relevant information for each tab has been entered and then the "next" button selected after the information has been entered. The buyer program 100 is not configured properly until the required information in the buyer program tab is completed and the "next" button is pressed. The "back" button may be used to toggle through the tabs. It should be noted also that community manager 120 may begin configuring a buyer program 100 and exit at any time after completing the buyer program tab. If the buyer program tab has been completed, then community manager 120 may return later to complete the configuration. The buyer program 100 is considered active when community manager 120 has added a financial institution 110 to the buyer program 100, the financial institution has accepted, and the buyer has entered its bank account information.

Editing the Buyer Program

FIGS. 8-D(1) and 8-D(2) are exemplary screen images 232 of the edit buyer program screen accessed by activating an "edit" button after activating the buyer program tab in FIG. 8-C. Having selected the buyer program tab from FIG. 8-C, the user may then edit information relating to the buyer program 100 or a buyer program tier. The company information for the particular buyer 106 is shown at the top of the screen. The user may edit the (1) buyer program details, (2) restricted auto-advance rules, and (3) interest calculation rules.

The buyer program details include the contact information for the buyer program 100, and include the buyer program name, a contact name, a telephone number, an email address, an optional description and an optional program manager. It should be noted that the program manager appears in a pull-down menu, allowing for the possibility that a single program manager may manage multiple buyer programs 100. A "display transmit rights message" flag triggers issuance of a notice that a trade has initiated. An "allow PO move at trade" option allows that system to move payment obligation maturity dates so that a given maturity date has sufficient positive value to cover a credit memo due on that date. The "trade type" defines whether the buyer program trades based on trade receivables or time drafts. If the community manager selects "Time Draft (TD)," as is shown in FIG. 8-D(2), an "Allow Print of Negotiable Drafts" box becomes selectable. If this box is selected, as also indicated in FIG. 8-D(2), then the printable draft functionality is enabled, as discussed above, and below with respect to FIG. 10-T and FIG. 14-L.

The restricted auto-advance rules set parameters for the automatic creation of buy orders. If auto-advance is set to "On", as shown in FIG. 8-D(1), then the auto-advance fields can be modified. If the auto-advance is set to "Off", as shown in FIG. 8-D(2), then the rules do not appear on the screen. Credit memo application order defines the order in which payment obligations are applicable to credit memos (i.e. largest or smallest payment obligation first). The auto-advance rules provide for a minimum amount, a maximum amount, date (any day, due date, within range of maturation, specific dates) that will be auto-advanced, payment obligation amount, payment obligation number, and schedule dates (every day or specific dates). The "any day" option means uploaded payment obligations for that supplier for that buyer program are automatically offered following their creation at the next auto-advance run. The "due date" option means payment obligations are automatically offered as of a calendar date (the due date) identified in the data uploaded from the buyer's data. This may be used, e.g., where the buyer is required to pay invoices within a specified amount of time. The "maturation date" option means that the system will automatically offer payment obligations for sale at a certain time prior to their maturity dates. Auto-advance may also be set based on time from the invoice date for the invoice(s) upon which the payment obligation is based. As noted above, system 10 operates based on payment obligations, not invoices, but if a buyer uploads invoice data as member content, the system can utilize the invoice date in this instance. It should be noted that the auto-advance option can be set to "On" at the initial set up for a default buyer program 100 or the initial set up of a buyer program tier. Once turned off for any buyer program 100 or buyer program tier, the auto-advance option can not be turned back on for that program or tier. In one presently described embodiment, time drafts cannot be selected for a buyer program for which restricted auto-advance rules are active, as is reflected in FIGS. 8-D(1) and 8-D(2).

The interest calculation rules determine the date that the system 10 utilizes for calculation of interest (total rate, i.e. FI base rate, FI margin, service provider rate, and community manager rate) for a trade. Selecting the payment trade date is the default, and causes the system 10 to calculate interest as of the trade date. Selecting the payment effective date provides for interest to be calculated as of a specified number of dates after the trade date. The number of days after trade (1-4) is entered in the box shown and is required if the payment effective date is selected.

FIG. 8-E is an exemplary screen image 234 of the buyer program parameter screen of the buyer program 100. The user is allowed to modify program financial information such as gross community margin, service provider fees (view only), net community margin, supplier transaction fee, FI transaction fee, minimum trade cut off days, maximum trade cut off days, reserve, margin account, maturing clearing account, rate display, tax profile, and minimum and maximum sell offer amount.

The gross community margin shown is the sum of the net community margin and the service provider basis points (Bpts).

The service provider fees are derived from the community pricing profile assigned to that community 112 to which the buyer program 100 belongs. The service provider fees shown are the established service provider basis points. The amount is estimated (estimates may be needed where service provider fees are applied in tiers based on trade volume) and based on the service provider pricing tiers. Service provider pricing tiers are established by the service provider through the community pricing profile functionality in the service provider 20 module.

The net community margin is either a fixed amount or is defined as the gross community margin minus the service provider fee. If the fixed check box is selected, then the net community margin can be entered as a fixed value. (For more details, see "Fixed net community margin" in the "Additional Features of the Buyer Program" section below.)

Optional supplier transaction and FI transaction fees are entered in the respective boxes shown and may be entered with up to two decimal places. These fees are fixed amounts per transaction and are charged at the time of the trade.

The last modified info shows the date, time and user name of the most previous modification of the buyer program.

The minimum trade cut off days for a sell offer are entered in the box shown. The system 10 will validate the number of maturity days of payment obligations within a sell offer before generating it into a buy offer. The payment obligation maturity dates within a trade must be beyond the day the trade occurs, plus this number of cut off days. Payment obligations that fall within the cut off days are not available to trade and are not visible on the available to fund page.

Maximum trade cut off days for trading are entered in the box shown. System 10 validates that the number of days until maturity (from the trade date) of any payment obligations are less than or equal to this value before displaying them on the available to fund screen.

The reserve for the buyer program 100 may be selected (yes) or not selected (no). An amount (dollar or other currency) or a percentage is entered in the box if the reserve is selected. The amount or percentage is defined on a monthly basis, so that the reserve can change monthly. It should be noted that the reserve functionality combines with credit memos to prevent buyer 106 from going into a net negative balance with their suppliers 108 due to trading. The reserve allows either an amount or percentage of payment obligations for a supplier 108 to be held back so that they can not be traded. The non-traded amount is used to offset credit memos that may come in for that supplier 108 throughout the month.

A margin account may be selected from a pull-down menu of bank accounts for the buyer program fees. Margin accounts are established as part of the bank account setup by the community manager 120. To be available for selection, the bank account must also be validated by service provider 20.

A maturing clearing account is established for the buyer program 100 and selected from a pull-down menu of bank accounts. Clearing accounts are established as part of the bank account setup by the community manager 120. (For more details, see "Clearing accounts" in the "Additional Features of the Buyer Program" section below.) To be available for selection, the bank account must also be validated by service provider 20.

The rate display for supplier 108 is selected from a pull-down menu. Choices include a daily, monthly or yearly display rate. This field determines how supplier 108 sees the discount rate during trading.

A tax profile for buyer program 100 is selected from a pull-down menu. Tax profiles are set up by service provider 20 using an out of system 10 process. Tax profiles that are set up by service provider 20 are available for selection.

A minimum amount required for a trade may be selected. If a minimum amount is required by selecting the option, then that amount may be entered in the box shown. The no minimum amount should be selected if no minimum trade amount is desired. If a minimum amount is entered, then no sell offers may be submitted less than this amount.

A maximum amount required for a trade may be selected. If a maximum amount is required by selecting the option, then that amount may be entered in the box shown. The no maximum amount should be selected if no maximum trade amount is desired. If a maximum amount is entered, then no sell offers may be submitted greater than this amount.

Once the user is satisfied with the page data, the "save" button can be selected to initiate the change.

FIG. 8-F is an exemplary screen image 236 of the distribution screen. The distribution screen is selected by the distribution tab shown in FIG. 8-C. The method is selected for distributing buy offers to the financial institution 110. The distribution methods available are rotation or manual. It should be noted that for single financial institution 110 buyer programs 100, the rotation option should be selected. Selecting the manual option causes community manager 120 to be responsible for allocating sell offers to specific financial institutions 110. It should also be noted that the rotation option can only be changed in an initial or default buyer program 100—the first buyer program 100 entered for buyer 106—through buyer program interface 212 (FIG. 5). Subsequent buyer program tiers 214—those based on the default buyer program 100—will inherit this value from the default.

FIG. 8-G(1) is an exemplary screen image 238 of the financial institution screen. FIG. 8-G(2) is a details screen activated from the "view" link in FIG. 8-G(1). The financial institution screen is displayed by selecting the financial institution tab shown in FIG. 8-C. The financial institution tab provides the community manager 120 with the capability to manage the financial institutions 110 associated with that buyer program 100. From the financial institution 110 page, community manager 120 can deactivate one or more FIs, add an FI to the buyer program 100, change the rotational sequence, designate a single internal FI and view FI details. Changing the financial rotation sequence controls the distribution of buy offers to financial institutions 110.

Selecting the checkbox for internal FI column corresponding to a particular financial institution 110 (from the screen shown in FIG. 8-G(2)) provides for making or changing a financial institution 110 to an internal FI. Internal FIs are self funding buyers. An internal FI is a buyer 106 acting as a financial institution 110 when accepting trades from their suppliers 108. (For more details, see "Internal/external financial institutions" in the "Additional Features of the Buyer Program" section below.)

Details for a financial institution 110 may be viewed by selecting the view hyperlink in the details column.

A financial institution 110 for buyer program 100 may be deselected by selecting the checkbox in the "all" column next to the financial institution 110 to be deactivated and then selecting the "deactivate selected" button. Selecting the checkbox next to "all" will cause all the checkboxes next to the respective financial institutions 110 to be checked. Selecting the "deactivate selected" button would then cause all financial institutions 110 for this buyer program 100 to be deactivated.

A financial institution 110 may be added to the buyer program 100 by selecting the "add" button. A list of available financial institutions 110 will be presented. Financial institution(s) 110 may be selected by selecting the check box corresponding to the financial institutions 110 to be added. Selecting the accept button will cause the selected financial institutions 110 to be added to the buyer program 100. The financial institution 110 receives an alert from the SCF system 10 notifying the financial institution 110 that they have been invited to join the buyer program 100. The financial institution 110 will not be active in the buyer program 100 until accepting the invitation and registering with the buyer program 100. It should be noted that community manager 120 can only assign financial institutions 110 that have been setup within service provider 20 and then assigned to the community 112 by the service provider 20. It should also be noted that financial information can only be changed on an initial or default buyer program 100—the first buyer program 100 entered for the buyer 106. Subsequent buyer program tiers—those based on the default—inherit the financial institution 110 information from the default.

FIG. 8-H is an exemplary screen image 240 of the supplier screen. The supplier screen is selected by selecting the supplier tab shown in FIG. 8-C. The supplier tab enables community manager 120 to organize buyer program 100 suppliers 108 into buyer program tiers 214. The primary function of the supplier tab is to move a supplier(s) 108 between the default buyer program 100 (via the buyer program interface 212) and buyer program tiers 214 and to view the supplier details.

Service Provider

Figure 9:
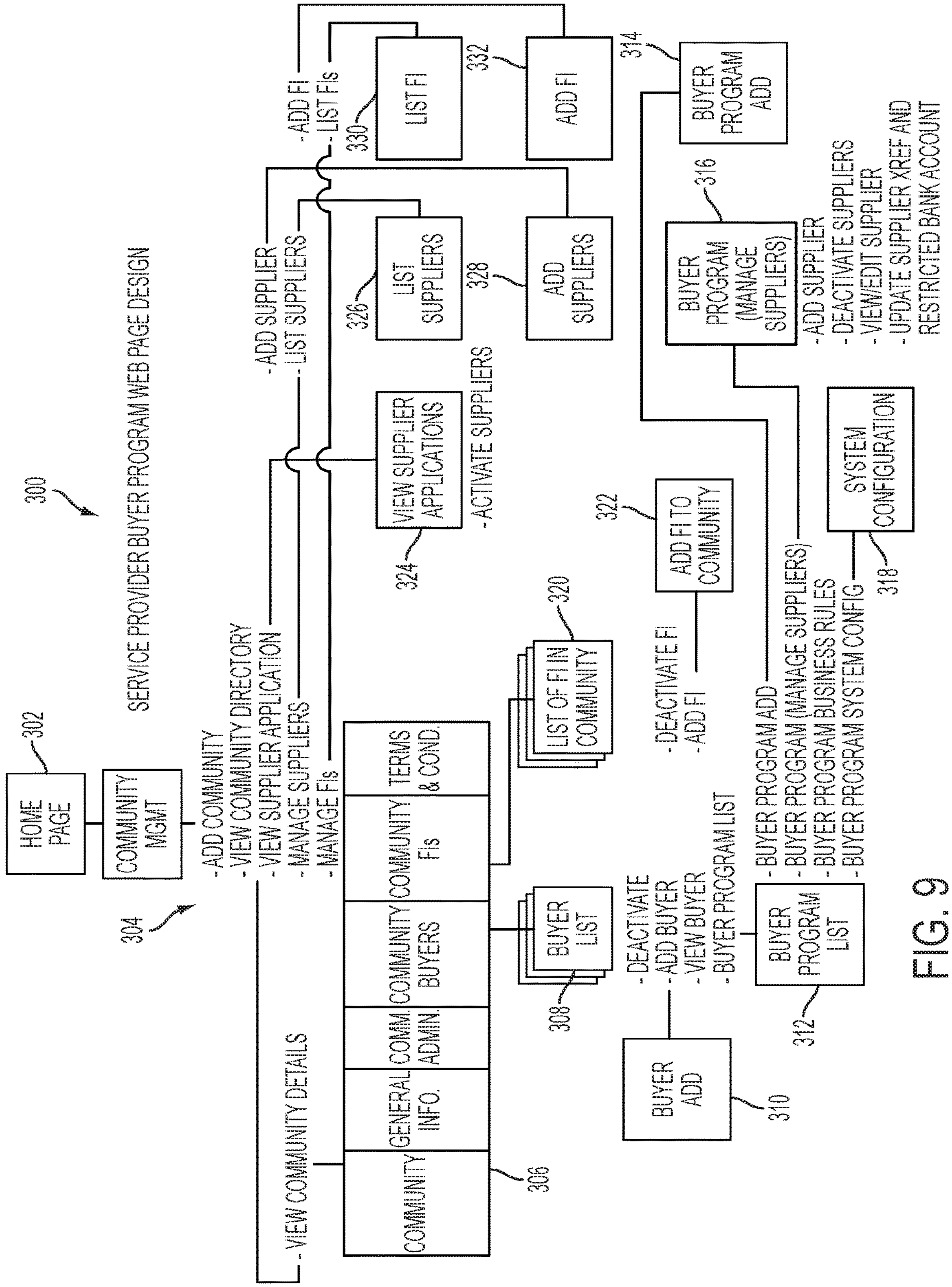
FIG. 9 is a diagram illustrating buyer program service provider web page features for the buyer program of FIG. 3.

FIG. 9 is a diagram illustrating buyer program service provider web page features 300. A buyer program service provider home page 302 provides for performing buyer program 100 related tasks. From a service provider interface 304, a service provider 20 can add communities 112, add buyers 106 to a community 112, add the default buyer program 100 for the new buyer 106, configure buyer program system related parameters, add financial institutions 110, add suppliers 108, view and approve supplier applications, associate suppliers 108 to buyer programs 100, and view and manage bank account applications.

More specifically, service provider 20 can add communities 112, view community details through a community interface 306, view and approve supplier applications 324, manage suppliers 108 and manage financial institutions 110.

From community interface 306, service provider 20 may access a community buyer list 308 and a list 320 of FIs in the community. From community buyer list 308, service provider 20 may deactivate buyer(s), add buyers at 310, view buyer details and access a buyer program list 312. From the buyer program list 312, service provider 20 may perform buyer program add 314, access buyer program (manage suppliers) 316, access buyer program business rules and perform buyer program system configuration 318. Managing suppliers 108 through the buyer program (manage suppliers) 316 interface allows service provider 20 to add suppliers, deactivate suppliers, view and edit suppliers, update supplier cross-references and restricted bank accounts. From the list of FIs in the community 320, service provider 20 may deactivate financial institutions 110 and add financial institutions to the community at 322.

A view supplier applications 324 interface allows service provider 20 to view supplier information and activate suppliers 108.

Service provider 20 manages suppliers 108 through a list suppliers interface 326 and an add supplier interface 328. Service provider 20 manages financial institutions 110 through a list FI interface 330 and an add FI interface 332.

FIG. 10-A is an exemplary screen image 302 of service provider home page. The service provider home page provides for performing buyer program 100 related tasks. Access is provided to important information regarding community 112 activities, as well as links to more detailed buyer program 100 information. The service provider home page provides tasks and alerts, and a list of active communities.

The tasks and alerts provide a listing including notifications, payments and other alerts. For example, a payment obligation import might have occurred at a certain time as a system notification. The date of the message is provided as well as the type of notification.

The active communities allows for viewing a list of communities by the order in which they were added to the system 10, and also provides for hyperlink to additional communities. Summary information is provided for each community 112 including the name, description, number of buyers, and number of suppliers.

FIG. 10-B is an exemplary screen image 336 of a community directory page. The community directory is accessed from a community management pull-down menu from the home page. Communities can be viewed and managed from the community directory list page.

A buyer program 100 for a specific community 112 is accessed from service provider 20 by locating the desired community 112 containing the buyer program 100 and locating the community 112 in the community directory. Selecting the hyperlink brings up a community tab page (FIG. 10-C), from which a community buyers tab may be accessed, providing a list of buyers (FIG. 10-D), from which buyer program information can be accessed by a "view" link.

FIG. 10-C is an exemplary screen image 338 of a community information page. There are five tabs on the community information page, including general information, community administrator, community buyers, community financial institutions and "terms and agreements." The general information tab is the default selection.

Buyer program 100 information can be accessed from the community buyers tab as described above. The community buyers tab provides a list of community buyers, and service provider 20 may manage the system 10 rules for the buyer program 100 from a page accessible from the "view" link for a particular buyer.

The community financial institutions tab provides a list of financial institutions 110. From the financial institutions list, service provider 20 may add a new financial institution 110 to the community or deactivate a financial institution 110 from the community.

FIG. 10-D is an exemplary screen 340 of a list of community buyers accessed by selecting community buyers tab on the community information page. A buyer list associated with that community 112 is displayed. From the list of buyers, service provider 20 can deactivate a buyer 106, view the buyer 106 company information, view a list of buyer programs 100 for the selected buyer 106 and add a buyer 106.

FIGS. 10-E(1) and 10-E(2) illustrate an exemplary screen 342 of the add buyer page. Adding a buyer 106 is the first step to adding a buyer 106 to the community 112 and thus begins the process for adding a buyer program 100. Adding a buyer 106 to the community is initiated by selecting the add button on the buyer list page in FIG. 10-D, causing the add buyer page to be displayed.

Buyer information includes general information, contact information, business description, time draft contract signatory information, currency, company logo and buyer administrator. General information includes the company name, ID and address. Contact information includes name, phone, email, cell phone, fax and website.

Business description allows for DUNS number, business number, tax type, tax identifier for the buyer and buyer remittance. The tax type is selected from a pull-down menu. Setting the buyer remittance flag will designate that buyer 106 will receive remittance advices electronically via system 10. It should be noted that the display information and required fields will differ depending upon the country code selected.

The time draft contract signatory is the identity of the person who signed the CMSA on behalf of the buyer and who thereby provides power of attorney to the community manager to execute the time draft on behalf of the buyers, where a buyer program is based on time draft trades. The date of authorization is the date the power of attorney is granted, typically the date the CMSA is signed.

The preferred currency utilized by buyer 106 is selected from a pull-down menu.

A company logo may also be specified by a path to the logo file. The company logo displays on buyer screens. The directory path may be entered directly, or the browse button may be selected to locate the company logo file.

Buyer administrator information includes user ID, name, email address, country and preferred time zone for the primary buyer administrator. The person listed has full access to this buyer 106 within the buyer module. It should be noted that each buyer 106 added will have a status of "pending" until the service provider 20 has created buyer program configuration and community manager 120 has configured the default buyer program 100. The buyer 106 status will change to "Active" after the buyer program 100 is created.

The buyer program 100 parameters determine whether checks for duplicate payment obligations and duplicate credit memos will be performed. If the duplicate payment obligation check is turned on, then system 10 will check for duplicate payment obligations during import. System 10 checks for duplicate payment obligation numbers and validates against the validation option that is selected. The validation option for duplicate credit memo check will be either original effective date or certified value. When more than one validation option is chosen, the payment obligation must match on all options chosen in order to be rejected. For example, if duplicate payment obligation check is on and original effective date is checked, then a payment obligation will be rejected if it has the same payment obligation number and effective date. If only one of the two is the same, then the payment obligation will be imported.

If the duplicate credit memo check is turned on, then system 10 checks for duplicate credit memos during import. System 10 validates against the validation option that is selected. The validation option for the duplicate payment obligation validation will be either original maturity date or original value. When more than one validation option is chosen, the credit memo must match on all options in order to be rejected. For example, if duplicate credit memo check is on and original maturity date is checked, a credit memo will reject only if it has the same credit memo number and maturity date. If only one of the two is the same, then the credit memo will be imported. Buyer unique document ID for payment obligations and buyer unique document ID for credit memos notifies the system whether to check the duplicate (i.e. buyer-defined) identification number for payment obligations and credit memos and reject uploaded obligations and credit memos having such buyer-supplied numbers that repeat from earlier obligations or credit memos.

FIG. 10-F is an exemplary image 344 of the buyer program list page. The buyer program list displays the name of the buyer program 100, status, trade type, buyer program type, country, currency, and links to view business rules and system configuration. From the buyer program list page, service provider 20 can view and manage a list of suppliers associated with the buyer program 100, view the buyer program business rules, view and edit the buyer program system configuration parameter, and add a buyer program 100. Viewing the buyer program business rules is a view only mode and provides the service provider 20 with a view of the buyer program business rules as set by community manager 120.

FIG. 10-G is an exemplary screen image 346 of the add buyer program page. Service provider 20 may add one or more buyer programs 100 for each buyer 106. Each buyer program 100 added from this page will be a default buyer program 100 in the community manager 120 interface. The company details are presented along with the company ID at the top of the screen. The buyer program details, buyer program configuration, buyer program system configuration, and bank account category payment type are specified when adding a buyer program 100.

The buyer program name is the name of the buyer program 100. The company ID is an identification number assigned to the buyer by the system that the system in this embodiment requires to be present in uploaded A/P obligation data.

Buyer program configuration includes country, currency, SP bank account (to receive service provider fees) and community pricing profile. Country specifies the country in which the buyer program 100 will be utilized. The currency specified is the currency in which the payment obligations for the buyer program 100 will be traded and matured. (For more details, see "Currency at default buyer program" in the "Additional Features of the Buyer Program" section below.) An SP bank account is selected for the service provider 20 to utilize for this buyer program 100. A community pricing profile is selected for this particular buyer program 100.

Buyer program system configuration includes time zone, trade calendar, maturity calendar, buy offer window open, buy offer window close, buy offer total time out, buy offer FI time out and pre-mature lead days. Intra-day rates allows financial institutions to enter rates to be applicable to trades, up to fifteen minutes before the trade window opens. A time zone is selected in which this buyer program 100 will be administered. The time zone is selected when adding the program and can not be modified.

Buy offer window open specifies the time of day during which buy offers are available. Buy offer window close specifies the time of day when buy offers are closed to purchase for the day. Buy offer total time out specifies the time (typically hours) until a buy offer times out, and is measured from the time a supplier 108 submits the offer. This time can include waiting for community manager distribution of the buy offer, as well as financial institution 110 approval. Buy offer FI time out specifies the hours until a buy offer times out while waiting for financial institution 110 approval.

Pre-mature lead days specifies the number of days in the future for which system 10 will generate payment instructions.

Fields are provided to define the format of payment instructions for the various entities that make or receive payments as a result of use of the system. For each entity, the screen provides a pull-down list for the type of payment instruction the system will create for them.

FIG. 10-H is an exemplary view 348 of the view buyer program page (managing suppliers). Company details and buyer program details are presented along with a list of suppliers. Service provider 20 utilizes the view buyer program (manage suppliers) to maintain suppliers 108 in a buyer program 100. Service provider 20 performs tasks including viewing/editing suppliers, adding suppliers, deactivating suppliers and updating suppliers.

Supplier names are presented in a column and include hyperlinks to the supplier company information. Selecting the hyperlink allows for viewing and/or editing the supplier company information.

A supplier 108 may be added by selecting the "add" button. Adding a supplier 108 is discussed in more detail regarding FIG. 10-J below.

A supplier 108 may be deactivated by selecting the check box beside the desired supplier 108 and then selecting the "deactivate selected" button. It should be noted that a supplier 108, once deactivated, is unable to create sell offers for this buyer 106. Deactivation does not occur until the following day. Un-traded payment obligations will still be settled to the supplier 108 upon maturity.

Supplier cross-references and restricted bank accounts may be updated. The supplier reference number is a reference number(s) associating uploaded payment obligations to a supplier 108 for a buyer 106. If a single reference number is entered, system 10 places the reference number between pipes ("|"). It should be noted that the buyer 106 may have any number of reference numbers for a given supplier 108. Each reference number is delineated by the pipe ("|") sign.

A restricted bank account restricts the supplier 108 from receiving payments into any other bank account. If the account is left open, the supplier 108 may utilize bank accounts as assigned in the supplier module. Restricted bank accounts are entered via the administration menu.

A reserve override option allows the service provider to allow a given supplier to trade without reserve. An "allow trade" option allows the service provider to remove a given supplier's ability to trade.

FIG. 10-J is an exemplary screen image 350 of the add supplier page. A list of available suppliers 108, including addresses, that could be added to buyer program 100 is displayed. The list may be modified and/or narrowed by entering search criteria to filter the results. Selecting "show all" enables viewing of the entire list of suppliers 108. Selecting the check box to the left of the supplier 108 marks the supplier 108 for addition to the buyer program 100. A reference number may be added for the supplier 108. Selecting the "add selected buyer program" button will add the supplier 108 to the buyer program 100. System 10 returns to the view buyer program page and displays the list of suppliers 108 with the newly added suppliers 108 included. It should be noted that if a buyer program is set for auto-advance, the status of new suppliers 108 remains pending until supplier 108 joins the buyer program 100. Once the supplier 108 has joined, the status is changed to "active."

FIG. 10-K is an exemplary screen image 352 of the buyer program system configuration page. From the buyer programs list page (see FIG. 10-F), the view hyperlink in the buyer program system configuration column is selected for the desired buyer program 100. The system configuration for the default buyer program 100 in a community 112 can only be changed on an initial or default buyer program 100. Subsequent buyer programs 100—those based on the default—inherit the system configuration information from the default program.

The view program system configuration page (FIG. 10-K) is displayed, and the edit button is selected to present the edit default buyer program page. The time zone, currency and country code are not modifiable. The trade and maturity calendar define weekends and holidays, thereby defining the valid-days for trades and maturity dates.

FIG. 10-L is an exemplary screen image 354 of the community financial institutions tab for maintaining membership. The list of financial institutions 110 is displayed. From the community financial institutions tab, service provider 20 user can view FI details, deactivate a financial institution 110 and add a financial institution 110 to the community 112.

To view FI details, the financial institution 110 hyperlink is selected in the FI name column for the desired financial institution 110. The FI company information is displayed but may not be edited.

A financial institution 110 may be deactivated by selecting the check box beside the desired financial institution 110 and then selecting the "deactivate selected" button. The financial institution 110 is then removed from the community financial institution listing. It should be noted that once the financial institution 110 has been deactivated, that financial institution 110 is unable to accept any buy offers excepting those on that financial institution's 110 trading desk which can now be rejected. Payment obligations will be settled to the financial institution 110 upon maturity.

Selecting the "add" button causes a financial institution 110 to be added to the community 112. The community management add FI page will open. FIG. 10-M is an exemplary screen image 356 of the community management add FI page. A list of financial institutions 110 is displayed that are available for the community 112. The list may be modified and/or narrowed by entering search criteria to filter the results. Selecting show all will enable viewing of the entire list of financial institutions 110. To view a financial institution 110, the hyperlink in the FI name column for the desired financial institution 110 may be selected. The financial institution 110 company information is displayed but can not be edited.

Selecting the check box to the left of the financial institutions 110 marks the financial institutions 110 for addition to the community 112. Selecting the "add selected to community" button will add the financial institutions 110 to the community 112. To cancel and return without selecting a financial institution 110, the maintain membership link in the breadcrumb trail at the top of the page may be selected. It should be noted that the status of these newly added financial institutions 110 is active and can be associated to a buyer program 100 by a community manager 120 at this time; however the financial institution 110 is prevented from joining the buyer program 100 until it has an active bank account.

FIG. 10-N is an exemplary screen image 358 of the view supplier applications page (FIG. 9) for the supplier enablement process. Service provider 20 may view and act upon new supplier applications. Once a supplier 108 is entered into the system 10, they must be approved before being assigned to a buyer program 100. Once activated, the supplier 108 may elect to participate in the buyer program 100.

A list of pending suppliers is displayed. The list may be modified and/or narrowed by entering search criteria to filter the results. Selecting "show all" will enable viewing of the entire list of supplier applications. To view supplier details, the hyperlink for the desired supplier 108 may be selected. Selecting the check box next to one or more suppliers 108 marks those suppliers 108 for activation. Selecting the "activate selected" button will activate the supplier(s) 108.

FIG. 10-P is an exemplary screen image 360 of the supplier list page. The supplier list page provides service provider 20 with the capability to add and manage suppliers 108 across all communities. The supplier list provides the supplier name, supplier address and status. From the supplier list page, community manager 120 can find suppliers 108, deactivate suppliers 108, reactivate suppliers 108, add new suppliers 108 and view supplier details. The search function can be utilized to find new suppliers 108.

The check box next to the desired supplier(s) is checked to deactivate one or more suppliers 108. Then selecting the "deactivate selected" button will deactivate the suppliers 108 across all buyer programs 100.

The check box next to the desired suppler(s) is checked to reactivate one or more suppliers 108. Then selecting the "reactivate selected" button will allow the supplier 108 to rejoin the buyer programs 100 when an invitation is extended.

A new supplier 108 is added by selecting the "add new supplier" button (see FIG. 10-P).

The supplier name hyperlink may be selected to view and edit supplier company information.

FIGS. 10-Q(1) and 10-Q(2) illustrate an exemplary screen image 362 of the add supplier page. The add supplier page 362 may be accessed from the supplier list page—see FIG. 10-P above—or selecting the add supplier option from the community management pull-down menu. Adding a supplier 108 at add supplier page 362 involves adding general information, contact information, business description, currency, company logo and supplier administrator for each supplier 108.

General information includes the name and address for the supplier 108.

Contact information includes the name, phone, email, cell phone, fax for the supplier contact and the company website.

The business description includes the DUNS number, business number, tax type and tax identifier for the supplier 108. The display information and required fields will differ depending upon the country code selected.

Currency selection is provided through a pull-down menu for selecting the preferred currency that the supplier 108 utilizes.

A company logo displayed on supplier screens may also be specified by a path to the logo file. The company logo displays on supplier screens. The directory path may be entered directly, or the browse button may be selected to locate the company logo file.

Supplier administrator information includes the user ID, name, email address, country and preferred time zone for the primary supplier administrator. The person listed will have full access to this supplier 108 within the supplier module.

FIG. 10-R is an exemplary screen image 364 of the FI list page for supplying a list of financial institutions 110. Service provider 20 may add and manage financial institutions 110 across communities 112. Managing financial institutions 110 includes the finding of financial institutions, deactivating financial institutions, reactivating financial institutions, adding new financial institutions viewing financial institution details, and setting limits on the ability to raise or lower pricing rates.

The search function is utilized for finding financial institutions 110. The list may be modified and/or narrowed by entering search criteria to filter the results. Selecting "show all" enables viewing of the entire list of financial institutions 110. Selecting the check box to the left of the financial institution 110 marks the financial institution 110 for activation or deactivation. After selecting the desired financial institution(s) 110, selecting the "deactivate selected" button deactivates the financial institution 110 across the buyer programs 100, and selecting the "reactivate selected" button allows the financial institution(s) 110 to rejoin buyer programs 100 when an invitation is extended.

Details of each financial institution 110 may be viewed and/or edited by selecting the hyperlink of the financial institution 110 name under the FI name column.

A new financial institution 110 may be added by selecting the "add new FI" button. Details for adding a new financial institution 110 are discussed in FIGS. 10-S(1) and 10-S(2) below.

FIGS. 10-S(1) and 10-S(2) illustrate an exemplary screen image 366 of the add FI page for adding financial institutions 110. The add FI page may be accessed from the FI list page or selecting the "add FI" option from a "manage FIs" pull-down menu (FIG. 9). Adding a financial institution 110 involves providing general information, contact information, business description, currency, company logo and the FI administrator.

General information includes the name and address for the financial institution 110.

Contact information includes the name, phone, email, cell phone, and fax for the financial institution 110 contact, and the company website.

The business description includes the DUNS number, business number, tax type and tax identifier for the financial institution 110. The display information and required fields will differ depending upon the country code selected.

Currency selection is provided through a pull-down menu for selecting the preferred currency that the financial institution 110 utilizes.

A company logo that displays on FI screens may also be specified by a path to the logo file. The company logo displays on financial institution screens. The directory path may be entered directly, or the browse button may be selected to locate the company logo file.

Financial institution administrator information includes the user ID, name, email address, country and preferred time zone for the primary financial institution administrator. The person listed will have full access to this financial institution 110 within the financial institution 110 module.

Bank Account Management

Figure 11:
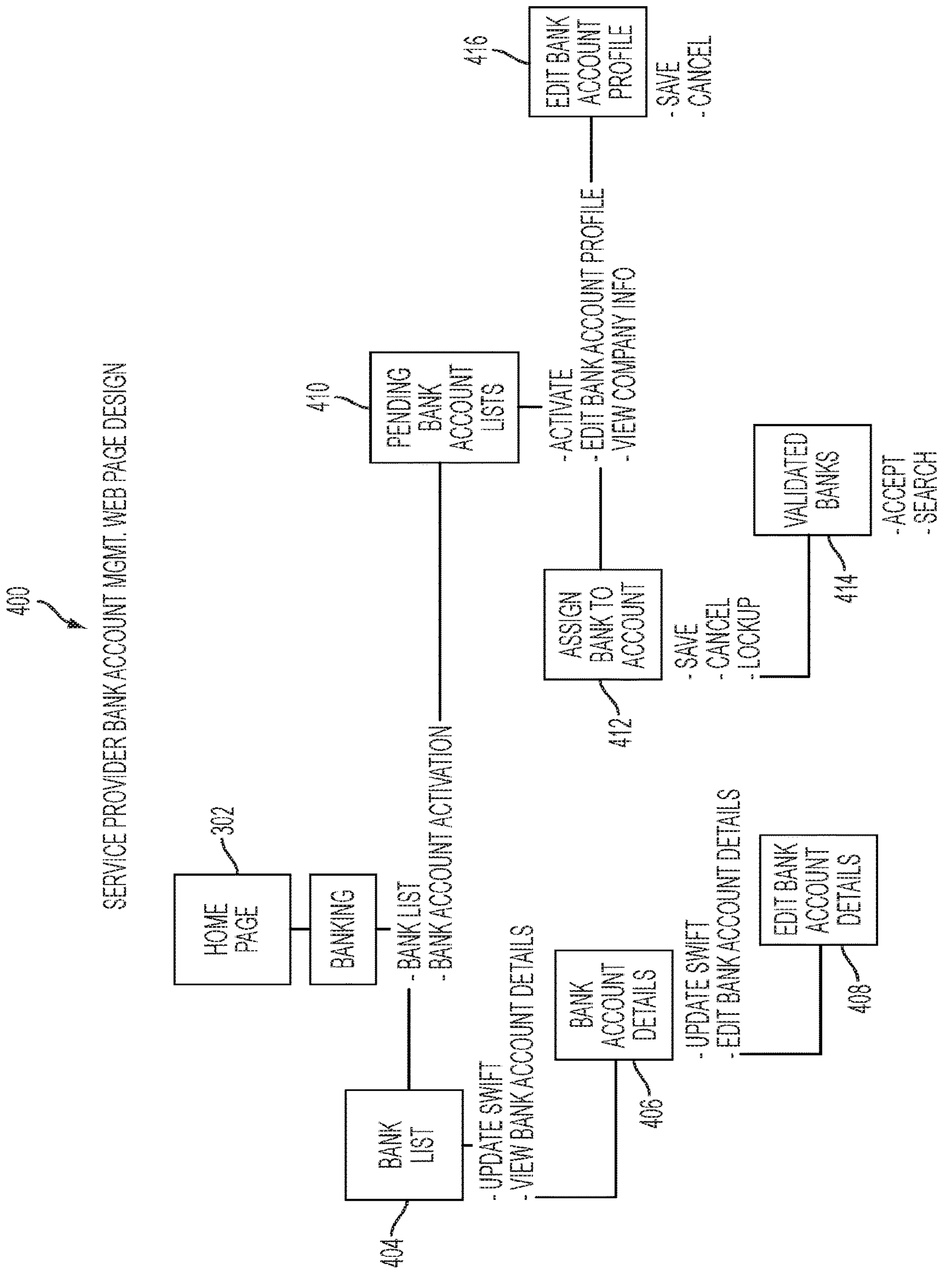
FIG. 11 is a diagram illustrating bank account management web page features for the buyer program service provider entity of FIG. 3.

FIG. 11 is a diagram illustrating bank account management web page features 400. Access is provided to a bank list 404 and bank account activation 410 functions via a service provider home page 302 banking pull-down menu. These functions provide for performing bank account related tasks.

Bank accounts are integral to buyer program 100 operation. Unless the bank accounts are activated for each community participant, the participant remains pending. Each entity manages its own bank accounts; however the validation and activation of those accounts in the SCF system 10 is controlled by service provider 20.

At bank list page 404, service provider 20 may update swift and view bank details. At a bank details page 406, service provider 20 may update swift and edit bank details 408.

At a pending bank account lists page 410, service provider 20 may activate bank accounts, assign a bank to an account 412, edit bank account profiles and view company information. Some bank accounts require additional bank account profile information prior to activation. These bank accounts are bank accounts established as the trade and maturing clearing accounts. The bank account having the "activate" hyperlink can be activated immediately if service provider 20 is satisfied with the information entered. When in doubt about the correctness of the data, service provider 20 may search through a list of existing banks to determine if the bank already exists. If the bank exists (validated banks 414), it can be associated with the new account. The new account will have the routing number of the associated bank. Bank account profiles may be edited at the edit bank account profile page 416.

FIG. 12-A is an exemplary screen image 418 of the bank list page. The banking menu allows service provider 20 to maintain banks that have been entered by different users. The bank list provides the ability to validate the banks that have been entered, and the bank activation will activate the specific banks entered.

The bank list provides routing number, bank name, country, swift number and validation information.

The search function is utilized for finding banks. The list may be modified and/or narrowed by entering search criteria to filter the results. Selecting "show all" enables viewing of the entire list of banks. Selecting the check box to the left of the bank marks the bank for deletion by then selecting the "delete selected" button. It should be noted that validated banks may not be deleted.

A bank may be validated by selecting the "validate" hyperlink corresponding to the desired bank. If a bank is already validated, the "validate" hyperlink does not appear.

Bank information may be updated by entering the swift number in the field corresponding to the desired bank and then selecting the corresponding "update" button.

Bank details may be viewed and updated by selecting the routing number hyperlink corresponding to the desired bank. The view bank details page will open (see FIG. 12-B).

FIG. 12-B is an exemplary screen image 420 of the view bank details page. Bank information, depending on the bank's country of location, including country, routing number, swift number, bank name and address are provided. Selecting the “edit” button provides for modifying bank information and opens the edit bank details page. From the edit bank details page, service provider 20 user may modify the bank name, address (including city, state/province and zip/postal) and county/region for the bank. Service provider 20 may not modify the country (in which this bank is utilized), routing number (identifying number for the bank), or the swift.

FIG. 12-C is an exemplary screen image 422 of the pending bank account list page. Service providers 20 may activate any pending bank accounts entered by other entities within system 10. In addition to activating accounts, service provider 20 may view company information, bank account information and update the bank account profile. Service provider 20 accessed the bank account activation from the banking menu via the pending accounts list.

The pending bank account list provides the account name, the bank name, routing number, account number, type, account type, country, currency and status. Additionally, access is provided to account information, company information and the bank account profile.

A list of pending bank accounts is displayed. The list may be modified and/or narrowed by entering search criteria to filter the results. Selecting “show all” enables viewing of the entire list of bank accounts. To view bank account details, the “account name” hyperlink for the desired bank account may be selected. Selecting the “edit” hyperlink provides for editing the bank account profile (see FIG. 12-F below). Information about the company may be viewed by selecting the “view” hyperlink in the company info column.

A bank account may be activated by selecting the “activate” hyperlink corresponding to the desired bank account (see FIG. 12-D).

FIG. 12-D is an exemplary screen image 424 of the assign bank to account page. Bank account information, depending on the country of the bank’s location, proposed bank information and bank information is provided. The bank account information includes routing number, swift number, account number, for credit to, type, working name and currency. The proposed bank information provides the country. The bank information provides the country, foreign exchange, bank name and routing number. Selecting the “save” button assigns the bank to the account. Selecting the “lookup” button provides for changing the bank assigned to the account by opening the validated banks page.

FIG. 12-E is an exemplary screen image 426 of the validated banks page. Upon selecting the “lookup” button from the assign bank to account page, this screen presents the capability to select a different validated bank for assignment to the account.

A list of validated banks is displayed. The list may be modified and/or narrowed by entering search criteria to filter the results. Selecting “show all” enables viewing of the entire list of validated banks. The bank name, country and swift number are displayed in the list. Selecting the radio button next to the desired bank marks that bank for assignment to the account. After selecting the desired bank(s) for assignment to the account, selecting the “accept” button assigns the validated bank and opens the assign bank to account page (see FIG. 12-D).

FIG. 12-F is an exemplary screen image 428 of the bank account profile page. Certain bank accounts provide an optional edit feature that enables adding more bank account profile details for the relevant bank accounts. The bank account profile is required for trade and maturity clearing accounts.

The bank account profile page is accessed from the pending bank account list (by selecting the “edit” hyperlink in the bank account profile column. Service provider 20 may modify the bank profile ID, destination name, destination number, source name and source number. The bank profile ID is a unique identifier for this bank account profile. Destination name is the name of the entity that is the destination for the account. Destination number is the identifying number corresponding to the destination name. Source name corresponds to the entity that is the source for the account. Source number is the identifying number for the source name. Country is not modifiable and corresponds to the country in which this bank account is utilized.

Financial Institution

Figure 13:
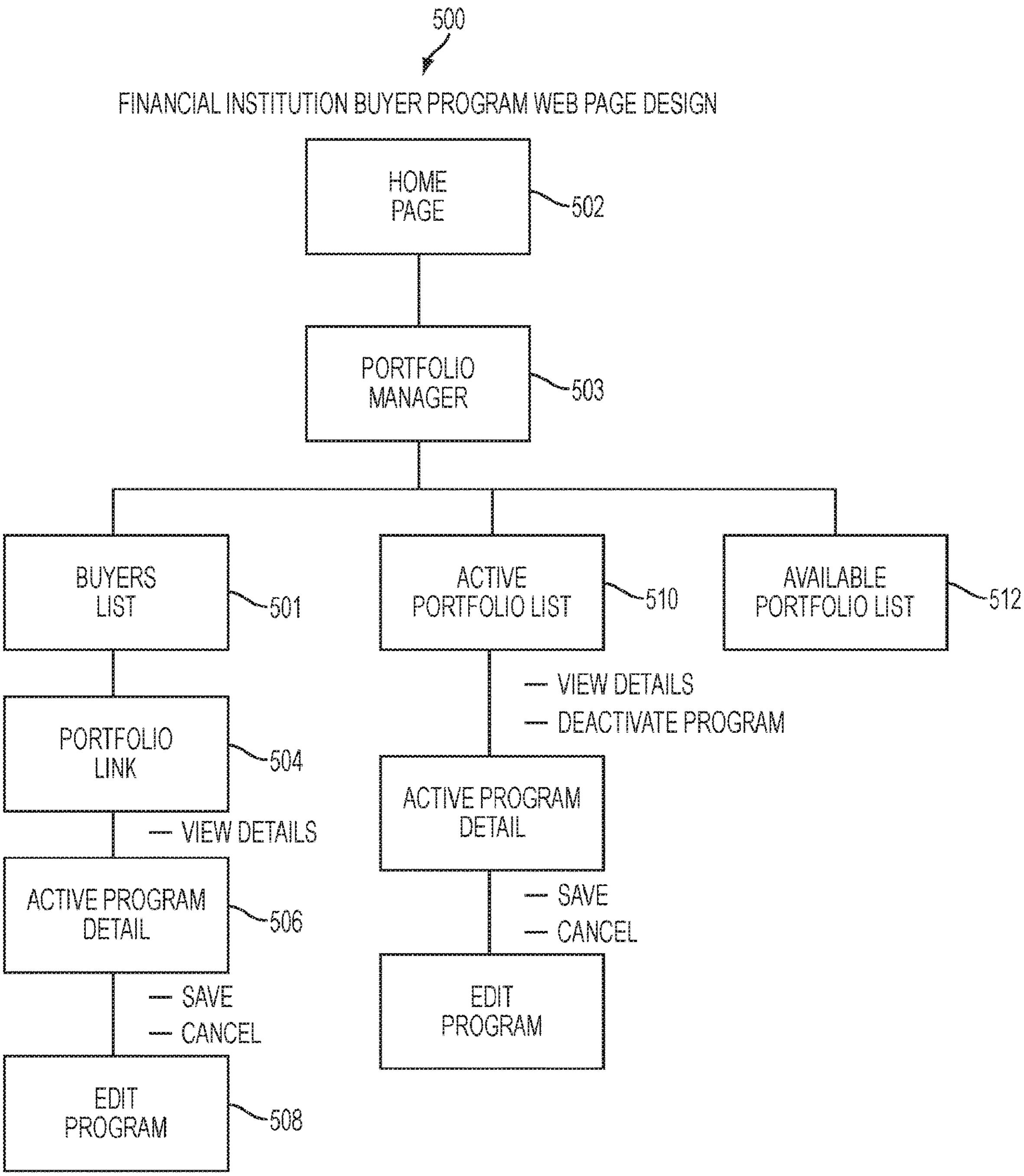
FIG. 13 is a diagram illustrating financial institution web page features for the buyer program of FIG. 3.

FIG. 13 is a diagram illustrating financial institution web page features 500. A financial institution home page 502 provides for performing portfolio manager tasks related to financial institutions 110. It should be noted that there must be at least one active financial institution 110 in each buyer program 100 for the buyer program 100 to be active.

An FI user has access to a buyer list 501, an active portfolio list 510 and an available portfolio list 512. The buyer list 501 provides access to details of the financial institutions 110 buyer/currency relationships, including maturing obligations, portfolios, and buyer history.

The active portfolio list 510 provides access to details regarding buyer program rates, fees, open credit limit, open credit, program manager and for deactivating buyer programs 100. Active program detail 506 may be accessed and the FI buyer program 100 information may be edited via an edit program 508.

The available portfolio list 512 provides access to any new buyer programs 100 that have been offered to the financial institution 110. New buyer programs 100 are offered by community manager 120 by adding the financial institution 110 to a buyer program 100. The financial institution 110 user can accept an available buyer program 100 via the available portfolio list 512.

FIG. 14-A is an exemplary screen image 502 of the financial institution home page. The financial institution home page 502 provides access to portfolio summary information for financial institutions 110. A financial institution portfolio includes all the buyers for which the financial institution 110 is providing funding. The portfolio summary provides a high level view of all buyer/currency combinations and includes total committed credit limit, total credit utilized, total credit available, average trade per day, margin month-to-date, margin last month, and margin year-to-date.

The total credit limit provides a total of the credit limit offered to the buyer/currency. The total credit utilized is a total of the credit utilized buyer currency. Total credit available is the limit minus the utilized.

Average trades per day provides a year-to-date average of all trades across all portfolios. The margin MTD provides a summary of the month-to-date profit performance as a total across each portfolio. Margin last month provides a summary of last month’s profit performance as a total across each portfolio. Margin YTD provides a summary of the year-to-date profit performance as a total across each portfolio.

The buyer details hyperlink opens the active portfolios page, as described below.

FIG. 14-B is an exemplary screen image 516 of the buyers page. Information is provided for buyer name, credit limit, credit utilized, credit available, available to purchase and an action selection pull-down menu. This page provides for viewing and managing performance information (including portfolios, maturing payment obligations, and buyer history).

Portfolio details may be viewed by selecting "active portfolios" from the portfolio manager pull-down menu and then selecting the program name hyperlink corresponding to the program to be modified. The active program details page will be displayed. Selecting the "edit" button will cause the edit program page to display.

FIG. 14-C is an exemplary screen image 518 of the active program details edit program page. Program details are presented for editing including general information, financial information, and auto accept rules.

General information includes the program name, program manager, and buyer—which are not modifiable—and asset originator, client originator and pool. The asset originator is a table entry maintained in the administration section, and can be used by the financial institution 110 to configure meaningful asset originator data and associate it with the buyer program 100. The client originator is a table entry maintained in the administration section, and can be used by the financial institution 110 to configure meaningful client originator data and associate it with the buyer program 100. The pool is a table entry maintained in the administration section, and can be used by the financial institution 110 to configure meaningful accounting pool data and associate it with the buyer program 100.

Financial information includes the approval date, next scheduled review, credit department notice, credit enhancers and payment status. The approval date is selected from a selectable calendar and specifies the date that the buyer program 100 was approved. Next scheduled review is also selected from a selectable calendar and specifies the next required review date.

The credit department notice is for informational messages. Credit enhancers are informational data entered by the financial institution 110 and control no system events. Payment status is an informational field for financial institution 110 use only.

The auto-accept rules control the amount and various characteristics of a sell offer that would be accepted automatically by the financial institution 110. The auto-accept rules may be off or on. A financial institution may choose to activate auto-accept for sell offers received during a specified period of time.

FIG. 14-D is an exemplary screen image 520 of the active portfolios page, which displays a list of all buyer programs 100 that are currently available to trade and is accessible from the portfolio manager menu 510 (FIG. 13) by selecting the active portfolios option from the pull-down menu or by selecting the Portfolios from the Action pull-down menu on the Buyers page 316 (see FIG. 14-B). Financial institution 110 users may view/edit the buyer program details.

A list of active buyer programs 100 that are available to trade is displayed. The list may be modified and/or narrowed by entering search criteria to filter the results. Selecting "show all" enables viewing of the entire list of active buyer programs 100.

Buyer program 100 details may be edited, and buyer 106, details may be viewed, (see FIG. 14-C) by selecting the buyer program hyperlink or the buyer hyperlink under the program name column for the desired program or the buyer column for the desired buyer, respectively.

FIG. 14-E is an exemplary screen image 522 of the viewing available portfolios page accessible from the available portfolios list 512 (FIG. 13). Presented is a list of available buyer programs 100 that the financial institution 110 is invited to join. Information for the available buyer programs 100 includes the buyer, portfolio name, trade type, program rate, transaction fee, buyer target credit capacity, and manager. To join an available buyer program 100, the financial institution selects the "add" hyperlink for the corresponding buyer program 100 and then enters the details in the active program registration page. An active program review page issues a warning that a buyer program 100 is about to be activated. After accepting the warning, the buyer program 100 is registered and the financial institution 110 is an active buyer program 100 participant.

FIG. 14-F is an exemplary screen image of FI pricing profile functionality. The FI pricing profile provides the rates and fees associated with the financial institution and that is assigned to one or more buyer programs 100. The list FI pricing profile web page is accessed from a pricing administrator menu (not shown). The list page enables the FI to view a list of pricing profiles, access and change profile details, add a new FI pricing profile, view pricing profile history, and view a list of buyer programs to which the pricing profile is assigned (FIG. 14-J).

FIG. 14-I is an exemplary screen image of a view FI pricing profile functionality accessed from the list FI pricing profile. Information regarding profile financial information and rate selection criteria is displayed. The FI pricing profile information, as set in the edit FI pricing profile web page (see FIG. 14-G), is displayed. If the FI pricing profile is changed, then pricing for all buyer programs 100 related to that pricing profile is also changed. The FI pricing profile is currency specific and is assigned to one or more buyer programs. The currency on the buyer program 100, in this embodiment, must match the currency on the FI pricing profile. The FI pricing profile provides the FI pricing for the buyer program 100 and determines the FI base rate and the FI margin.

FIG. 14-G is an exemplary screen image of the edit FI pricing profile functionality. The edit FI pricing profile web page is accessed from the view FI pricing profile web page via an edit button. Profile financial information and rate selection criteria may be specified. Profile financial information includes the name of the profile, the currency specified, the profile rate in basis points, the FI margin over in basis points, the rate type (tenor/prime/fixed), the rate calculation (annual or flat) and the number of days in year for the rate calculation.

Rate selection criteria specifies the interest rate for tenor, prime or fixed.

FIG. 14-H is an exemplary screen image of view FI pricing profile history functionality. Rate history is maintained of all changes to the FI pricing profile and can be accessed from the list of FI pricing profiles (see FIG. 14-F). Rate history may also be accessed from the view FI pricing profile page (see FIG. 14-I above).

The rate history displays the previous rate and the changed to rate for all rate categories. History entries also include date/time stamp and the name of the user initiating the change. A search capability is also available.

From the financial institution home page 502 (FIG. 13), the user may access a "trading desk" pull-down menu (not shown), presenting a screen 562, as shown in FIG. 14-K, from which the financial institution can manually accept buy offers. "Total offers" presents information regarding the total number of fund-accepted sell offers to the financial institution. "Total new offers" provides information about those offers the financial institution has not yet viewed. The financial institution may accept or reject a given offer by checking the box at the left of the row with the offer information and activating the "accept" or "reject" button, respectively.

From the financial institution home page 502 (FIG. 13) the user may select a "Trading Desk" tab, from which the user may access a "Print Negotiable Drafts" page, as shown in FIG. 14-L, at which the financial institution user can request the printing of accepted drafts. That is, a screen 503 is a template for a search function that allows the financial institution user to select draft records for printing, where the selectable group of draft records (of a buyer program that is active for printable drafts) are those records (a) that have not yet been printed, and (b) that correspond to sell offers that have been accepted by this financial institution. Given that universe of draft records in the SCF system database, the financial institution user selects drafts for printing by activating a "Request system to Print Negotiable Drafts" button 505. If the user does not select any of the criteria 507, 509, 511, 513, 515 and/or 517, activation of button 505 selects all drafts that meet the two general criteria. Alternatively, as indicated in FIG. 14-L, the financial institution user can apply one or more criteria 507-517 to narrow the group of drafts to print, e.g. by the buyer associated with the payment obligation(s) underlying the sell offer to which a draft corresponds (507), the buyer program under which such sell offer occurs (509), a range of draft reference ID's (511), date range for offer acceptance (513/517), and/or date range for draft maturity date (515/517). By entering such criteria, the user selects some group of draft records fewer in number than the entire range of available accepted drafts. For instance, the user may enter the present date as a date range for offer acceptance, thereby selecting all drafts corresponding to sell offers selected on the present day. The financial institution may do this each day, thereby selecting and printing each day those drafts that correspond to sell offers the financial institution accepts that day. But, as indicated in the figure, screen 503 allows the financial institution to select drafts based on other criteria, e.g. draft reference ID in the event the financial institution wishes to print specific drafts.

Once the financial institution user enters the criteria, if any, the user activates print request button 505. The SCF system applies the criteria to database 452 (FIG. 29) and selects those draft records that meet the criteria. In the presently-described embodiment, the SCF system does not present the user with a list or display of the selected drafts, but it should be understood that the system could present such a list and/or display option, thereby creating an intermediate step in which the financial institution user individually confirms the drafts the financial institution desires to print. In the presently described embodiment, upon activation of button 505, the system creates a print request embodying the data corresponding to drafts for the selected draft records and forwards this request to the computer of the financial institution user who was logged into the system and who activated the print request button. As described above, the print request is created in the same manner as a server creates a print request responsively to activation of an instruction to print content displayed on a webpage by a user accessing that webpage. The system may present the user with a query box (not shown) requesting the user to confirm that all drafts meeting the selected criteria should be printed.

Assuming the user answers the confirmation query positively or if the confirmation query is not present, the system prepares the print request, i.e. a print file that contains the data corresponding to the selected draft records and formatting instructions configured to print a respective page for each selected draft record, each page according to the format shown in FIG. 28B. The structure and format of print requests should be understood in this art and are therefore not discussed in further detail herein. SCF system 10 then forwards the print request through Internet 454 (FIG. 29) to the computer system 110 (FIG. 29) of the logged in financial institution user. Similar to a print request a user receives from webpage content (in response to a print request activated by the user at that web page displaying content desired for printing), the print request causes the financial institution user's computer to display a print dialog box by which the financial institution user prints the drafts. SCF system 10 transmits the print request to the financial institution user computer via an encrypted communication connection between system 10 and the financial institution, for example a hypertext transfer protocol secure (HTTPS) connection. The financial institution user then prints the print job data, by appropriate activation of the user's print dialog box to activate the computer's print driver, thereby causing the financial institution's computer systems and printers to print respective paper drafts corresponding to each electronic draft record included in the print instruction data. The configuration of the print dialog box, and the print function between the financial institution user computer and a printer's print buffer, are within the control of the financial institution's computer system, although security measures in this regard can be agreed upon by system parties if desired.

In the presently described embodiment, the financial institution computer system does not return a confirmation to the SCF system that the requested draft(s) have printed. Instead, the SCF system assumes printing occurs when it sends the print instruction to the financial institution computer system and therefore modifies each draft record in database 452 (FIG. 29) to identify each record as "PRINTED." The system additionally, or alternatively, identifies the record as "VOID." As indicated above, and depending on the applicable law governing negotiable instruments involved in the transactions, each electronic record may comprise a negotiable instrument prior to the print request, and the SCF system inserts a PRINTED and/or VOID notice in each record upon printing to thereby indicate the record is no longer a negotiable instrument. The printed draft becomes the only negotiable instrument that corresponds to the payment obligation(s) underlying the draft. In another embodiment, the SCF system does receive a print confirmation from the financial institution computer system and changes the draft records' status to PRINTED and/or VOID only in response to receiving such confirmation.

In one present embodiment, the print file that system 10 sends to the financial institution user computer includes the draft data in "pdf" image format, but it should be understood that other formats could be used. For example, where the print files encompass the draft data as hypertext mark-up language (HTML) images, the print file may include an instruction that causes the financial institution user's print dialog box to enable or disable various functions.

It is possible, however, that the financial institution does not successfully print one or more drafts, and in that event, the financial institution may contact the SCF system community manager (e.g. by telephone, email, or other means of communication) and request a reprint, i.e. that the SCF system again make available for printing the draft record(s) for the one or more drafts that did not successfully print, or that perhaps have been lost or destroyed after printing. The SCF system community manager may request formal confirmation from the financial institution, e.g. in the form of an affidavit executed by the financial institution and forwarded to the SCF system community manager, identifying which drafts are requested for reprinting and providing the circumstances and reason for the reprint request. Once such confirmation is received, the SCF system service provider accesses a screen 519 shown at FIG. 10-T (from the “Support” menu at page 302 (FIG. 10-A)) that allows the service provider to search against all draft records that have been modified to PRINT and/or VOID status. Screen 519 allows the service provider to enter criteria to narrow the search, but if no criteria are entered, activation of a search button 535 causes the system to retrieve all draft records from database 452 (FIG. 29) that meet the PRINT and/or VOID criteria, displaying such records in a lower portion 537 of screen 519. Alternatively, the service provider can narrow the number of returned records by qualifying the search to pull only those draft records specifying the financial institution requesting the reprint (521), the buyer on the drafts requested for reprint (523), the buy program under which the drafts originated (525), a date range on which the sell offers underlying the drafts requested for reprint were accepted (529/533), and/or the maturity date for the drafts requested for reprint (531/533). In the example provided in FIG. 10-T, the service provider has requested all drafts having an acceptance date between Nov. 1, 2011 and Nov. 30, 2011. The database contained only a single PRINTED and/or VOID draft meeting that criteria, and so screen portion 537 includes only that draft record.

Each row in screen portion 537 includes a check box at the far left end. If the service provider wishes to select the draft for reprint, the service provider activates this box, so that the box status changes to checked. If the service provider then activates a “submit” button at the bottom of the screen, the SCF system modifies the existing draft record for the draft in database 452, by removing the PRINTED and VOID legends, and removing the Draft Number (shown in the top right corner of FIGS. 28A and 28B). When the FI later prints the draft, the system assigns a new Draft Number to the record, and adds “REPRINTED” and “VOID” legends to the record. The removed Draft Number is added to an audit record that identifies the user name of the FI user who submitted the reprint request, the request date/time, the draft’s current owner, and the supporting documentation information entered by the user. The Draft Number is a number assigned to each draft record by the SCF system. In the presently described embodiment, it is a number that is unique for each draft record across the entirety of the SCF system and that is assigned at the time of printing the draft or selecting the draft for reprint, although in another embodiment the numbers could be defined to be unique across drafts from a given buyer (e.g. similar to sequential check numbers). Once modified, the selected draft(s) is/are available for the financial institution to print, according to the procedure described above, and the service provider sends a corresponding notice to the financial institution externally of the system, although in another embodiment the system notifies the financial institution automatically by a task/alert message. The notice includes the drafts’ reference ID(s), and the financial institution may specifically select these reference IDs in requesting a draft print instruction through the screen at FIG. 14-L.

At a box 529 at screen 519, the service provider enters in text an explanation of what confirmation was received from the financial institution confirming the need to reprint the draft(s), and the SCF system stores this information in database 452.

In another embodiment, the SCF community manager prints the drafts at the SCF system, rather than the SCF system sending print instructions to the financial institution. In such embodiment, from the community manager home page 202 (FIG. 5), if the relevant buyer program is active for printable drafts, the community manager may access a “Print Negotiable Drafts” page, similar to the page shown in FIG. 14-L, at which the community manager can request the printing of drafts having been accepted by a given financial institution on the buyer program. The screen is a template for a search function that allows the community manager to select draft records for printing, where the selectable group of draft records are those records corresponding to the buyer program (a) that have not yet been printed, and (b) that correspond to sell offers that have been accepted by the given financial institution. The community manager may choose to restrict the selected draft record by financial institution. Given that universe of draft records in the SCF database, the community manager selects drafts for printing by activating a “Request System to Print Negotiable Drafts” button presented on the screen. The community may select none, some, or all of the criteria for drafts as instructed or agreed upon by or with a financial institution or as otherwise desired, similarly to the process described with respect to FIG. 14-L. Once the community manager enters the criteria, if any, the community manager activates the print request button. The SCF system applies the criteria to database 452 (FIG. 29) and selects those draft records that meet the criteria. Similarly to the embodiments described above, the SCF system does not present the community manager a list or image of the selected drafts, although this may be done in other embodiments. Instead, the SCF system prepares a print request containing data corresponding to the selected draft records, and formatting instructions configured to print a respective page for each selected draft record, each page according to the format shown in FIG. 28B, triggering a print dialog box on the community manager’s computer. The community manager then activates the print function, thereby causing the computer to send the print data to a print buffer defined by the print dialog box, and ultimately causing the drafts to print on respective pages. The community manager then delivers the hard copy drafts to, or holds the hard copy drafts in custody for, the financial institution purchasing the drafts. The SCF system changes the draft records corresponding to printed drafts to indicate they have been printed, as described above. If the community manager determines one or more drafts should be reprinted, the community manager can request reprinting to the service provider, who in turn controls the database and system, as described above, to make the relevant draft records available for reprinting.

Supplier

FIG. 15-A is an exemplary screen image 524 showing the tasks and alerts for a supplier. Among other things, supplier 108 may receive notification that a buyer program 100 is available, with instructions to activate to a buyer program 100. The activate buyer program function allows supplier 108 to register and become active to new buyer programs 100. Once service provider 20 or community manager 120 associates the supplier 108 with a buyer program 100 that requires activation, supplier 108 receives a task and alert—as shown in FIG. 15-A—which when viewed (FIG. 15-B) contains an activation number.

The tasks and alerts screen shows the date, title and type information for the alert, but the activation number is accessed by viewing the task and alert. From the supplier home page, supplier 108 views the task and alert by selecting the "date/time" hyperlink to show the message details page.

FIG. 15-B is an exemplary screen image 526 of a message details page. The message, in this instance, includes an invitation to join a buyer program 100, provides the customer information and includes the activation number. After acquiring the activation number, supplier 108 accesses the activate buyer program function from the administration pull-down menu (not shown). The activation number is input to the activate buyer program to begin the registration process.

FIG. 15-C is an exemplary screen image 528 of the activate buyer program page. The activation number—acquired from the task and alert—is entered into the program activation number box shown. Selecting the "next" button causes the welcome and confirmation page to be displayed. Selecting the "cancel" button cancels the activate buyer program function and causes navigation back to the home page.

FIG. 15-D is an exemplary screen image 530 of a welcome and confirmation page of the activate buyer program function. The buyer program details section provides the program name, customer, the discount rate and the transaction fee associated with this buyer program 100. Tax reporting preferences are designated by selecting the radio button for the associated option. The page displays parameters describing how payment obligations submitted to the system owing to the supplier are selected for creation of sell offers under auto-advance rules. The supplier activates "next" to continue.

FIG. 15-E(1) is an exemplary screen image 532 of a customer list page accessible from an administration pull-down menu (not shown). Auto-advance rules for a particular buyer program are accessible from a "view" link for that program, resulting in the screen shown in FIG. 15-E(2). Auto-advance rules include processing details, sell offer selection criteria and auto-advance date selection. Auto advance may set to "on" or "off" Sell offer is set by selecting "review" or "initiate funding." "Remit to bank account" is selected via a pull-down menu for selecting the bank account to which funds are remitted. The credit memo application order is also displayed.

Sell offer selection criteria include minimum amount, maximum amount, selection by payment obligation amount and selection by payment obligation numbers. When a minimum amount is specified, system 10 will not create a sell offer with an amount less than the specified minimum amount. When a maximum amount is specified, system 10 will not create a sell offer that exceeds the specified maximum amount.

Date selection criteria allows the supplier 108 user to determine the age of the payment obligations to be included in the sell offer. Age is based on number of days until payment obligation maturity. Similar to the options discussed above with regard to the community pages, selection criteria include "anyday" (any valid trade date), "only payment obligations maturing between" (a configurable number of days) or "between" (a configurable range of dates). Selection for auto-advance dates between certain days provides a scheduling calendar that opens for selecting the dates to specify the range. Selection may also be made by payment obligation amounts in a range of prices, or set by payment obligation numbers.

Auto advance scheduled date selection provides for setting auto-advanced scheduled date(s) to occur on selected auto-advance dates. A scheduler calendar window opens for allowing selection of dates. It should be noted that if the selection falls on a non-trading day, then auto-advance is scheduled to run on the next trading day.

Upon completion of specifying the auto-advance rules, selecting the "save" button causes the auto-advance rules to be saved and then causes navigation to a view auto-advance rules screen 534 (FIG. 15-F). The values selected for auto-advance rules are displayed for verification.

Activation of the "funding" pull-down menu (not shown) from the supplier home page presents a screen 552 shown in FIG. 15-E(3) that provides an estimate of funding available for that supplier, arranged by currency. The "rate" is a composite of the financial institution base rate, the financial institution margin, the service provider rate, and the community manager rate. The "PO count" is the number of payment obligations comprising the payment obligation value. The "CM count" is the number of credit memos that comprise the credit memo value. The supplier may enter an amount in a "funding desired" box and activate a "create sell offer" button, and system 10 searches the payment obligations to that supplier available for funding on the system and selects those payment obligations with the lowest discount cost possible, thereby creating an offer as close to the desired amount as possible, charging the least amount of interest possible. By checking a "trade" box, activating the "create sell offer" button, the user causes the system to create a sell offer using all available payment obligations. "Date summary" allows the user to see payment obligations in a date summary fashion, allowing trade by maturity date. Referring to FIG. 15-E(3A), the date summary screen groups payment obligations by date. Each row represents a date and identifies the number of payment obligations with maturity dates on that date. "Date Due" refers to the difference between the maturity date and the present date. The system runs credit memo and reserve processes (discussed below) and shows the resulting credit memo values and holds in respective columns. The total payment obligation value of the day's payment obligations, less the credit memo value and holds, is the available to fund amount. The projected fees are the total of the FI base rate, FI margin, service provider rate and community manager rate, applied across the number of days shown in "Days Due," the difference being shown in "Projected Settlement." Checking a box at the leftmost column allows the user to select payment obligations on a given date for trade.

"PO details" (from FIG. 15-E(3)) allows the user to view individual payment obligations available for trade, and allows the user to select payment obligations for an offer individually, as shown in FIG. 15-E(3B). FIG. 15-E(3B) breaks down the information shown in FIG. 15-E(3A) into individual payment obligations, except that if a payment obligation is held, it is not shown in FIG. 15-E(3B), even though it does comprise one of the number of payment obligations reflected for its day in the "PO Count" column of FIG. 15-E(3A). The check boxes at the leftmost column of FIG. 15-E(3B) allow the user to select payment obligations on an individual basis for trade.

After activating the "create sell offer" button from page 552 (or the screen in FIG. 15-E(3A) or 15-E(3B)), the system presents a screen 553, as shown in FIG. 15-E(4), providing details of the requested sell offer. Upon activating a "confirm sell offer" button, the system effects the sell offer, which thereby becomes irrevocable. Activating a "deselect" box removes the pending sell offer. The projected discount interest is the amount the supplier would pay for the trade if it occurs at that time.

Also available from the "funding" pull-down menu from the supplier home page (not shown), the system presents a screen 554 in FIG. 15-E(5) that provides an information detail regarding a supplier's previous sell offers. Sell offers may be searched based on timing criteria, as indicated at the top of page 557. Similarly, a payment obligation and credit memo history page 557, as shown in FIG. 15-E(6), is available from the funding pull-down menu from the supplier home page.

From the "reports" menu available from the supplier home page (not shown), the supplier may access a screen 556 that provides further payment obligation information in a report format, as shown in FIG. 15-E(7). The transaction date is the date on which the trade occurred, if the payment obligation is traded, or the date on which payment was made, where the payment obligation is not traded. The effective date is the date of payment, whether the payment obligation is traded or not traded. The original invoice date is a date provided by the buyer when data is uploaded. Although outside the operation of system 10, this date is likely the date of an underlying invoice.

A report screen 558, shown in FIG. 15-E(8) is also available from the "report" menu and provides a report of accepted sell offers.

From the "administration" pull-down menu from the supplier home page (not shown), the supplier user may access a screen 532 in FIG. 15-E(1), providing information specific to customers linked to buyer programs in common with the supplier. A "notification of upload" dropdown box allows the supplier to designate conditions under which it will receive a task and alert when the given buyer uploads A/P obligation data. For example, the supplier may activate the system to provide an alert when the buyer executes the first upload, or all uploads.

Buyer

The function that the buyer 106 performs in set up of a buyer program 100 is to set up the program management features, including setting valid maturity dates and setting auto correction rules.

To access the set maturity dates page, the buyer 106 selects the "set maturity dates" option from the buyer program management pull-down menu on a navigation bar (not shown). FIG. 15-G is an exemplary screen image 536 of a maturity date page. Currency, time zone, and maturity settings are shown for the respective buyer program 100. Buyers 106 that have established maturity dates for payment of supplier's 108 payment obligations can use the set maturity date option to enter the respective maturity dates. Payment obligations that have been uploaded to system 10 are validated to ensure that all payment obligation maturity dates are validated against the dates selected.

The calendar function shown for selecting a specific maturity date operates differently than the scheduling calendar utilized previously. Non-maturing days are displayed in red, and selected maturity dates are displayed in green. (Of course, any color coordination scheme could be used to indicate the comparison of non-trading dates versus selected maturity dates.) Non-maturing days are set by service provider 20 and include holidays and weekends. Valid maturity dates are set by buyer 106 using the calendar to select from designated valid system maturity dates.

During payment obligation upload, calendar restrictions on maturity dates set by the buyer 106 (e.g. the buyer identifies weekend dates and holidays, which in one embodiment are not valid maturity dates) are used to validate the maturity dates on the payment obligations. Payment obligations rejected during the upload process appear in the rejected payment obligations list. It should be noted that the buyer should select these restrictions covering a period extending at least ninety days from the current date. That is, the buyer may set calendar restrictions in the immediate future, provided these restrictions also extend out at least ninety days. It should be noted that the default setting on the maturity date page is initially set to "no specific maturity date." To set specific restrictions, the user utilizes the calendar function and enters specific dates, again preferably for a period extending at least ninety days in the future.

Discontinuing maturity date validation may be performed via selecting the "no specific maturity" option and then selecting the "submit" option to save the changes. It should be noted that users must still correct the maturity dates of all previously rejected payment obligations even though they have deselected the "specific maturity date" option.

To access the auto correct maturity dates page, the buyer 106 selects the "auto correct maturity dates" option from the buyer program management rollover menu on the navigation bar (not shown). FIG. 15-H is an exemplary screen image 538 of the auto maturity date rules page for automatically correcting invalid maturity dates of rejected payment obligations and invalid effective dates for credit memos. The buyer 106 has the option to set up rules for automatically correcting maturity dates at the time a payment obligation or credit memo is uploaded into system 10. Buyer 106 may set automatic correction of payment obligations with rejected maturity dates that are prior to the first valid maturity date when uploading, or to set auto correction of payment obligations with maturity dates that fall on invalid maturity dates in the future, or both.

Additionally, buyer 106 can set an automatic auto correction of credit memos with effective dates that are prior to the first valid effective date when uploading, or set auto correction of credit memos with effective dates that fall on invalid effective dates in the future, or both.

Buyer 106 selects the "past" or "future" checkboxes from the options for maturity dates of rejected payment obligations. Selecting the "past" option will auto correct the payment obligations with a maturity date in the past to the next valid maturity date. Selecting the "future" option will require the user to select how they will apply auto corrected maturity dates—to either nearest validity date, earlier validity date or later validity date.

Buyer 106 selects the "past" or "future" checkboxes from the options for effective dates of rejected credit memos. Selecting the "past" option will auto correct the rejected credit memos with an effective date in the past to the next valid effective date. Selecting the "future" option will require the user to select how they will apply auto corrected maturity dates—to either nearest validity date, earlier validity date or later validity date. The submit option saves the rules settings.

Upon selecting a "payments menu" option from the buyer program management pull-down menu from a buyer home page (not shown), the system presents a screen 564, as shown in FIG. 15-I(1), that provides detailed information regarding payment obligations and credit memos applicable to the buyer that have not been paid. A screen 565 (FIG. 15-I(2)) provides detailed information regarding payment obligations and credit memos that have matured. As indicated at the top of the screens, the buyer may search for payment obligation and credit memo information through date ranges.

From an "administration menu" pull-down menu (not shown), the buyer may access a screen 566, as shown in FIG.

15-J, that provides detailed information regarding suppliers that are in the buyer programs that belong to the buyer.

Additional Features of the Buyer Program

Fix net community margin. Community manager 120 is able to fix the net community margin (NCM) value to a specified value which results in a valid gross community margin (GCM) relative to the appropriate service provider pricing tier in use. A checkbox titled "fixed" is available alongside the NCM textbox on the parameters tab of the buyer program setup, as indicated in FIG. 8-E. This fixes the NCM value and prevents further system 10 changes to the value. The NCM textbox becomes a required input field if the "fixed" checkbox is selected. When setting specific NCM to ON, the GCM is equal to the service provider fee plus the fixed NCM value. When fixing the NCM value by selecting the ON checkbox, the GCM input box should typically be disabled. The GCM is then auto-calculated.

Entered gross community margin. If the NCM is set to OFF, the GCM textbox is a required input field and the NCM textbox is disabled. The user must enter a gross community margin that is equal to or greater than the service provider fee. System 10 then auto-calculates the NCM—the net community margin is equal to the gross community margin minus the service provider fee. It should be noted that when the total supplier pricing (TSP) locked rate is selected, the NCM ON checkbox is disabled.

Clearing account. A clearing account is utilized by buyer 106 for maturing obligations. On the buyer program parameters page (as shown in FIG. 8-E) an entry for the maturing clearing account is available and is used for maturing obligations typically owned by buyer 106. The payment transactions to suppliers 108 and financial institutions 110 for maturing obligations go through this clearing account.

Currency at default buyer program. System 10 allows service provider 20 to select the currency at the default buyer program level. Buyer program tiers 214 (variations from the default) are in the same currency as the default buyer program 100. System 10 allows any number of default buyer programs 100 per currency, and allows multiple buyer program tiers 214 per default buyer program 100. A buyer 106 may have any number of currencies, and the buyer program tiers 214 under the default are in the same currency as the default. The buyer program tiers 214 do not give the user the option to select the currency but rather display the currency of the default buyer program 100. Once the currency is established for the buyer program 100, it can not be changed.

A supplier 108 may belong to more than one default buyer program 100 per buyer 106. Because a supplier 108 might bill a buyer 106 in different currencies—for example, European and Canadian—the supplier 108 may belong to multiple default buyer programs 100. The supplier 108 cannot belong to two different buyer program tiers 214 of the same default buyer program 100. A supplier 108 can only be moved between buyer programs that are buyer program tiers 214 of a default buyer program 100. They cannot be moved between default buyer programs 100.

The community manager home page 202 allows (FIGS. 5 and 6) community manager 120 to select the currency to get a community summary by buyer programs 100 trading in similar currencies. Community manager 120 defines the currency of the home page summary and can view the summary in each currency the community 112 is trading in by selecting the currency from a list box of appropriate currencies. Community manager 120 can set the default currency for display when first accessing the home page. Community manager home page 202 allows the user to select the currency for the trading snapshot. The community manager defines the currency of the trading snap shot and views the snap shot in each currency in which the community 112 is trading. The community manager can group and summarize buyer programs 100 by currency on the list buyer program page.

Community manager 120 can define the currency of the clearing and margin bank accounts. All bank accounts are defined by currency. System 10 only allows a clearing account with the same currency as the buyer program 100 to be associated with it. A community manager 120 is not allowed to associate a clearing bank account that does not have the same currency as the buyer program 100. The buyer program 100 may have a clearing account for maturing obligations that can be owned by the buyer 106. Every financial institution on a buyer program needs to have a second clearing account in which to maintain funds to pay for trades occurring each day. This keeps the two types of transactions separate.

Capability to perform supplier pricing and allocate rates to financial institutions. The buyer program 100 has the capability to perform supplier pricing, as well as the capability for allocation of rates to financial institutions 110. The buyer program list page contains a list of buyer programs 100 associated with a selected buyer 106. From the buyer program list page, community manager 120 can search and find buyer programs 100, view buyer program details, deactivate buyer programs 100 and add buyer programs 100. The buyer program list page is accessed from the home page or the community buyer list page.

Tax reporting functionality. Tax reporting functionality facilitates compliance with the Australian Goods and Services Tax (GST) regulations. This will enable implementation of the system 10 by Australian customers and also by customers in countries that have taxes similar to the GST.

A new tax profile field is added to the buyer program 100 for tax reporting.

Tax invoice and tax transaction reports are available in the report menu.

Notification of tax report generation is sent to service provider 20, community manager 120 and supplier 108.

Suppliers 108 receiving tax reports are identified by assignment of a tax reporting flag on the buyer program pricing tab.

Suppliers 108 joining the buyer program 100 are required to indicate whether they are eligible for tax reporting for the tax profile assigned (other than none) in the buyer program 100.

The tax component in the tax invoice report is calculated by locating the tax profile within the buyer program 100 and checking the tax percentage in the tax profile. The tax rate used in this invoice is the rate at the time the invoice is generated.

A tax profile drop-down is available on the buyer program pricing tab. This tax profile is used for the associated suppliers 108 transactions if eligible for tax reporting. If no tax profile is assigned to a buyer program 100, the supplier 108, community manager 120 and service provider 20 will not get any tax reporting reports or notifications during that period.

The capability to schedule the auto-advance allows the user to set the auto-advance to either "Initiate Funding" or "Review" options. If auto-advance is set to "initiate," then the sell offer is immediately submitted following execution of the auto-advance process. If auto-advance is set to "Review," the sell offer is not automatically submitted, but is held for review and the user may cancel or submit the sell offer. A task and alert notifies the supplier 108 if auto-advance created a sell offer and provides an alert for each buyer program 100.

Buy offer distribution methods for buyer programs. Two distribution methods for buy offers are available to select from the default buyer program 100 of the buyer 106 only within the community module. These are rotational and directed. In the rotational distribution method, buy offers are immediately sent to relevant financial institutions 110 after creation by a supplier 108 and proceed to the next financial institution 110 in sequence if either rejected or timed out. In the directed distribution method, buy offers are immediately sent to community manager 120 after creation by a supplier 108. Community manager 120 distributes the relevant buy offer(s) to financial institutions 110. If the buy offer times out or is rejected, it returns to the community manager 120 for redistribution. If the rotational distribution method is selected (on the distribution tab of the buyer program 100), each financial institution 110 that is part of the buyer program 100 is assigned a rotational sequence (system assigned or manually assigned). This ensures that buy offers are rotated between financial institutions 110 in a specific sequence.

Internal/external financial institutions. The self funding liquidity enhancement provides functionality allowing a buyer's 106 treasury department to "become" the financial institution 110 and fund their own payment obligations. This new type of financial institution 110 is referred to as an "Internal FI." True financial institutions 110 are referred to as "External FI's."

When adding a new buyer program 100, community managers 120 also identify and flag the internal financial institution 110.

Community manager 120 can flag a financial institution 110 as internal on the buyer program 100 (add, edit and view) FI tab. An "Internal FI" column is also on the FI tab in conjunction with an "update" button that flags the selected financial institutions 110 as internal. Any number of financial institutions 110 may be flagged as internal.

Payment obligations that have been sold to internal financial institutions 110 mature and become "Matured" at the time of purchase. Therefore, internal financial institutions 110 will never have maturing obligations and will always reflect as "Matured."

Internal financial institutions 110 are included in the rotational sequence, and therefore community managers 120 assign a rotation sequence to internal financial institutions 110 as well.

FI activation to buyer programs. When a financial institution 110 is added to a buyer program 100 by a community manager 120, the financial institution 110 is sent a notification to join the particular default buyer program 100. The financial institution 110 enters a credit limit with other necessary information and accepts the association with the relevant buyer program 100. The status of this financial institution 110 changes to "active" on the FI tab of the buyer program 100. The particular buyer program 100 is present on the active programs and portfolios pages of the FI module.

Figure 16:
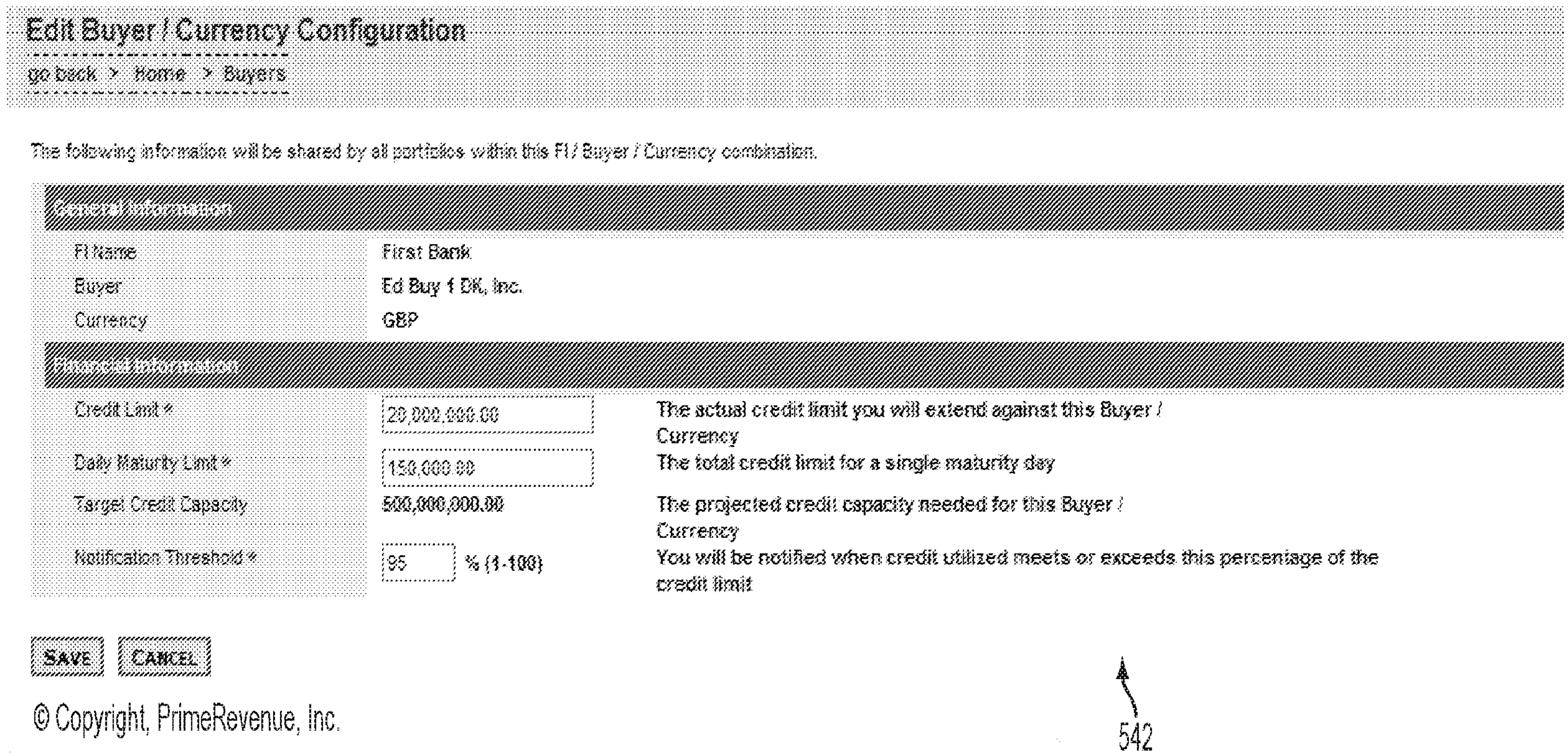
FIG. 16 is an exemplary screen image illustrating a daily maturity limit example for the buyer program of FIG. 3.

Daily maturity limit. FIG. 16 is an exemplary screen image 542 illustrating daily maturity limit. The daily maturity limit per buyer 106 is monitored to restrict the financial institution 110 from buying payment obligations that exceed the daily maximum. This helps prevent financial institutions 110 from exceeding daily credit limits. For example, a buyer 106 may have a $1 million credit limit and a $100,000 daily limit. Thus, the buyer 106 does not want to exceed $100,000 on any one day for maturing obligations. If a supplier 108 creates a sell offer and the daily limit is met, then those payment obligations are rejected for the sell offers that violate the daily limit. After checking whether the sell offer exceeds the total credit limit available for the sell offer, the daily maturity limit will be checked. If the buyer 106 has a daily maturity limit set, the system 10 checks the maturity date for the invoice on a sell offer, adds all the invoices with the same maturity date on that sell offer, and then adds that total to what has already been purchased for that day. The system 10 then compares that total to the daily limit to verify that it is not exceeded. If the limit is exceeded the user is given a warning that the daily maturity limit is exceeded for this maturity date, the available limit, and that the payment obligations for that maturity date will be removed from the sell offer. The user may then cancel or continue.

If the user continues, then those invoices are removed and the system 10 checks the next date. The system 10 will proceed date-by-date until the final sell offer is created.

If the user cancels, the sell offer is not created and the user can go back to the work sheet to remove invoices and then re-submit to stay within the daily maturity availability.

Cross community financial institution. Service provider 20 has the capability to assign FIs across buyer programs 100 and across communities 112. A financial institution 110 can belong to any number of communities 112 and any number buyer programs 100 within those communities 112. The only exception to this rule is that the financial institution 110 may not belong to more than one buyer program tier 214 within a default buyer program 100.

Cross community suppliers. Service provider 20 has the capability to assign suppliers 108 across multiple buyer programs 100 and across multiple communities 112. A supplier 108 can belong to any number of communities 112 and any number of buyer programs 100 within those communities 112. The only exception to this rule is that the supplier 108 may not belong to more than one buyer program tier 214 within a default buyer program 100.

Multiple communities within the SCF platform. Service provider 20 has the capability to set up multiple communities 112 to support the participating entities on the SCF platform. Each community 112 can consist of one or more buyer programs 100. Suppliers 108 and financial institutions 110 can belong to any number of buyer programs 100 across any number of communities 112 thus providing a comprehensive range of configuration possibilities.

Credit Memos

As described above, system 10 may accept credit memos, which may reduce the total value of payment obligations within the system. Credit memos are uploaded from the buyer's ERP system and represent offsets against the A/P obligations created between the buyer and seller outside system 10. Validity of the underlying offset is not a part of system 10 or its operation. The parties have agreed that credit memos may be input into the system to offset payment obligations, and if the parties disagree about the propriety of a given credit memo, such issues may be resolved between the parties outside the operation of system 10.

Credit memo data for a given credit memo includes buyer identification, supplier identification, currency, amount, and an effective date. The effective date is assigned by the buyer and is the date the credit memo is to be applied against payment obligations. The system associates credit memos to buyer programs in the same manner as payment obligations—by buyer identification, currency, and supplier identification.

Once loaded into the system, a credit memo remains active until its effective date. Upon that date, the system checks the untraded payment obligations from the buyer to the supplier in the buyer programs that mature (i.e. have maturity dates) on the credit memo's effective date. If the total amount of such payment obligations is equal to or greater than the total amount of the credit memos, the system offsets the credit memo total against the payment obligations (i.e. reducing the amount of the payment obligations) and generates payment instructions to pay the supplier the net amount (payment obligations minus credit memos).

On a given effective/maturity date, if the total amount of the payment obligations is less than the total amount of credit memos, then under a first option, the system changes the effective date of all credit memos having this effective date to the next business day. The system also changes the maturity date of the payment obligations maturing on this day to the next business day. That is, where a group of credit memos and a group of payment obligations have the same effective date and maturity date, respectively, and where the payment obligation total value is less than the credit memo total value, the system increases the credit memos' effective date by one business day and increases the payment obligations' maturity date by one business day. When the next business day arrives, the system repeats this procedure, not only with the credit memos and payment obligations moved forward from the previous business day, but also considering any credit memos and payment obligations having effective and maturity dates on the new business day. This process can repeat, accumulating credit memos and payment obligations, until a day occurs at which the payment obligation total value meets or exceeds the credit memo total value. At that point, the accumulated credit memos reduce the payment obligation amounts and a payment is made as described above.

Figure 17:
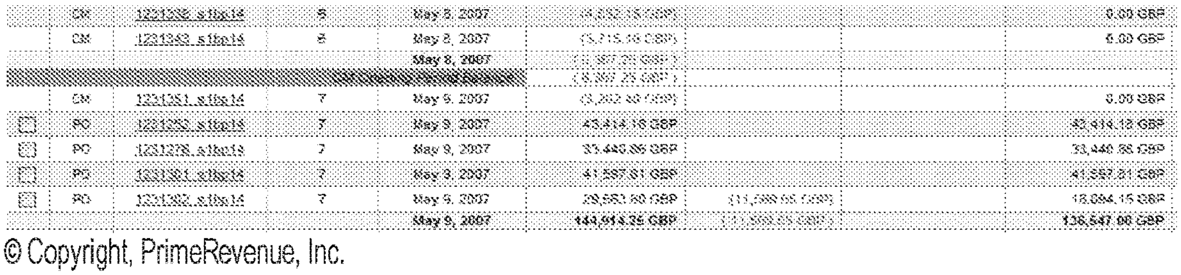
FIG. 17 is an exemplary screen image illustrating credit memo functionality in the system illustrated in FIG. 1A.
Figure 18:
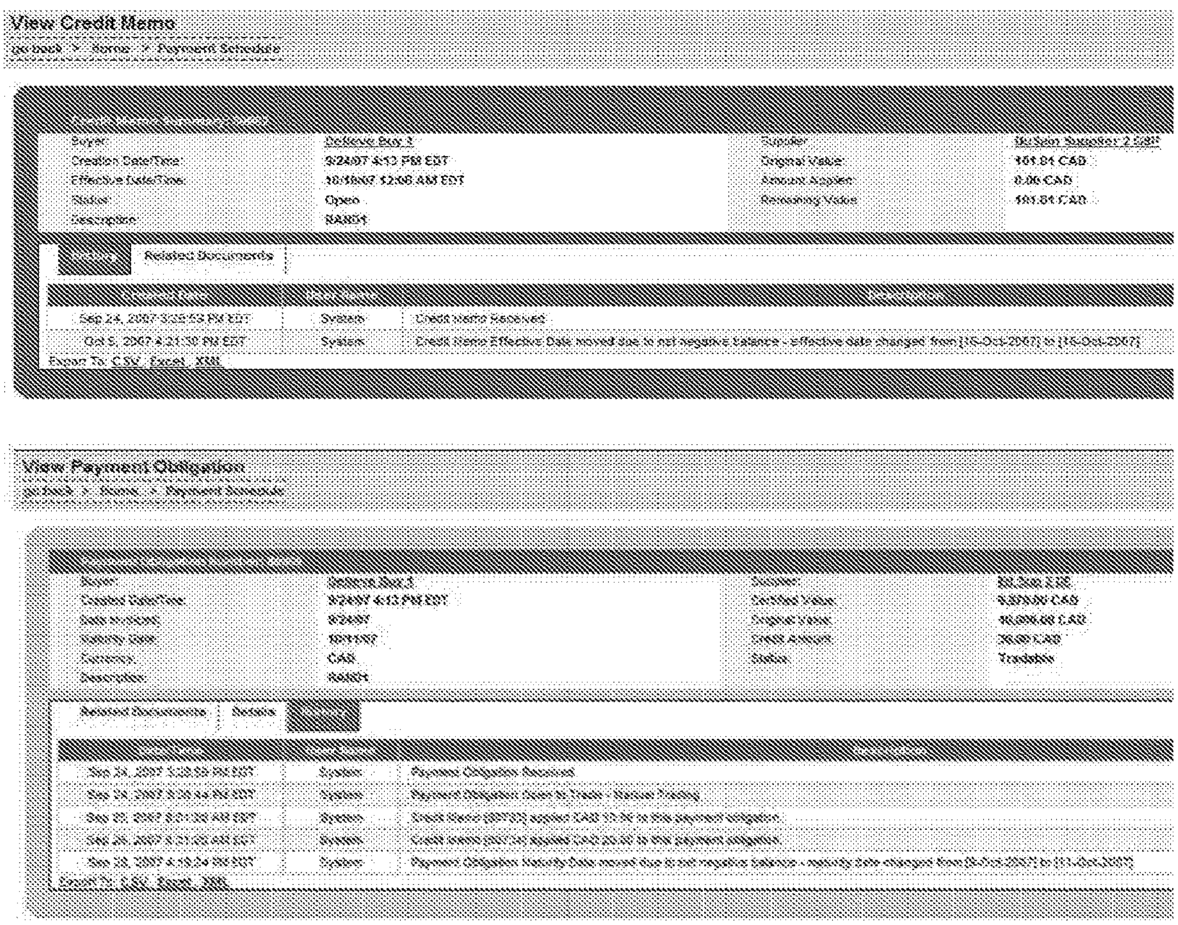
FIG. 18 is an exemplary screen image illustrating credit memo functionality in the system illustrated in FIG. 1A.

For example, and referring to FIG. 17, there are two credit memos due on May 8, but there are no payment obligations to offset the credit memos. The system automatically increments the effective dates of these credit memos to the next business day, May 9. The system may then apply the credit memos against payment obligations maturing on May 9, along with any additional credit memos with that effective date. FIG. 18 displays history notes for credit memos and payment obligations that have been moved forward.

In the presently-described embodiments, the system provides a second option under which at least some credit memos may be applied on an effective date on which the total payment obligation is less than the total credit memo value. On such a day, the system identifies the one or more credit memos that have the oldest original effective date (because credit memos may have rolled forward to new effective dates, as described above, some credit memos having the present effective date may have had an earlier original effective date). Of these one or more credit memos, the system identifies the credit memo having the largest individual value. If the value of this credit memo is greater than the total value of payment obligations maturing on this day, the system does not apply any credit memos and moves all credit memos and payment obligations to the next business day. If, however, the value of this credit memo is less than the total value of maturing payment obligations, then the system offsets the payment obligation amount by the amount of this credit memo. Having reduced the payment obligation amount(s) by the credit memo amount, the system repeats the process, excluding the now-applied credit memo, by finding the oldest/largest credit memo and applying it (if possible) to the remaining payment obligation value maturing on that day. This analysis repeats for the remaining credit memos and generates a payment utilizing all payment obligations and the applied credit memos. The remaining credit memos are moved forward to the next day.

In one embodiment, the buyer may set a maturity tolerance for net negative balances as part of the second credit memo option. This is a maximum payment threshold that the buyer is willing to allow for the above-mentioned payment of obligations and applied credit memos. As described above, if payment obligation value is less than credit memo value on a given date, there comes a point following processing of credit memos at which the system can no longer apply credit memos to payment obligation on the given date. At that point, there will be a remaining payment obligation value. If the total remaining payment obligation amount having this maturity date is less than the threshold, the system allows these payment obligations to mature and therefore processes payment of the payment obligations as described herein. The remaining credit memos, however, are incremented to the next business day. If the total remaining payment obligation value is above the threshold, both the credit memos and the payment obligations are incremented.

FIG. 19 illustrates an example of the second credit memo option. Assume that credit memos 1-5 have accumulated up to a present effective date of April 20. FIG. 19 illustrates the original effective date for each credit memo, and its value. On April 20, the total payment obligation value is $6,000. Credit memos 1 and 2 are the oldest credit memos. The largest of these is credit memo 2, for $4,400. Since this amount is less than the total payment obligation amount ($6,000), credit memo 2 is applied against the total payment obligation value, leaving a balance in payment obligation value of $600. The system next tries to apply credit memo 1. Since its value ($1,000) is less than the total remaining payment obligation value ($1,600), the system applies credit memo 1. The next earliest credit memo date is April 13, for credit memo 3. Its value is $6,500. Since that is greater than the remaining payment obligation value, the credit memo 3 cannot be processed. The next oldest credit memo date is April 14. Credit memo 4 has the largest value of the credit memos from this date, at $400. Since this amount is less than the total remaining payment obligation balance, it is applied against the payment obligation value, reducing the payment obligation value to $200. The remaining credit memo value, for credit memo 5, is $125. Since that amount is less than the remaining payment obligation value, credit memo 5 is matured and applied against the payment obligation value, leaving a payment obligation balance of $75. Assume that the maturity tolerance is set to $100. Since the remaining payment obligation value is less than the tolerance level, the system matures all of the payment obligations and credit memos, effecting payment of the $75 value to the supplier. If the remaining payment obligation balance were above $100, the maturity date of all payment obligations and effective date of all credit memos would be incremented to the next business day.

In the presently-described embodiments, the buyer may designate an existing payment obligation against which to apply a given credit memo. Each payment obligation has a reference ID given to it by the buyer at the time of upload from the buyer's ERP system. The buyer similarly assigns reference IDs to credit memos. To link the credit memo to a payment obligation, the buyer uploads a record (at the time of uploading the relevant credit memo) listing the credit memo ID and the payment obligation ID. At the upload, the system checks to see if the associated payment obligation remains untraded, and has not matured, and has a value greater than or equal to the credit memo. If these three criteria are met, the system applies the credit memo against the designated payment obligation, thus reducing its certified value by the amount of the credit memo. If any of these criteria are not met, the system ignores the relationship between the credit memo and the payment obligation and treats the credit memo as it would any other credit memo on that effective date, as described above.

Credit memos also have an effect on the trading of payment obligations, at least with regard to payment obligations having maturity dates on or after the effective date of a given credit memo. For any given credit memo, payment obligations having maturity dates earlier than the credit memo's effective date can be traded without regard to the credit memo. Credit memos can, however, prevent trading of payment obligations with maturity dates on or after the credit memo effective dates unless the system has held sufficient payment obligations to cover the credit memos.

Referring to FIG. 20, for example, the supplier sees payment obligations that are to mature on November 14. Since the earliest credit memo effective date is November 15, the supplier may trade the two payment obligations maturing on November 14.

With regard to trades, the system associates credit memos with payment obligations on a date basis. Assume, for example, that two credit memos have a given effective date and that there are several payment obligations maturing on the same date. The system checks the first credit memo value against the payment obligations. The supplier may choose to have payment obligations applied in ascending or descending order. If the supplier chooses descending order, the system checks the credit memo value first against the largest payment obligation maturing on that day. If its value is equal to or greater than the credit memo value, the system reduces the payment obligation's value by the credit memo amount. If this were the only credit memo with this effective date, the payment obligation would be available to the supplier to trade, with the reduced value. Since there is another credit memo on this day, however, the system will apply the credit memo value against this payment obligation value. If the remaining payment obligation value is greater than the second credit memo value, both credit memos are applied against the payment obligation, and the payment obligation is available to trade, at its reduced value. If the payment obligation's remaining value is less than the second credit memo amount, the system applies the credit memo to that remaining value and moves to the next-largest payment obligation to satisfy the remaining credit memo balance, proceeding to subsequent payment obligations until doing so. If the total payment obligation value is less than the total credit memo value for the day, then all of these payment obligations are held, and the remaining credit memo balance rolls to the next business day to be considered in determining whether payment obligations are available for trade on that next business day. In this manner, if credit memos are effective on a day on which no payment obligations mature, the credit memos are simply applied, for trading purposes, against the next maturing payment obligations.

Referring to FIG. 21, for example, the payment obligation of May 10 may be traded without regard to credit memos. The May 11 payment obligation, however, will be reduced by the two credit memos effective on May 11.

As noted, the supplier may choose to apply credit memos to payment obligations on a given day, for trading purposes, in ascending order, meaning that credit memos are initially associated with the smallest payment obligation maturing on that date, and then sequentially larger payment obligations.

Figure 22:
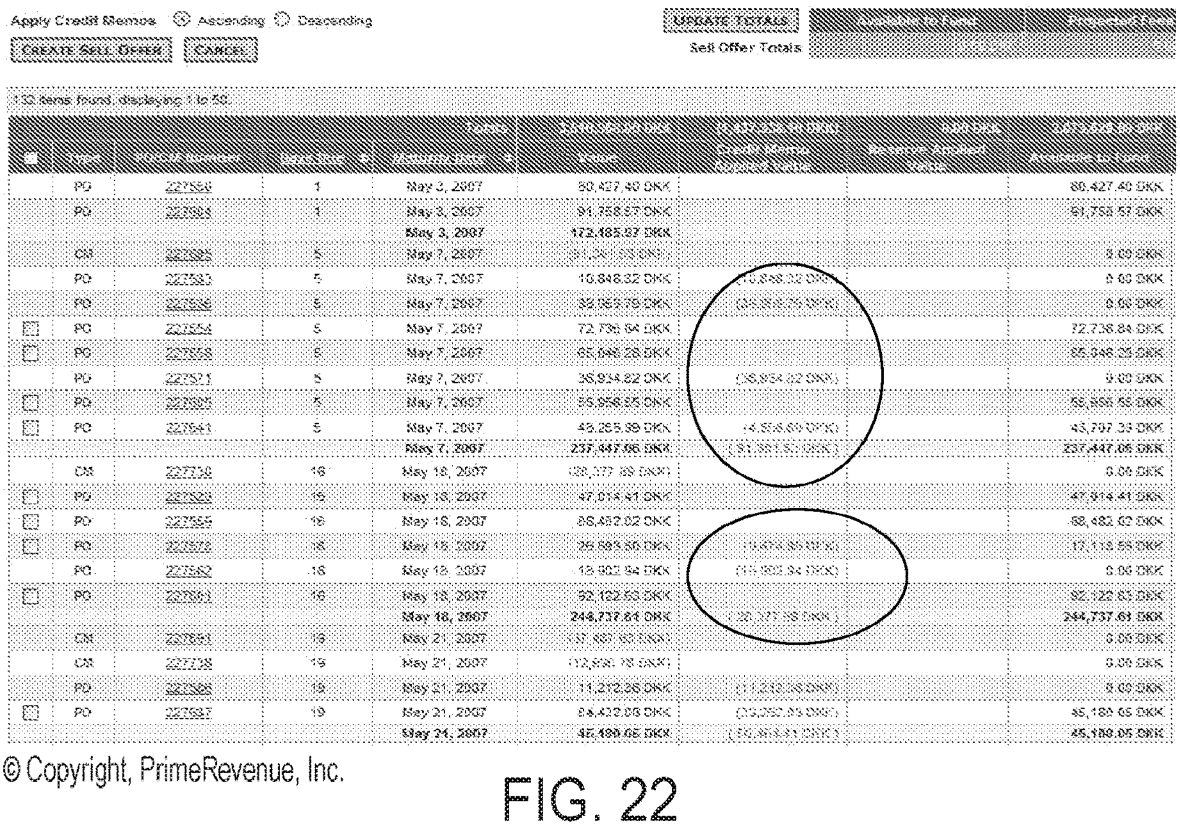
FIG. 22 is an exemplary screen image illustrating credit memo functionality in the system illustrated in FIG. 1A.
Figure 23:
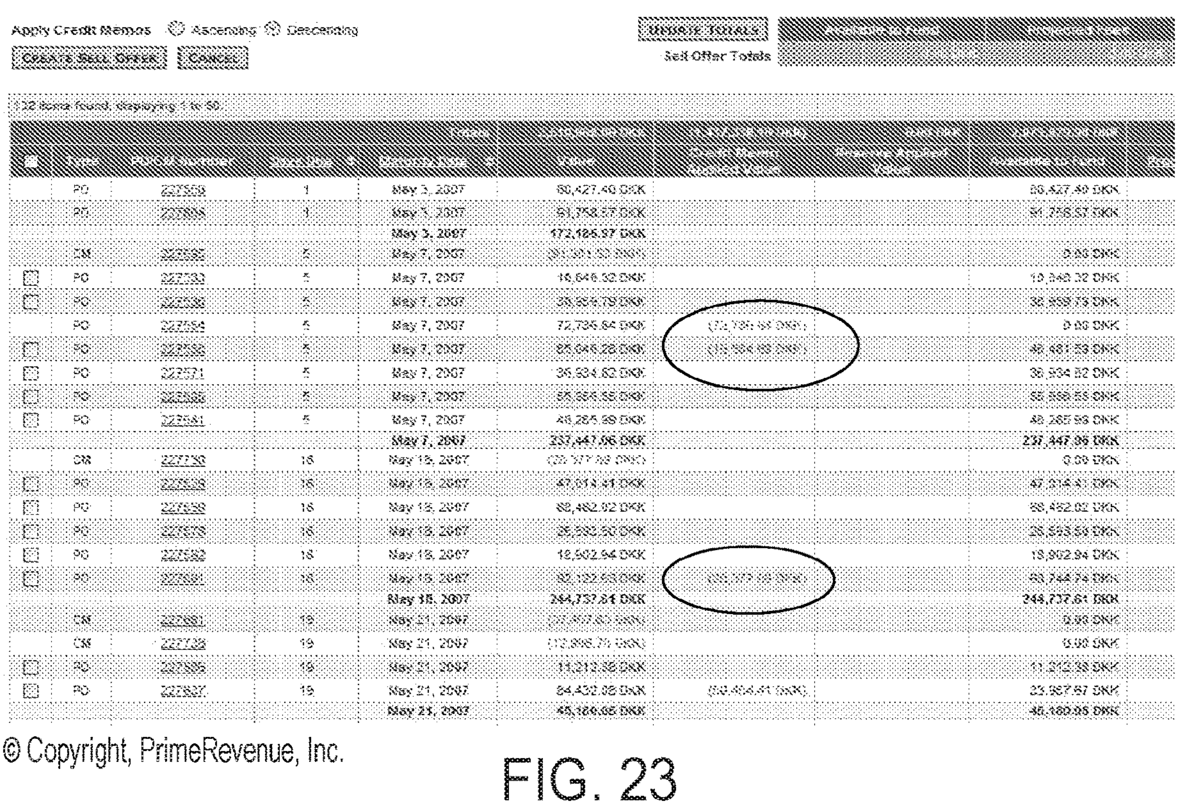
FIG. 23 is an exemplary screen image illustrating credit memo functionality in the system illustrated in FIG. 1A.

For example, and referring to FIG. 22, there is one credit memo effective on May 7, with seven maturing payment obligations. The values of the credit memo and payment obligations are provided in "value" column, and the allocation of the credit memo to the payment obligations is provided in the "credit memo applied value" column. The system applies the credit memo first to payment obligation 227533, then to payment obligation 227571, and then to payment obligation 227536. As indicated in the far left column, the system holds these three payment obligations, none of which are available to trade. The remaining credit memo balance, 4558.60 DKK, is less than the value of the next-largest payment obligation, i.e. payment obligation 227641. This remaining balance is, therefore, applied against the 641 payment obligation, which is available to trade at the reduced amount. A similar example follows in FIG. 22 for the items effective and maturing on May 8. FIG. 23 provides the same example, where the supplier selects application of credit memos to payment obligations in descending order.

In the presently-described embodiments, the system allows the trade of a credit memo that is split between payment obligations only if those payment obligations mature on the same day. As a default, the system will simply hold all payment obligations to which credit memos split between different days are applied. In the example described above, where the total payment obligation value on a given day is less than the total credit memo value, such that part of the second credit memo is applied against a payment obligation on a subsequent day, assume that the credit memo is applied against a payment obligation having a value greater than the hold over credit memo amount. Under the default setting, the system holds the payment obligation, even though there is an available remaining amount. In the event, however, that the buyer subsequently uploads payment obligations on the original maturity date, such that the total payment obligation value on that date exceeds the total credit memo value, and such that the system can then apply all credit memos on the original date to payment obligations maturing on that date, the system changes allocation of the credit memo back to payment obligations on the original date, and the payment obligation on the next day, previously held, will then be available for trade. Also, where a payment obligation is held because of a split-day application of a credit memo, the remaining payment obligation balance is applied to the reserve.

For example, and referring to FIG. 24, the credit value on April 26 is greater than the payment obligation value, and the credit value is therefore carried over to April 27. Because the credit memo value is split over more than one maturity date, the payment obligation to which the credit memo value is applied (53545) is unavailable for trade. Its remaining balance (1750 EUR) is reflected in the held value column.

The restriction on trading credit memos applied across maturity dates does not apply to self-funded buyer programs, if the supplier chooses to trade all payment obligations subject to the split credit memo on the same day. In a self-funded configuration, the system automatically changes a payment obligation maturity date to the trade date. Thus, if a supplier to a self-funded buyer program selects all payment obligations subject to a split credit memo to trade on the same day, all the payment obligations will have the same maturity date, eliminating the maturity date split.

In a still further embodiment, a buyer program may be configured with an "allow payment obligation move at trade" option to be activated, thereby allowing the trade of payment obligations subject to split credit memos to be traded. If the supplier selects such a payment obligation for trade, the system changes the maturity date of each zeroed-out payment obligation to which the associated credit memo is applied to the maturity date of the partially-reduced payment obligation. Thus, all payment obligations subject to the split credit memo now have the same maturity date. The system therefore trades the partially reduced payment obligation, along with the zeroed-out payment obligations. Referring to FIG. 25, for example, there is a greater credit memo value than payment obligation value on April 26, and the credit memo value is therefore carried over to April 27. Because the "allow payment obligation move at trade" option is activated, the payment obligation to which the credit memo value is partially applied (payment obligation 53545) can be traded. If the supplier trades this payment obligation, the system changes the maturity dates of all the zeroed payment obligations from April 26 to April 27, and changes the effective dates of all credit memos applied on April 26 to April 27.

The credit memo values are subtracted from the value of payment obligation before fees are calculated. That is, when a credit memo is applied against a payment obligation, the payment obligation's certified amount is reduced by the credit memo amount.

Credit Memo Report. FIG. 26-A(1) is an exemplary screen of a credit memo report criteria, as indicated at 555. Also indicated at 555, FIG. 26-A(2) is an exemplary screen of credit memo report results.

Credit memo documents have an effective and a submitted date. Under date range selection options, the term "Credit Memo Dates" appears next to the radio buttons for selecting one of the following: effective date, submitted date, original effective date, applied date, or maturity date.

The "Include PO and Maturity/Effective Date Info" option allows the user to view in the report results the payment obligation data in addition to credit memo data.

If the "Include PO and Maturity Date Info" is on, then a payment obligation number or maturity date is displayed. If the credit memo is applied to a maturity date rather than to a trade, it does not include a payment obligation number. Applied date, maturity date, and applied amount are populated, and the original date field is left blank.

Reserve

The reserve functionality combines with credit memos to prevent the buyer 106 from acquiring a net negative balance with their suppliers 108 due to trading. The reserve functionality allows the system 10 to set a reserve percentage or amount, or a combination of both, per month to hold back some payment obligations for a supplier 108 and prevent them from being traded. If the combination is used, the system reserves the higher amount that would result from use of the percentage of the fixed amount for the given month. Reserve amounts and percentages can be set the same for all months or can vary by month. The non-traded or reserved payment obligation amount is used to offset credit memos coming in for that supplier 108. For example, suppose a buyer 106 owes a supplier $500,000, and then discovers before maturity that they have $50,000 in credits. If the supplier 108 traded all $500,000, then the buyer 106 would actually owe $50,000 more than desired. Having a 10% reserve would hold back $50,000. Since the $50,000 is not traded, it can be offset with credits.

Reserves and Available to Fund. The reserve applies when calculating the available amount to fund. The reserve is used for trades rather than with maturing obligations, and only restricts the trading of obligations.

Reserves and Credit Memos. The reserve functionality works in conjunction with credit memos. The reserve function typically runs after the credit memo application. When a user reaches the available to fund screen, and the system 10 calculates available to fund, the system 10 also calculates the reserve. From a credit memo details tab, changing the application of credit memos to descending from ascending also causes the reserve to be reapplied. A payment obligation that was reserved may no longer be reserved due to how credit memos were applied. For example, a reserved payment obligation may go to $0.00 value because of the new credit memo run and thus, can no longer be reserved.

The reserve is also applied in an ascending order only. It starts at the beginning of a monthly period and moves downward, consuming earlier payment obligations before consuming later payment obligations. A supplier 108 cannot make a descending reserve calculation from the end of the month. Thus, the reserve typically starts on today's date and moves to the end of the month. Once the reserve calculation reaches the first date with available payment obligations, it reserves in an ascending manner. The reserve calculation takes the smallest payment obligations and moves to the largest payment obligations, with the goal of consuming smaller payment obligations and leaving larger payment obligations to trade.

Reserve Period. The reserve period typically applies to a calendar month, and the reserve amount is calculated for that period. If the calculated reserve amount is not used for that period, it does not typically apply to any other periods.

For example, if the reserve for January is $10,000, the entire reserve is $10,000. If nothing is reserved in January, or no credits are received, the $10,000 balance does not carry over to February, but rather expires at the end of the month (January).

However, if credit memos are not used in a period (or month), they do not expire, but rather move on to the next month. If the credit memo carries over to the next month, it consumes the reserve for that month.

Percentage or Amount. As noted above, the reserve can be based upon a calculated percentage or a specific amount of the uploaded payment obligations. If both a calculated percentage and a specific amount are specified, then the greater of the two is used as the reserve.

As an example, 10% and $10,000 are chosen for the reserve. If one payment obligation was uploaded for $1,000, the reserve would be $10,000 (10% of $1,000 is $100, thus the larger $10,000 is the reserve). However, if the reserve is set at $10,000, but with no percentage specified, then the system 10 reserves $10,000 and performs no percentage calculations. Similarly, if the reserve is set at 10%, then $100 is the reserve.

Percentage looks at all uploads for the month for payment obligations having a maturity date in that month. If the reserve is 10% for January, then it is 10% for all uploads in the month of January with a maturity date in January. Thus, if payment obligations are uploaded on January 15, having a maturity date in January, the maturity date January 1-31 is used for the 10% calculation.

It should be noted that the reserve calculation is based on original value of the payment obligations rather than the certified value. A credit memo dedicated by the buyer to a specific payment obligation (as discussed above) decreases the certified value, and would cause miscalculations of the reserve percentage.

Reserve Consumption. When the total amount of credit memos uploaded within the monthly period equals or exceeds the specified reserve amount, then the reserve commitment is considered met for the period. The reserve amount is then set to zero.

For example, if the reserve is $10,000 for January and $2,000 in credit memos are uploaded, then the reserve is $8,000. But if $10,000 in credit memos are uploaded, then the reserve is zero for that month. The credit memo amount is based on effective date of the credit memo, not the uploaded or submitted date. If credit memos for February are uploaded in January, then they count toward the February reserve consumption rather than January. It should be noted that this reserve consumption includes all credit memo amounts, that is credit memos and credit memos dedicated to payment obligations.

Figure 27:
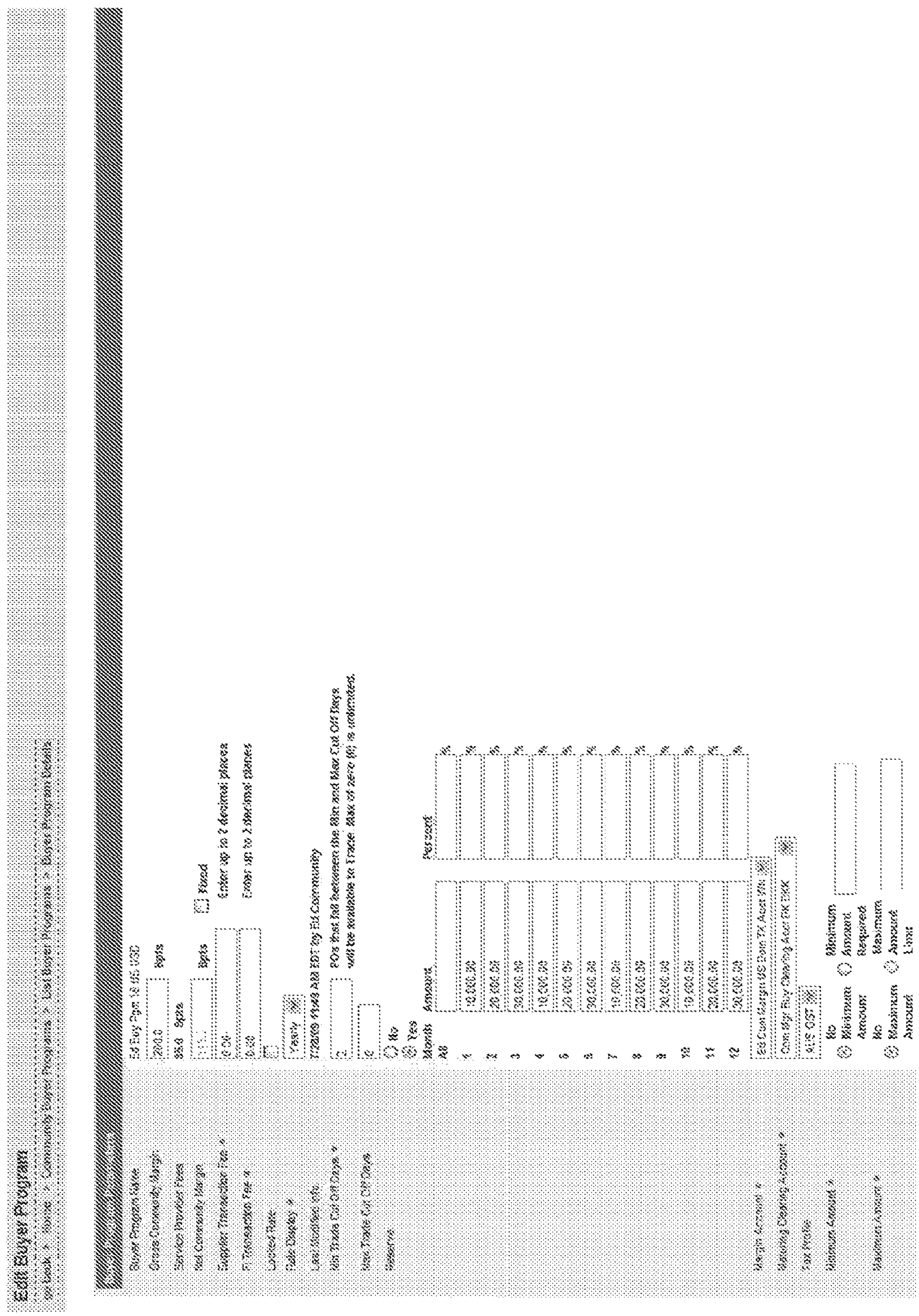
FIG. 27 is an exemplary screen image illustrating a buyer program view for pricing for the buyer program of FIG. 3.

Reserves are set in the community module. FIG. 27 is an exemplary screen image of the buyer program parameters view. The reserve amount is maintained by community manager 120 on behalf of the buying organization. A reserve can be specified for any buyer program 100 or buyer program tier, and can be on or off for any of the tiers.

A "Reserve" field is included in the buyer program 100 and can be set by any tier. Any supplier 108 in the tier then gets this reserve. The reserve field can be set on or off (Yes or No in FIG. 27). If the reserve field is turned on, there are two fields for entering percentage and amount for each month. The user can enter values in one or both fields, and the larger of the two values is used as the reserve amount.

The reserve amount can be changed as needed and takes effect immediately. For example, if the reserve amount is changed, then moments after the change, a user at the available to fund screen receives the effects of the new amounts.

The reserve for a month is not prorated. Rather the entire reserve is the value for a given month.

Reserves Restrict Trading of a Payment Obligation. A payment obligation can not be traded if a reserve has been applied against the payment obligation on the worksheet. This is true even if it is a partial application. For example, a $1 reserve applied to a $1,000 payment obligation causes the $1,000 to be on reserve.

Reserve Applied to Tradable Invoices Only. A reserve only applies to tradable payment obligations on the worksheet. A reserve can not be applied against a non-tradable payment obligation on the worksheet.

Available to Fund Screen Modifications. The reserve amount is available to the user on the funding estimate, date summary, and payment obligation details page.

Reserve is calculated per month. For example, if the date is January 1, the reserve is $10,000 per month, and there are payment obligations with maturity dates in January, February, and March, the reserve is $30,000 (assuming no credit memos). The reserve consumes $10,000 per month rather than $30,000 beginning in January.

As credit memos are uploaded to the system 10, the reserve amount is consumed and the amount for the month is reduced.

After the credit memos are applied, the reserve balance is applied to invoices in an ascending method for the month. Upon reaching the first date with available payment obligation reserves are applied in an ascending manner and consumed until the reserve balance goes to zero. A payment obligation with a reserve is non-tradable.

The reserve amount applied for a payment obligation goes into the reserve applied value. The user sees this value since they can not trade the payment obligation due to the reserve.

Supplier Customer List. The reserve column under the supplier list denotes whether a reserve is on or off. If the reserve is on, the percentage, amount, or both are displayed.

Buyer Supplier List. The reserve column under the buyer supplier list denotes whether a reserve is on or off. If the reserve is on, the percentage, amount, or both are displayed.

Auto Advance. The auto-advance process utilizes the same rules for calculation and application of reserve as does the directed trade process. The auto-advance process calculates the reserve and then applies that reserve with the same rules (applying to those payment obligations being held for split credit memos, then by maturity date, and then by the lowest certified value within the month). Once the reserve has been applied, the system determines which remaining tradable payment obligations to auto-advance based on the parameters set for auto-advance.

Even if a buyer program does not have reserve set, if a payment obligation is being held by a credit memo, the remaining amount of the payment obligation (where a payment obligation is held as a result of a credit memo split across different maturity dates) will be reflected in the reserve value, both on the date summary and on a credit memo details tab. This allows the resulting available to fund amount to be correct (payment obligation value minus credit memo value minus reserve equals available to fund).

For example, assume that the buyer program for a supplier detailed in FIG. 35 and FIG. 36 has a 10% reserve. In August, there are approximately 4.1 million dollars in payment obligations, and $168,000 in credit memos. The reserve is $410,000, minus the $168,000 in existing credit memos, leaving a calculated reserve of $242,000. The system actually reserved $266,000, due to the fact that payment obligations are reserved in their entirety.

In this example, a set of credit memos split across two maturity dates, on August 15 and August 16. Because of the split payment obligation 248232 is not tradable, the first application of reserve goes to this payment obligation. Secondarily, the system begins reserving payment obligations on the first maturity that is eligible for trading (August 10). The system then applies reserve to payment obligations on August 13, in ascending-amount order, starting with the lowest value payment obligation and continuing until the reserve is met (payment obligation 248262). The value of this payment obligation ($25,000) is greater than the difference between the calculated reserve and the applied reserve ($24,000), because the entire amount of the payment obligation is reserved. In September, and referring to FIGS. 37 and 38, there is $192,000 in payment obligations and no credit memos. The 10% reserve is $19,000. That amount applies to a single payment obligation and holds the entire payment obligation.

Track Documents

Figure 30:
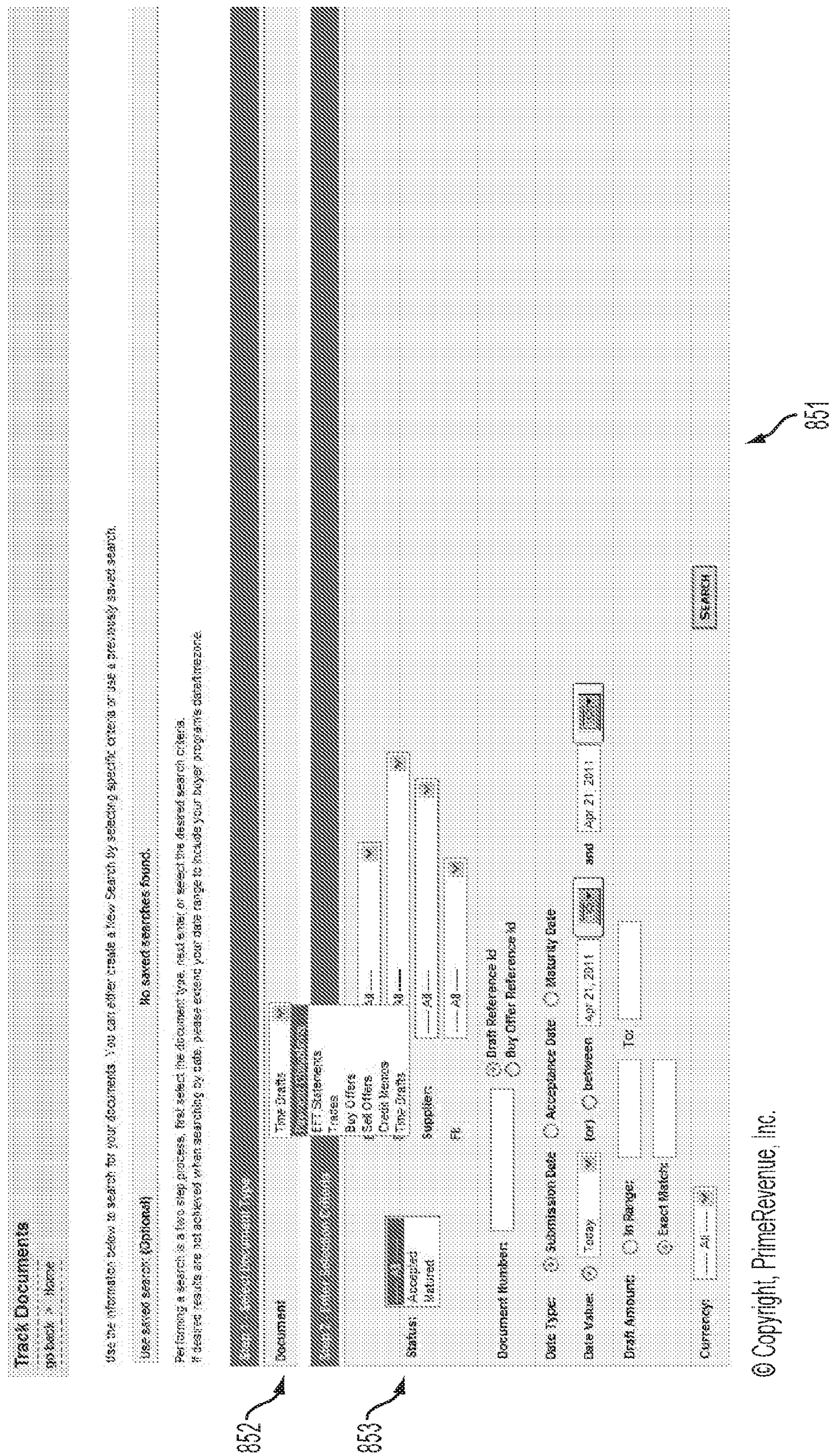
FIG. 30 is an exemplary screen image illustrating a document tracking feature of the system shown in FIG. 3.
Figure 32:
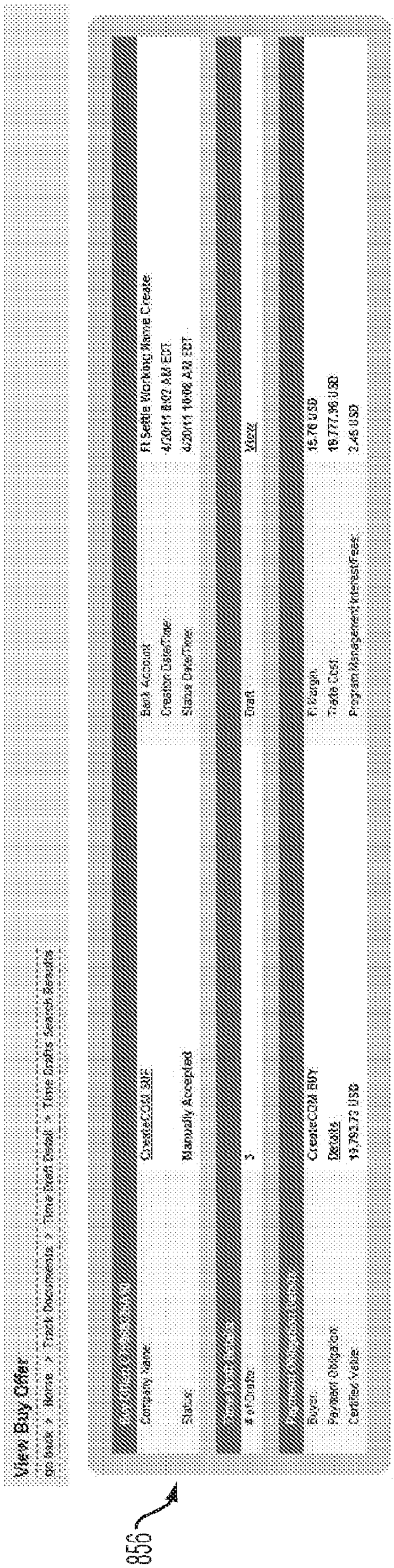
FIG. 32 is an exemplary screen image illustrating buy offer information accessible from the search results illustrated in FIG. 31.
Figure 33:
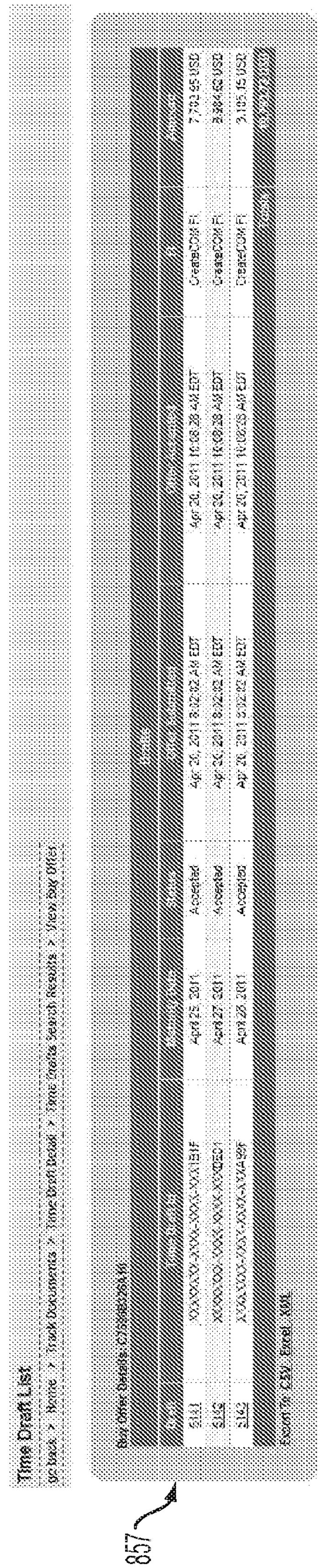
FIG. 33 is an exemplary screen image of time draft information accessible from the screen shown in FIG. 32.
Figure 34:
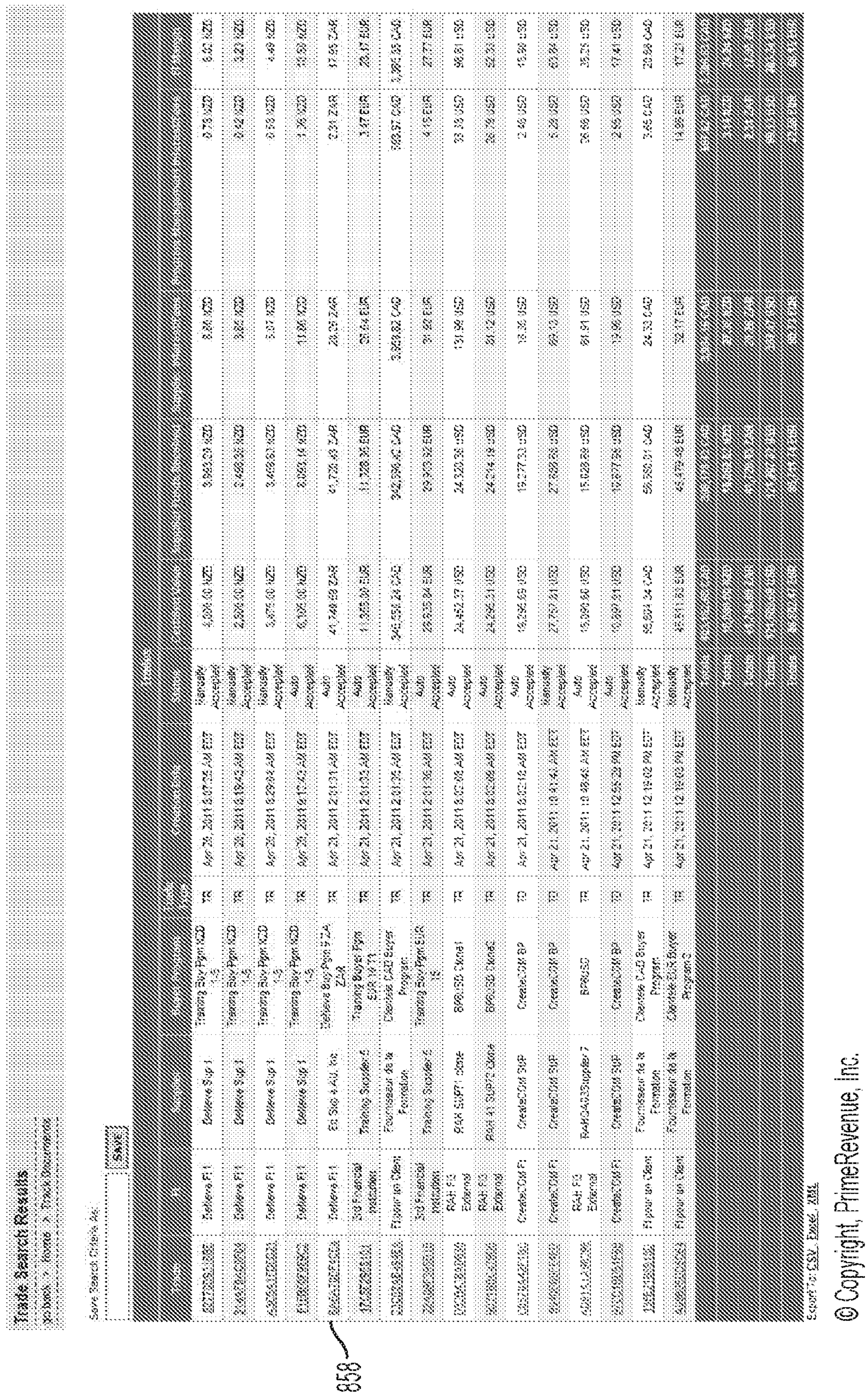
FIG. 34 is an exemplary screen image of search results accessible from the search screen of FIG. 30.

FIG. 30 illustrates a screen image 851 of a document tracking search page available in the user interfaces for all system participants, i.e. suppliers, financial institutions, buyers, community managers, and the service provider. In the presently-described embodiment, only those entity users having a "track documents" security role may access this page. Upon selecting the document search, the user is presented with a first screen 852 at which the user selects the desired document type from a pull-down menu. Upon selecting a document type, a secondary window 853 presents a series of search criteria specific to that document type. In the example shown in FIG. 30, the user has selected "time drafts," and the search criteria in window 853 relate to data stored in database 452 for time drafts and that may be used to generate a search query. Upon defining the desired search criteria, the user executes the search by activating a "search" button. FIG. 31 provides an image of a search report screen 854 resulting from the search executed from page 851 in FIG. 30. Activation of the hyperlink for a given draft reference ID in the search results page presents a time draft detail report, as shown in FIG. 28. This screen presents a list 855 providing information regarding the payment obligations underlying a given time draft. Buy offer details may be viewed on a buy offer details page 856 illustrated in FIG. 32. Screen 856 may be accessed by activating a hyperlink under the "buy offer reference ID" column of screen 854 in FIG. 31. Screen 856 identifies the number of time drafts associated with the buy offer. The trade cost is the amount the trade cost the financial institution. It consists of the amounts paid to the supplier, the service provider, and the community manager. The difference between trade cost and certified value is the financial institution margin. The program management/interest fee is the sum of the amounts paid to the service provider and the community manager. Screen 856 provides access to a details page 857, shown in FIG. 33, through activation of a "view" hyperlink. Activation of the hyperlink in the "draft" column of screen 857 for any row brings the time draft detail page, shown in FIG. 28, for that time draft. If, at screen 852 in FIG. 30, the user selects "trades," and executes a search in a resulting page 853 for trades, the system presents a screen 858, as shown in FIG. 34. Note the "trade type" column, which indicates whether the trade is a trade of receivables (TR) or of time drafts (TD). The "suppliers funds received" is the amount paid to the supplier based on the trade. It is displayed immediately after the trade occurs. The "supplier interest/fees" is the supplier rate amount plus the supplier transaction fees, if any. The "program management interest/fees" is the service provider rate amount, the service provider's portion of transaction fees (if any), the community rate amount, and the community portion of any transaction fees.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof

What is claimed is:

1. An electronic supply chain finance system utilized by a buyer, a supplier that provides goods and/or services to the buyer and a financial institution, each of which is remote from the system and has access to the system through the Internet, comprising:

a non-transitory computer-readable medium containing program instructions;

a processor in operative communication with the non-transitory computer-readable medium and including hardware or software based logic to execute the program instructions that implement a method comprising the steps of receiving over the Internet information defining a payment obligation from the buyer to the supplier, the information comprising a payment amount of the payment obligation, a maturity date of the payment obligation, identification of the buyer, and identification of the supplier, creating a negotiable instrument as an electronic record in memory based on the information, wherein the buyer is obligor and the electronic record stores an identification of the supplier as obligee of the negotiable instrument, an identification of a financial institution maintaining an account upon which the buyer may draw funds, a payable date based on the maturity date of the payment obligation, a payment value based on the payment amount of the payment obligation, and an identifier that is unique among identifiers stored in a plurality of said negotiable instrument electronic records created by performances of the creating step by the processor, and storing in the electronic record an electronic indorsement on behalf of the supplier, storing in the electronic record an electronic signature on behalf of the buyer, applying a function to the electronic record that produces an output that varies as a function of data stored in the electronic record, and storing the output, and providing to a computer system of a first financial institution over the Internet electronic instructions including a print request that is, upon receipt at the first financial institution computer system, executable at the first financial institution computer system to cause the first financial institution computer system to print the negotiable instrument, indorsed on behalf of the supplier in favor of the first financial institution as payee; and an interface that, for parties remote from the system, controls access by the parties through the Internet to a plurality of negotiable instrument electronic records created through performances of the creating step by the processor, so that said access is limited to said plurality of negotiable instrument electronic records.

2. The system as in claim 1, wherein, at the creating step, the payable date is the maturity date.

3. The system as in claim 1, wherein the method comprises the steps of receiving from the supplier an offer to sell the payment obligation and receiving an acceptance of the offer from the first financial institution.

4. The system as in claim 1, wherein, at the creating step, the negotiable instrument is a time draft, on behalf of the buyer as drawer, to the supplier as payee, and drawn on an account owned or controlled by the buyer.

5. The system as in claim 1, wherein the identifier is encrypted.

6. The system as in claim 3, wherein, at the step of receiving the offer to sell the payment obligation, the sell offer has a discounted value and a payment date earlier than the maturity date, based on the financial terms.

7. The system as in claim 3, wherein the program instructions implement the step of creating the negotiable instrument as an electronic record after implementing the step of receiving the acceptance.

8. The system as in claim 3, wherein upon the receipt of the acceptance of the offer from the first financial institution, the method includes the step of receiving over the Internet instructions from a user associated with the first financial institution to print the negotiable instrument, and wherein the providing step comprises creating the print request in response to receipt of the instructions from the user, wherein the print request includes data corresponding to the negotiable instrument created as the electronic record and instructions to control printing format at the first financial institution computer system.

9. The system as in claim 1, wherein the interface comprises a graphical user interface presented by the processor and a data center switch that provides the remote parties access to the graphical user interface via the Internet.

10. The system as in claim 9, comprising a first computer sub-system comprising a said non-transitory computer-readable medium and a said processor, and a second computer sub-system comprising a said non-transitory computer-readable medium and a said processor, wherein the second computer sub-system stores a copy of the information and the negotiable instrument electronic record stored at the first computer sub-system, wherein the first computer sub-system maintains a single said electronic record for each said negotiable instrument of a plurality of said negotiable instruments, and wherein the data center switch selectively and mutually exclusively provides the remote parties access to the first computer sub-system and the second computer sub-system.

11. An electronic supply chain finance system utilized by a buyer, a supplier that provides goods and/or services to the buyer and a financial institution, each of which is remote from the system and has access to the system through the Internet, comprising:

- a non-transitory computer-readable medium containing program instructions; and
- a processor in operative communication with the non-transitory computer-readable medium and including hardware or software based logic to execute the program instructions that implement a method comprising the steps of
  - receiving over the Internet accounts payable information from an accounts payable system operating on a computer system of the buyer defining a payment obligation from the buyer to the supplier, the information comprising a payment amount of the payment obligation, a maturity date of the payment obligation, identification of the buyer, and identification of the supplier,
  - receiving over the Internet instructions from a user associated with a first financial institution to print a negotiable instrument, wherein the negotiable instrument
    - is drawn on a financial institution maintaining an account upon which the buyer may draw funds,
    - is indorsed to the first financial institution as payee on behalf of the supplier as obligee,
    - has a payable date based on the maturity date, and
    - has a payment value based on the payment amount,
  - creating a print request that is executable by a computer system of the first financial institution and that comprises data corresponding to the negotiable instrument and instructions to control printing format at the first financial institution computer system, and
  - providing to the computer system of the first financial institution over the Internet electronic instructions including a said print request that is, upon receipt at the first financial institution computer system, executable at the first financial institution computer system to cause the first financial institution computer system to print the negotiable instrument, indorsed to the first financial institution on behalf of the supplier as obligee thereof, wherein the negotiable instrument has the buyer as obligor and the supplier as obligee, at least partially effecting a trade between the supplier and the first financial institution prior to the maturity date that is based on negotiation of the negotiable instrument.

12. The system as in claim 11, wherein, at the second receiving step, the payable date is the maturity date.

13. The system as in claim 11, wherein the negotiable instrument is a time draft.

14. A method of providing funds to a supplier that provides goods and/or services to a buyer, comprising:

- receiving from a first computer system via the Internet, at a second computer system remote from the buyer, the supplier and a financial institution, information defining a payment obligation from the buyer to the supplier corresponding to a transaction in which the supplier provides the goods and/or services to the buyer, the information comprising a payment amount of the payment obligation, a maturity date of the payment obligation, identification of the buyer, and identification of the supplier,
- creating a negotiable instrument as an electronic record in memory at the second computer system based on the information, wherein the buyer is obligor and the electronic record stores
  - an identification of the supplier as obligee of the negotiable instrument,
  - an identification of a financial institution maintaining an account upon which the buyer may draw funds,
  - a payable date based on the maturity date of the payment obligation,
  - a payment value based on the payment amount of the payment obligation, and
  - an identifier that is unique among identifiers stored in a plurality of said negotiable instrument electronic records created by performances of the creating step by the second computer system;
- storing in the electronic record an electronic indorsement on behalf of the supplier;
- storing in the electronic record an electronic signature on behalf of the buyer;

applying a function to the electronic record that produces an output that varies as a function of data stored in the electronic record, and storing the output;

prior to the maturity date, electronically providing to a computer system of a first financial institution via the Internet electronic instructions including a print request that is, upon receipt at the first financial institution computer system, executable at the first financial institution computer system to cause the first financial institution computer system to print the negotiable instrument, indorsed on behalf of the supplier in favor of the first financial institution as payee;

generating an electronic funds transfer instruction to transfer to an account of the supplier from an account of the first financial institution of an amount of funds determined by the payment amount of the payment obligation and financial terms under which the first financial institution agrees to trade the payment obligation and issuing the electronic funds transfer instruction to effect transfer of the amount of funds; and restricting access of parties remote from the system through the Internet to a plurality of said negotiable instrument electronic records created through performances of the creating step.

15. The method as in claim 14, further comprising the step of, prior to the electronically providing step, receiving over the Internet instructions from a user associated with the first financial institution to print the negotiable instrument, and wherein the electronically providing step comprises creating the print request, wherein the print request includes data corresponding to the negotiable instrument stored in the electronic record and instructions to control printing format at the first financial institution computer system.

16. An electronic supply chain finance system utilized by a buyer, a supplier that provides goods and/or services to the buyer, and a financial institution, each of which is remote from the system and has access to the system through a computer network, comprising:

a non-transitory computer-readable medium containing program instructions;

a processor in operative communication with the non-transitory computer-readable medium and including hardware or software based logic to execute the program instructions that implement a method comprising the steps of receiving over the network information from the buyer defining a payment obligation from the buyer to the supplier, creating a negotiable instrument as an electronic record in memory defined by the non-transitory computer-readable medium, wherein the electronic record defines the buyer as obligor, and the supplier as obligee, of the negotiable instrument, the electronic record defines a payable date of the negotiable instrument based on a maturity date of the payment obligation and a payment value based on a payment amount of the payment obligation, and the electronic record includes an identifier, providing to a computer system of the financial institution over the computer network electronic instructions including a print request that is, upon receipt at the computer system of the financial institution, executable at the financial institution computer system to cause the financial institution computer system to print the negotiable instrument, indorsed on behalf of the supplier in favor of the financial institution as payee, and applying a function to the electronic record that produces an output data that varies as a function of data stored in the electronic record, and storing the output data; and an interface that, for parties remote from the system, controls access by the parties through the computer network to a plurality of negotiable instrument electronic records created through performances of the creating step by the processor so that said access is limited to said plurality of negotiable instrument electronic records, each said negotiable instrument electronic record of the plurality having a said identifier that is unique with respect to said identifiers of the other negotiable instrument electronic records of the plurality.

17. The system as in claim 16, wherein, at the creating step, the payable date is the maturity date.

18. The system as in claim 16, wherein, at the receiving step, the payment obligation is irrevocable by the buyer in response to receipt of the information from the buyer defining the payment obligation.

19. The system as in claim 16, wherein the method comprises the steps of receiving from the supplier an offer to sell the payment obligation and receiving an acceptance of the offer from the financial institution.

20. The system as in claim 19, wherein the method implemented by the processor comprises the step of, after receipt of the acceptance and creation of the negotiable instrument electronic record, generating an electronic funds transfer instruction to transfer to an account of the supplier from an account of the financial institution of an amount of funds based on the payment amount of the payment obligation and, upon receipt of the acceptance, issuing the electronic funds transfer instruction to effect transfer of the amount of funds.

21. The system as in claim 19, wherein the program instructions implement the step of creating the negotiable instrument as an electronic record after implementing the step of receiving the acceptance.

22. The system as in claim 19, wherein upon receipt of the acceptance of the offer from the financial institution, the method includes the step of receiving over the computer network instructions from a user associated with the financial institution to print the negotiable instrument, and wherein the providing step comprises creating the print request in response to receipt of the instructions from the user, wherein the print request includes data corresponding to the negotiable instrument and instructions to control printing format at the financial institution computer system.

23. The system as in claim 19, wherein, at the step of receiving the sell offer, the sell offer has a discounted value and a payment date earlier than the maturity date.

24. The system as in claim 16, wherein, at the creating step, the negotiable instrument is a time draft, on behalf of the buyer as drawer, to the supplier as payee, and drawn on an account owned or controlled by the buyer.

* * * * *